United States Patent
Harif

(10) Patent No.: US 9,592,562 B2
(45) Date of Patent: Mar. 14, 2017

(54) CUTTING TOOLS, CUTTING TOOL HOLDERS AND CUTTING INSERTS THEREFOR

(75) Inventor: Gershon Harif, Holon (IL)

(73) Assignee: GERSHON SYSTEM LTD., Holon (IL)

( * ) Notice: Subject to any disclaimer, the term of this patent is extended or adjusted under 35 U.S.C. 154(b) by 1114 days.

(21) Appl. No.: 13/381,541

(22) PCT Filed: Jul. 1, 2010

(86) PCT No.: PCT/IL2010/000534
§ 371 (c)(1),
(2), (4) Date: Dec. 29, 2011

(87) PCT Pub. No.: WO2011/001438
PCT Pub. Date: Jan. 6, 2011

(65) Prior Publication Data
US 2012/0107061 A1    May 3, 2012

Related U.S. Application Data

(60) Provisional application No. 61/222,757, filed on Jul. 2, 2009, provisional application No. 61/248,121, filed on Oct. 2, 2009.

(51) Int. Cl.
*B23C 5/20* (2006.01)
*B23C 5/10* (2006.01)
(Continued)

(52) U.S. Cl.
CPC ............ *B23C 5/10* (2013.01); *B23B 27/1611* (2013.01); *B23B 27/1629* (2013.01);
(Continued)

(58) Field of Classification Search
CPC .. B23B 27/16; Y10T 407/23; Y10T 407/1924
(Continued)

(56) References Cited

U.S. PATENT DOCUMENTS 3,805,349 A    4/1974 Nose
4,480,949 A    11/1984 Van De Bogart
(Continued)

FOREIGN PATENT DOCUMENTS

CN    1148829    4/1997
CN    1211207    3/1999
(Continued)

OTHER PUBLICATIONS

International Search Report from International Application No. PCT/IL2010/000534 dated Feb. 15, 2011.
(Continued)

*Primary Examiner* — Daniel Howell
*Assistant Examiner* — Ryan Rufo
(74) *Attorney, Agent, or Firm* — Dorsey & Whitney LLP

(57) ABSTRACT

A cutting element for use in a cutting operation, comprising a cutting edge (CE) capable of cutting out material from a workpiece during the operation, to form therein a workpiece corner of angle alpha. There exists at least one view of the cutting edge in which a portion of the cutting edge is delimitable by a first (L1) and a second (L2) line oriented tangentially to the portion of the cutting edge portion at respective tangency points A and B. The lines form therebetween a cutting angle corresponding to the workpiece corner angle alpha and have a vertex 0. For a bisector of the cutting angle intersecting the portion of the cutting edge at the point C, the projection C of the point C of the portion of the cutting edge on a line OL passing through the vertex 0 perpendicularly to the plane of the one view is located
(Continued)

between projections A1 and B' of the respective points A and B of the portion of the cutting edge on the line OL.

15 Claims, 167 Drawing Sheets

(51) Int. Cl.
| | |
|---|---|
| B23B 27/16 | (2006.01) |
| B23B 29/04 | (2006.01) |
| B23B 51/02 | (2006.01) |
| B23C 5/06 | (2006.01) |
| B23C 5/08 | (2006.01) |
| B23C 5/16 | (2006.01) |
| B23D 61/04 | (2006.01) |

(52) U.S. Cl.
CPC ............ *B23B 29/043* (2013.01); *B23B 51/02* (2013.01); *B23C 5/06* (2013.01); *B23C 5/08* (2013.01); *B23C 5/165* (2013.01); *B23C 5/207* (2013.01); *B23D 61/04* (2013.01); *B23B 2200/321* (2013.01); *B23B 2200/325* (2013.01); *B23B 2200/328* (2013.01); *B23B 2205/16* (2013.01); *B23B 2210/06* (2013.01); *B23B 2251/02* (2013.01); *B23B 2251/046* (2013.01); *B23B 2251/14* (2013.01); *B23B 2251/18* (2013.01); *B23B 2270/20* (2013.01); *B23B 2270/30* (2013.01); *B23C 2200/045* (2013.01); *B23C 2200/085* (2013.01); *B23C 2200/125* (2013.01); *B23C 2200/205* (2013.01); *B23C 2200/206* (2013.01); *B23C 2210/0414* (2013.01); *B23C 2210/082* (2013.01); *B23C 2210/086* (2013.01); *B23C 2210/088* (2013.01); *B23C 2210/168* (2013.01); *B23C 2210/54* (2013.01); *Y10T 83/9319* (2015.04); *Y10T 407/1962* (2015.01); *Y10T 407/2268* (2015.01); *Y10T 407/23* (2015.01); *Y10T 407/235* (2015.01); *Y10T 407/24* (2015.01); *Y10T 408/89* (2015.01); *Y10T 409/303808* (2015.01)

(58) Field of Classification Search
USPC .................................................. 407/113, 42
See application file for complete search history.

(56) References Cited

U.S. PATENT DOCUMENTS

| | | | |
|---|---|---|---|
| 4,552,492 A | | 11/1985 | Komanduri et al. |
| 4,671,710 A | | 6/1987 | Araki |
| 4,934,879 A | * | 6/1990 | van Barneveld .............. 407/66 |
| 5,044,840 A | * | 9/1991 | Fouquer et al. ............. 407/114 |
| 5,145,295 A | * | 9/1992 | Satran .......................... 407/113 |
| 5,221,163 A | * | 6/1993 | Nishimura ..................... 407/53 |
| 5,382,118 A | * | 1/1995 | Satran et al. .................. 407/42 |
| 5,437,522 A | | 8/1995 | Satran et al. |
| 5,634,745 A | | 6/1997 | Wiman et al. |
| 5,718,540 A | * | 2/1998 | Satran et al. .................. 407/42 |
| 5,720,583 A | * | 2/1998 | Bohnet et al. ................. 407/42 |
| 5,803,674 A | * | 9/1998 | Satran et al. .................. 407/42 |
| 5,807,031 A | * | 9/1998 | Arai et al. .................... 407/113 |
| 5,904,450 A | | 5/1999 | Satran et al. |
| 6,123,488 A | * | 9/2000 | Kasperik et al. ............. 407/113 |
| 6,439,811 B1 | | 8/2002 | Wardell |
| 6,527,486 B2 | * | 3/2003 | Wiman et al. ................ 408/188 |
| 6,623,217 B2 | | 9/2003 | Brockett et al. |
| 7,063,489 B2 | | 6/2006 | Satran |
| 7,578,638 B2 | | 8/2009 | Hessman et al. |
| 7,632,046 B2 | | 12/2009 | Andersson et al. |
| 8,317,436 B2 | | 11/2012 | Harif |
| 8,419,319 B2 | * | 4/2013 | Hatta ............................ 407/113 |
| 2003/0077131 A1 | | 4/2003 | Wiman et al. |
| 2004/0037659 A1 | * | 2/2004 | Sung ...................... B23C 5/202 407/114 |
| 2004/0208713 A1 | * | 10/2004 | Duerr et al. .................... 407/34 |
| 2004/0258490 A1 | * | 12/2004 | Walrath ......................... 407/54 |
| 2005/0105973 A1 | * | 5/2005 | MacArthur .................... 407/53 |
| 2005/0214081 A1 | * | 9/2005 | Satran et al. ................. 407/113 |
| 2006/0045636 A1 | * | 3/2006 | Johnson et al. ............... 407/42 |
| 2007/0003384 A1 | * | 1/2007 | Smilovici et al. ........... 407/113 |
| 2007/0056413 A1 | * | 3/2007 | Krenzer et al. ................ 82/1.11 |
| 2007/0071559 A1 | * | 3/2007 | Koskinen ........................ 407/34 |
| 2007/0071560 A1 | * | 3/2007 | Karonen ......................... 407/34 |
| 2008/0232912 A1 | * | 9/2008 | Bhagath ........................ 407/114 |
| 2008/0304924 A1 | * | 12/2008 | Engstrom et al. ............ 407/114 |
| 2009/0285646 A1 | * | 11/2009 | Oprasic et al. .............. 407/114 |
| 2010/0202839 A1 | * | 8/2010 | Fang et al. ..................... 407/53 |
| 2011/0008112 A1 | * | 1/2011 | Abe ............................... 407/42 |

FOREIGN PATENT DOCUMENTS

| | | |
|---|---|---|
| CN | 1558807 | 12/2004 |
| CN | 1856380 | 11/2006 |
| CN | 101143388 | 3/2008 |
| DE | 4309897 | 8/1994 |
| EP | 0962272 | 12/1999 |
| EP | 2119520 | 11/2009 |
| JP | U1973106568 | 12/1973 |
| JP | S52134182 | 11/1977 |
| JP | H01020913 Y2 | 6/1989 |
| JP | U1993085503 | 11/1993 |
| JP | U1994050720 | 7/1994 |
| JP | U1994061408 | 8/1994 |
| JP | U1994064805 | 9/1994 |
| JP | H1020913 | 1/1998 |
| JP | 2006326720 | 12/2006 |
| JP | 2007521978 | 8/2007 |
| JP | 2008155367 | 7/2008 |
| JP | 2009537335 | 10/2009 |
| JP | 2010523353 | 7/2010 |
| JP | 3172438 | 12/2011 |
| RU | 2240208 | 11/2004 |
| SU | 338306 | 5/1972 |
| SU | 1323243 | 7/1987 |
| WO | WO 93/08944 | 5/1993 |
| WO | WO 95/07784 | 3/1995 |
| WO | WO 95/30506 | 11/1995 |
| WO | WO 99/17899 | 4/1999 |
| WO | WO 02/18083 | 3/2002 |
| WO | WO 2005/080034 | 9/2005 |
| WO | WO 2007/134561 | 11/2007 |
| WO | WO 2008/093592 | 8/2008 |
| WO | WO 2008/120186 | 10/2008 |
| WO | WO 2009/029021 | 3/2009 |
| WO | WO 2009/147461 | 12/2009 |

OTHER PUBLICATIONS

International Preliminary Report of Patentability from International Application No. PCT/IL2010/000534 dated Dec. 13, 2011.

* cited by examiner

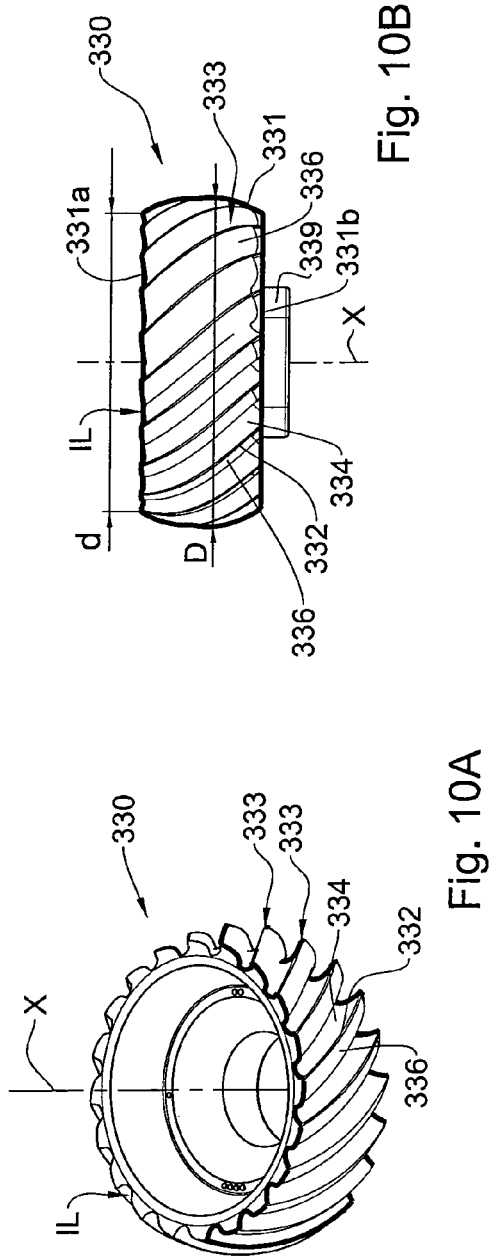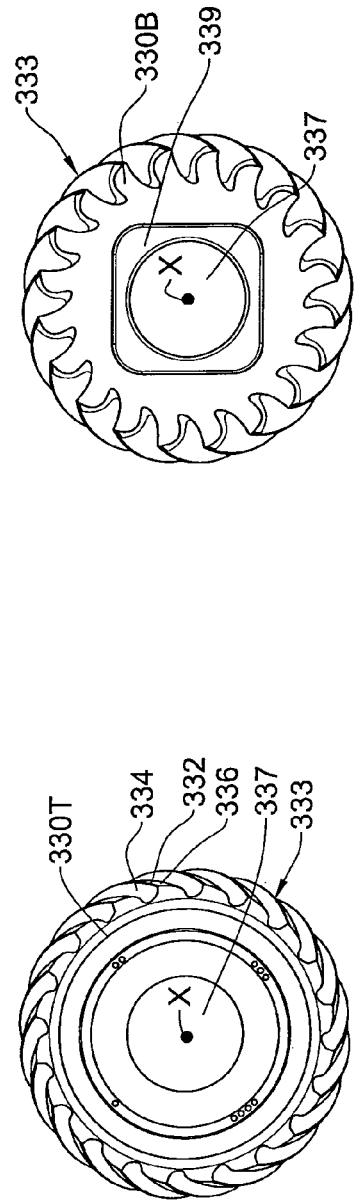
Fig. 10A, Fig. 10B, Fig. 10C, Fig. 10D

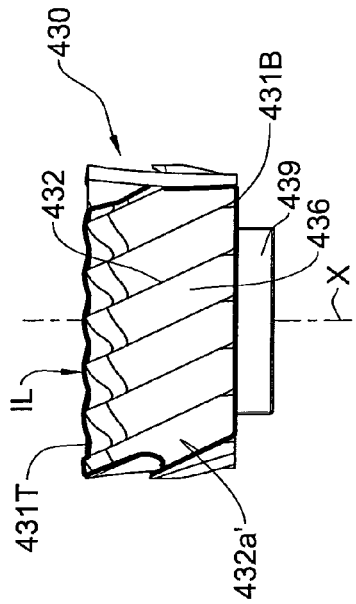
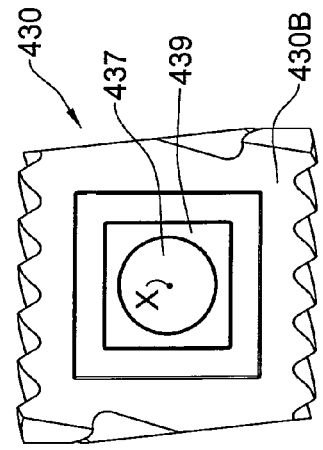
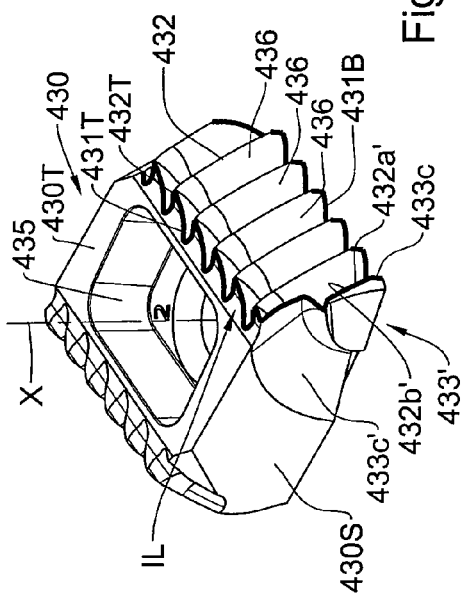

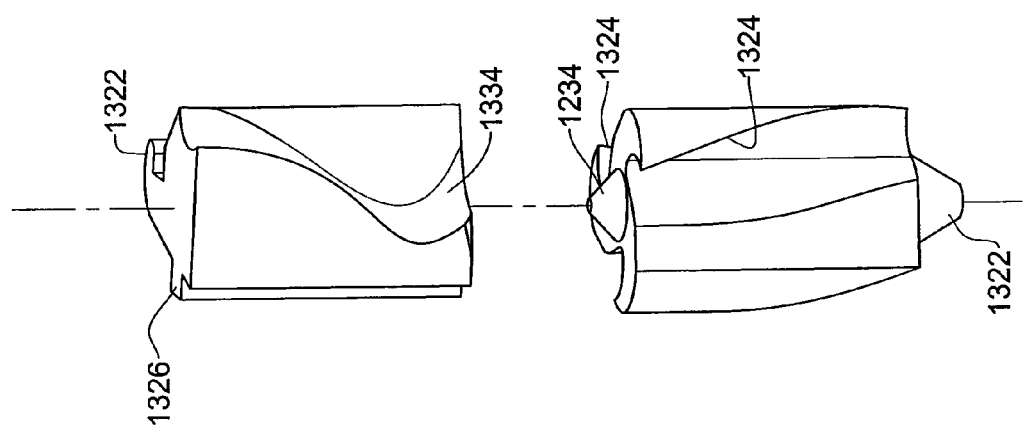
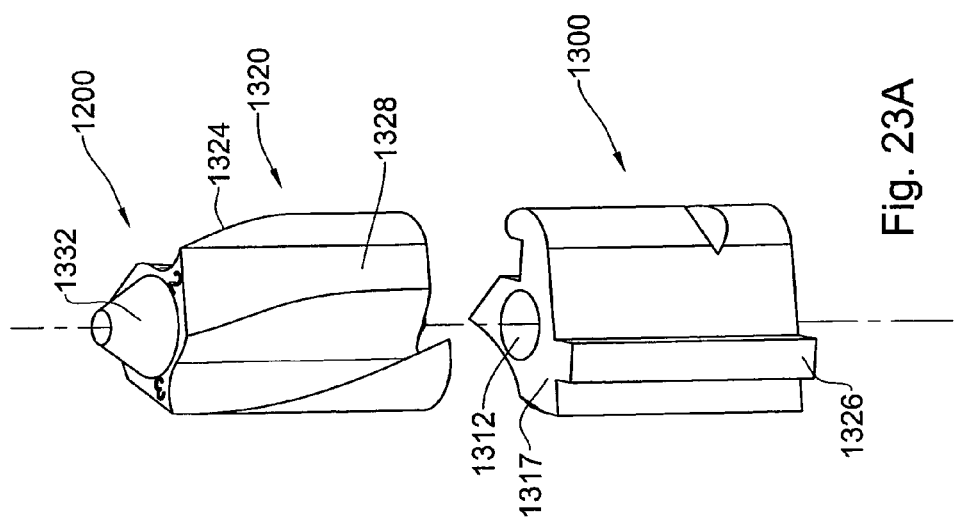
Fig. 23B
Fig. 23A

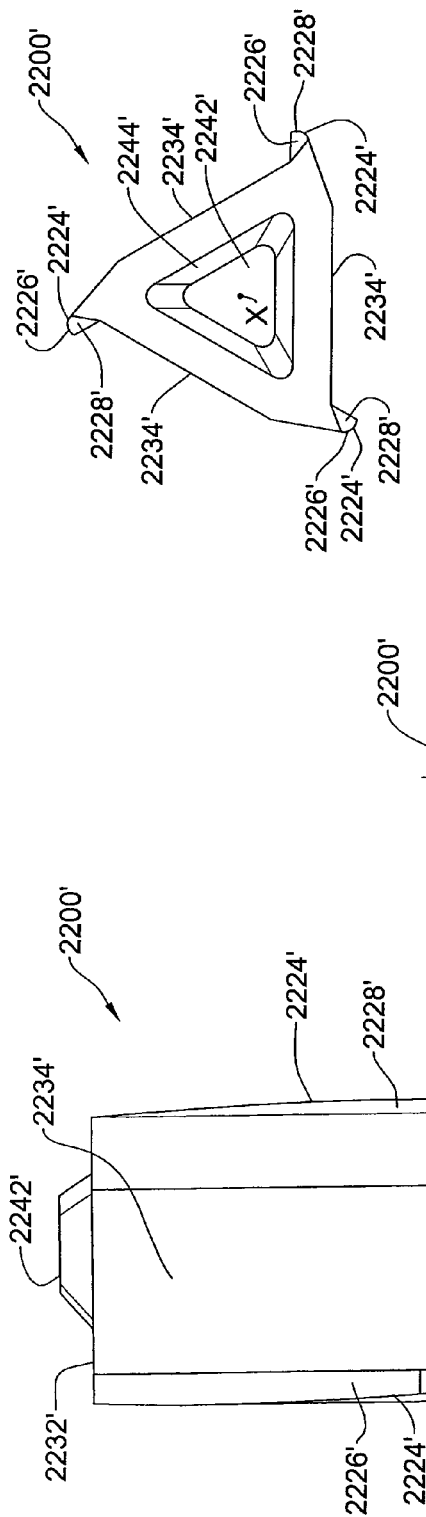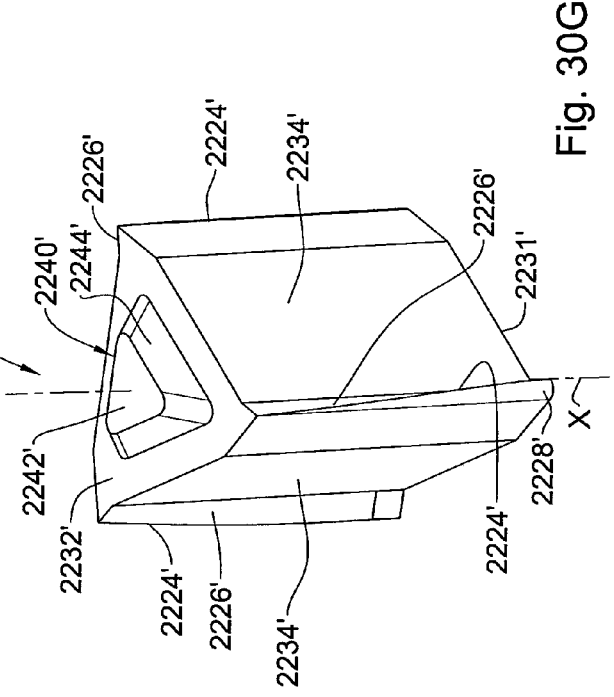
Fig. 30F
Fig. 30G
Fig. 30E

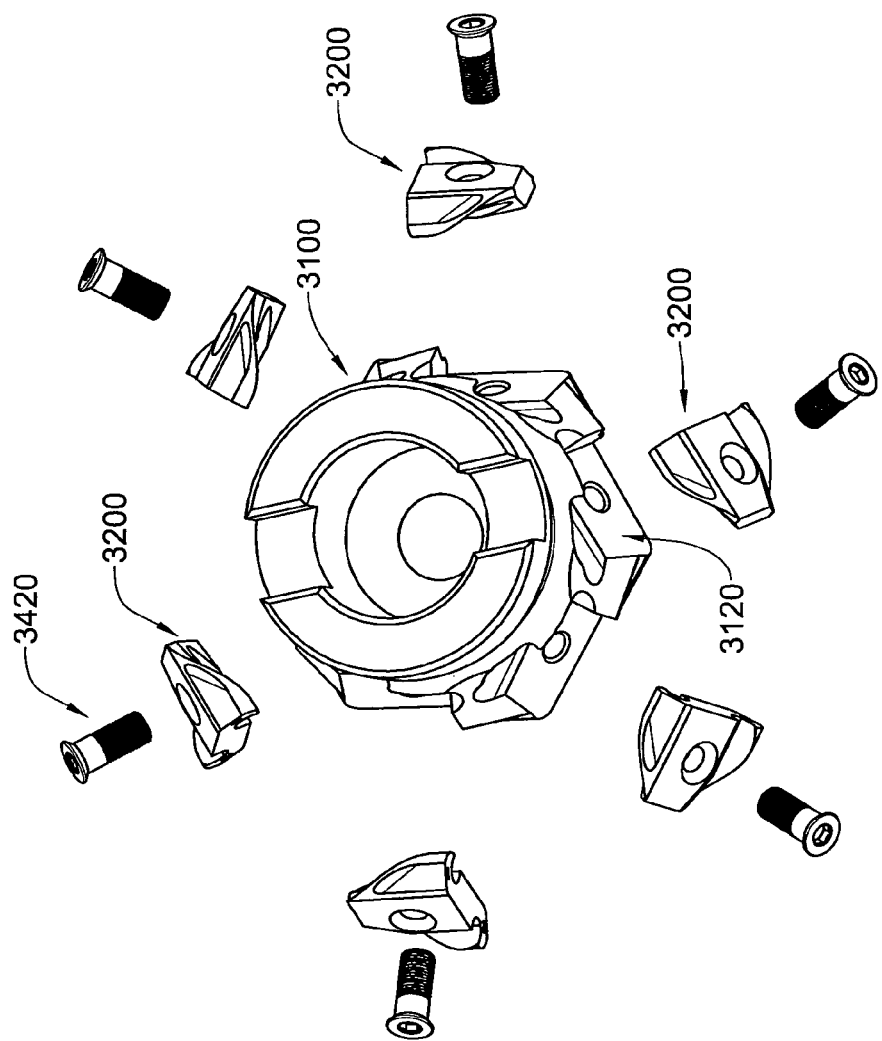

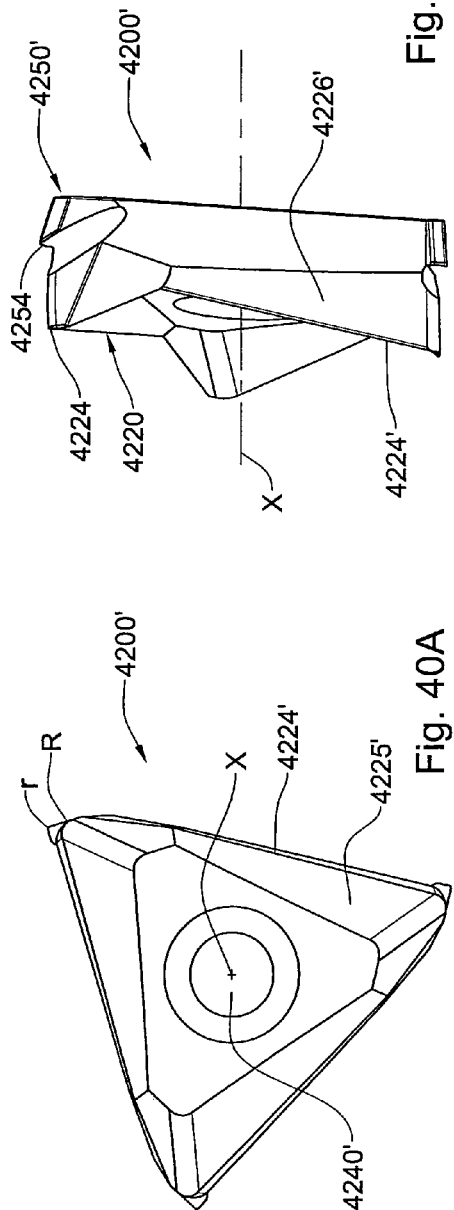
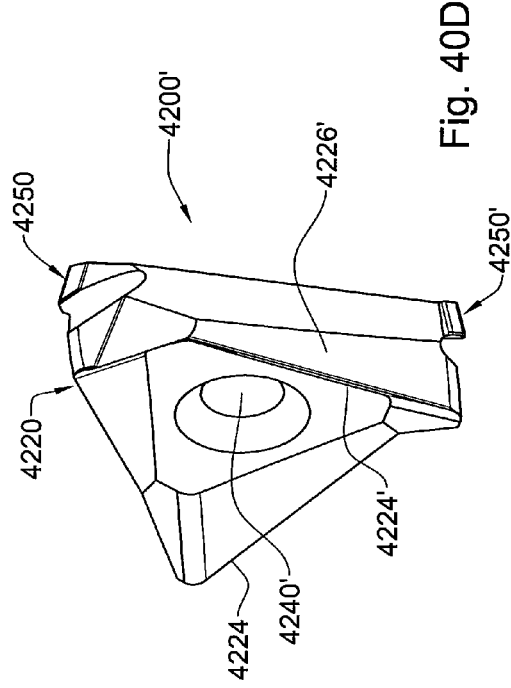
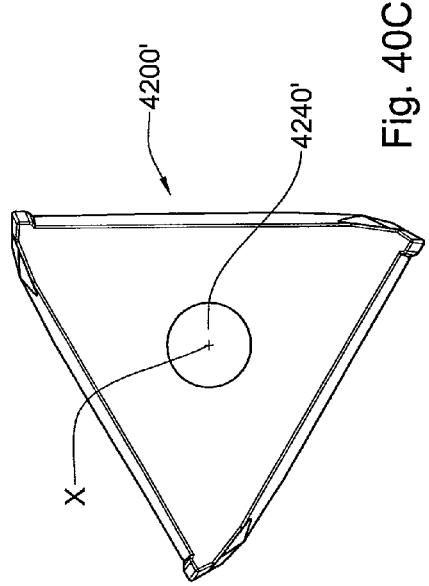
Fig. 40A
Fig. 40B
Fig. 40C
Fig. 40D

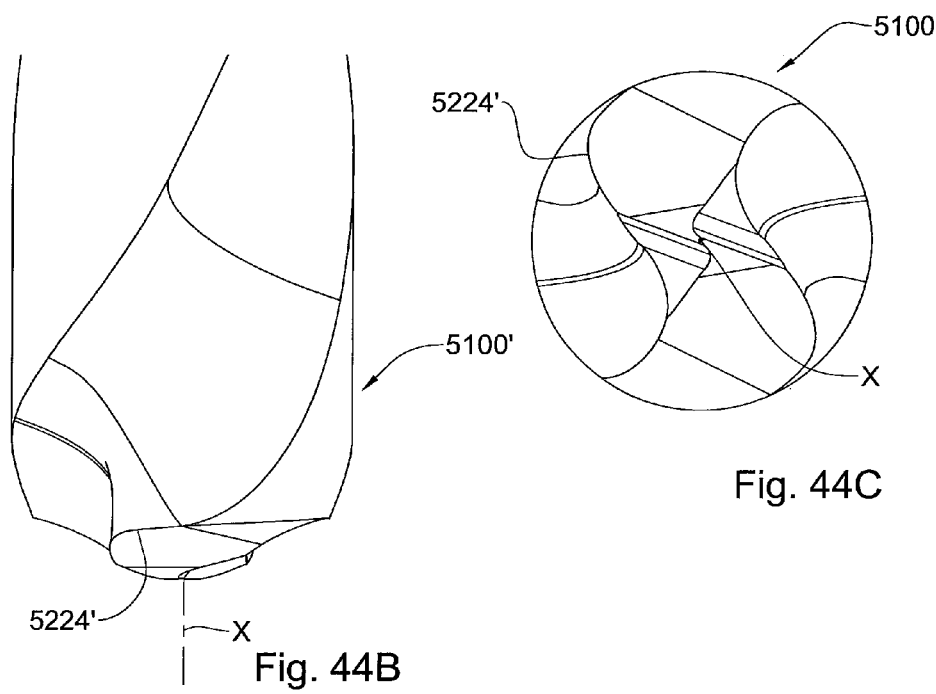
Fig. 44B
Fig. 44C
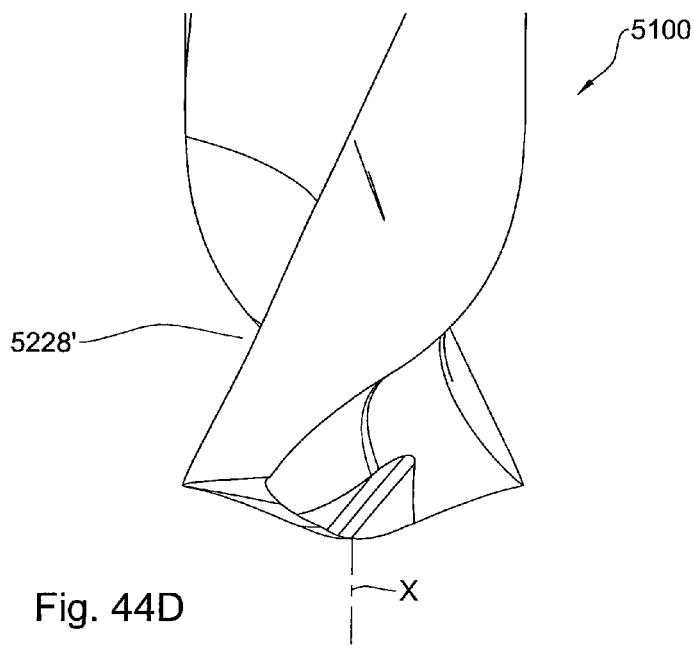
Fig. 44D

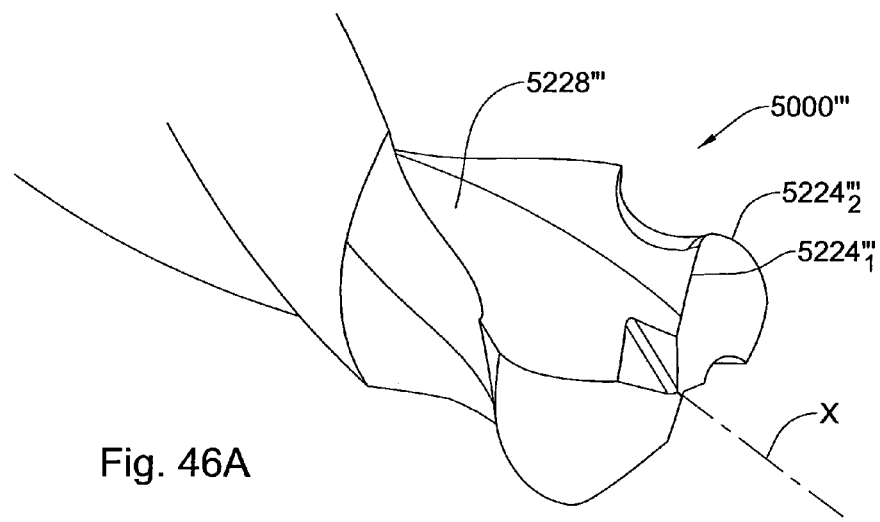
Fig. 46A
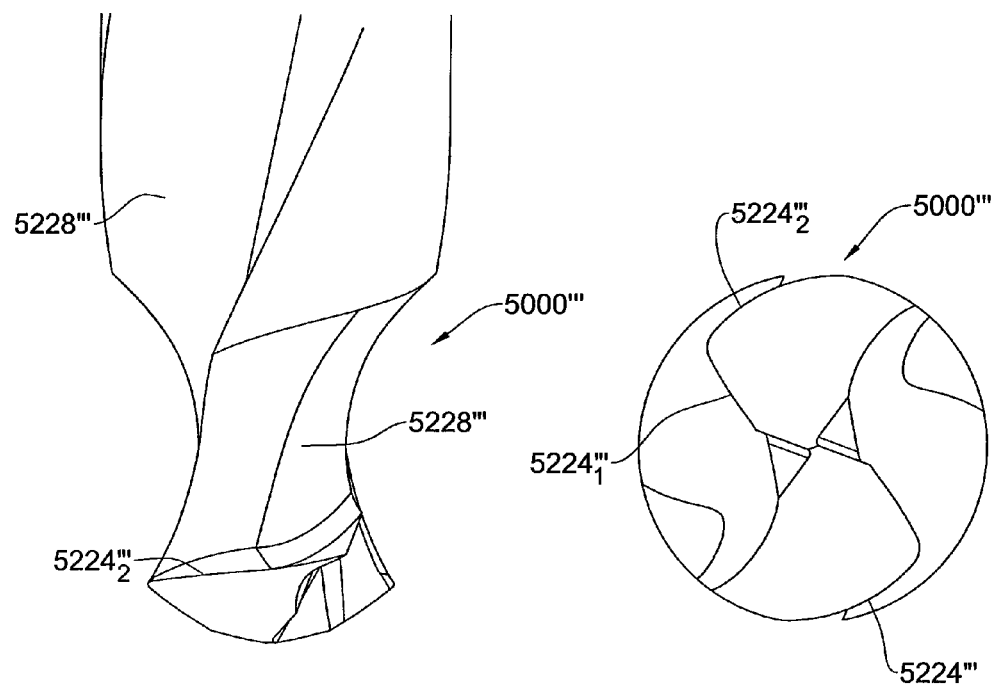
Fig. 46B
Fig. 46C

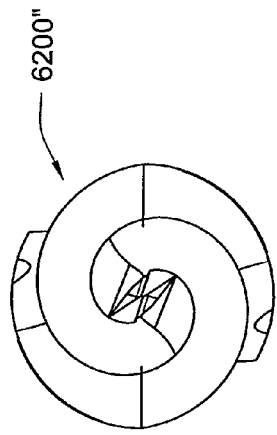
Fig. 53C
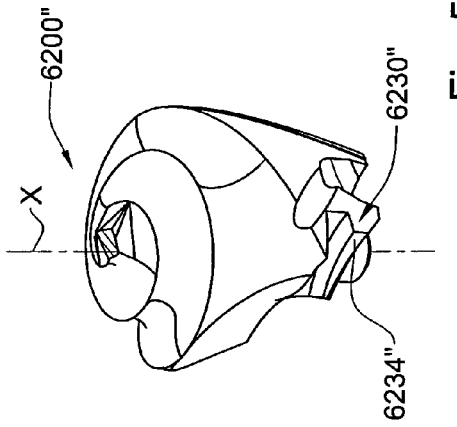
Fig. 53E
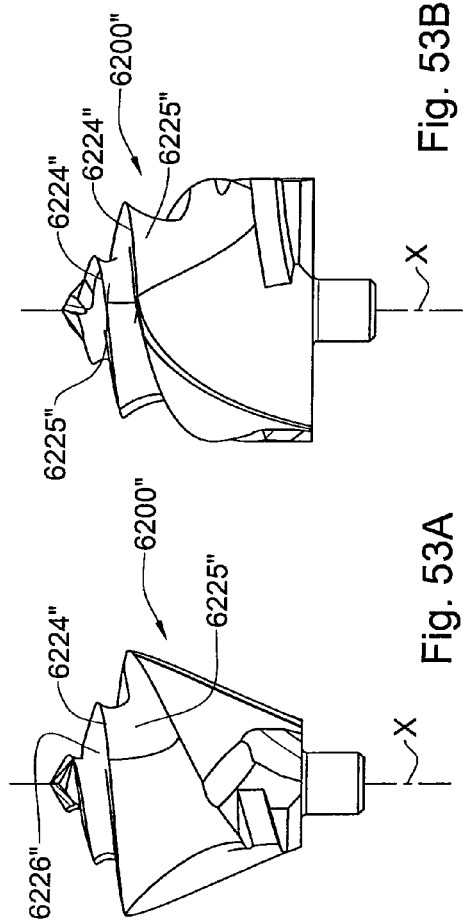
Fig. 53B
Fig. 53A
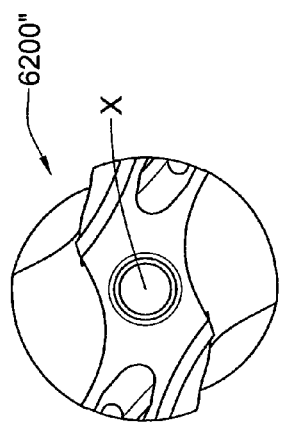
Fig. 53D

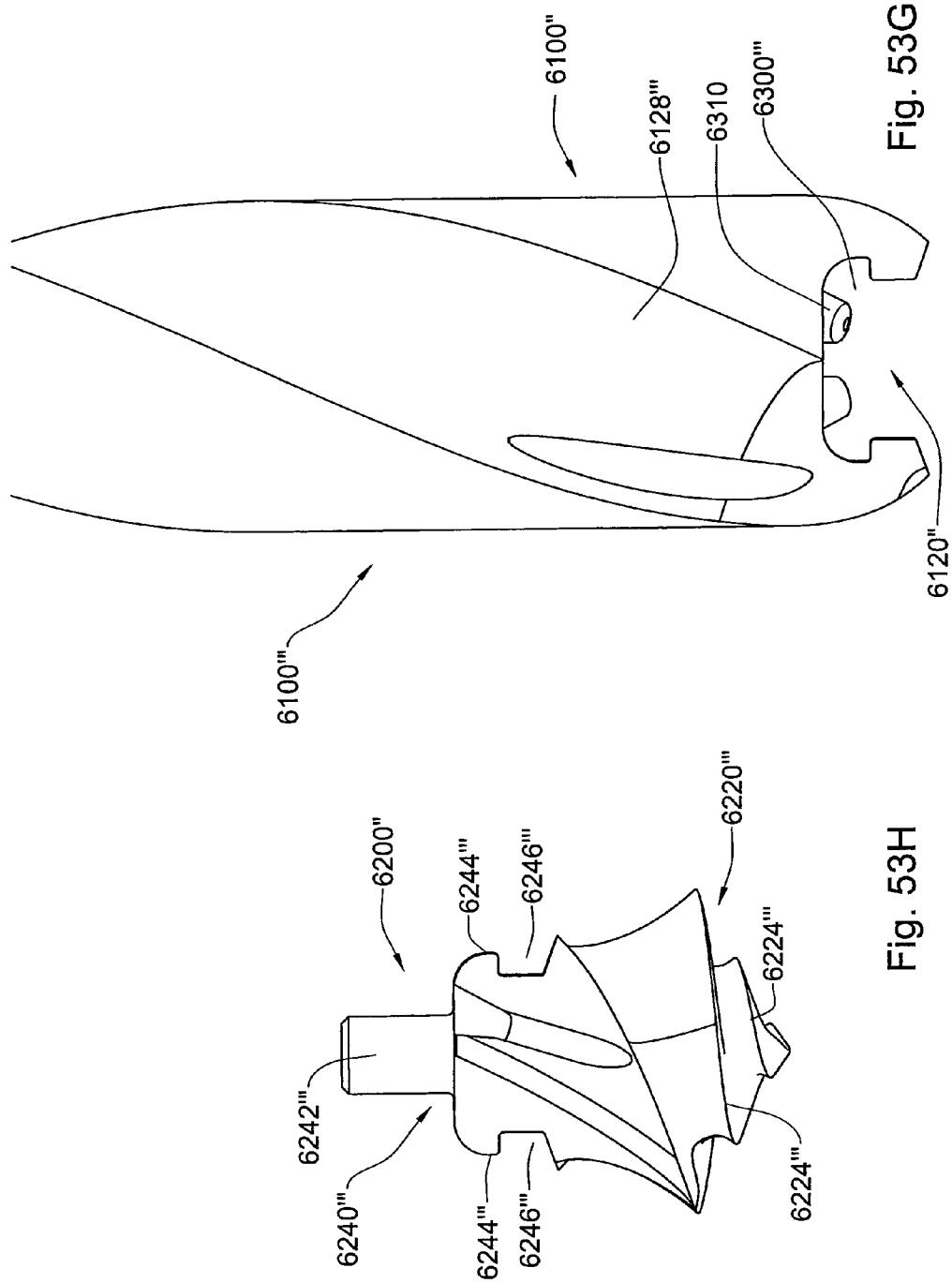

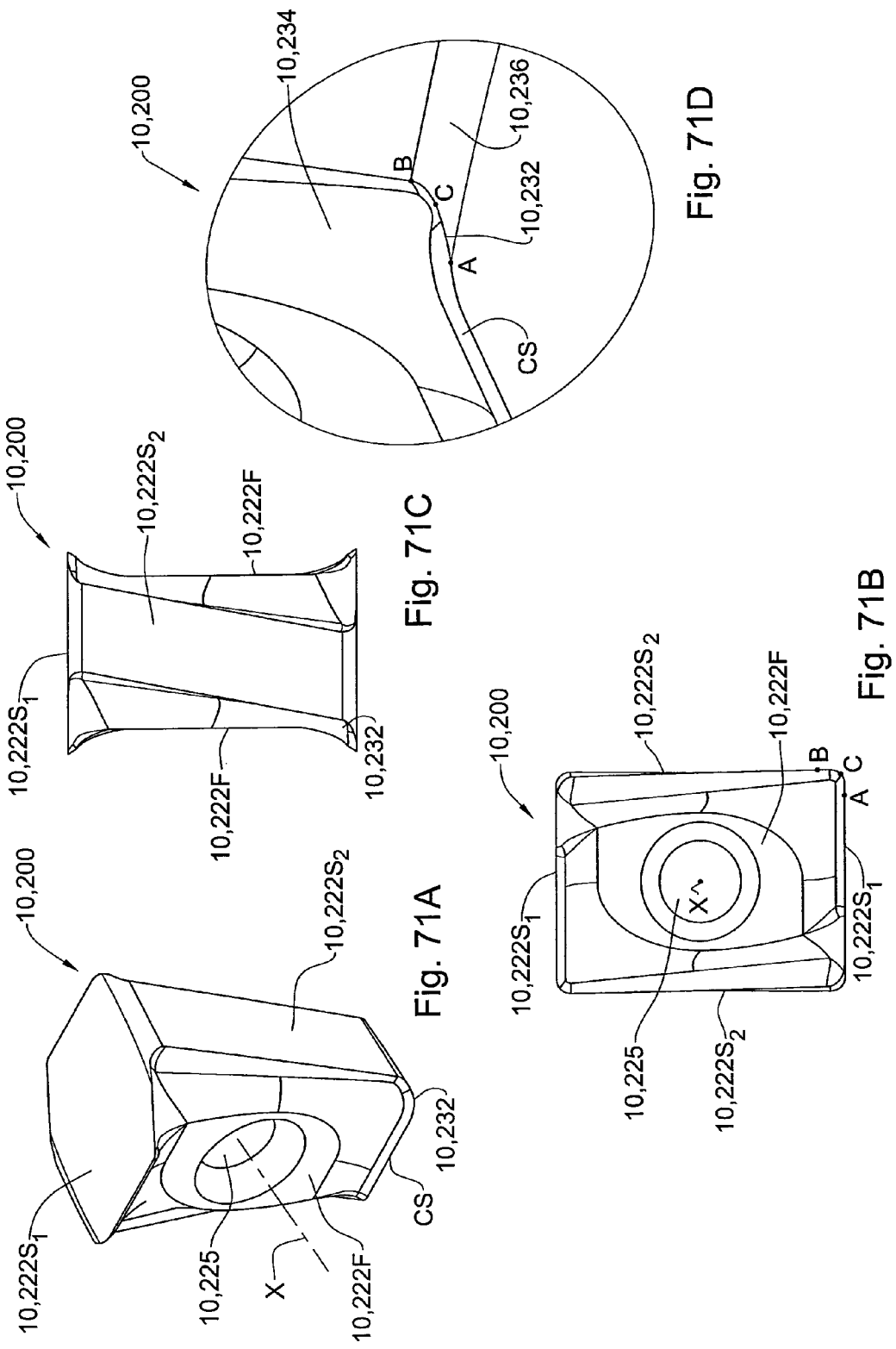

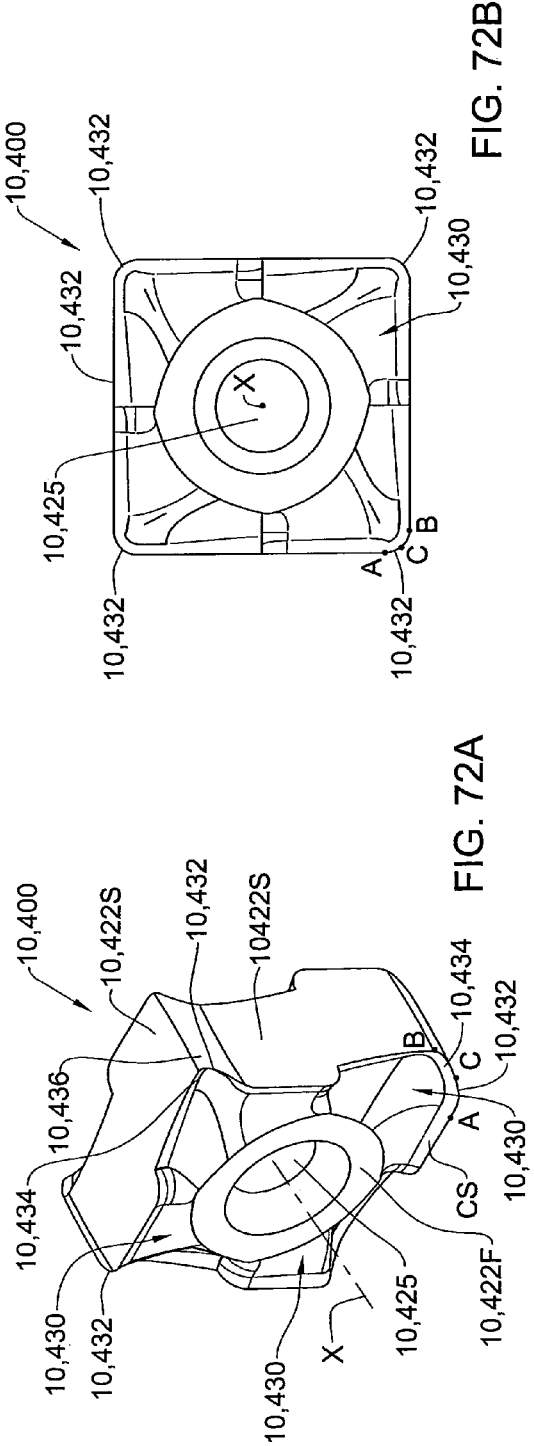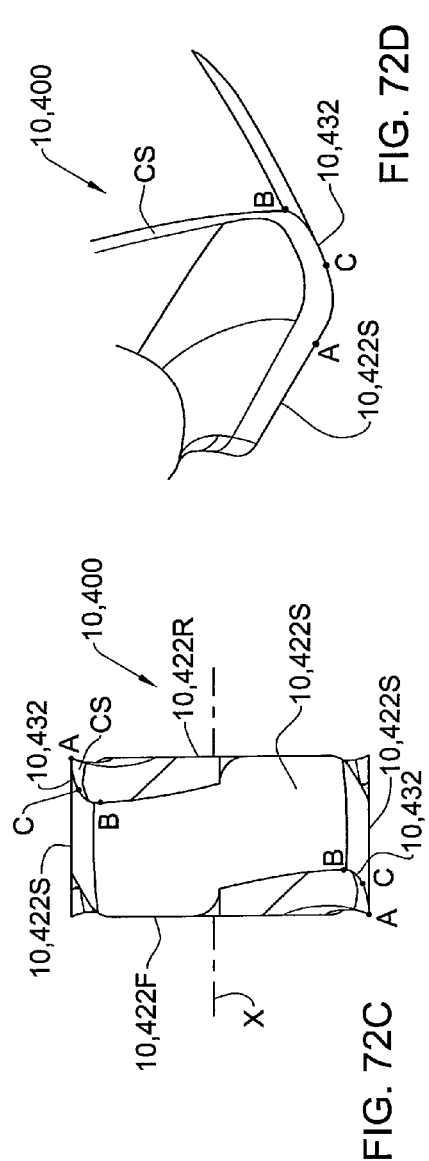

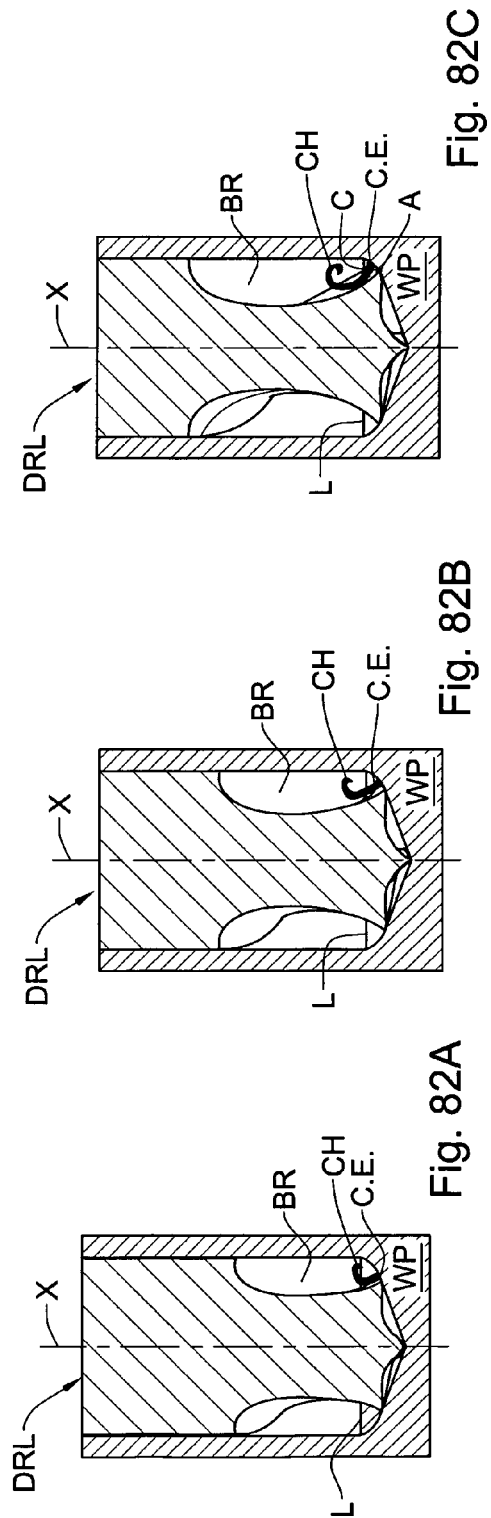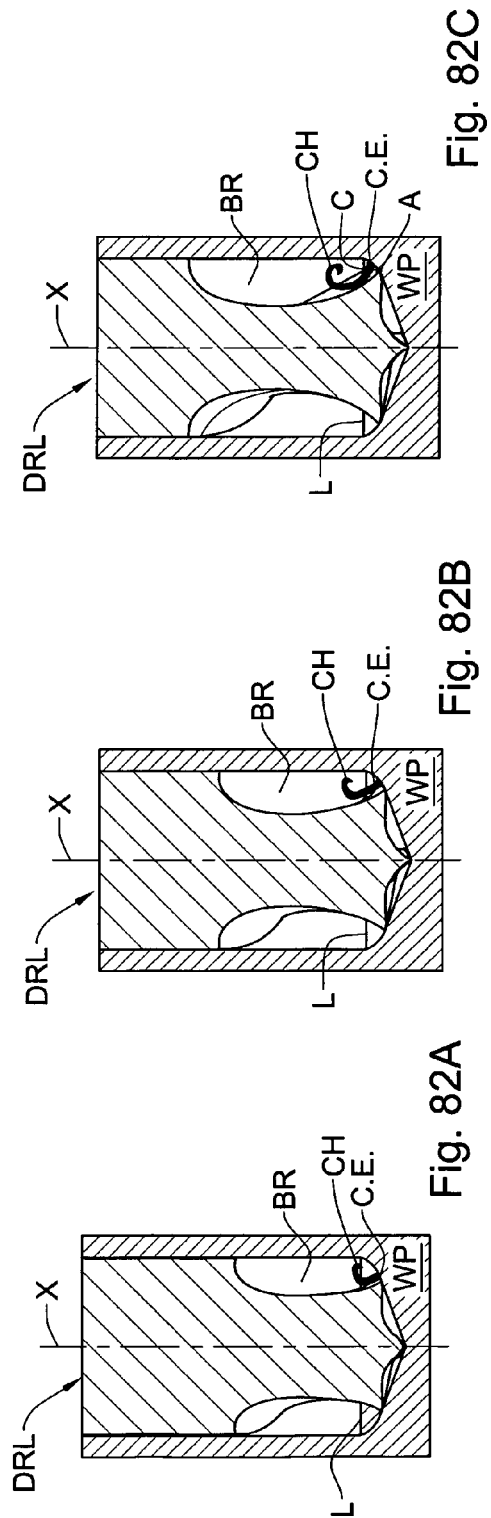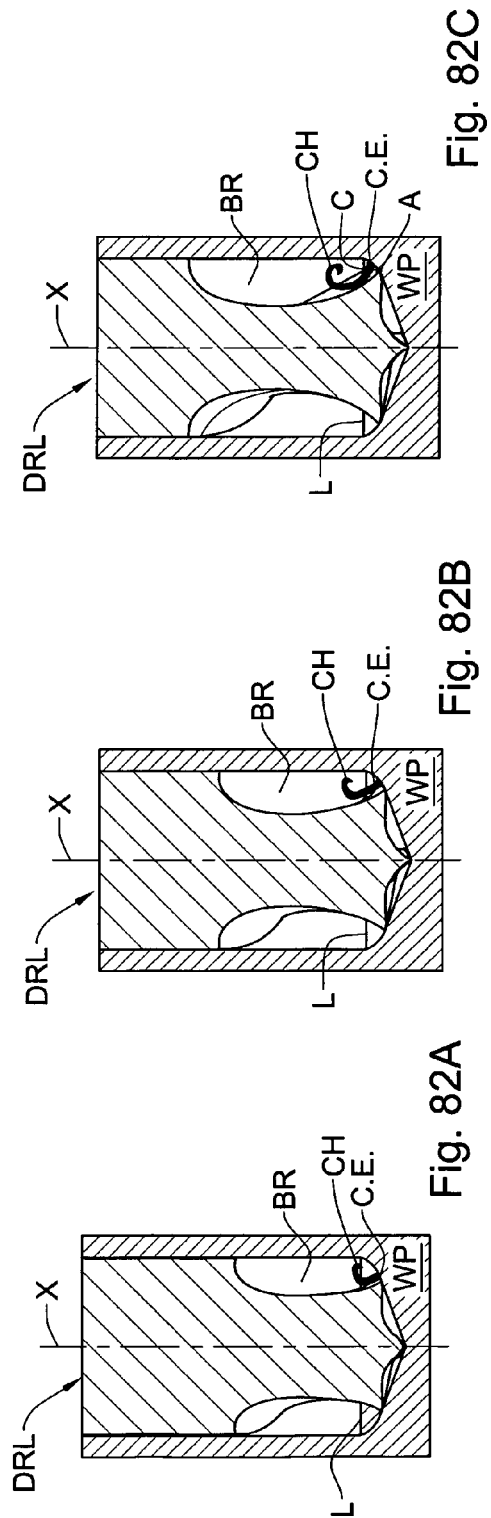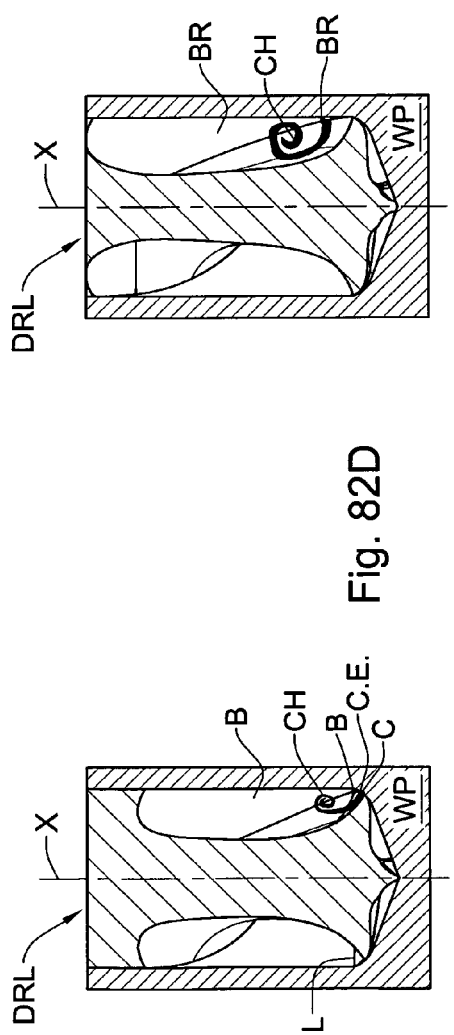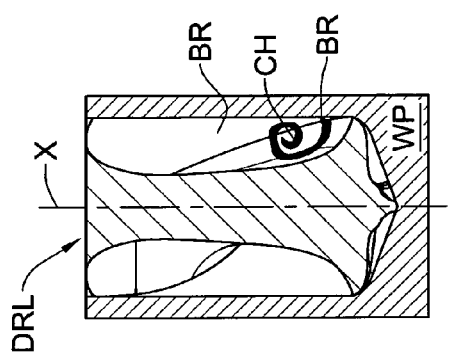

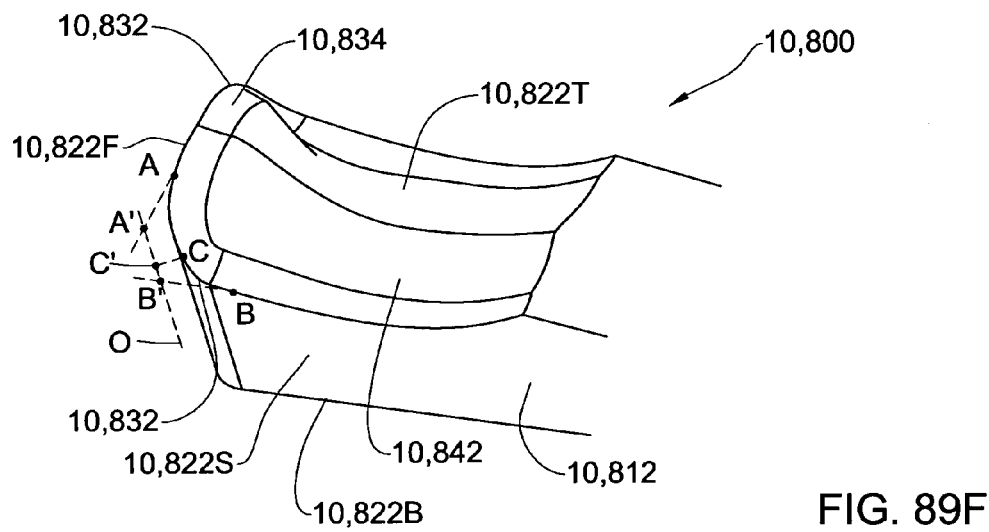
FIG. 89F
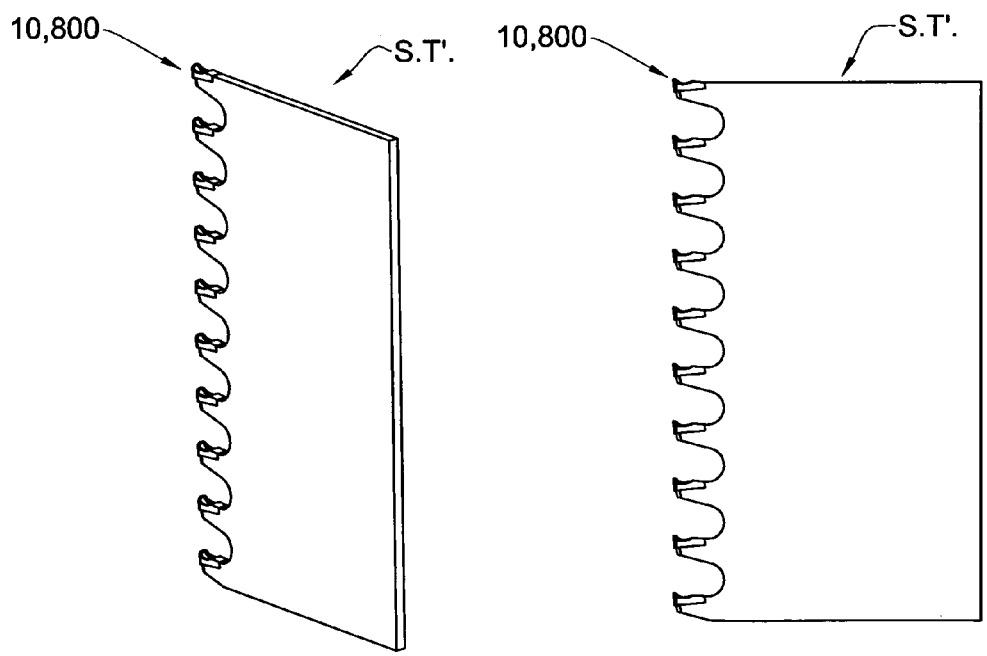
FIG. 90A
FIG. 90B

CUTTING TOOLS, CUTTING TOOL HOLDERS AND CUTTING INSERTS THEREFOR

FIELD OF THE INVENTION

This invention relates to cutting tools and cutting inserts, in particular, those formed with a plurality of cutting edges.

BACKGROUND OF THE INVENTION

Cutting tools are used for removing material from a workpiece in order to manufacture therefrom a desired final element. There exists in common practice a great variety of operations for the removal of material, for each of which, a specific tool is designed, which may be in the form of a single body or in the form of a tool holder with one or more replaceable cutting inserts mounted thereon. Examples of such operations are drilling, milling, turning, boring etc.

A majority of cutting tools or cutting inserts are formed with a cutting edge, adapted to come in contact with the workpiece, within a cutting zone, so as to remove material therefrom during a cutting operation, the removed material being in the form of a chip, and the process of forming chips being known as chipping.

During a cutting operation there is usually provided a linear displacement of the cutting tool relative to the workpiece, referred to as 'feed' and either rotation of the cutting tool about its central axis with the workpiece being stationary, such as e.g. in milling and drilling operations, or rotation of the workpiece about its central axis with the tool moving only linearly such as e.g. in turning, slotting, parting and the like.

Chips must be evacuated continuously during chipping and any congestion may rapidly lead to high loads, overheating, quick wear and consequent break-down, failure or malfunction of the cutting tool or cutting insert.

Each cutting edge of a cutting tool or cutting insert is known to have a rake surface extending from the cutting edge in the direction away from the workpiece and a relief surface extending from the cutting edge transversely to the rake surface and generally facing in the direction of the workpiece, the cutting edge being defined at the intersection between its rake and relief surfaces.

The rake surface is adapted to come in contact with the removed chip and may have chip deforming/splitting/breaking or the like means whose design is such as to facilitate the evacuation of the chip from the cutting zone.

The relief surface is generally designed so as not to come in contact with the workpiece during cutting operation. With a given angle between the relief and rake surfaces of each cutting edge, this is achieved by the cutting tool/cutting insert being positioned during cutting operation such as to provide a distance between the relief surface and the workpiece, said distance normally increasing in the direction away from the cutting edge.

During a cutting operation, the amount of material to be removed per time unit by a given cutting tool from a given workpiece, and particularly, the thickness of the chip removed, depends on a number of parameters including the speed of rotation $V_R$ of the cutting tool relative to the workpiece and the feed F.

On the other hand, the above parameters have a drastic influence on loads exerted on the cutting tool during chipping. The loads exerted on the cutting tool may be so high as to cause damage thereto, rendering it useless. On top of this, friction of the cutting tool with the workpiece causes heating of the former and the latter at the cutting zone, due to which extensive cooling, usually by means of a cooling liquid, is normally required. To avoid undesirable cutting conditions, the feed F and rotation speed $V_R$ are thus limited, and so is, as a consequence, the power used.

SUMMARY OF THE INVENTION

The inventor of the disclosed subject matter has realized that forming cutting edges on a surface of a cutting tool or cutting insert (hereinafter "cutting member") that in conventional cutting members is used to serve as its relief surface, and orienting them in a specific manner, among other possible advantages, allows for the reduction of loads exerted on the cutting member during a cutting operation and simplified chip evacuation.

In particular, according to one aspect of the disclosed subject matter, the orientation of the cutting edge or plurality of cutting edges in a cutting member designed for a specific cutting operation on a workpiece is transverse to a line that defines a maximal working dimension of the cutting member in said operation. Said dimension may be in a direction along or perpendicular to central or longitudinal axis of the cutting member respectively. The cutting portion of the cutting member may have a front face, and the line that defines the maximal dimension of the cutting portion may begin at least from that front face.

The transverse orientation of the cutting edge relative to said line may be such as to define therebetween an angle in the range of 30÷85°, more particularly in the range of 40÷75° and even more particularly in the range of 50÷65°.

The line that defines a maximal working dimension of the cutting member in said operation is formed at the intersection between two adjacent surfaces of the cutting member angled to each other, which, in a conventional cutting member designed for the same cutting operation, serves as a conventional cutting edge and said adjacent surfaces serve as conventional rake and relief surfaces for said cutting edge. In the cutting member of the disclosed subject matter, such intersection line may or may not constitute a cutting edge. But even in the former case, in the cutting member of the disclosed subject matter there is always at least one other cutting edge intended for performing the same cutting operation, which is oriented transversely to said intersection line, extends along that of said two adjacent angled surfaces which is adapted to face the workpiece during said cutting operation (hereinafter "cutting surface"), and intersects, or may imaginarily be extended to intersect, said intersection line at a location spaced from its both ends, if said intersection line has such ends (which may not necessarily be the case; one example of such situation is a circular intersection line).

The cutting surface of the cutting member of the disclosed subject matter may be formed with one or more cutting elements, each having said cutting edge directed transversely to said intersection line. Each such cutting edge has its own rake surface and relief surface, and the rake and relief surfaces of said one or more cutting elements constitute parts of said cutting surface.

In addition, the cutting member may be designed such that the cutting edges have a greater extension with respect to a longitudinal axis of the cutting member than that of the intersection line, whereby during a cutting operation, engagement of the cutting member with the workpiece may be such that the cutting edges are closer to the workpiece that said intersection line. More particularly, this may allow the cutting edges to come in contact with the workpiece while the intersection line is out of contact therewith. In case the cutting member is adapted for revolving about a central axis, the intersection line may disposed closer to the central axis than the cutting edges, i.e. it is disposed inwards of the cutting envelope formed by the cutting edges of the cutting member.

Said cutting surface may be confined, at least along a majority of its periphery, by a boundary line, a portion of which is constituted by said intersection line, so that in a view of said cutting surface in which the maximal number of cutting edges is visibly in their maximal length, said boundary line is seen as encompassing said one or more cutting elements. Said cutting edge of at least the majority of the cutting elements does not lie on said boundary line.

For cutting members having chip evacuation flutes extending along and about a central axis of rotation of the cutting member, such as e.g. in milling and drilling tools, the cutting portion may be defined as a body portion between two adjacent chip evacuation flutes, in which case the cutting surface may either be the radially outermost surface of such body portion (milling) or a front surface perpendicular to the central axis (drilling). In both case, the intersection line may be formed at the intersection of the cutting surface and a surface of one chip evacuation flute. In particular, in the former case, said intersection line may be formed at the intersection of said radially outermost surface of the cutting member with a surface of one chip evacuation flute, and the maximal cutting dimension of the cutting member in this case, will be the projection of the intersection line on the central axis of the cutting member, e.g. axial extension of a cutting portion of the cutting tool. In the latter case, the intersection line may be formed between the front surface and a surface of one chip evacuation flute, and the maximal cutting dimension of the cutting member in this case, will be the projection of the intersection line on a surface perpendicular to the central axis, e.g. a diameter of the cutting tool.

For other kinds of cutting members, e.g. such that have a longitudinal body with a front cutting portion and which are adapted to perform a cutting operation on a revolving workpiece, the cutting surface may be defined as a surface facing the workpiece in the longitudinal direction of the cutting member. Thus, for example, in case the cutting member is a turning tool, the cutting surface may be a surface extending transversely to the longitudinal axis of the cutting tool and directly facing the revolving workpiece.

In addition to the cutting edge(s) extending transversely to said intersection or boundary line, the cutting member of the disclosed subject matter may have additional cutting edge(s) extending along a portion of said boundary line (i.e. lying thereon).

The cutting surface may be formed with a chip evacuation channel between two adjacent cutting elements, which extends in a direction transverse to said intersection line and is adapted to discharge therethrough material removed by the cutting edge of one of the cutting elements during operation of the cutting member It should be noted that the terms 'chip evacuation flute' and 'chip evacuation channel' are not interchangeable and/or equivalent. Although both are adapted for removing chips during a cutting operation, the former term refers to a space formed between two adjacent cutting portions, while the latter refers to a space formed between two adjacent cutting elements on one cutting surface.

The cutting member may be a cutting tool, if the cutting elements thereof are formed integrally therewith as one solid body, or alternatively, it may be a cutting insert adapted for mounting onto a cutting tool holder in order to form a cutting tool assembly.

In case said cutting member is an integral cutting tool, it may have a longitudinal, central axis and be formed with a plurality of chip evacuation flutes extending along and partially about said axis, thus dividing the tool into a corresponding plurality of cutting portions, each having its own cutting surface. Each of such cutting surfaces may thus be confined by a first intersection line between a first chip evacuation flute and said cutting surface, and a second intersection line between a second chip evacuation flute and said cutting surface. In this case, said first intersection line and said second intersection line may constitute a part of the boundary line of said cutting surface.

At least one of said cutting portions may be formed with a plurality of cutting elements each having at least one edge extending along a direction between said first intersection line and said second intersection line transversely thereto (not necessarily intersecting one or both of the first intersection line and second intersection line). In this case, the cutting edges of two adjacent cutting elements may be oriented such as to form a continuous cutting line. This is obtained by the front end of one of the cutting edges overlapping with the rear end of the adjacent cutting edge when projected on the first or second intersection lines mentioned above, by virtue of which the spacing between the two cutting edges will not be felt by a workpiece cut thereby.

The integral cutting tool may have the cutting portions and the intersection lines extending generally along the central axis (e.g. spirally thereabout). Such a cutting tool may be, for example, a milling tool. at least one of said chip evacuation channels may extend spirally about said cutting tool at an inclination angle $\beta$ with respect to said central axis, while at least one of said cutting edges may be inclined with respect to the central axis by an angle $\alpha \leq \beta$, in particular a $\alpha \ll \beta$. The inclination angle $\beta$ may be 75°, more particularly 65°, even more particularly 55° and still more particularly 45°, and the angle $\alpha$ may respectively be 45° or less, more particularly 30° or less and even more particularly 15° or less.

In addition, the integral tool described above may be formed with a front face perpendicular to the central axis, which has a concavely curved shape, adapted to prevent the front face of the cutting tool from coming in contact with the workpiece during a cutting operation.

The cutting member may further be in the form of an integral cutting tool, in which said cutting portions may extend generally radially with respect to its central axis. Consequently, the intersection lines may also extend radially from the central axis. In this case, the cutting edges may extend along a surface oriented generally perpendicular to the central axis but not in a radial direction. For example, the cutting edge/s may extend spirally about the central axis along said surface. According to a specific example, the cutting edge may even be in the shape of an arc extending about the central axis. Such a cutting tool may be, for example, a drilling tool.

In particular, said cutting surface may be formed, in addition to said cutting edge, with a plurality of supplemental cutting segments, some of which may be constituted by portions of the intersection line. According to a particular design, said cutting portion may be formed with an inner supplemental cutting edge extending, in the radial direction, between a first point lying on the central axis and a second point remote from the central axis, a subsequent cutting segment extending in an arc about the central axis between a third point and a fourth point, both located remote from the central axis, and a further subsequent outer supplemental cutting segment also extending in the radial direction, between the fourth point and a fifth point lying on the envelope of the cutting tool. In particular, the inner supplemental cutting segment and the outer supplemental cutting segment may be constituted by portions of the intersection line, and may also be aligned with one another. In addition, the radial distance of said fourth point from the central axis may be lesser than the radial distance of said second point from the central axis, whereby the intermediate cutting edge overlaps with the inner supplemental cutting segment.

According to another example of the above cutting tool, the cutting surface may be formed with several continuous cutting edges extending spirally, and outwardly from the central axis of the cutting tool to the envelope of the cutting tool. In this example, the spiral cutting edge is transverse to any radial line extending between the central axis of the cutting tool and the envelope thereof.

Alternatively to the integral cutting tools discussed above, the cutting tool may also be constituted by a cutting tool holder and at least one cutting insert mounted thereon. The cutting tool holder may have a seat portion formed with an insert seat adapted to receive said cutting insert. The cutting insert may thus have a mounting segment and a cutting segment formed with the cutting portion.

The cutting insert may have a top face, a bottom face and at least one side face extending therebetween. The cutting insert may be designed such that one of the side faces or a portion of a side face thereof constitutes the cutting surface. The cutting surface may be confined by a boundary line, a portion of which is constituted by an intersection line between said top/bottom face and the side face of the cutting insert. It should be noted that this intersection line may be the same line which is used as a cutting edge in conventional cutting inserts.

According to a specific example, the cutting elements formed on said cutting surface may be in the form of teeth extending along said cutting surface between said top face and said bottom face (though not necessarily intersecting with the top face or bottom face), in a direction transverse to the intersection line. Each cutting tooth may have a cutting edge, also extending between said top face and said bottom face and transverse to the intersection line.

According to a specific design, said cutting edges may extend between the top face and the bottom face such that they have an inclination angle $\alpha$ with respect to a perpendicular line extending between the top and bottom face of the cutting insert. The inclination angle $\alpha$ may be about 45°, more particularly 30° and even more particularly 15°. Due to the angle $\alpha$, the arrangement may be such that during penetration into the workpiece, the cutting edges peal off chips of material from the workpiece, rather breaking chips off the workpiece as in conventional cutting tools.

In addition, the cutting teeth may be designed so as to have a varying width, e.g. having a first width at an area adjacent the top face of the cutting insert and a second width at an area adjacent the bottom face of the cutting insert.

According to one design, said cutting insert may be of polygonal prism shape, i.e. having several side walls extending between the top face and the bottom face. According to another design, said cutting insert may be of circular shape, i.e. having one circular side wall extending between the top face and the bottom face.

In case of a polygonal cutting insert, the cutting insert may be formed with corner cutting edges which are formed so as to bridge two adjacent side faces. In particular, a corner cutting edge may have a first end located on one side face approximate the top face of the cutting insert, and a second end located on the adjacent side face and approximate to the bottom face of the cutting insert. Thus, during a cutting operation, the projection of the cutting edges including the corner cutting edge form a continuous cutting edge as previously defined.

It is important to note that the side wall/s, along the plane extending between the top and bottom face, may be straight, angled, bulged or the like. According to one specific design, the side wall may be convex. In particular, if a circular cutting insert is used, it may assume a general barrel shape.

The cutting insert may be designed such that the intersection line between the top face of the cutting insert and the side face thereof formed with the cutting portion also constitutes a cutting edge.

The cutting insert may be adapted to be mounted onto the cutting tool holder such that the bottom face thereof is flush with a seat face of the cutting tool holder. Said cutting insert may also be adapted to be fastened to said cutting tool holder by a fastening element, e.g. a bolt. For this purpose, said cutting insert may be formed with a central cavity adapted for receiving therethrough said fastening element. Said central cavity may define a central axis for said cutting insert. Thus, said cutting insert may be adapted to be mounted onto said cutting tool holder such that the central axis is perpendicular to the seat face.

The insert seat and the mounting segment of said cutting insert may have a corresponding design, which may be shaped such that the cutting insert is prevented from rotating about the central axis during operation of the cutting tool. Specifically, said insert seat may be in the form of a polygonal depression and said cutting insert may be formed with a corresponding polygonal mounting extension adapted to fit thereto.

Said cutting insert may be indexible, i.e. having more than one side face formed with a cutting portion, wherein said cutting insert may assume several mounting orientations with respect to the cutting tool holder.

In addition, the seat portion of the cutting tool holder may be formed with a holder relief surface, designed so as not to come in contact with the workpiece after the cutting edges of the cutting insert mounted onto the insert seat of the seat portion have penetrated into the workpiece.

According to a specific design, the holder relief surface may be designed so as to be generally flush with the relief surface of the cutting insert. The holder relief surface may assume various shapes, e.g. straight, cylindrical, conical, tapering etc. Furthermore, said holder relief surface may be formed with holder channels adapted, when the cutting insert is mounted onto said cutting tool holder, to be aligned with the chip evacuation channels of the cutting insert, thereby allowing chips removed from the workpiece and incoming from the chip evacuation channel to progress into the holder channels.

At least one of the cutting portions may be formed with a chamfer portion formed between the bottom face and the side face of the cutting insert constituting the cutting portion. Such a chamfer portion may allow reducing the loads exerted on the cutting teeth during penetration into and exit from a workpiece.

With respect to all of the above described examples, the intersection line may serve as an auxiliary cutting edge, wherein the design of the cutting member may be such that, during operation, chips of material removed from the workpiece by the cutting edges are urged in a first direction, and chips of material removed from the workpiece by said auxiliary cutting edge are urged in a second direction, angled to the first direction.

In particular, in all of the above examples in which the cutting tool comprises chip evacuation flutes, and said intersection line constitutes an auxiliary cutting edge, the design may be such that during operation, material removed from the workpiece by the cutting edges is urged to the chip evacuation channels between two adjacent teeth and therefrom into a first chip evacuation flute located on one side of the cutting portion, while material removed from the workpiece by the auxiliary cutting edge of the same cutting portion is urged to a second chip evacuation flute located on an opposite side of the cutting portion. In particular, the design may be such that some material is urged to a chip evacuation flute located CW of the cutting portion while other material is urged to a chip evacuation flute located CCW of the cutting portion (CW and CCW being defined with respect to the central axis).

According to another aspect of the disclosed subject matter there is provided a cutting member having an external working surface formed thereon with at least one cutting element having a cutting edge, such that provided a conventional two-dimensional development of said cutting surface, defined by a generatrix G and a directrix D of said development, the ratio R is given between the total length T of the projection of said at least one cutting edge on said development and the perimeter P of said development, such that $R \geq 1$.

Optionally, the cutting member may be such that $R \geq 1.5$, preferably $R \geq 2$, more preferably $R \geq 2.5$, even more preferably $R \geq 3$ and still more preferably, $R \geq 3.5$.

In addition, with respect to all of the above examples, it is possible to define an envelope of rotation either of the cutting tool or the workpiece as the surface formed during rotation of the respective cutting tool or workpiece by those points thereon located farthest from the rotation axis.

According to yet another aspect of the disclosed subject matter there is provided a method for manufacture of a cutting tool, said method including forming, along a singe cutting portion, at least one auxiliary cutting edge extending along a first direction and a plurality of main cutting edges extending along a second direction transverse to said first direction, both main cutting edges and auxiliary cutting edge being adapted for simultaneously engaging a workpiece during a cutting operation.

According to a further aspect of the disclosed subject matter there is provided a method for performing a cutting operation using the cutting member of the previous aspect of the disclosed subject matter, having a cutting portion formed with at least one main cutting edge and at least one auxiliary cutting edge, said method including providing the cutting member with a predetermined feed speed F such that chips of material removed from the workpiece by said at least one main cutting edge are urged in a first direction, and chips of material removed from the workpiece by said at least one auxiliary cutting edge are urged in a second direction, angled to the first direction.

According to still a further aspect of the disclosed subject matter, there is provided a cutting member adapted for removing material from a workpiece, said cutting member having a cutting envelope, and being formed with a first cutting portion having a first cutting edge with a radius r which lies on the cutting envelope and a second cutting portion having a second cutting edge with a radius R>r, which lies inwards from the cutting envelope, the first cutting portion and second cutting portion being arranged such that during a cutting operation, said second cutting edge is adapted to come in contact with said workpiece prior to said first cutting edge.

Under the above arrangement, during a cutting operation, the second cutting portion removes material from the workpiece leaving a radius R therein, while immediately thereafter, the second cutting portion removes the remaining material to leave a radius r within the workpiece. This arrangement allows, inter alia, to more evenly spread the loads exerted on the cutting tool. In particular, it is noted that the most rapid wear in a cutting tool occurs in cutting corners, i.e. at the curved cutting edge. Thus, increasing the radius R of the second cutting edge and overlapping it with the first cutting edge with radius r may considerably reduce the wear of the first cutting portion and of the cutting tool in general.

Such an arrangement may effectively increase the life span of a cutting tool, and even double it, due to the distribution of loads on two cutting edge portion.

The above design is referred herein as a 'back tooth', and may be implemented in any of the cutting tools referenced above, i.e. milling, drilling, turning etc. It should be understood that the 'back tooth' principle is not restricted to integral cutting tools and may also be implemented for cutting inserts.

It should also be appreciated that the cutting member may be formed with more than two cutting portions, i.e. it may be formed with a plurality of cutting portions, each having a cutting edge portion of different radius (e.g. R1, R2, R3 . . . ) which are arranged such that R1>R2>R3 etc. In this case, the cutting member is adapted to come in contact with the workpiece such that the first cutting edge portion to contact the workpiece is of the largest radius and followed by cutting edge portions of decreasing radius.

It should also be emphasized that there exist conventional cutting tools which have several cutting portions, each formed with an undulating cutting edge portion having crests and troughs, being arranged such that the cutting edge portion of one cutting portion is at an offset to a cutting edge of an adjacent cutting portion (i.e. the crests and troughs are shifted with respect to one another). However, in such cutting tools there is no load distribution, i.e. the crest of one cutting edge portion is applied with the same load as a crest of an adjacent cutting edge portion. In contrast, according to the disclosed subject matter, the cutting portions differ from one another in their design, i.e. shape and dimensions (not simply offset from one another) allowing distributions of the loads exerted on the cutting edge portions.

According to another particular example of the above aspect, there is provided a cutting member with a central axis having a cutting envelope and formed with a main cutting element having a main cutting edge lying on said envelope and having a cutting radius R. The cutting member is further formed with a bottom cutting element having a bottom cutting edge on said envelope lying on a surface extending generally perpendicular to the central axis, and a side cutting element having a side cutting edge on said envelope lying on a surface extending generally parallel to the central axis.

The cutting member is designed such that the cutting edges of the main, bottom and side cutting element are arrange consecutively along the envelope of the cutting member, with the cutting edge of the main cutting element being the first to contact the workpiece during operation of the cutting member.

Under the above arrangement, during operation of the cutting member, the cutting edge of the main cutting element comes first in contact with the workpiece, removing chips therefrom and leaving a rounded corner therein, having a radius R corresponding to the radius of the cutting edge. Thereafter, the bottom cutting element comes in contact with the workpiece so that the cutting edge thereof penetrates into the workpiece, straightening the bottom side of the corner left by the first cutting element. Further thereafter, the side cutting element comes in contact with the workpiece so that the cutting edge thereof penetrates into the workpiece, straightening the side of the corner left by the first cutting element, thus leaving a right corner (90°) in the workpiece.

With respect to the above, it should be understood that in the arrangement of the main, bottom and side cutting elements, whereas the main cutting element should be the first to come in contact with the workpiece, the bottom cutting element and the side cutting element are interchangeable. In other words, the cutting member may be designed such that the side cutting element may first remove the side of the corner, and only thereafter the bottom cutting element removes the bottom side of the corner.

In accordance with a still further aspect of the disclosed subject matter, there is provided a cutting tool comprising a cutting tool holder, a cutting insert and a chip breaker separate from the cutting insert, wherein the cutting insert is configured for mounting onto said cutting tool holder such that it engages the chip breaker and is supported thereby.

According to still a further aspect of the disclosed subject matter there is provided a chip breaker adapted to be mounted onto a cutting tool holder of a cutting tool, said chip breaker having a first portion adapted for engaging said cutting tool holder and being supported thereby, and a second portion configured for engaging said cutting insert and supporting it.

According to still a further aspect of the disclosed subject matter there is provided a cutting member with at least one cutting element as previously disclosed, wherein the rake surface of the cutting element is formed with a plurality of chip breaking steps disposed along the rake surface in the direction of the cutting edge.

Each of the chip breaker steps are adapted to be oriented transverse to the rake surface, at an angle $\alpha$, the angle being sufficient to cause a chip removed from the workpiece during operation of the cutting tool and progressing along the rake surface to break upon contact with the chip breaker step.

According to one example, the chip breaking steps may be in the form of flat surfaces extending transverse to the cutting edge. According to another example, the chip breaker steps may be in the form of convex pockets formed along a chip evacuation channel of the cutting element. According to a further example, the chip breaker steps may be in the form of bulges or protrusions formed along the rake surface of the cutting element.

According to still another aspect of the disclosed subject matter there is provided a method for the manufacture of a cutting member, including the steps of:
 a) forming a cutting member having a cutting envelope and a cutting portion with a cutting edge of radius r;
 b) forming a chip evacuation channel in a direction transverse to the cutting envelope of the cutting member, thereby effectively splitting the cutting portion into a first cutting portion containing the cutting edge of radius r and a second cutting portion;
 c) increasing the radius r of the cutting edge of the first cutting portion to a radius R; and
 d) forming a cutting edge of radius r in the second cutting portion.

The chip evacuation channel may be adapted to evacuation chips of material removed by the second cutting edge of radius r. The arrangement may be such that chips removed by the first cutting edge of radius R are urged into a first direction and chips removed by the second cutting edge of radius r are urged into a second direction.

According to still another aspect of the disclosed subject matter there is provided a method for modification of a cutting member, including the steps of:
 a) providing a cutting member having a cutting envelope and a cutting portion with a cutting edge of radius r;
 b) forming a chip evacuation channel in a direction transverse to the cutting envelope of the cutting member, thereby effectively splitting the cutting portion into a first cutting portion containing the cutting edge of radius r and a second cutting portion;
 c) increasing the radius r of the cutting edge of the first cutting portion to a radius R; and
 d) forming a cutting edge of radius r in the second cutting portion.

It is appreciated that the cutting members according to all the above aspects of the disclosed subject matter, including the various features thereof, are not restricted to operations such as drilling, milling, turning and the like, in connection with which they have been described, and may independently be applied, in various combinations in other cutting field, e.g. shaving, wood work, knives etc.

According to still another aspect of the disclosed subject matter, there is provided a cutting formed with a prolonged cutting edge, such that:
 said cutting edge is capable of cutting out material from a workpiece to form a corner of angle $\alpha$;
 there is at least one projection of said cutting edge in which a portion of the cutting edge may be delimited by a first and a second line having respective tangency points A and B with said cutting edge, and intersecting one another at point O to form an angle corresponding to angle $\alpha$;
 a bisector of said angle $\alpha$ intersects the portion of said cutting edge at point C;
 said first and second line represent respective projections of a first and a second planar surface $A_S$, $B_S$, and said intersection point O represents a projection of the intersection line $O_L$ between the surfaces;
 wherein, the projection of point C on said intersection line $O_L$ (C') is located between the projections of respective points A, B on said intersection line (A', B').

In other words, the design of the cutting edge may be such that, points A, B and C do not lie on the same plane, and more particularly, they lie on consecutive planes perpendicular to the intersection line $O_L$, such that point C lies on the middle plane, i.e. the plane located between the plane on which lies point A, and the plane on which lies point B.

The concept of designing the cutting edge of the corner in the above described manner may be referred hereinafter as 'warped corner', and may interchangeably be used with respect to the following terms 'magic corner','twisted corner', 'curved corner', 'prolonged corner' etc.

The cutting element may have a first side face and a second side face, angled to one another by an angle corresponding to the angle $\alpha$, the intersection between the side faces forming said corner. The cutting element may further be formed with a front face, such that the intersection between the front face and the corner formed by the side faces forms the portion of said cutting edge.

The arrangement may be such that point A is located on a segment of the cutting edge at the intersection between the first side face and the front face while point B is located on a segment of the cutting edge between the second side face and the front face.

According to one example, the cutting edge of the cutting portion may have a 'sunk in' design, i.e. point A is elevated over the front face to an extent greater than point B. In this case, during the cutting operation, point A is the first to engage the workpiece, thereafter point C and only thereafter, point B. Alternatively, according to another example, the cutting edge of the cutting portion may have a 'bulging out' design, i.e. point B is elevated over the front face to an extent greater than point A. In this case, during the cutting operation, point B is the first to engage the workpiece, thereafter point C and only thereafter, point A.

With reference to the above two designs ('sunk in' and 'bulging out'), it should be understood that these terms are used in comparison to a reference cutting insert in which all three points A, B and C lie on the same plane. In other words, compared to the reference cutting insert, in the 'sunk in' example, point B is 'sunk in', along the intersection line, with respect to an equivalent point B on the reference cutting insert. Similarly, also compared to the reference cutting insert, in the 'bulging out' example, point B is 'bulges out', along the intersection line with respect to an equivalent point B on the reference cutting insert.

In both of the above case, the cutting edge yields to the definition according to which the projection of point C on the intersection line $O_L$ lies between the respective projections of points A and B on the intersection line $O_L$.

The cutting edge of the cutting element may also be defined at the intersection of a rake surface and a relief surface, the rake surface being constituted by the above mentioned front face, while the rake surface is constituted by the side faces. In particular, along the cutting edge and on the rake surface, there may be defined a cutting strip, which is an area portion of the rake surface extending from the cutting edge (in a direction perpendicular thereto) and along the cutting edge, e.g. like a ribbon.

The cutting strip is thus a surface (a ribbon surface), which extends along the corner of the cutting edge passing through points A, C and B. In particular, the cutting strip is adapted to change its orientation (i.e. the direction in which the cutting strip is facing), while progressing between the above points.

Specifically, the cutting strip extends, much like the cutting edge, from point A, surrounding the corner via point C, and progressing towards point B. It is further noted that at point A the cutting strip may be facing essentially parallel to a face plane perpendicular to the intersection line $O_L$, while at point C, the cutting strip may already be twisted (at least partially) about itself, such that its surface is angled to face plane. Progressing further towards point B along the cutting edge, the cutting strip may complete the twist such that it lies generally on a plane perpendicular to the face plane, and then curves towards point B where it is again facing essentially parallel the face plane.

It is thus noted that the cutting strip performs generally two twists (warps)—one about the corner of the cutting element, and one about itself, i.e. changing the orientation of the surface of the cutting strip with respect to the intersection line $O_L$.

Furthermore, it is also noted that the cutting strip C.S., having surrounded the corner and facing in a generally upward direction, is slightly elevated over the point C. In other words, progression along the cutting strip CS from point C to point B, is under an incline.

According to one implementation, the cutting element may be a drilling tool or a drilling insert, configured for removing material from a workpiece during a drilling operation in order to form a hole therein. The drilling tool may have a body extending along and about a central axis X, having a peripheral surface (surface extending about the central axis) and a front surface oriented perpendicular to the central axis. The front surface and peripheral surface correspond to a bottom and side of the hole formed within the workpiece during the drilling operation.

The drilling tool/insert may be formed with a cutting portion at an end of the body adjacent the front surface such that the cutting portion comprises a cutting edge defined at the intersection between the peripheral surface of the body, and the front surface thereof.

The intersection of the front surface and the peripheral surface may form a corner, as in common drills. However, applying the principle of the 'warped corner' to the drilling tool/insert, may result in this corner being filleted (with a rounded edge), rather than with a sharp edge as in common drills.

Thus, in operation, the drilling tool/insert according to the implementation may be configured to form within the workpiece a hole with a filleted corner between the bottom and the side of the hole. Filleting of the corner of the drilling tool/insert allows, inter alia, reduction of the stresses and loads on the corner of the cutting edge, and for smoother evacuation of chips from the workpiece during the drilling operation.

According to another implementation, the cutting element may be a milling/turning insert, formed with a front face, a rear face and side faces extending therebetween. The cutting insert may be formed with a cutting corner at least at one intersection between neighboring side face and the front/rear face.

According to one example, the front/rear side (front/rear) of the cutting insert may be formed with a number of cutting edges equal to the number of side faces thereof (e.g. four cutting edges for a cutting insert having four side faces). Alternatively, according to another example, the front/rear side of the cutting insert may be formed with a number of cutting edges equal to half the number of side faces (i.e. two cutting edges for a cutting insert having four side faces. In the latter example, the cutting edges may be disposed alternately, i.e. each corner of the cutting insert formed with a cutting edge may be neighbored by two corner formed without a cutting edge.

The cutting insert may be indexible and/or reversible, i.e. having more than one cutting edge on one side (front/rear) thereof, and/or having at least one cutting edge at any one of its front/rear sides.

According to one specific design, the corner along which the cutting edge is disposed may be a filleted corner, i.e. having a continuous curvature radius, thus configured to form a filleted corner in a workpiece during the cutting operation. According to another specific design, the corner along which the cutting edge is disposed may be a broken filleted corner, i.e. having at least two segments, each segment having a continuous curvature radius, wherein at the junction point between two segments, there is formed a corner (rather than a continuous radius). According to still another specific design, the corner along which the cutting edge is disposed may be a chamferred corner, i.e. having at least three segments, angled to one another to form the corner, thus configured to form a chamferred corner in a workpiece during the cutting operation.

According to a specific design, the cutting insert may be formed with at least three side faces—two peripheral side face and one intermediary side face bridging between the peripheral side faces. Thus, two corners are formed, between the intermediary side face and each of the peripheral side faces, and two neighboring cutting edges may be defined at the intersection of these corners with a top face of the cutting insert. The cutting edges may have a mirror design with respect to a symmetry plane passing between the peripheral side faces and perpendicular to the top face and the intermediary side face of the cutting insert.

According to this design, the corner formed between the intermediary side face and the top face of the cutting insert may also constitute a cutting edge of the cutting insert, bridging between the cutting edge portions disposed at the corners.

According to one example, both cutting edges at the corners may be of the 'sunk in' design, in which case the top face of the cutting insert may be elevated above the corners. Under such a design, chips removed by the cutting edges of the corners are split into two groups, chip removed by the cutting edge of one corner are urged (along the top face) towards the side face of the corresponding corner (i.e. away from the symmetry plane), while chips removed by the cutting edge of the other corner are urged towards the side face of the corresponding other corner, thus being separately evacuated from the cutting insert.

According to another example, both cutting edges at the corners may be of the 'bulging out' design, in which case at least a portion of the top face of the cutting insert may be oriented lower above the corners. Under such a design, chips removed by the cutting edges at both corners are urged (along the top face) to converge (i.e. towards the symmetry plane), and are evacuated together from the cutting insert.

The above examples may be particularly useful when incorporated in saws and/or parting/grooving tools.

The concept of the 'warped corner' may be implemented in a variety of cutting tools, some of the examples of which are: integral tools for milling, turning, grooving, parting, sawing and drilling, and cutting inserts used in conjunction with cutting tool holders to form tools for performing the above operations. It should also be understood that this concept may be used in conjunction with any one of the previously described aspects of the subject matter of the present application.

It is also appreciated that the features described above with respect to all aspects of the disclosed subject matter may provide the cutting tools of the disclosed subject matter with at least one of the following advantages:

Feed—under the same loads, the cutting tool may operate at greater feed and rotation speed F and $V_R$ respectively, than an equivalent cutting tool without the above mentioned features, and, as such, remove a greater amount of material from the workpiece per time unit t;

Loads—under the same feed and rotation speed F and $V_R$, the cutting tool may be subjected to lower loads than an equivalent cutting tool without the above mentioned features, thereby providing an increased overall lifespan;

Chip—under the same rotation speed $V_R$, the cutting tool may be allowed a greater feed F than an equivalent cutting tool without the above features, thus allowing to remove a thicker chip per time unit t for one turn of the cutting tool or workpiece;

Speed—under the same feed F, the cutting tool or the workpiece may be allowed a greater rotation speed $V_R$ than an equivalent cutting tool without the above features, removing a greater amount of chips per time unit t;

Heat—due to the reduced loads applied to the cutting edges of the cutting member, and the fact that the loads are distributed among a great number of cutting edges, the amount of heat (compared with conventional cutting tools) created due to contact of the cutting member and the workpiece is considerably reduced, whereby wear of the cutting member is reduced and life span is increased;

Surface roughness—due to the orientation of the cutting edges, and pealing off of the chips from the workpiece, the resulting surface roughness of the workpiece may be increased with respect to a workpiece handled by conventional cutting tools;

Chip removal—due to the pealing off of chips from the workpiece, the chance is reduced for chips remaining attached to the cutting member after being removed from the workpiece;

Penetration—the cutting edge is always angled to the workpiece such that the penetration into the workpiece is much smoother, allowing reduction of the loads applied to the cutting element; and Lifespan—all of the above provide the cutting element with an extended lifespan, under conditions similar to known cutting elements.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 10A to 10D are, respectively, schematic isometric, front, top and bottom views of a cutting insert used in the milling tool shown in FIG. 9;

FIGS. 12A to 12D are, respectively, schematic isometric, front, top and bottom views of a cutting insert used in the milling tool shown in FIG. 11;

FIGS. 23A and 23B are, respectively, schematic top-front and bottom-rear isometric exploded views of a cutting insert and chip breaker as shown in FIG. 19A;

FIG. 27C is a schematic top isometric view of the cutting insert holder shown in

FIG. 27A;

FIGS. 29A to 24F are, respectively, schematic front, side, top, bottom, and isometric views of the cutting insert shown in FIG. 26A;

FIGS. 30E to 30G are schematic respective front, top and isometric views of a cutting insert of the finishing tool of FIG. 30A;

FIG. 31B is a schematic isometric exploded view of the milling tool shown in FIG. 31A;

FIGS. 40A to 40D are, respectively, schematic front, side, rear and isometric views of the cutting insert shown in FIG. 39A;

FIGS. 44A to 44D are, respectively, schematic isometric, front, bottom and side views of a drilling tool according to another example of the disclosed subject matter, the drilling tool having a curved cutting edge without a back tooth;

FIGS. 46A to 46C are, respectively, schematic isometric, front and bottom views of a drilling tool according to still another example of the disclosed subject matter;

FIGS. 53A to 53E are, respectively, schematic front, side, top, bottom and isometric views of a drilling insert used in the drilling tool shown in FIG. 51;

FIG. 53G is a schematic front view of a drilling tool holder of the drilling tool shown in FIG. 53F;

FIG. 53H is a schematic front view of a drilling insert used in the drilling tool shown in FIG. 53F;

FIG. 58D is a schematic 45° view of the cutting insert shown in FIG. 58A;

FIG. 59A is a schematic isometric view of a turning tool according to still another example of the disclosed subject matter;

FIG. 59B is a schematic isometric exploded view of the turning tool shown in FIG. 59A;

FIG. 59C is a schematic isometric view of a turning tool holder used in the turning tool shown in FIG. 59A;

FIGS. 60A to 60D are schematic respective front, top, top isometric and bottom isometric views of a cutting insert used in the turning tool shown in FIG. 59A;

FIG. 61 is a schematic isometric view of the turning tool shown in FIG. 59A during operation thereof on a workpiece;

FIG. 62A is a schematic isometric view of a turning tool according to yet another example of the disclosed subject matter;

FIG. 62B is a schematic isometric exploded view of the turning tool shown in FIG. 62A;

FIG. 62C is a schematic isometric view of a turning tool holder used in the turning tool shown in FIG. 62A;

FIGS. 63A to 63C are schematic respective isometric, front and top views of a cutting insert used in the turning tool shown in FIG. 62A;

FIG. 63D is a schematic enlarged view of detail N of FIG. 63A;

FIGS. 64A to 64C are schematic respective isometric, front and top views of another example of a cutting insert to be used in the turning tool shown in FIG. 62A;

Figure 64A:
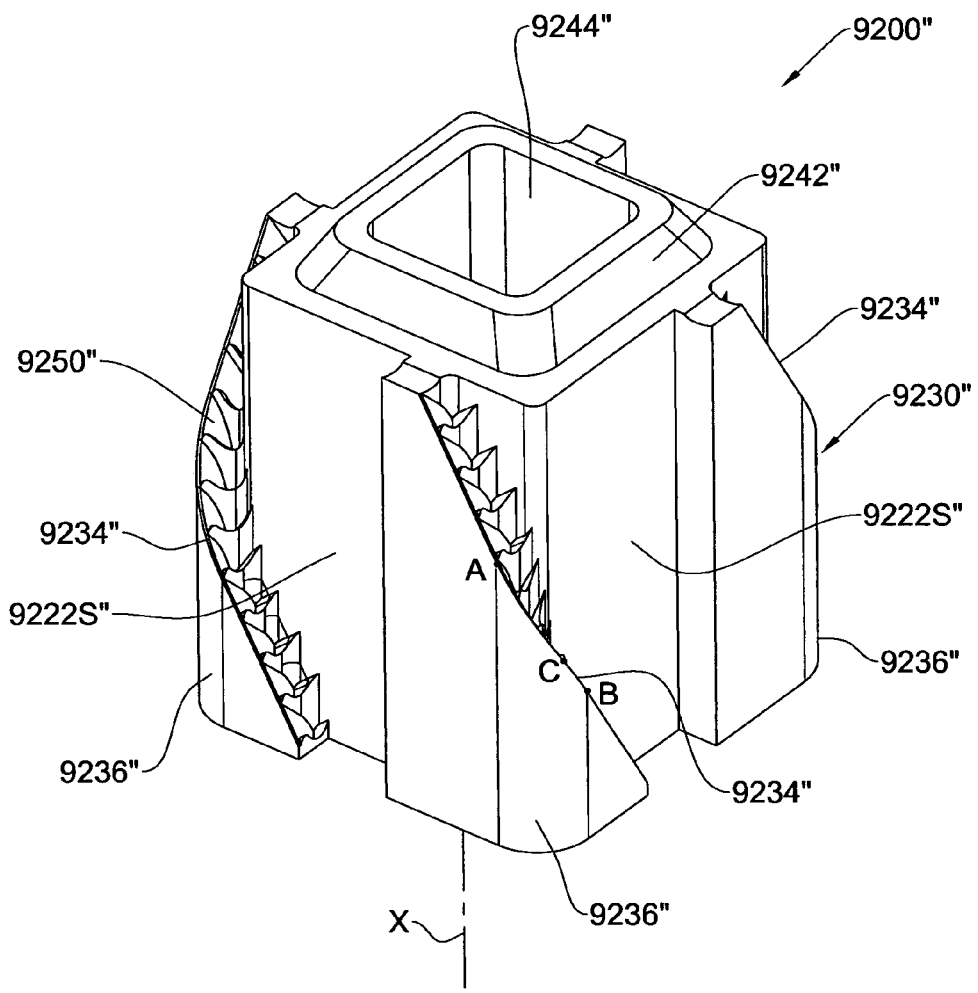
Figure 64B:
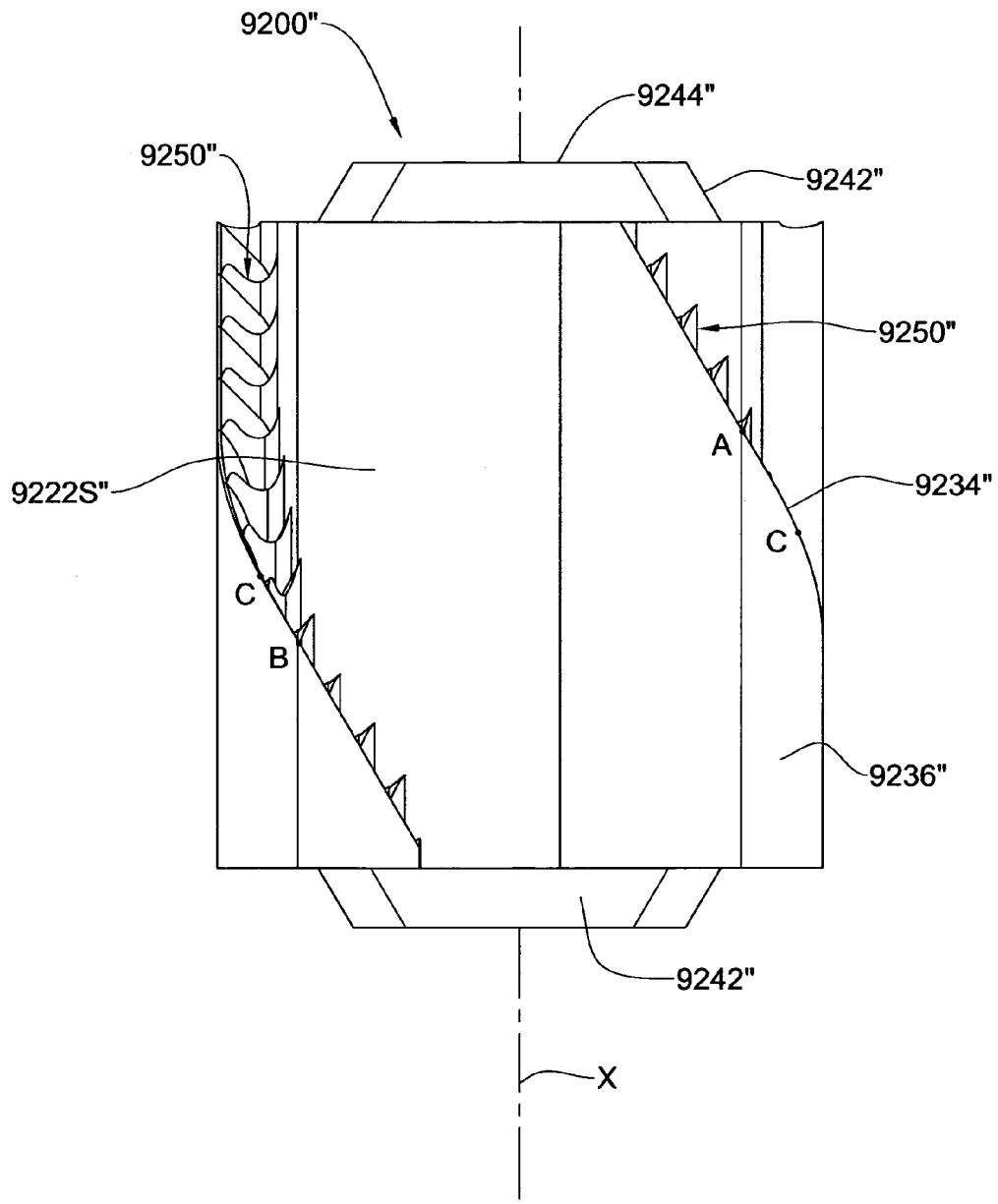
Figure 64C:
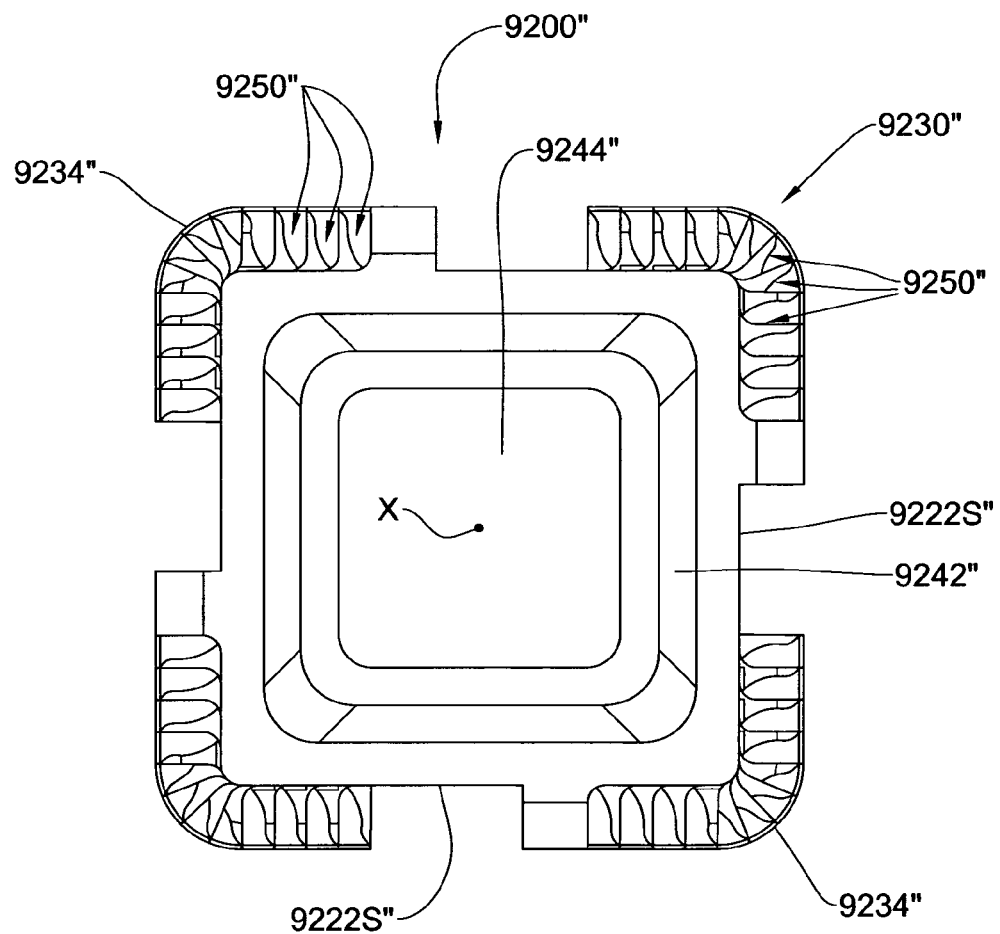
Figure 64D:
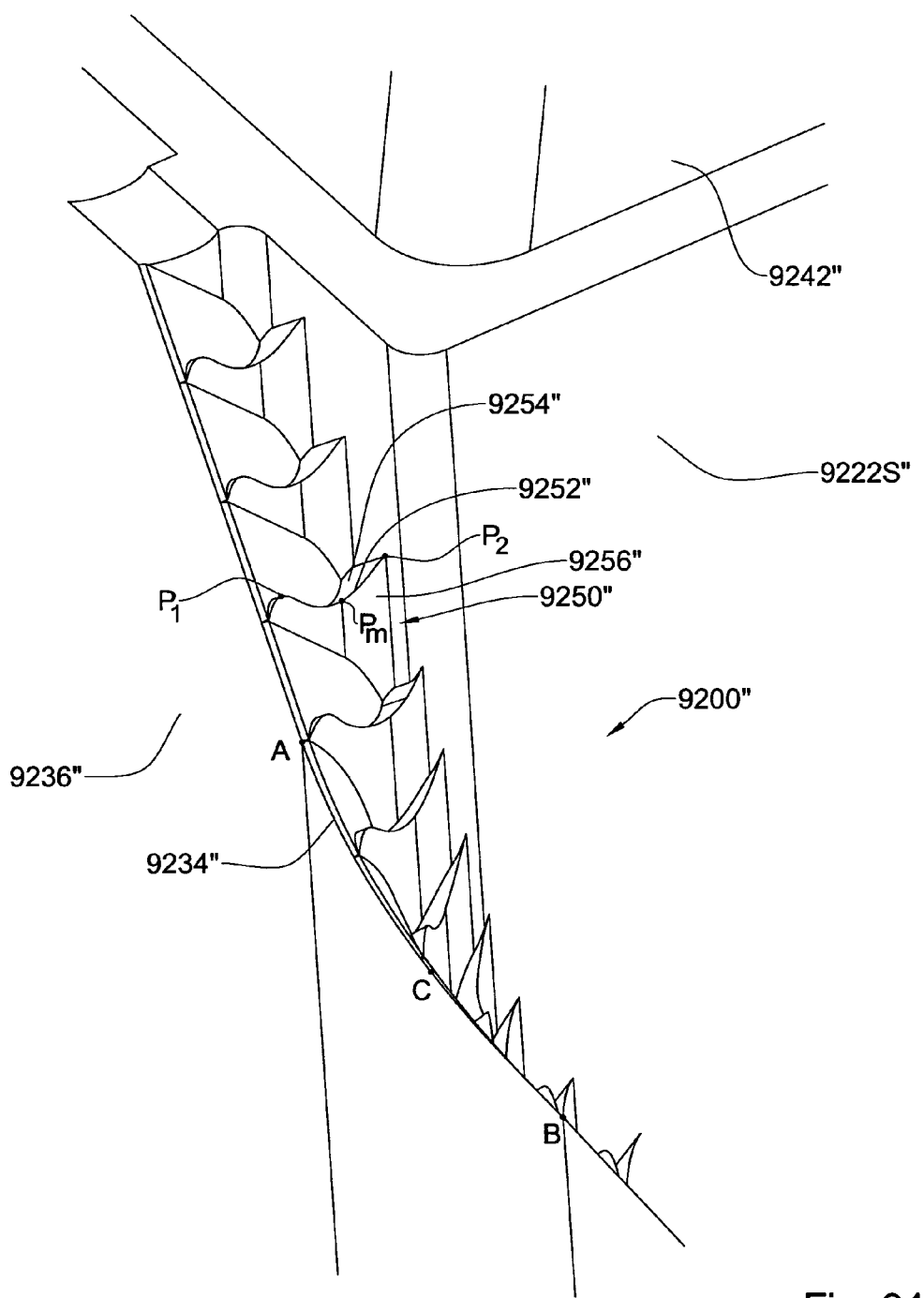
Figure 65A:
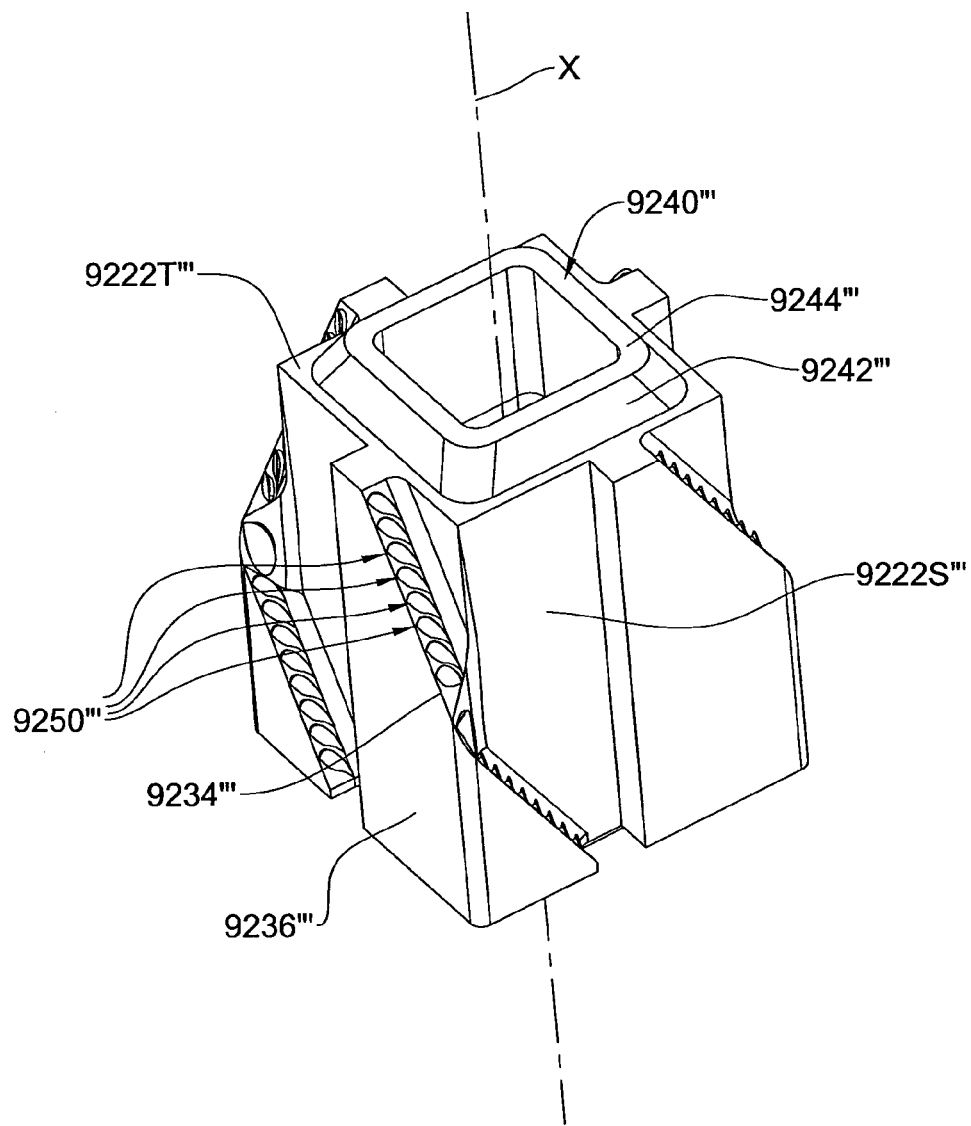
Figure 65B:
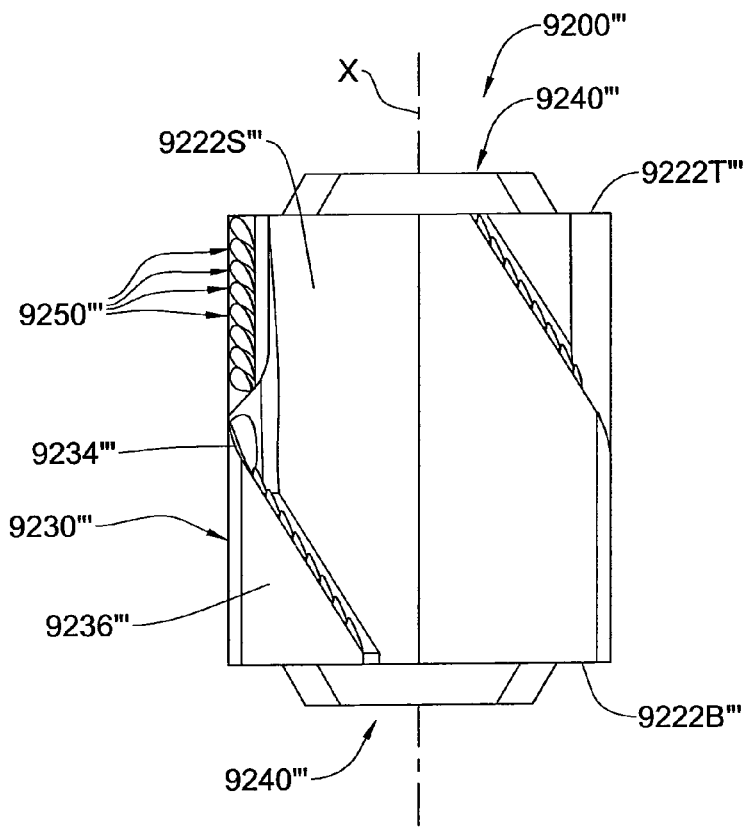
Figure 65C:
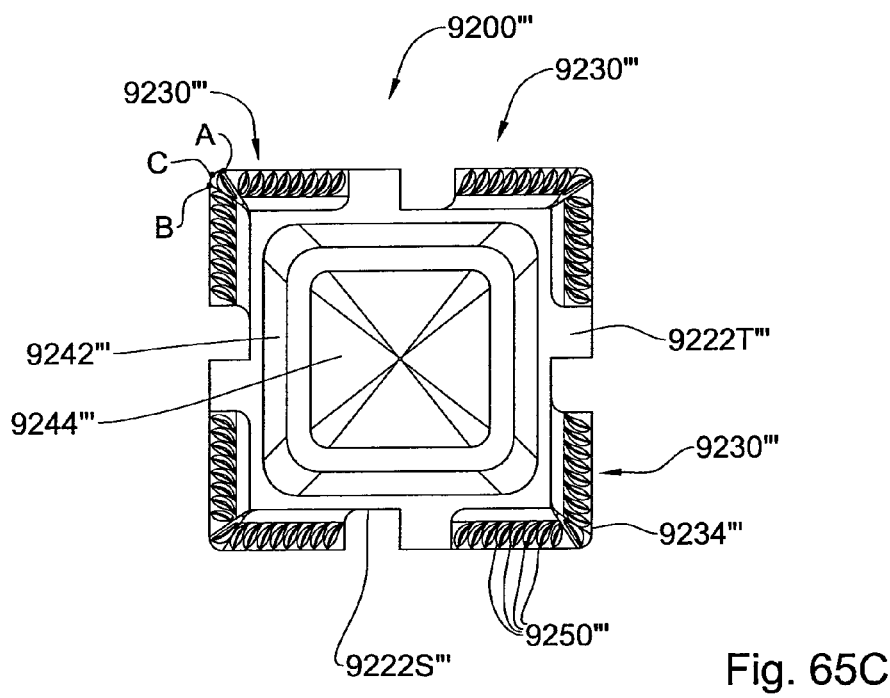
Figure 65D:
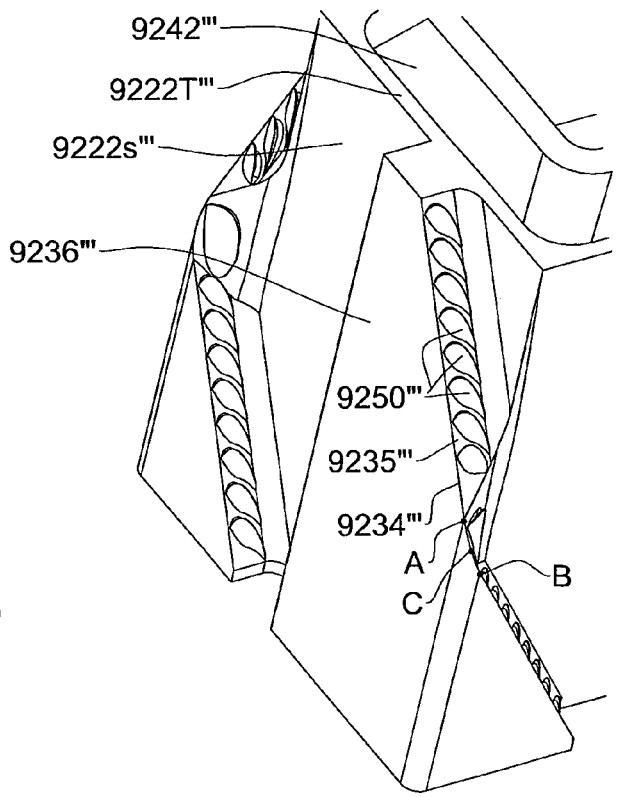
Figure 65E:
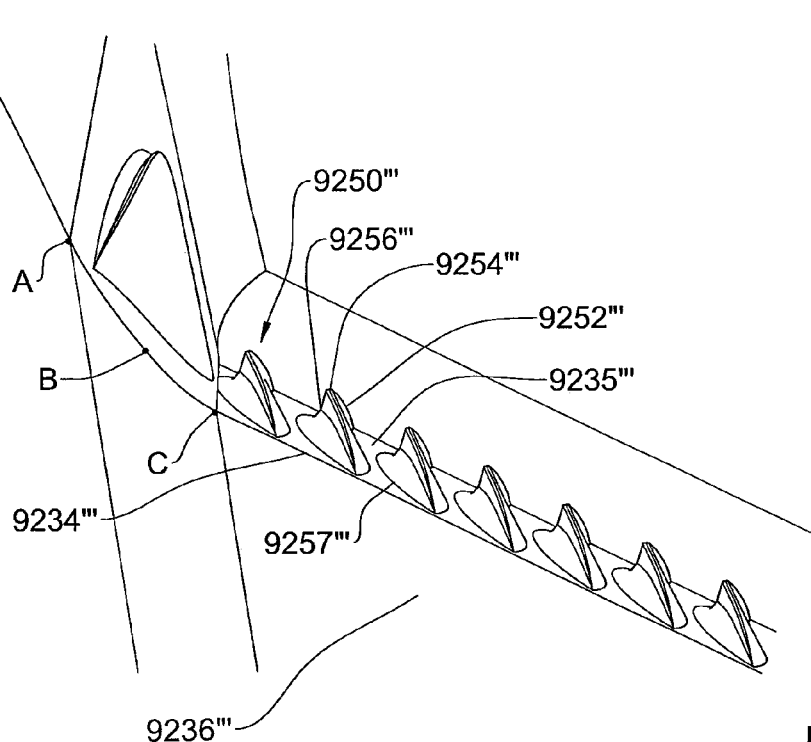
Figure 66A:
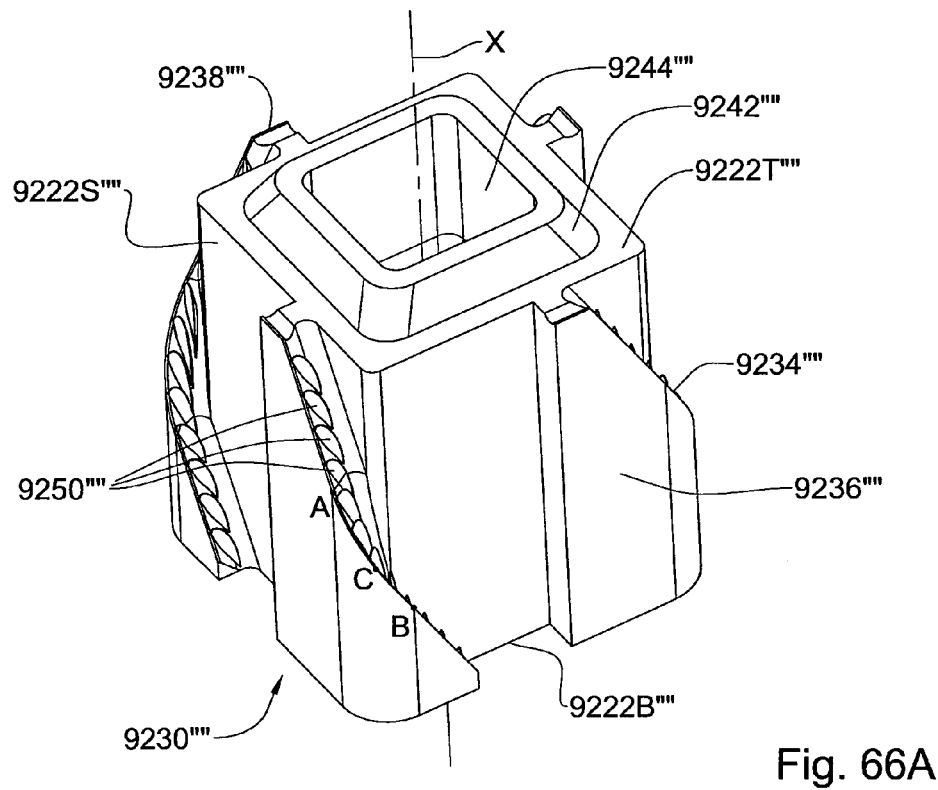
Figure 66B:
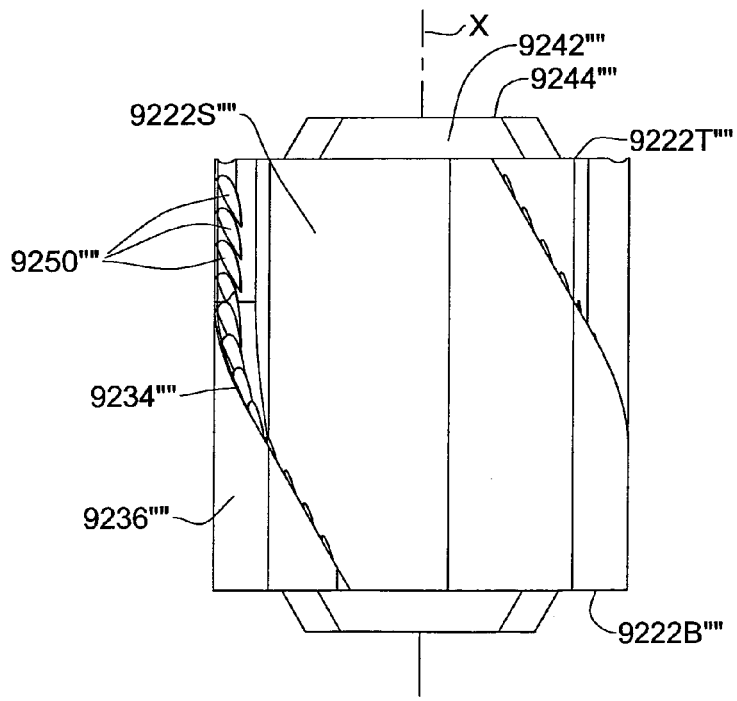
Figure 66C:
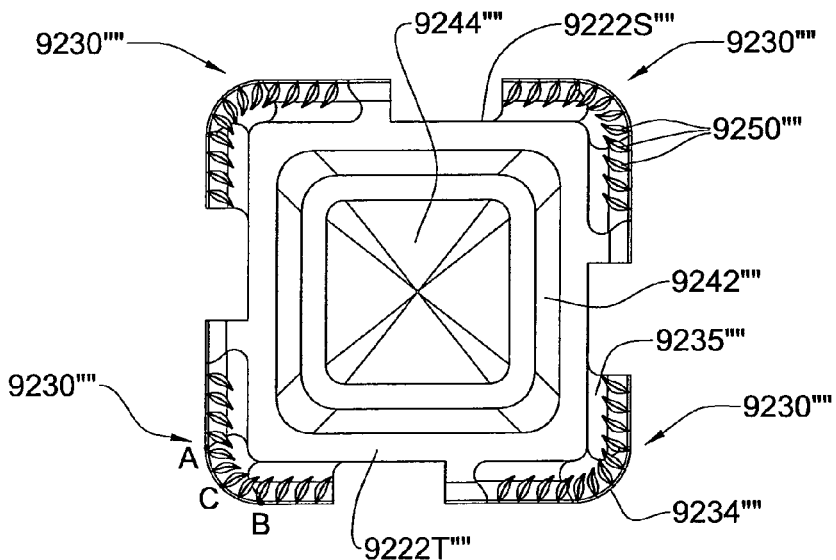
Figure 66D:
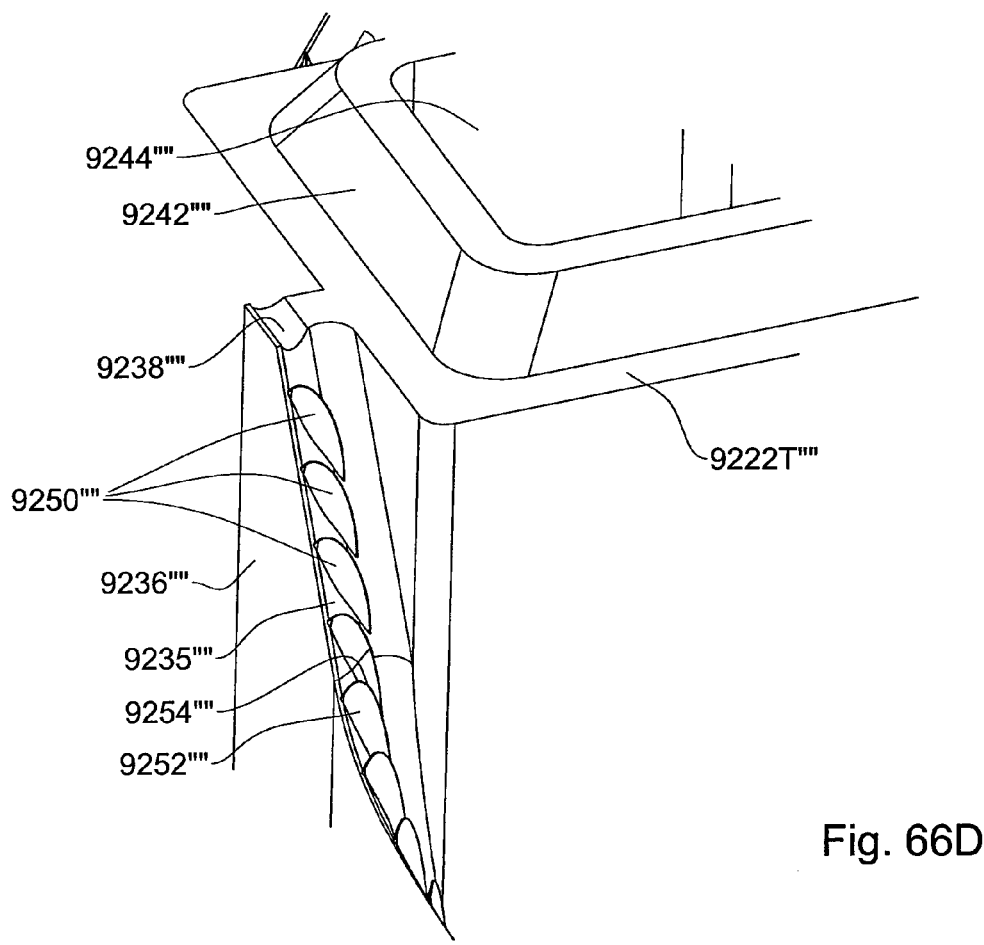
Figure 66E:
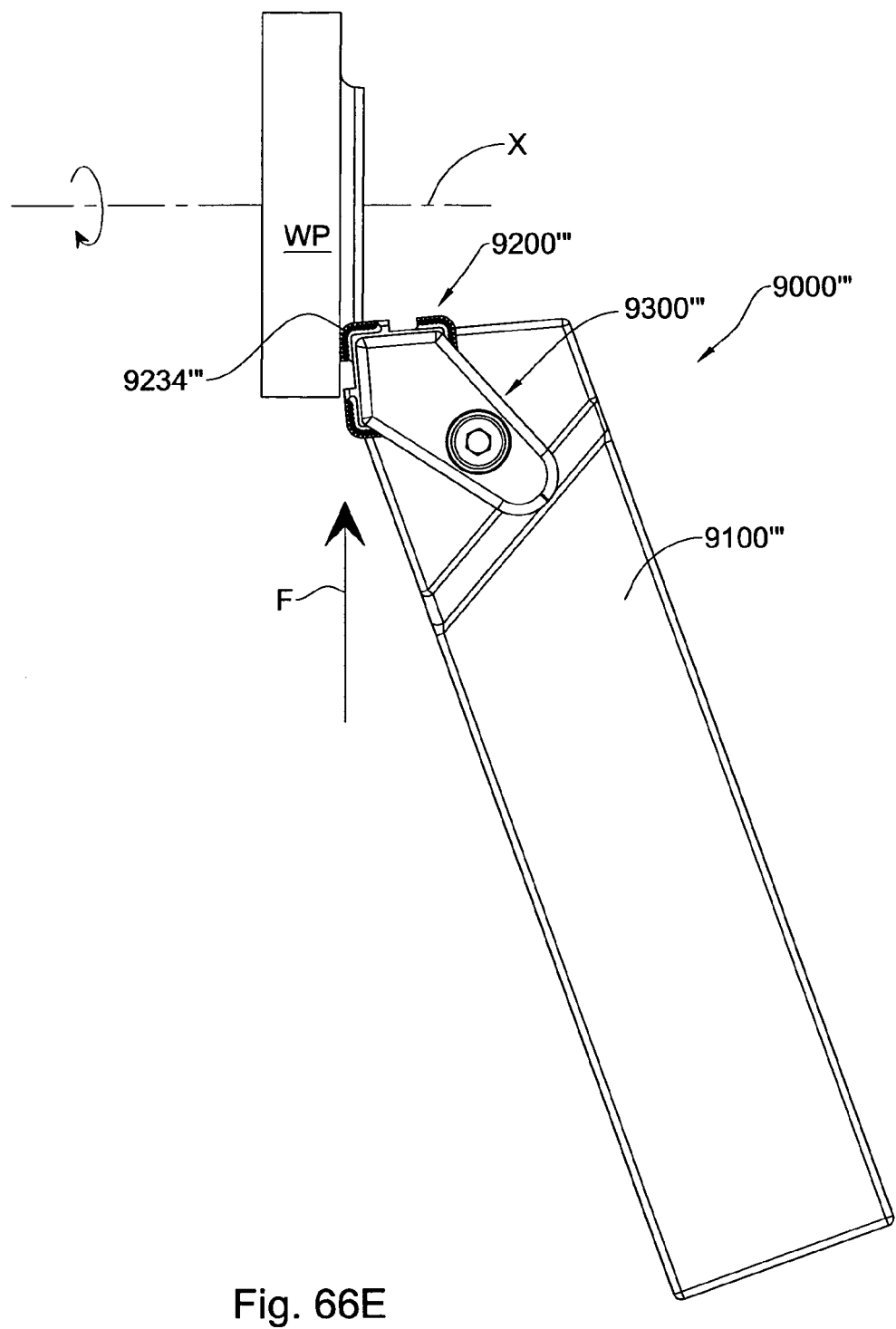
Figure 66F:
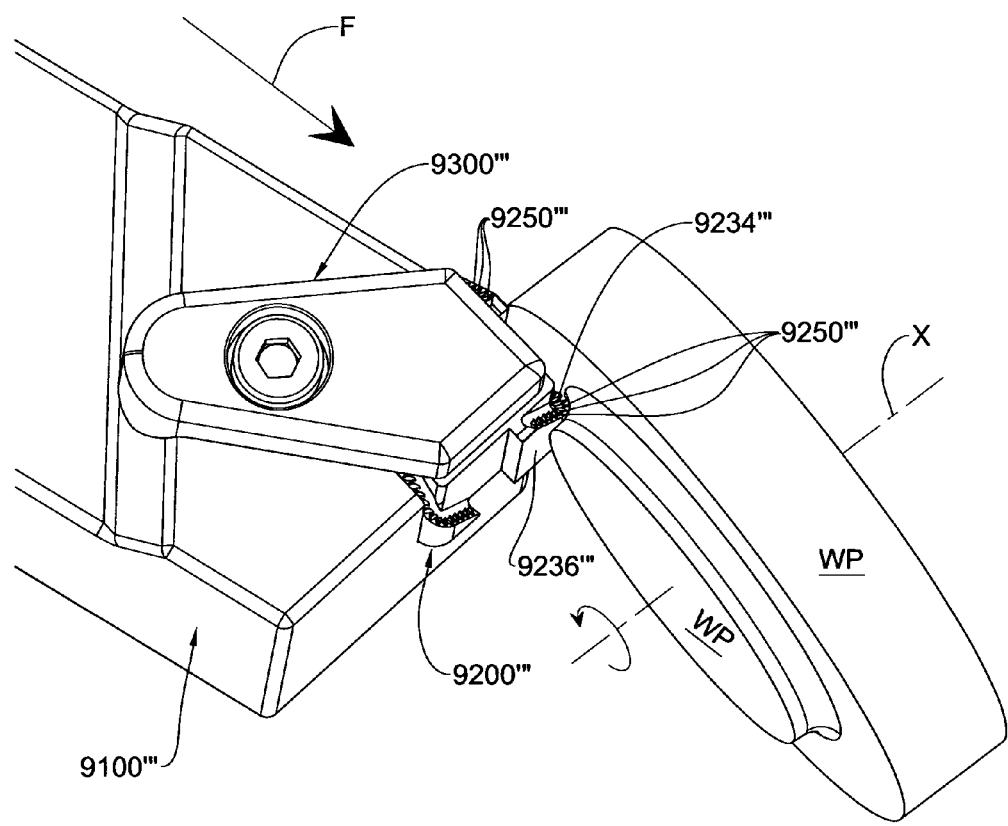
Figure 66G:
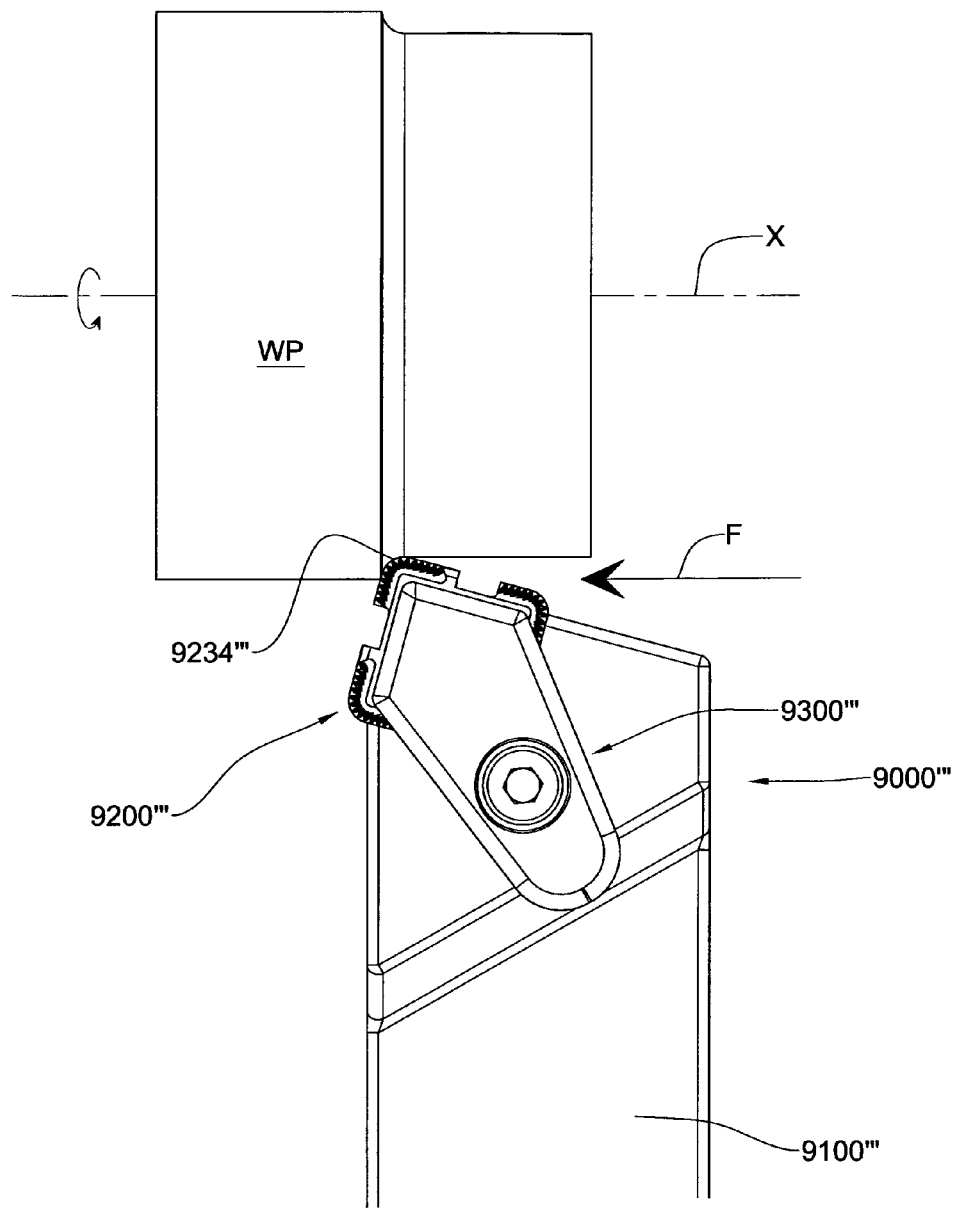
Figure 66H:
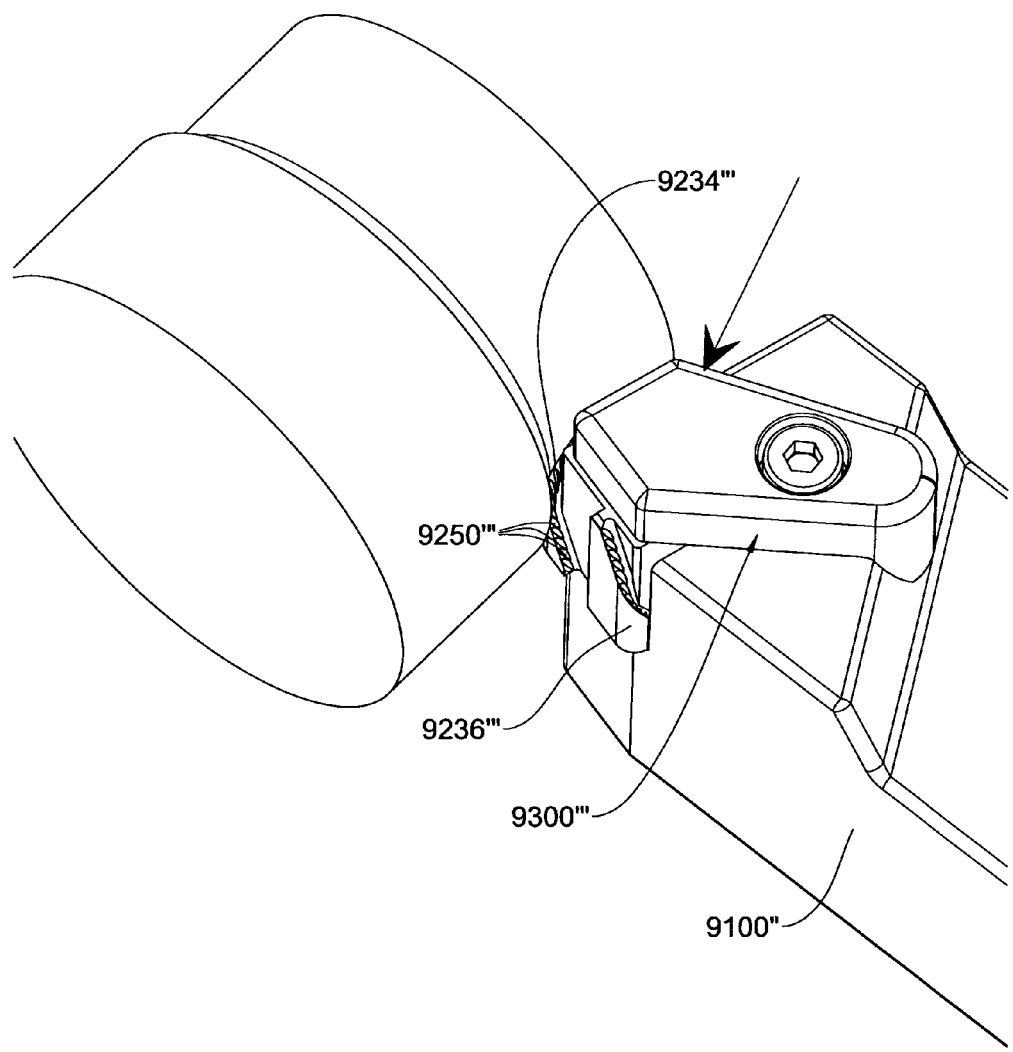
Figure 66I:
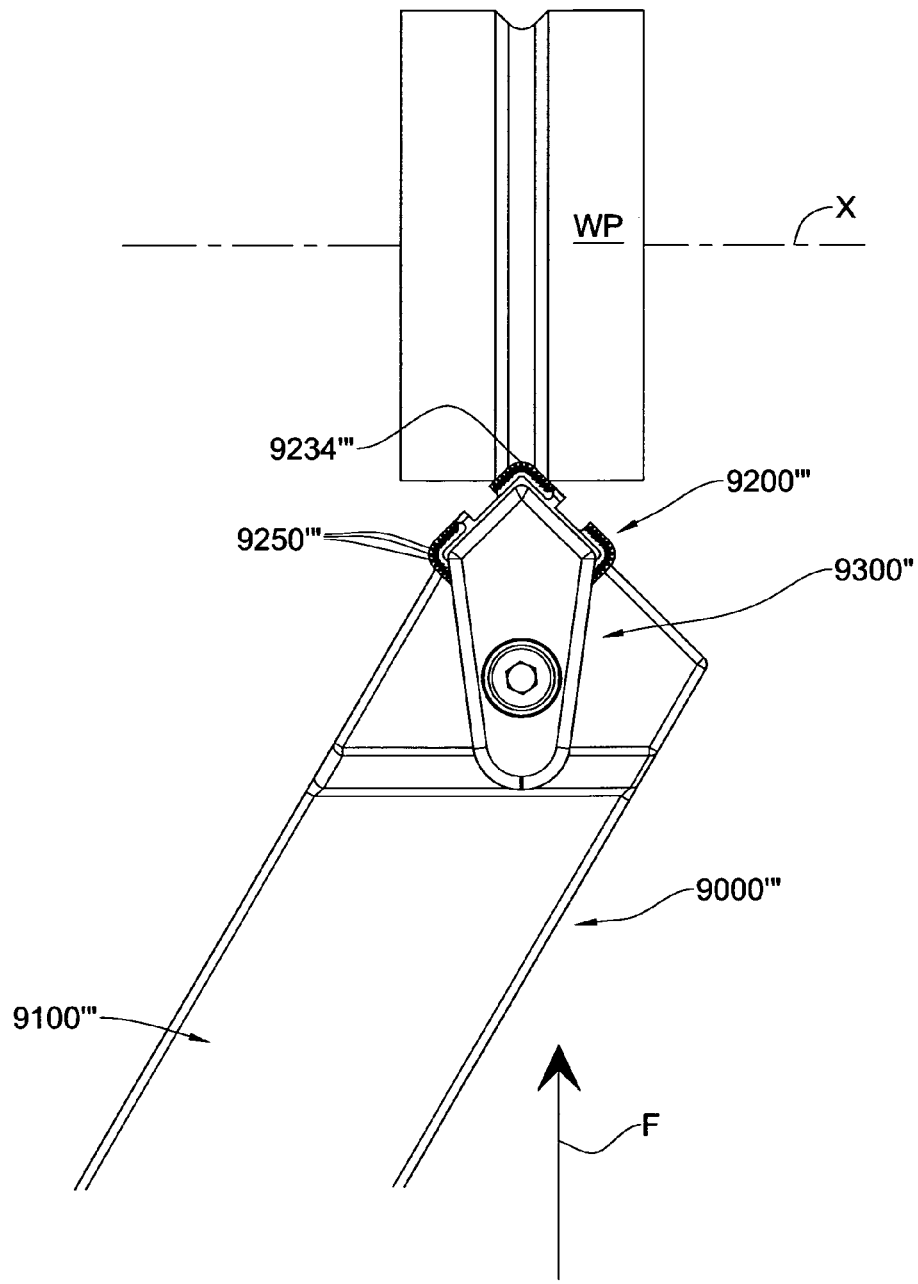
Figure 66J:
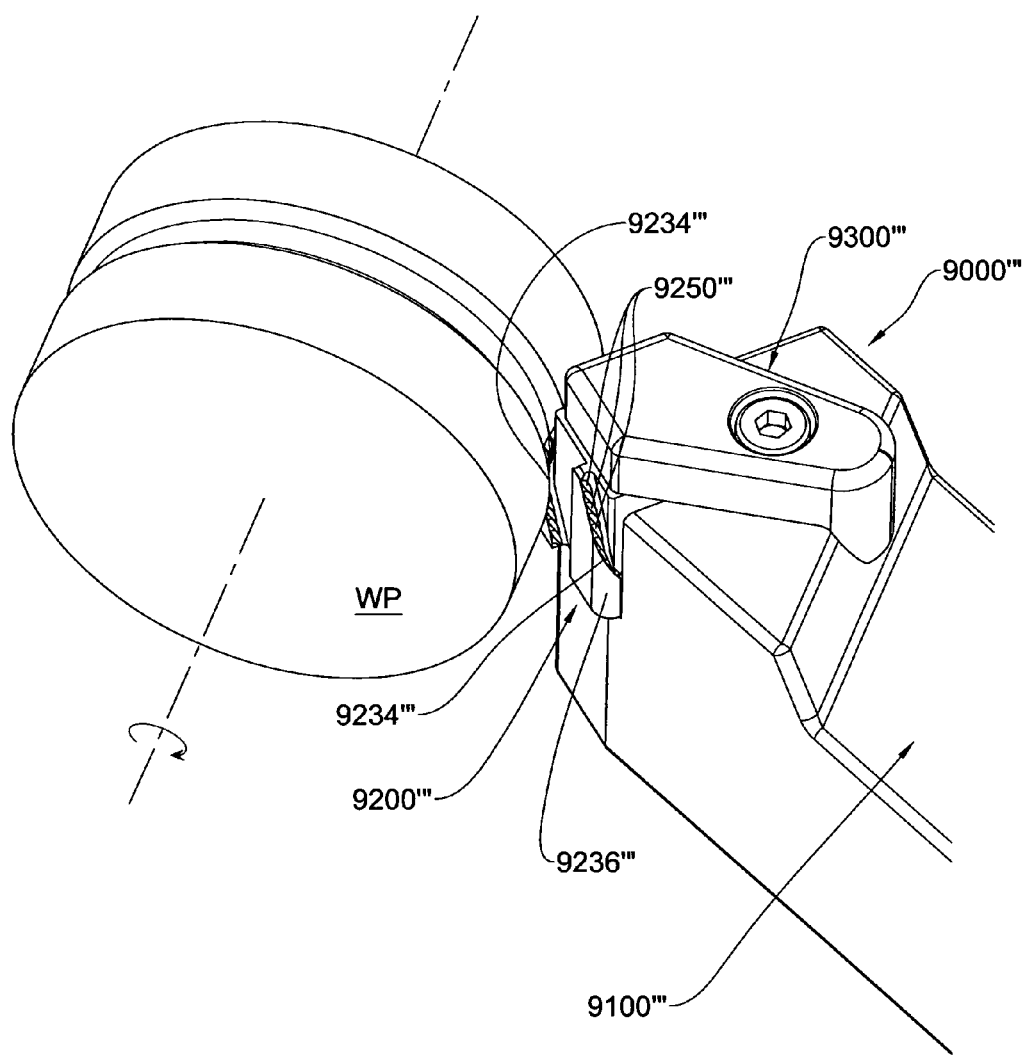
Figure 67A:
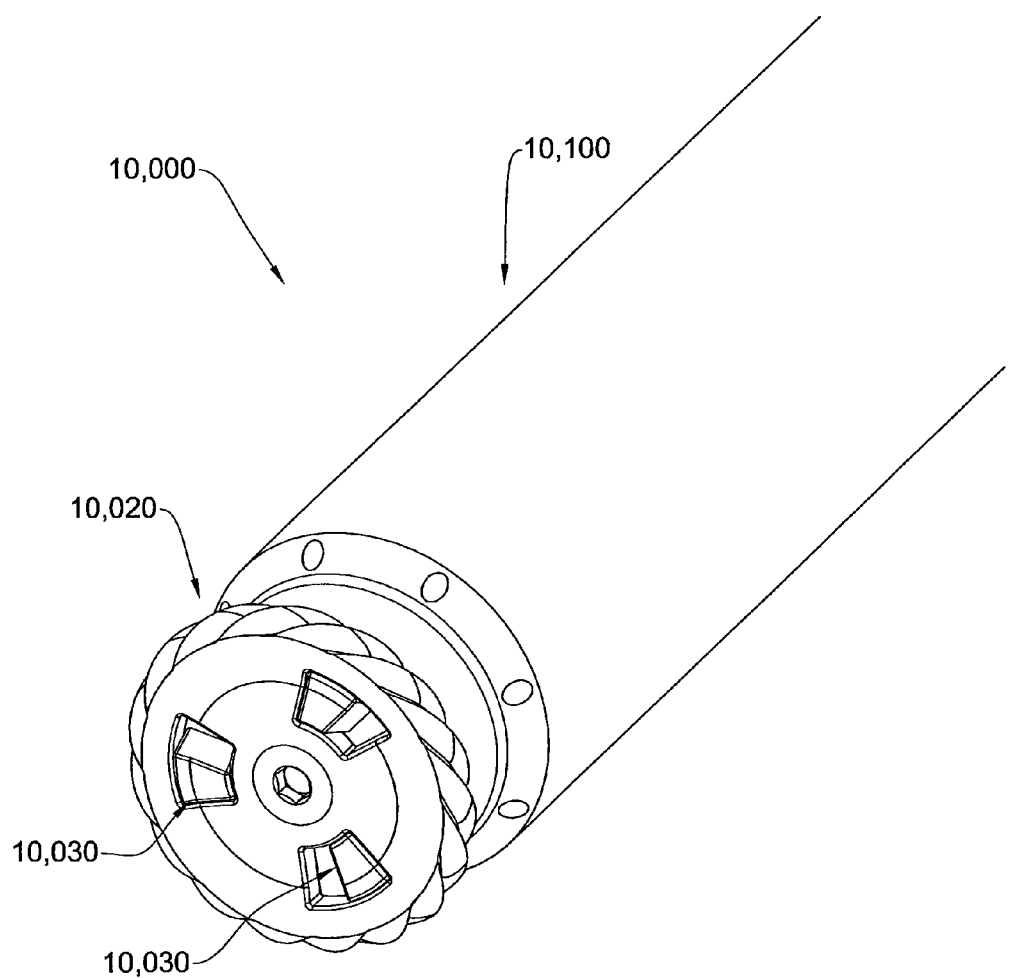
Figure 67B:
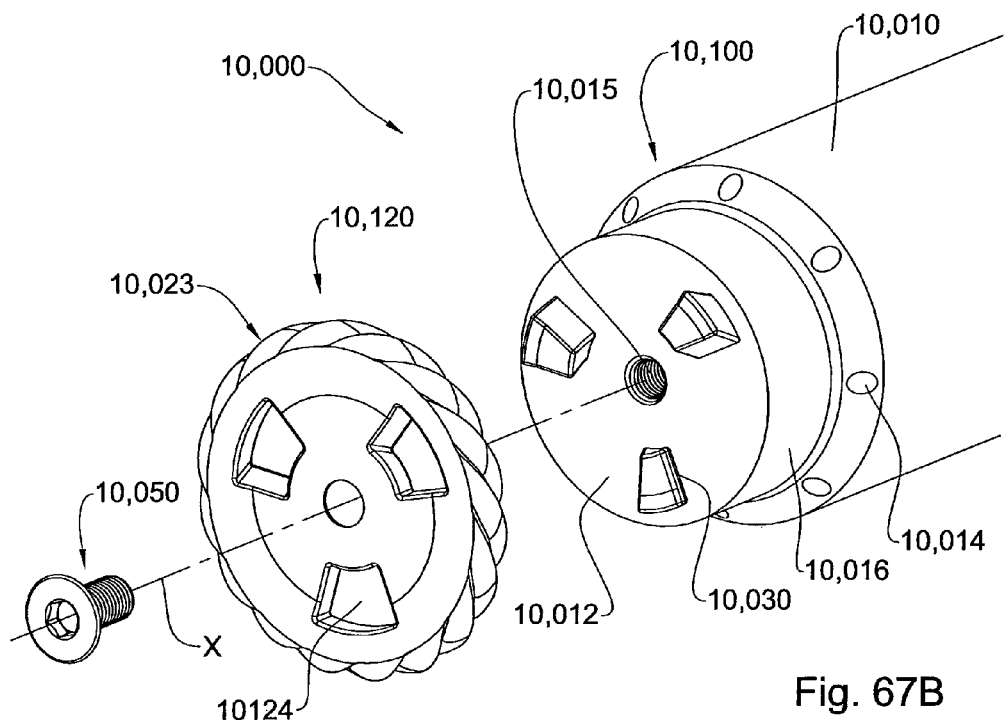
Figure 67C:
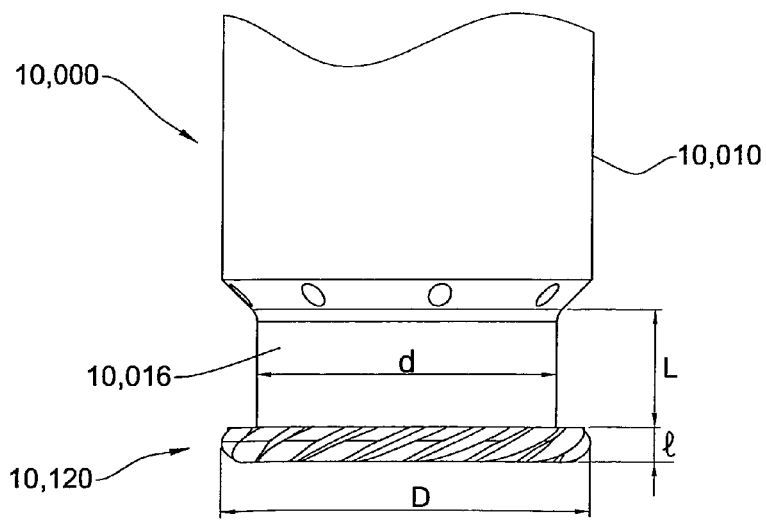
Figure 68A:
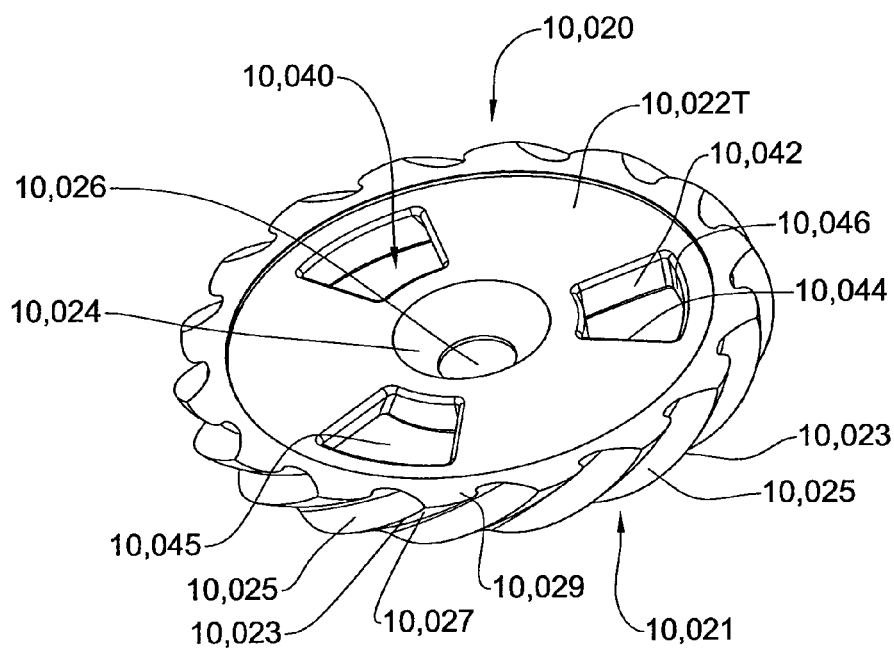
Figure 68B:
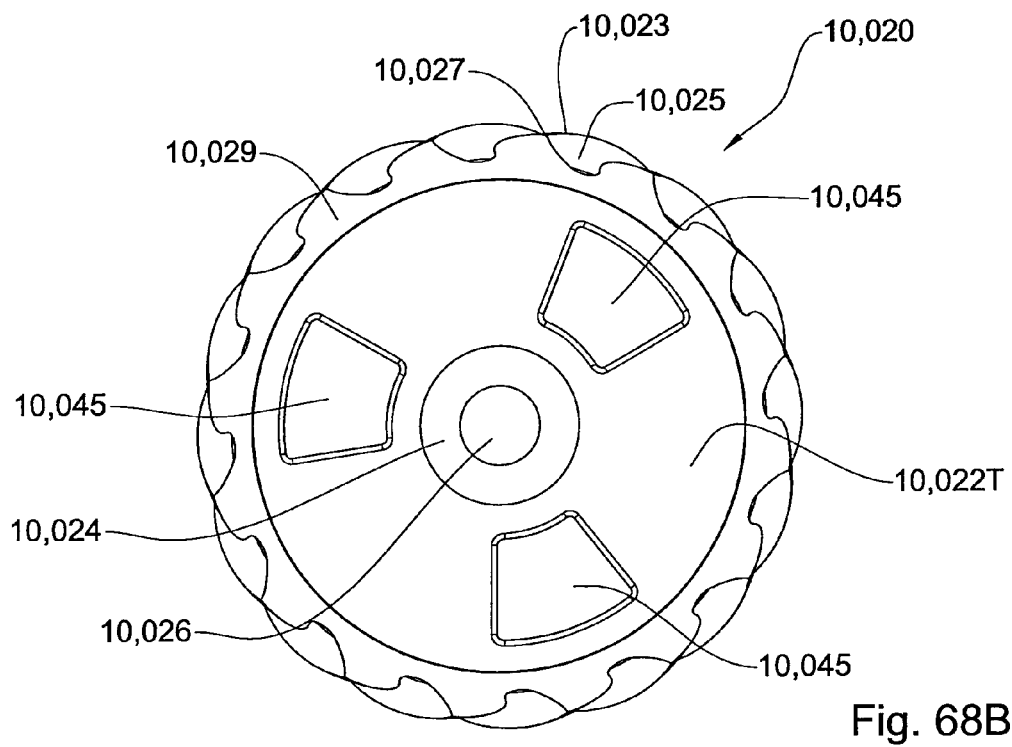
Figure 69:
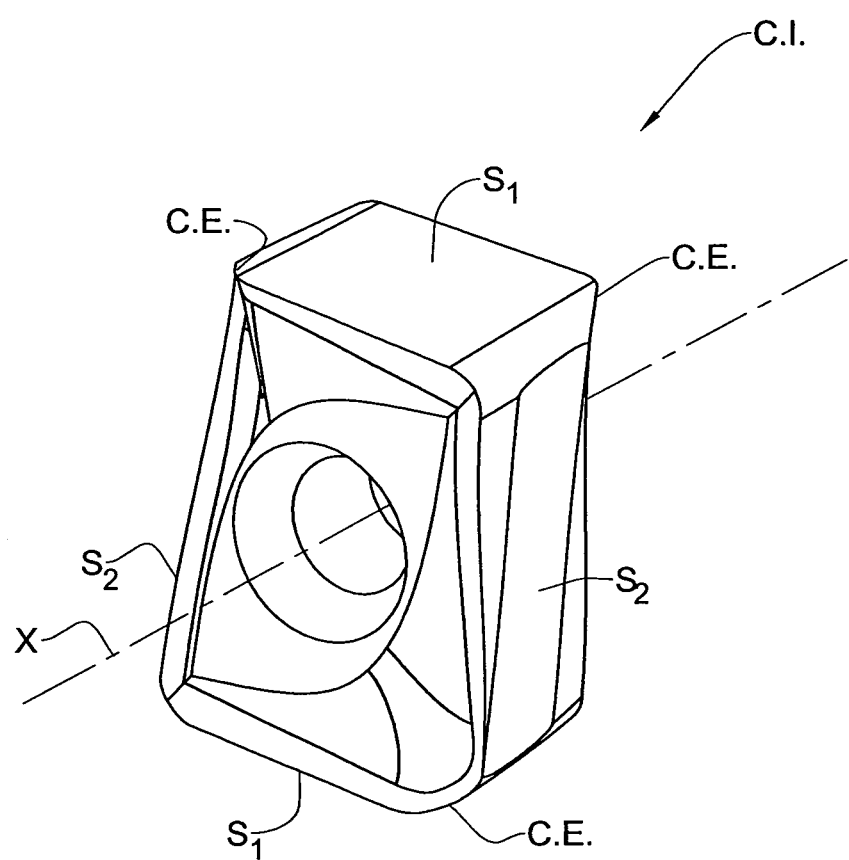
Figure 70A:
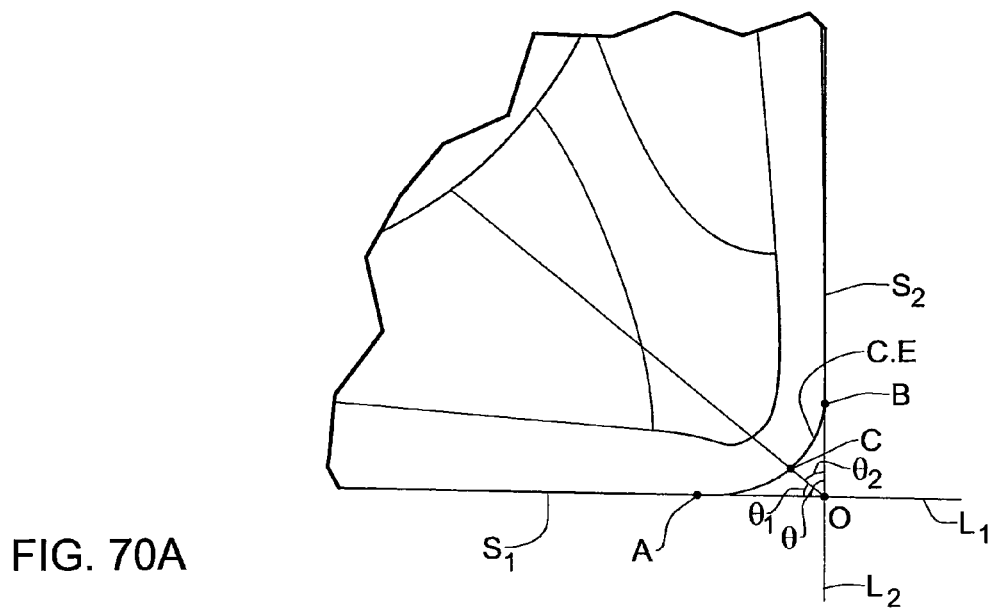
Figure 70B:
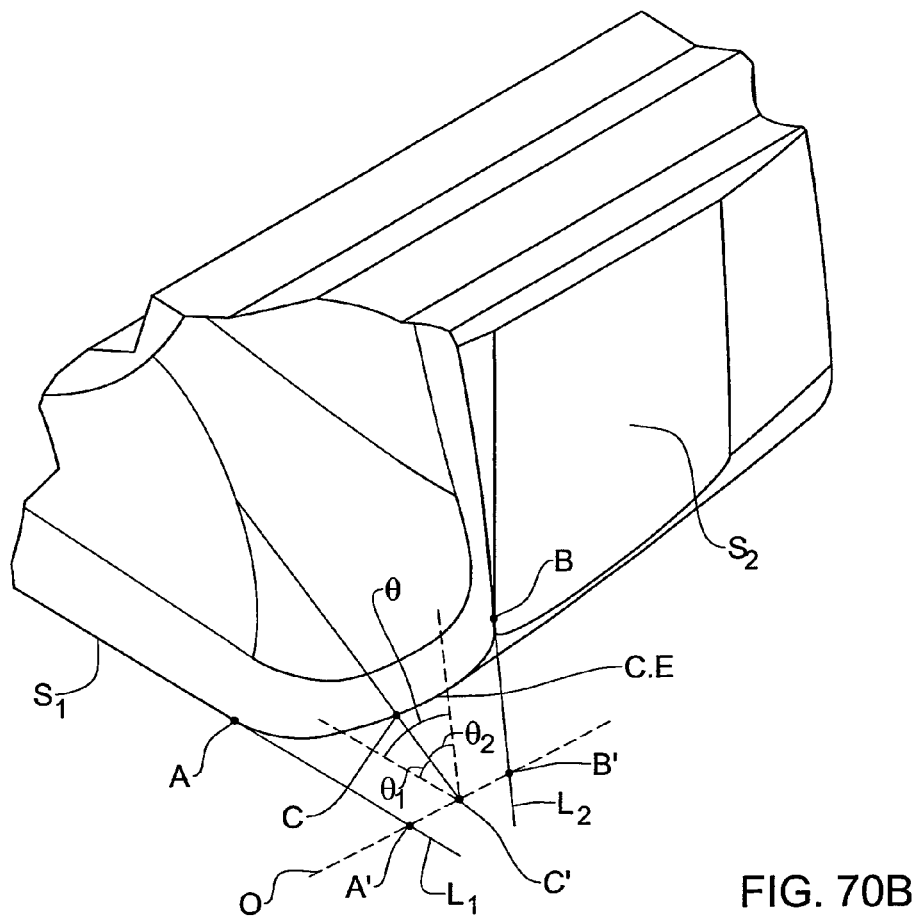
Figure 70C:
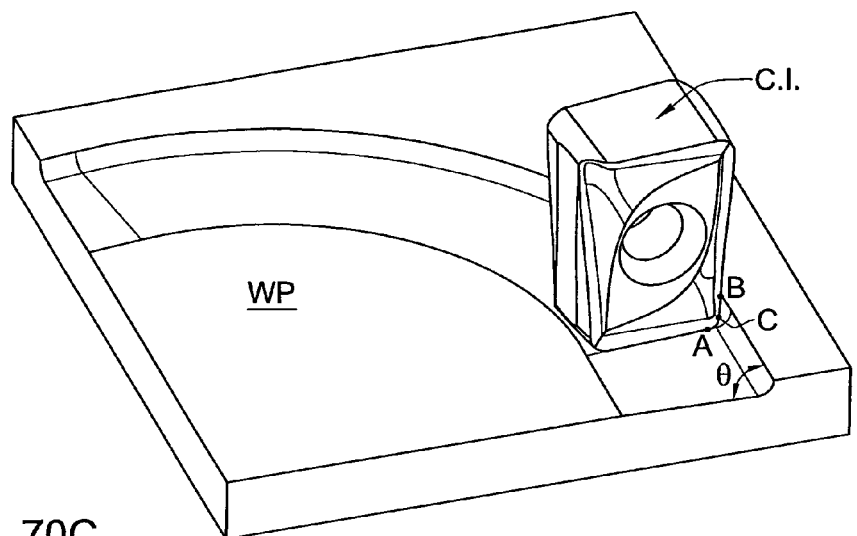
Figure 70D:
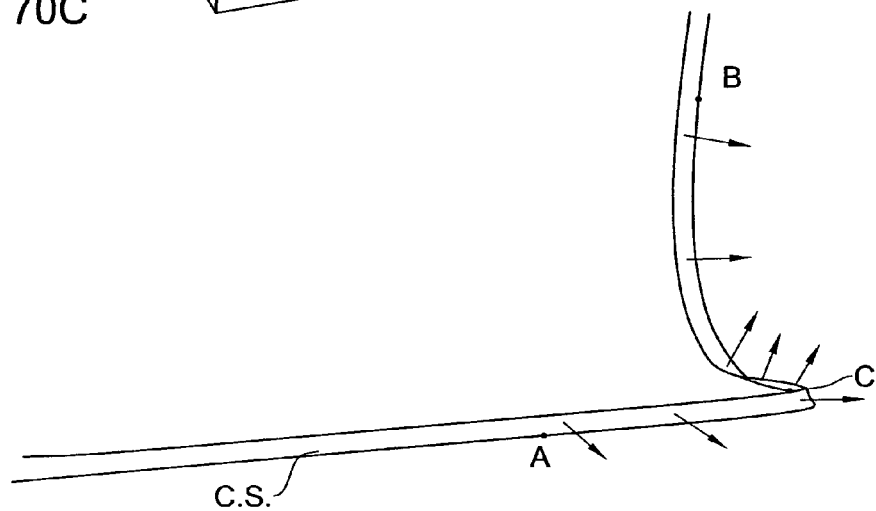
Figure 70E:
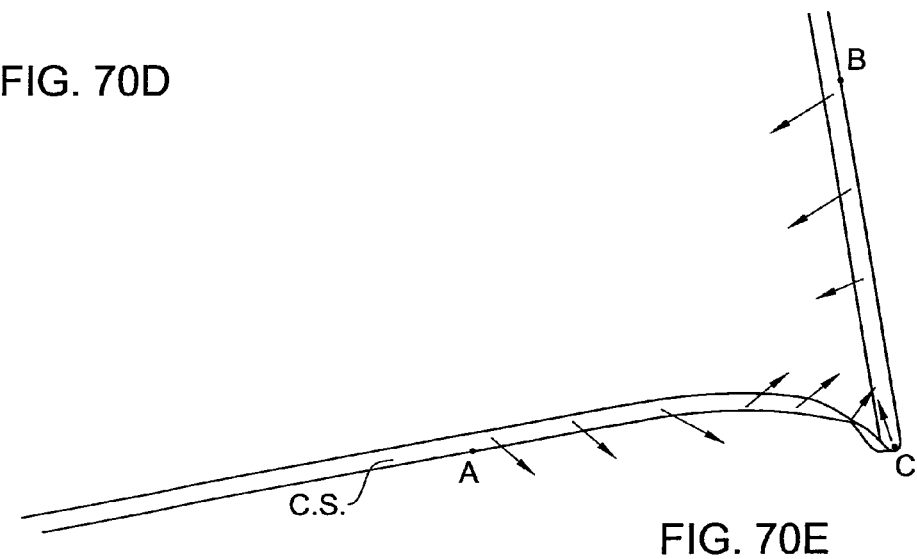

FIG. 64D is a schematic enlarged view of detail O shown in FIG. 64A;

FIGS. 65A to 65C are schematic respective isometric, front and top views of another example cutting insert;

FIG. 65D is a schematic enlarged view of detail P of FIG. 65A;

FIG. 65E is a schematic enlarged view of detail Q of FIG. 65A;

FIGS. 66A to 66C are schematic respective isometric, front and top views of yet another example of a cutting insert;

FIG. 66D is a schematic enlarged view of detail R of FIG. 66A;

FIGS. 66E and 66F are schematic top and isometric views of the cutting tool shown in FIG. 66A, during one example of a cutting operation on a workpiece;

FIGS. 66G and 66H are schematic top and isometric views of the cutting tool shown in FIG. 66A, during another example of a cutting operation on a workpiece;

FIGS. 66I and 66J are schematic top and isometric views of the cutting tool shown in FIG. 66A, during yet another example of a cutting operation on a workpiece;

FIG. 67A is a schematic isometric view of a surface milling tool according to the disclosed subject matter;

FIG. 67B is a schematic isometric exploded view of the surface milling tool shown in FIG. 67A;

FIG. 67C is a schematic front view of the surface milling tool shown in FIG. 67A;

FIGS. 68A and 68B are schematic isometric and top views of a cutting insert used in the surface milling tool shown in FIG. 67A;

FIG. 69 is a schematic isometric view of a cutting insert according to another example of the subject matter of the present application;

FIGS. 70A and 70B are schematic front and isometric views of a portion of the cutting insert shown in FIG. 69;

FIG. 70C is a schematic isometric view of the cutting insert shown in FIG. 69, when engaged with a workpiece during a cutting operation;

FIGS. 70D and 70E are schematic front and top isometric views of a cutting strip of the cutting insert shown in FIG. 69;

FIGS. 71A to 71C are schematic isometric, front and side views of a cutting insert according to another example of the subject matter of the present application;

FIG. 71D is a schematic enlarged view of a portion of the cutting insert shown in

Figure 73A:
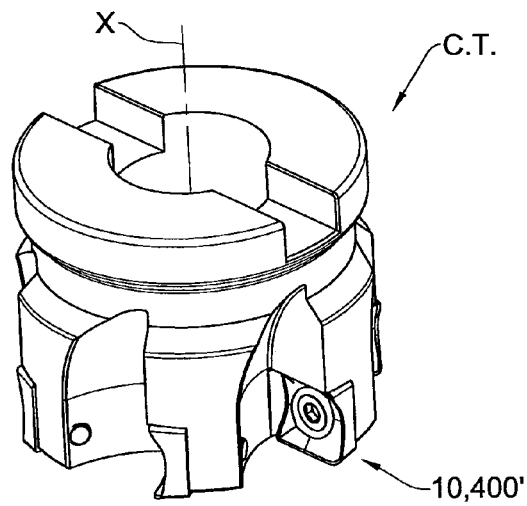
Figure 73B:
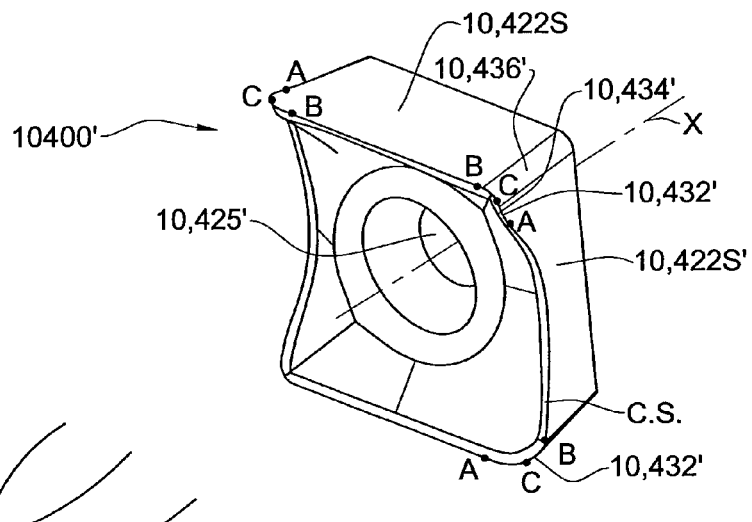
Figure 73C:
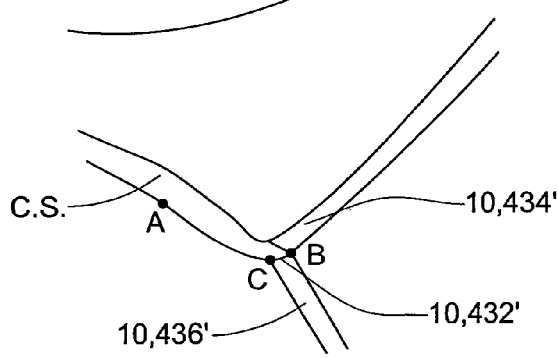
Figure 74A:
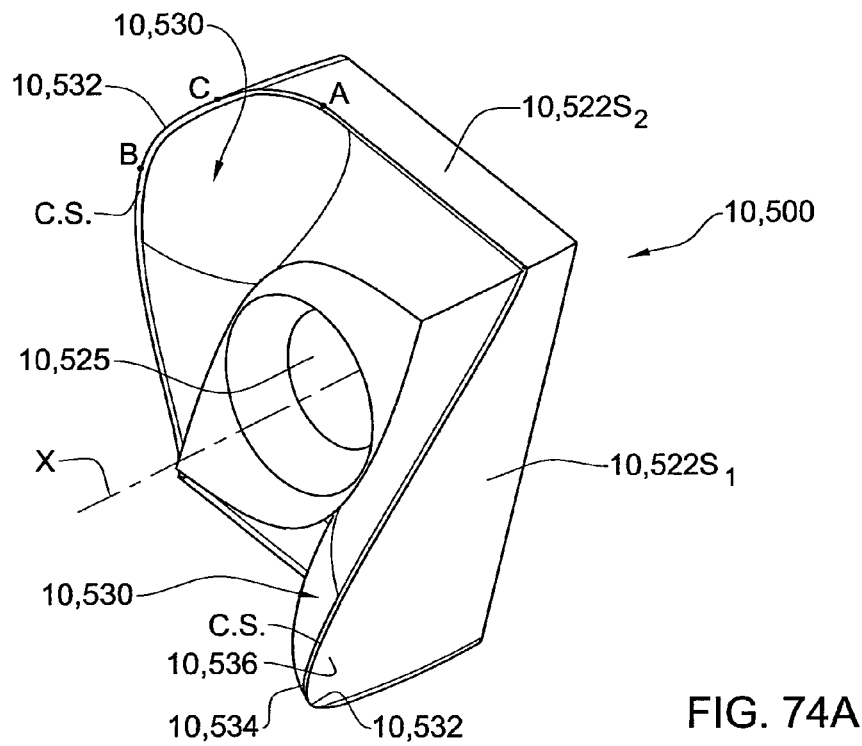
Figure 74B:
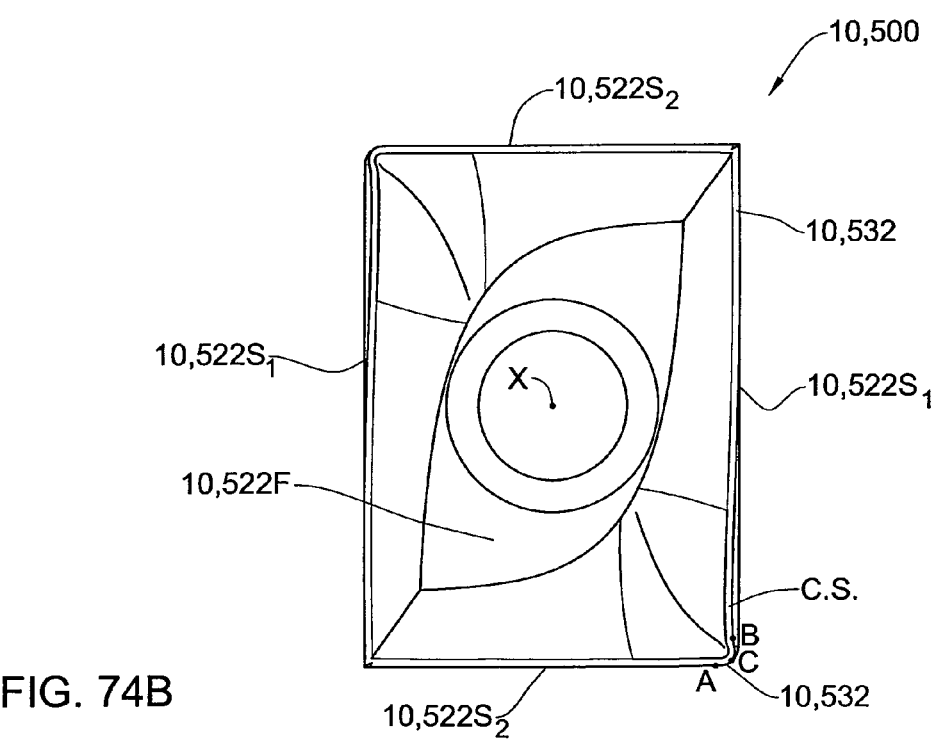
Figure 74C:
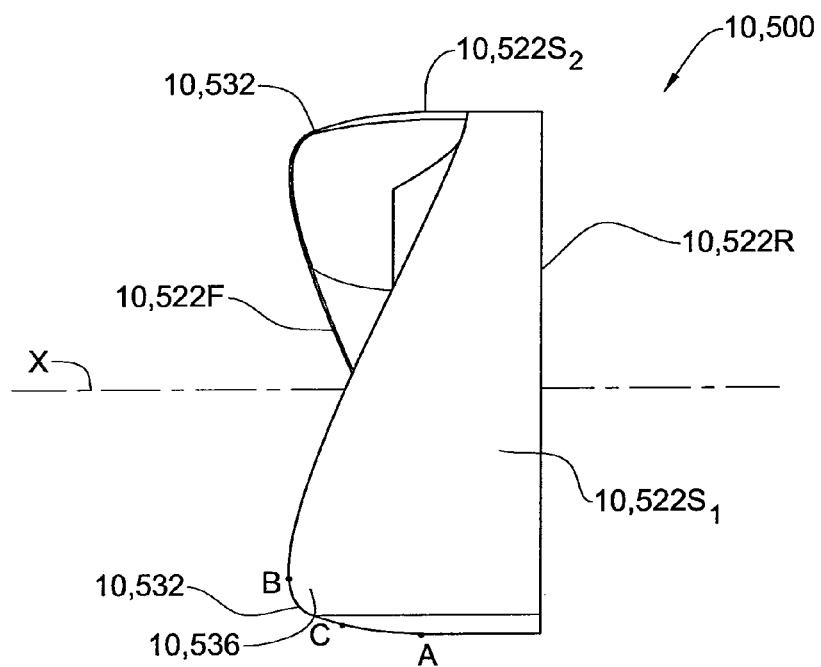
Figure 74D:
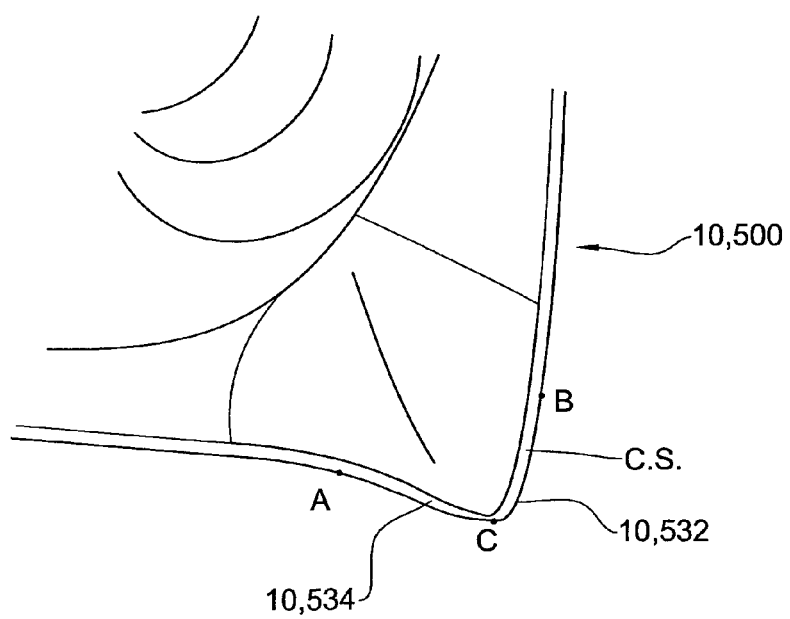
Figure 75A:
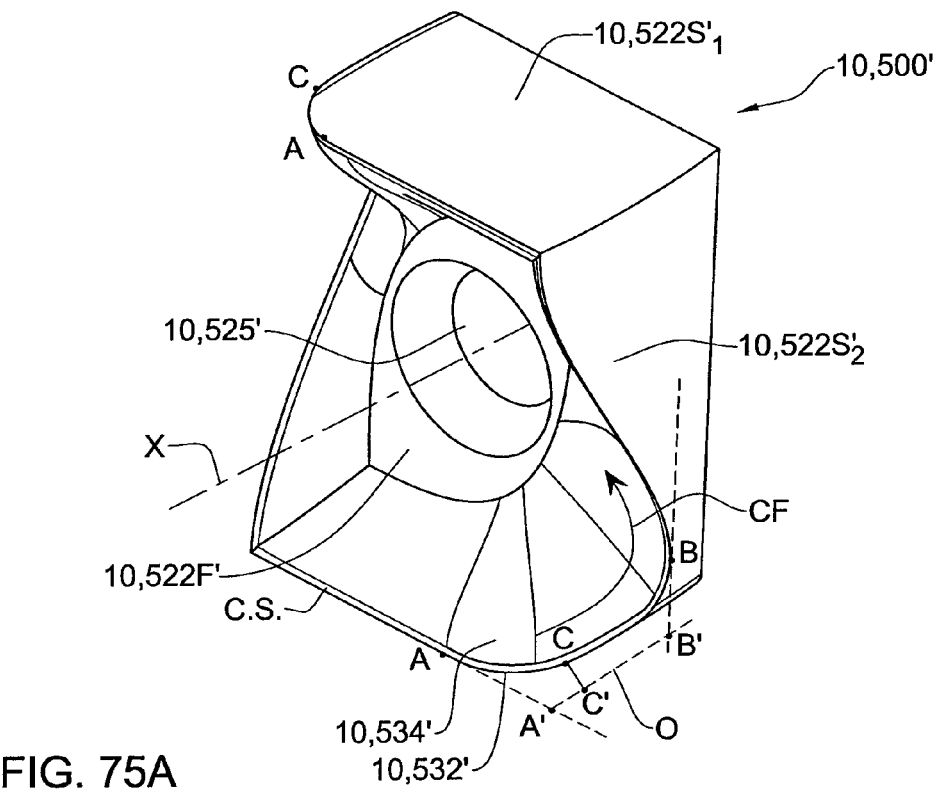
Figure 75B:
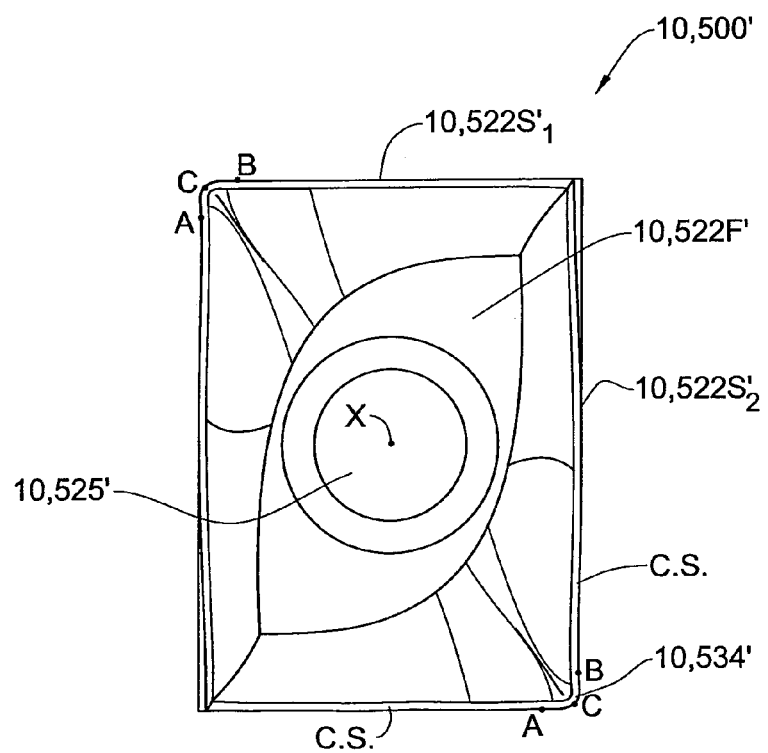
Figure 75C:
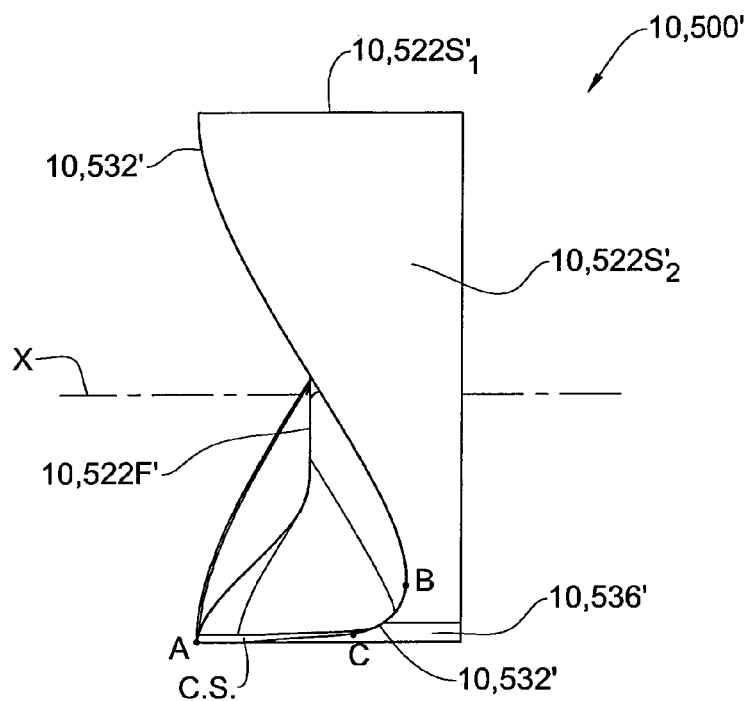
Figure 75D:
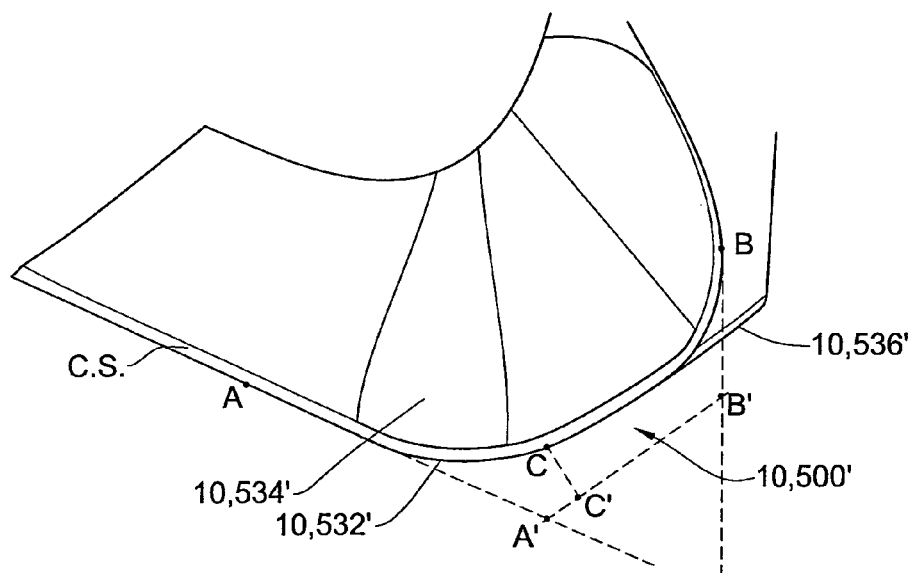
Figure 76A:
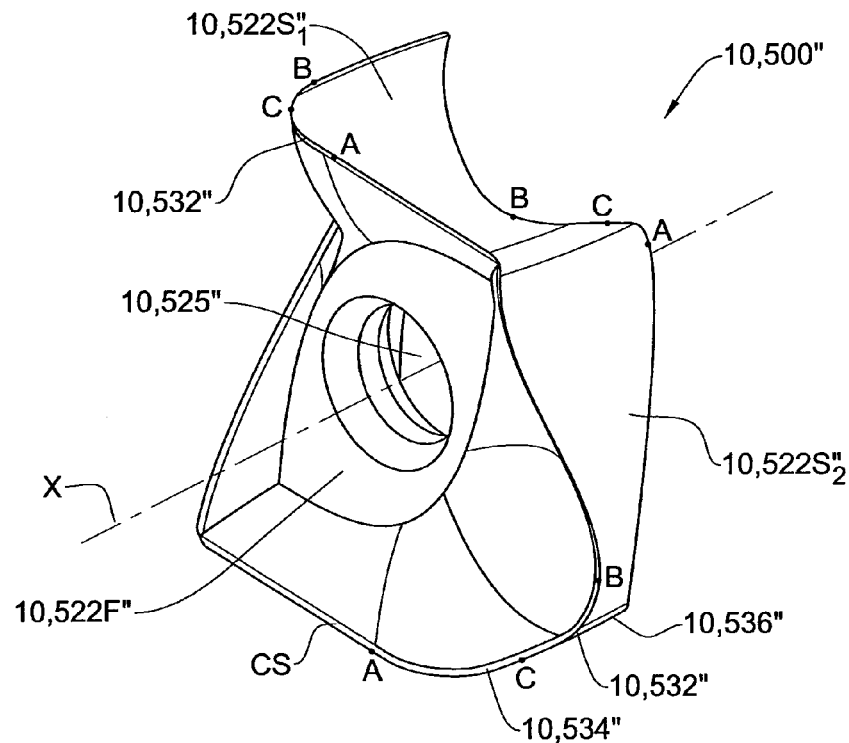
Figure 76B:
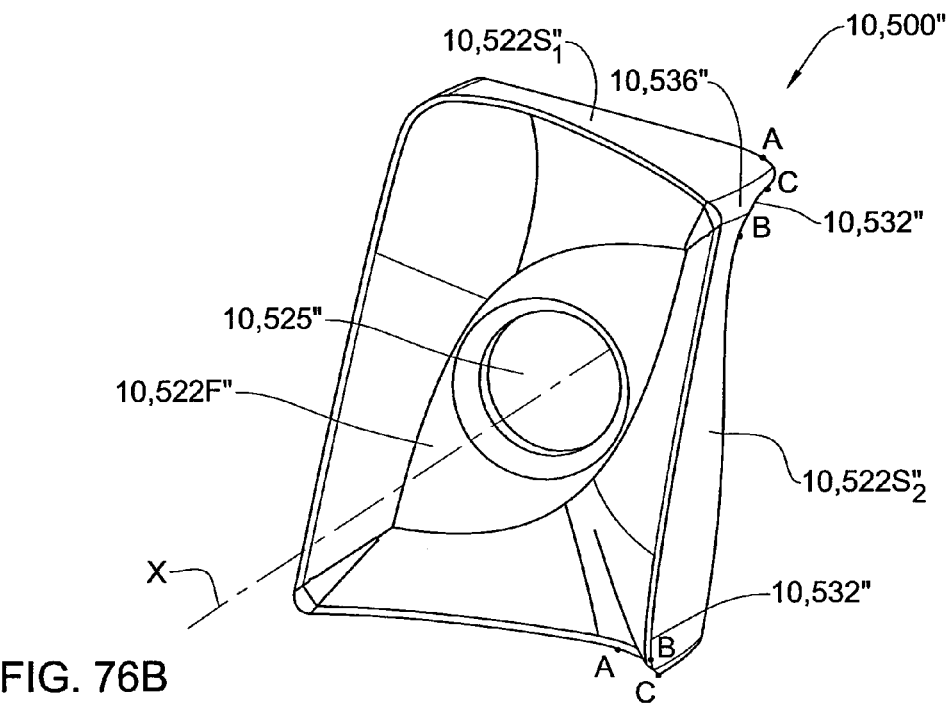
Figure 76C:
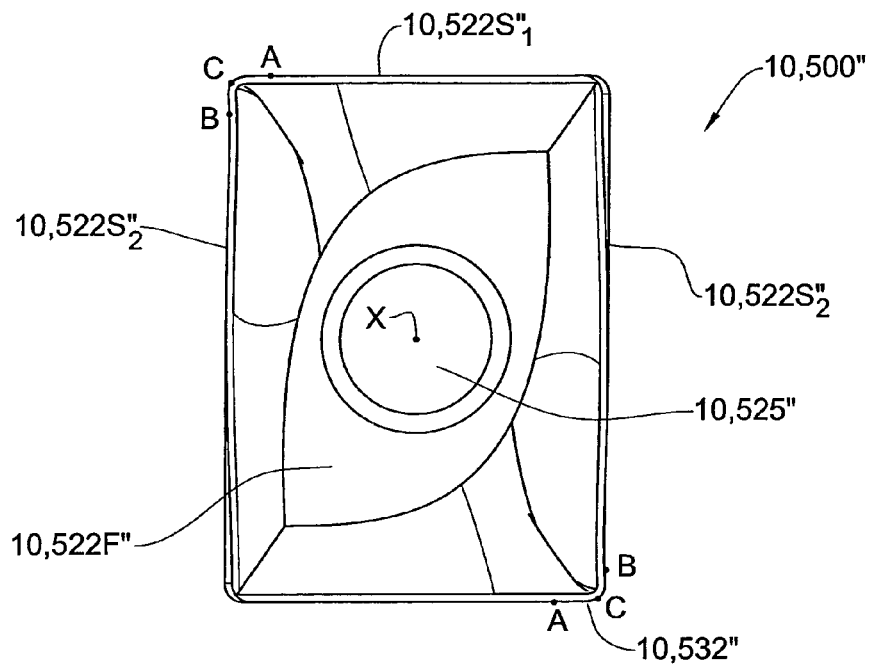
Figure 76D:
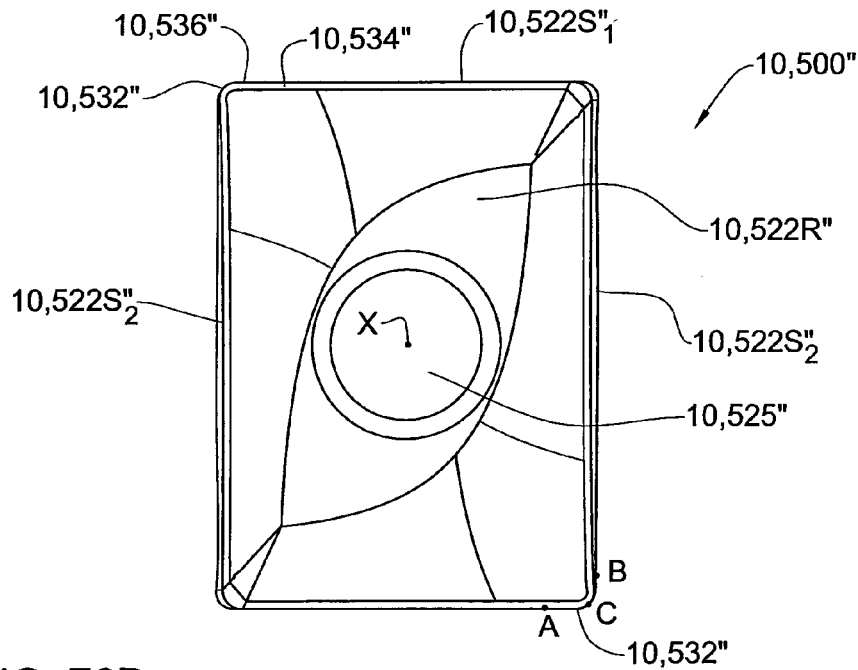
Figure 76E:
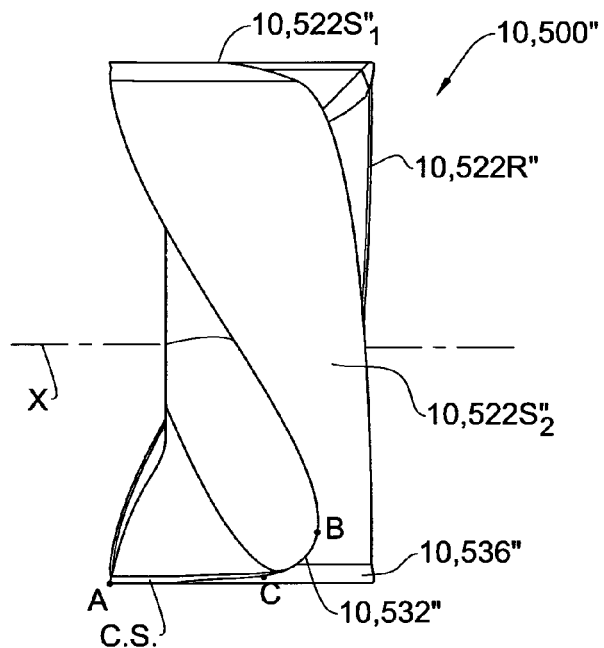
Figure 76F:
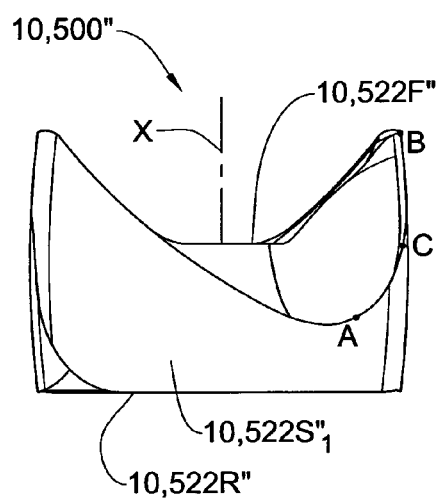
Figure 76G:
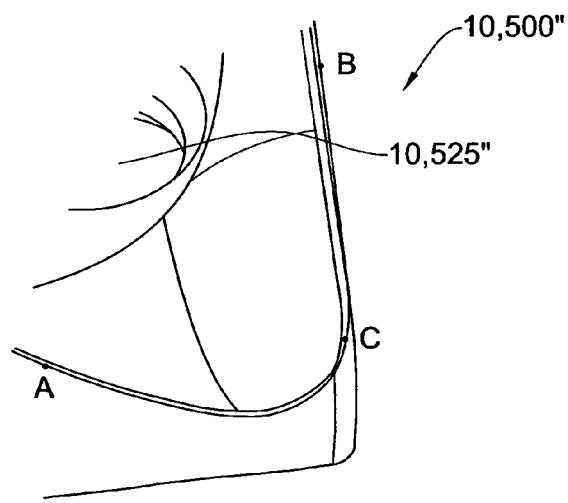
Figure 77A:
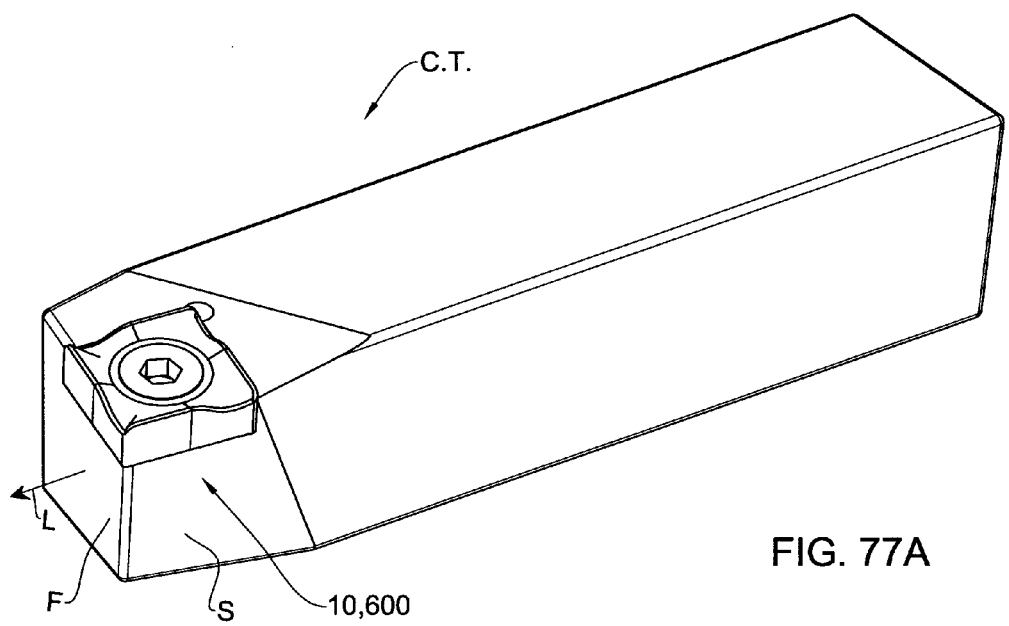
Figure 77B:
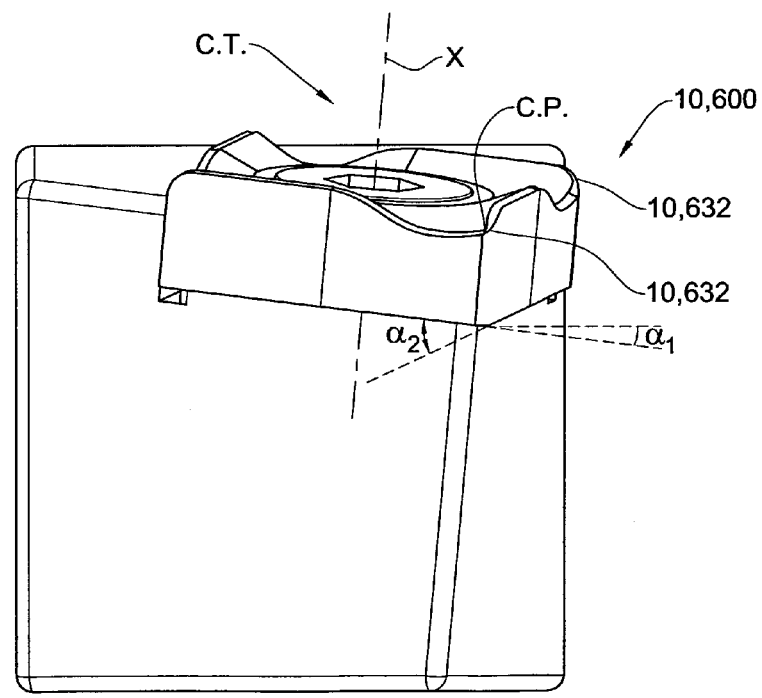
Figure 78A:
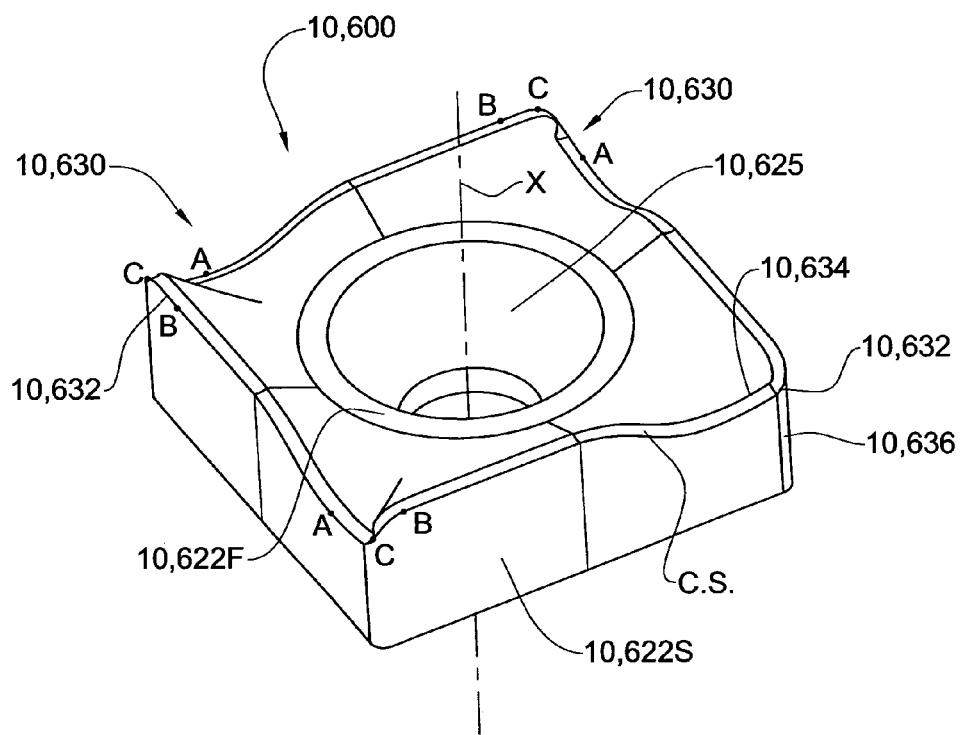
Figure 78B:
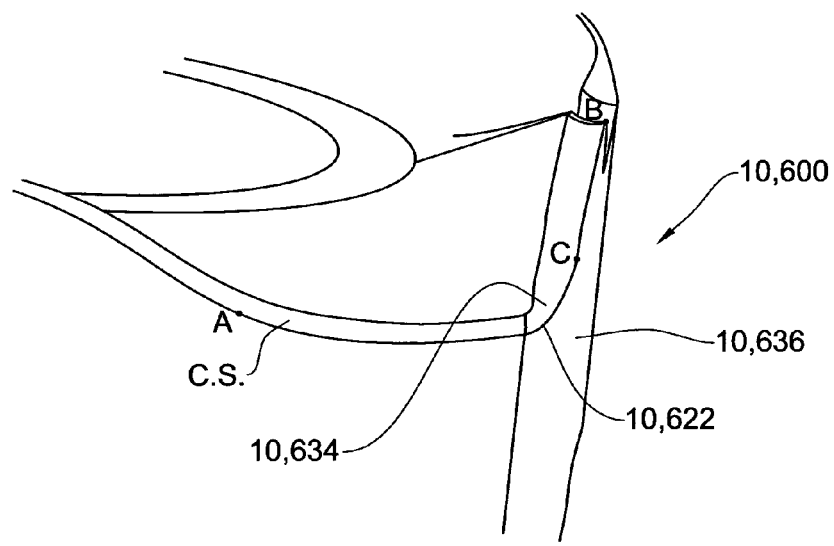
Figure 78C:
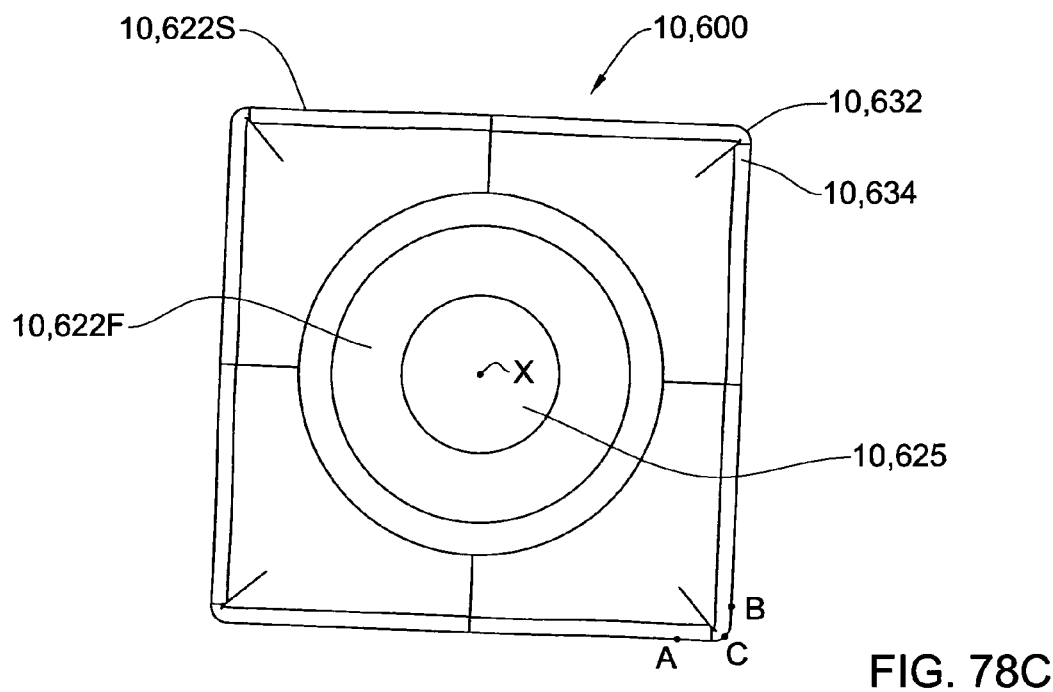
Figure 79:
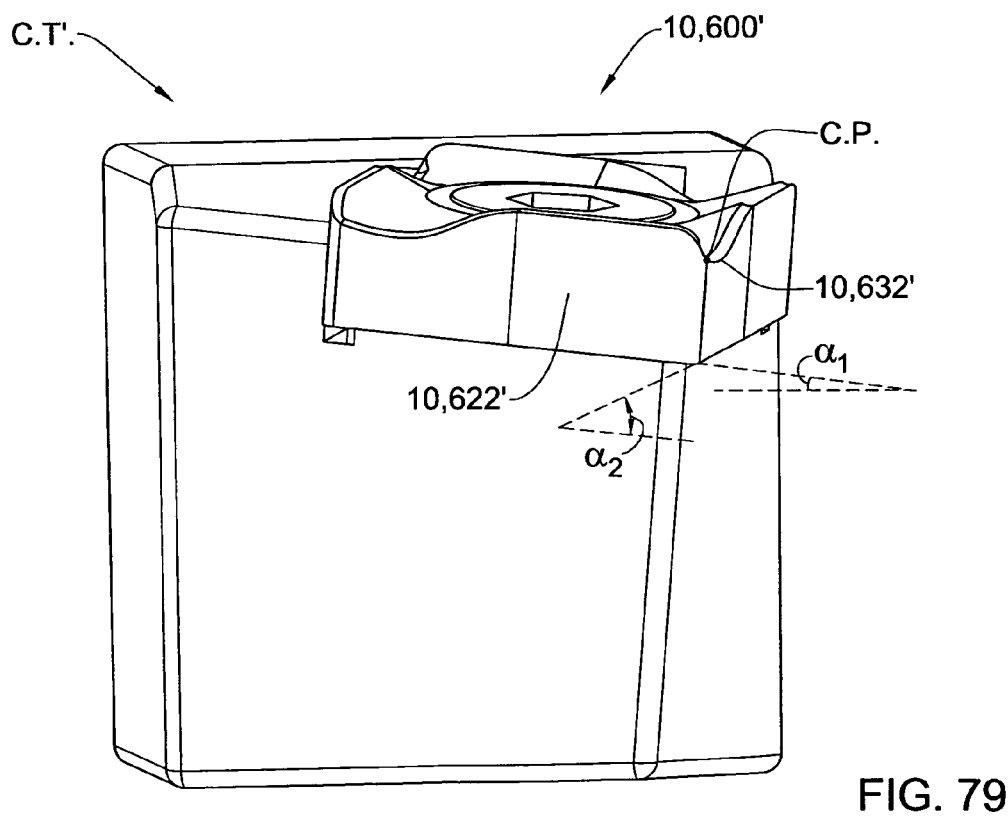
Figure 80A:
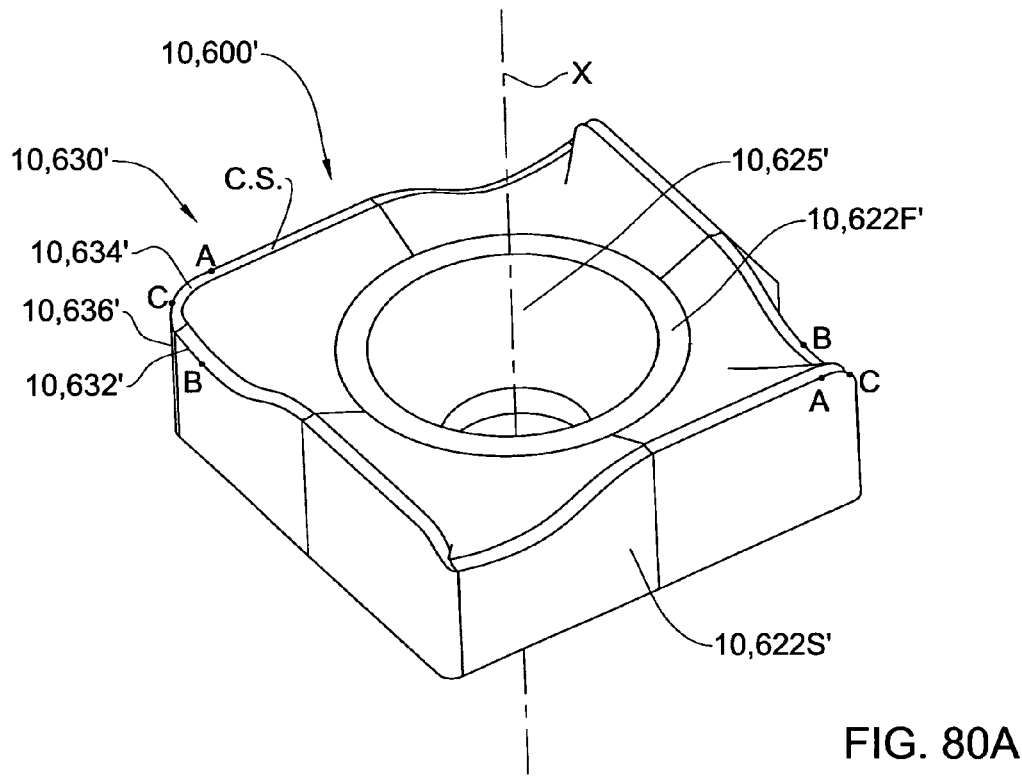
Figure 80B:
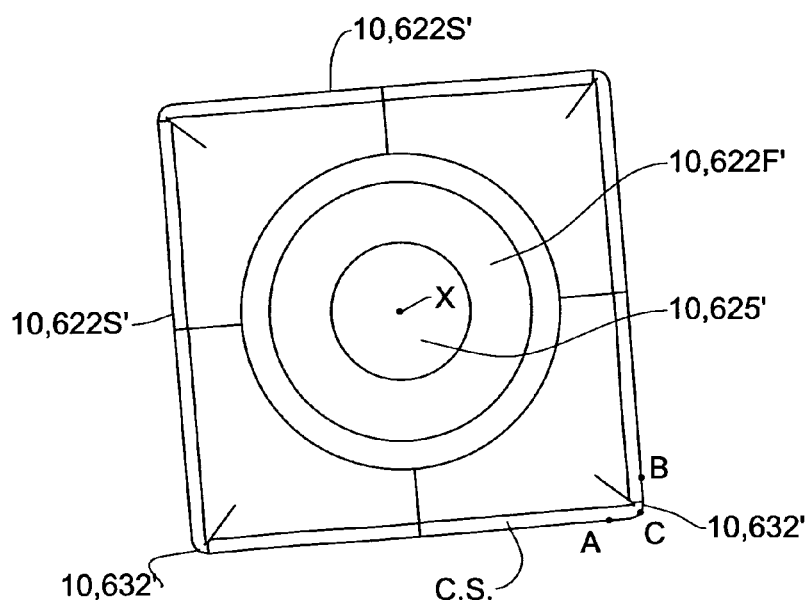
Figure 80C:
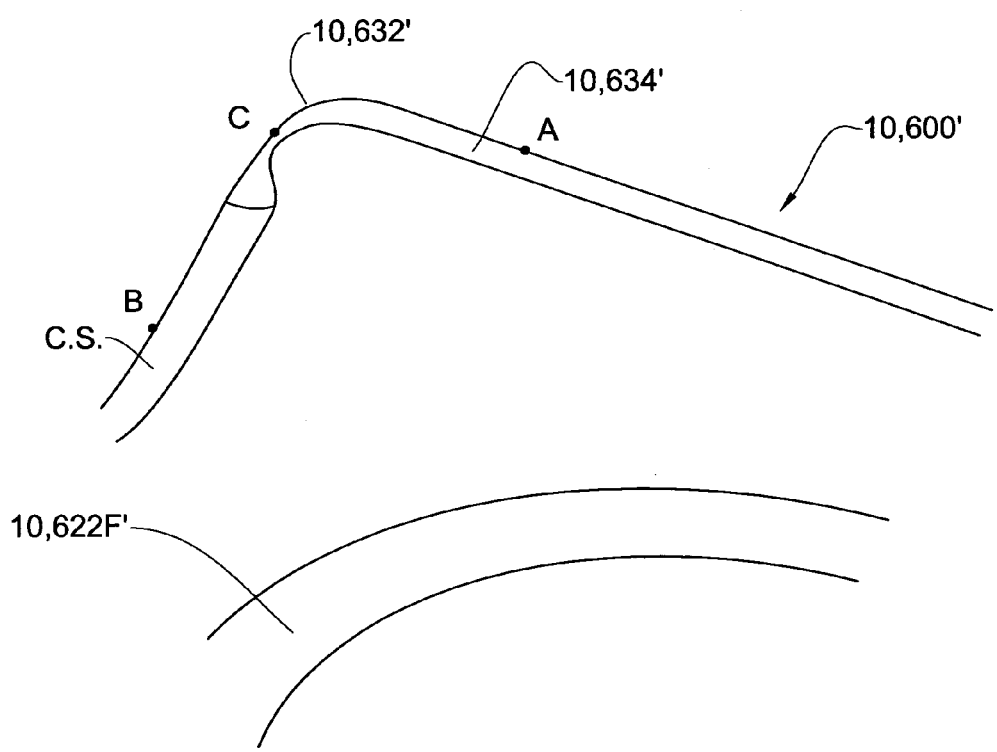
Figure 81A:
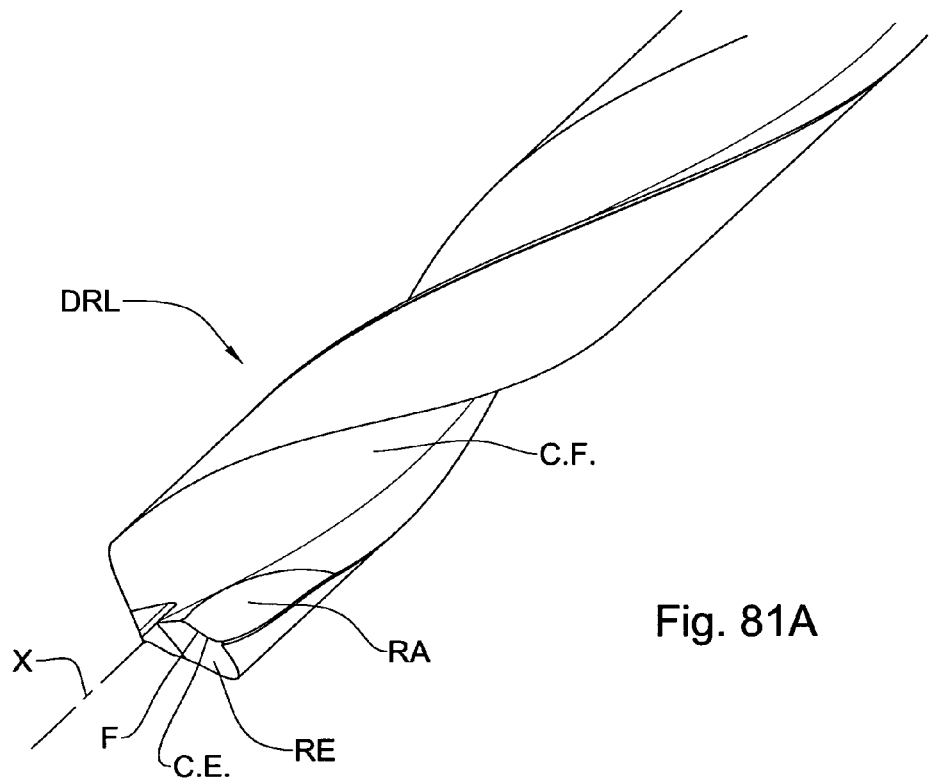
Figure 81B:
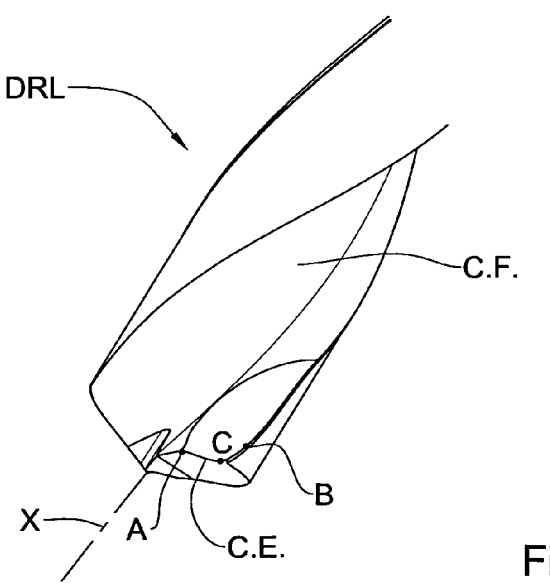
Figure 81C:
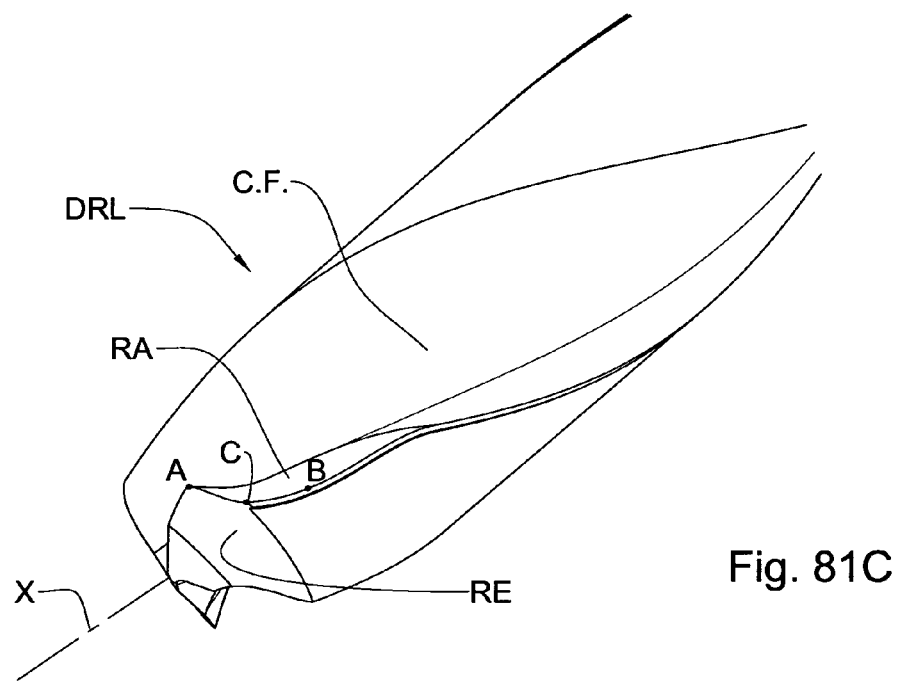
Figure 81D:
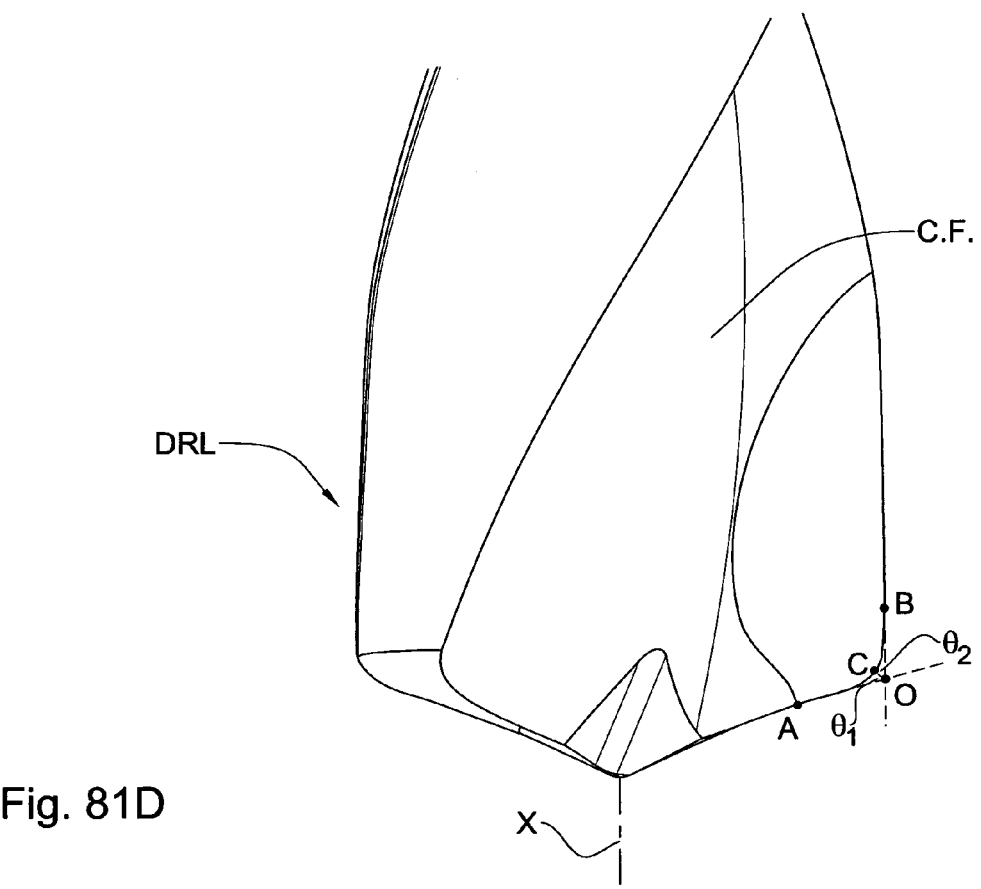
Figure 81E:
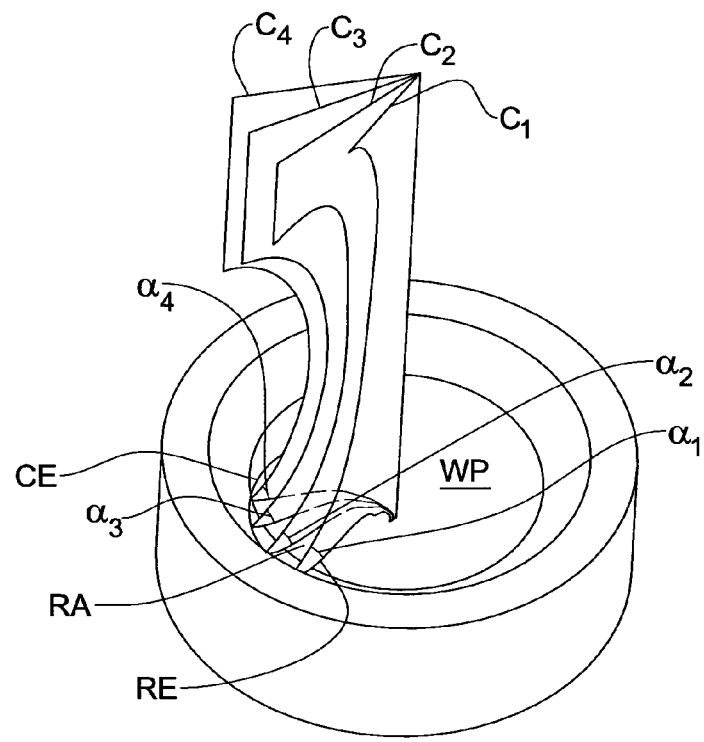
Figure 81F:
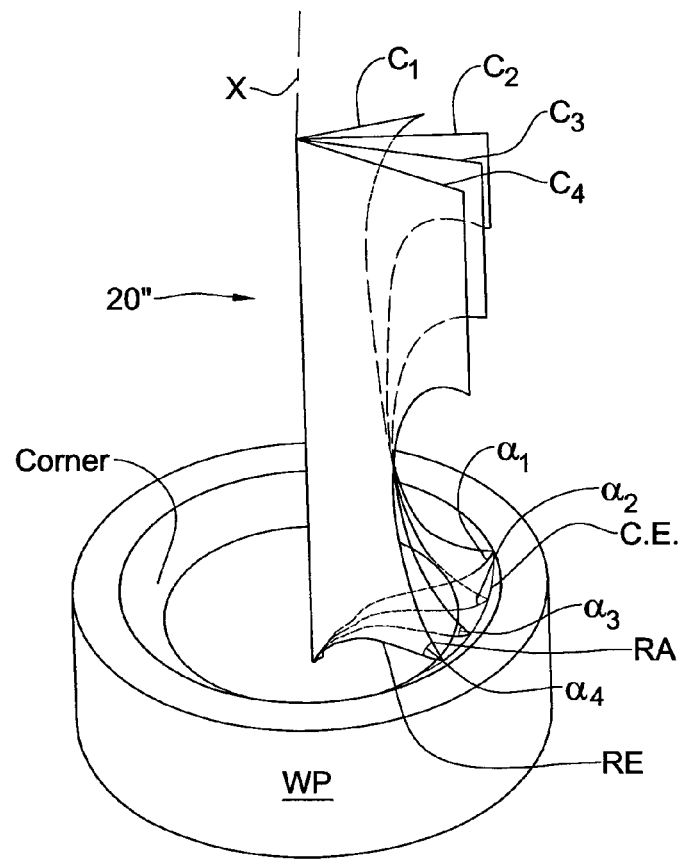
Figure 81G:
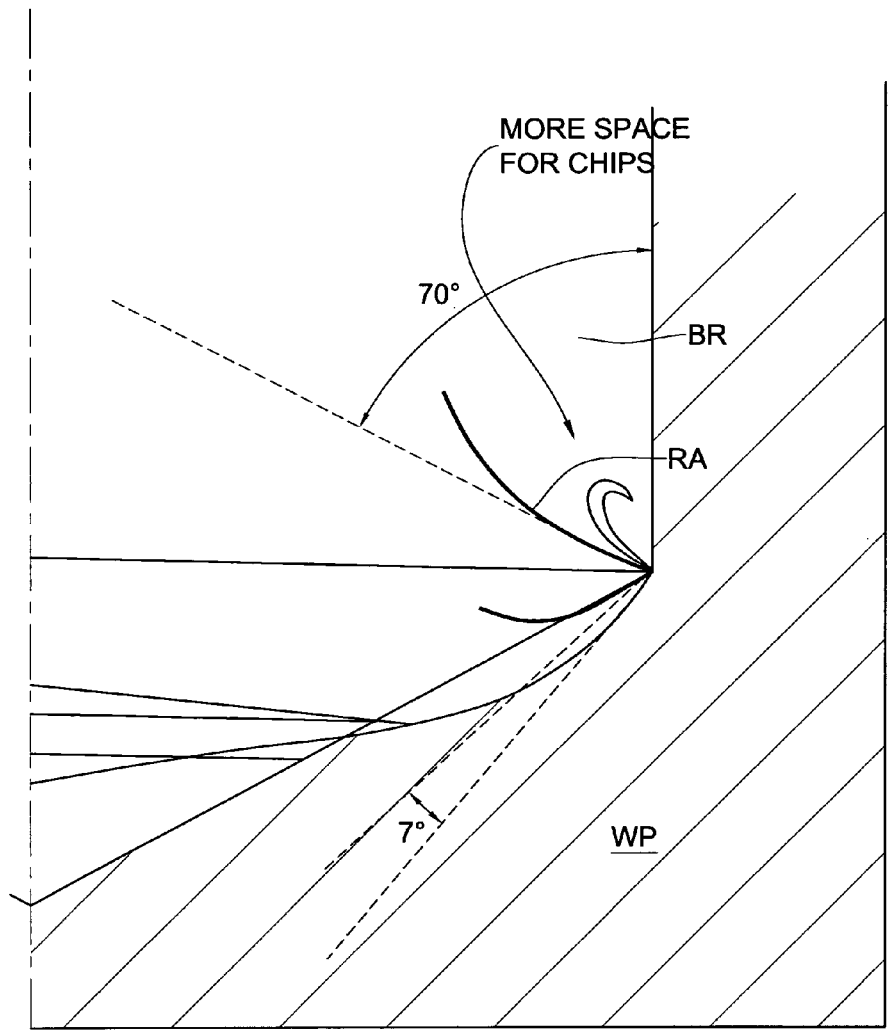
Figure 83A:
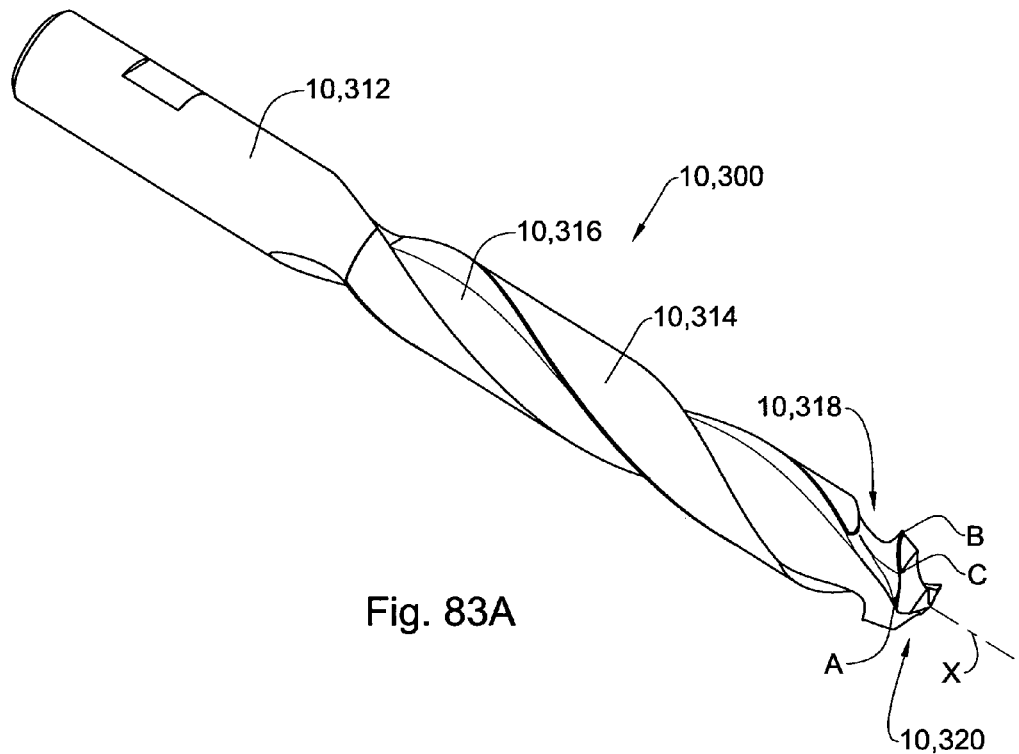
Figure 83B:
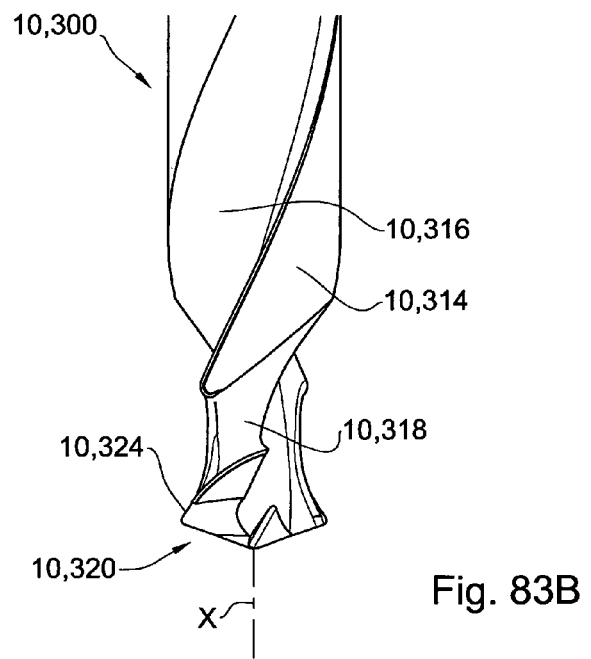
Figure 83C:
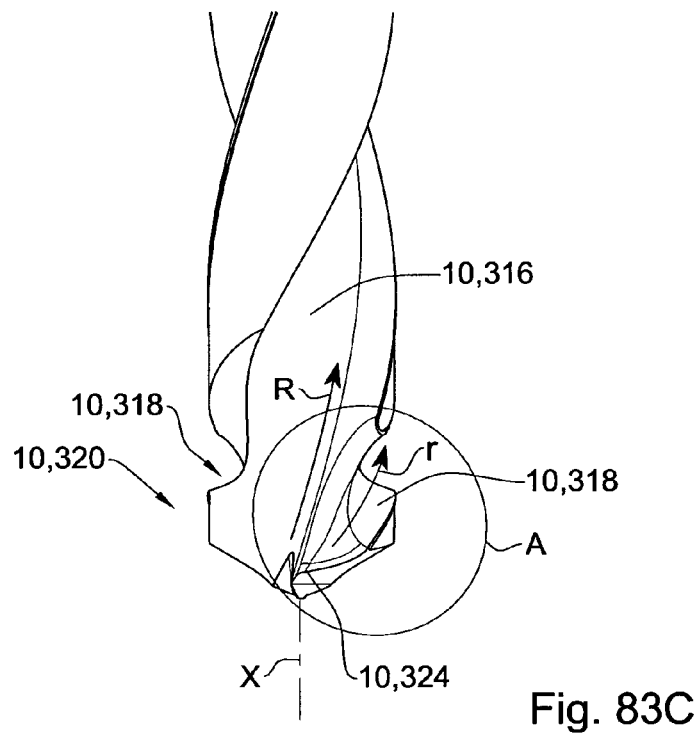
Figures 83D, 83E:
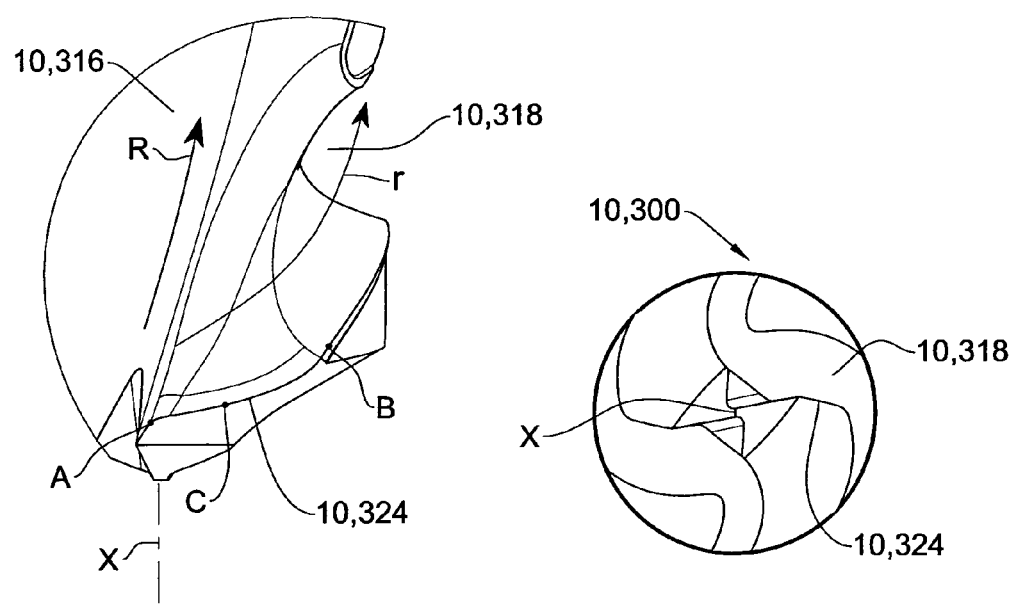
Figure 83F:
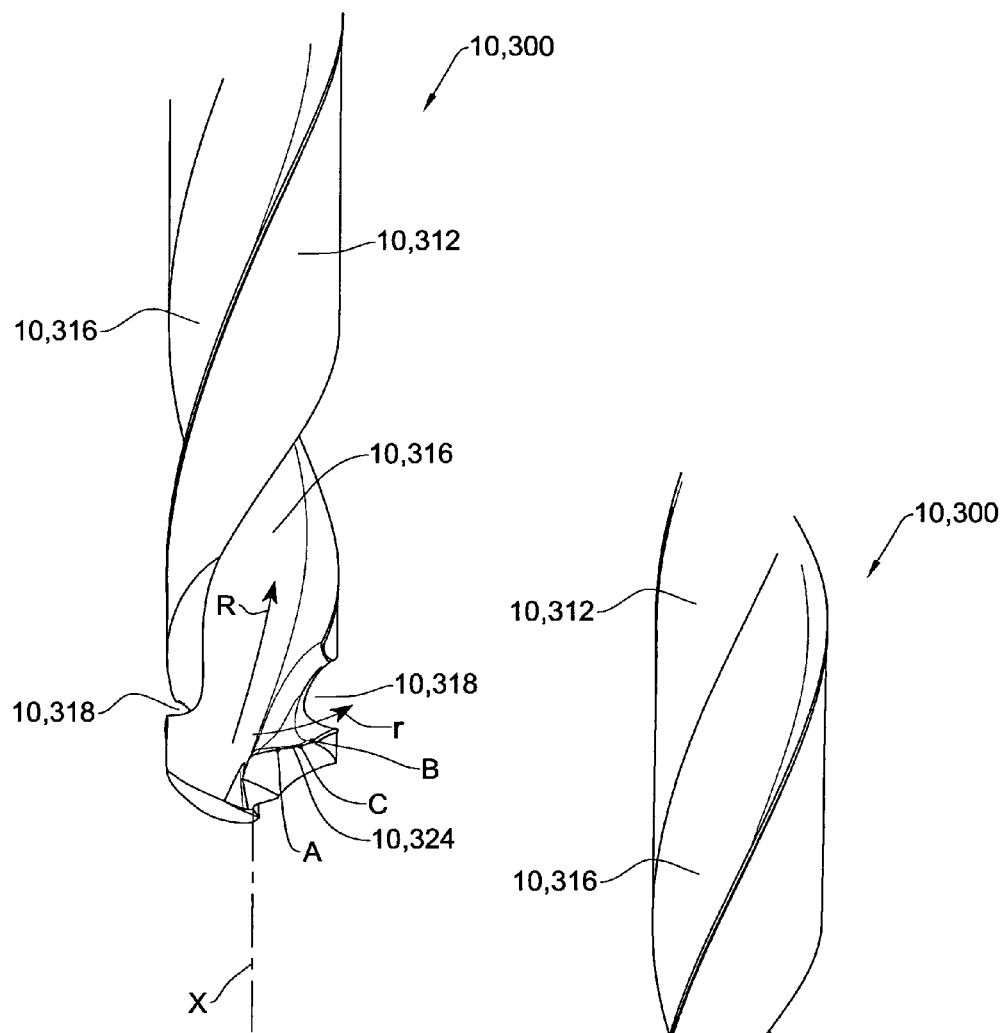
Figure 83G:
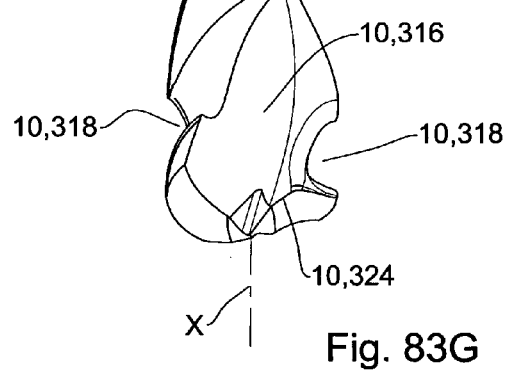
Figure 84A:
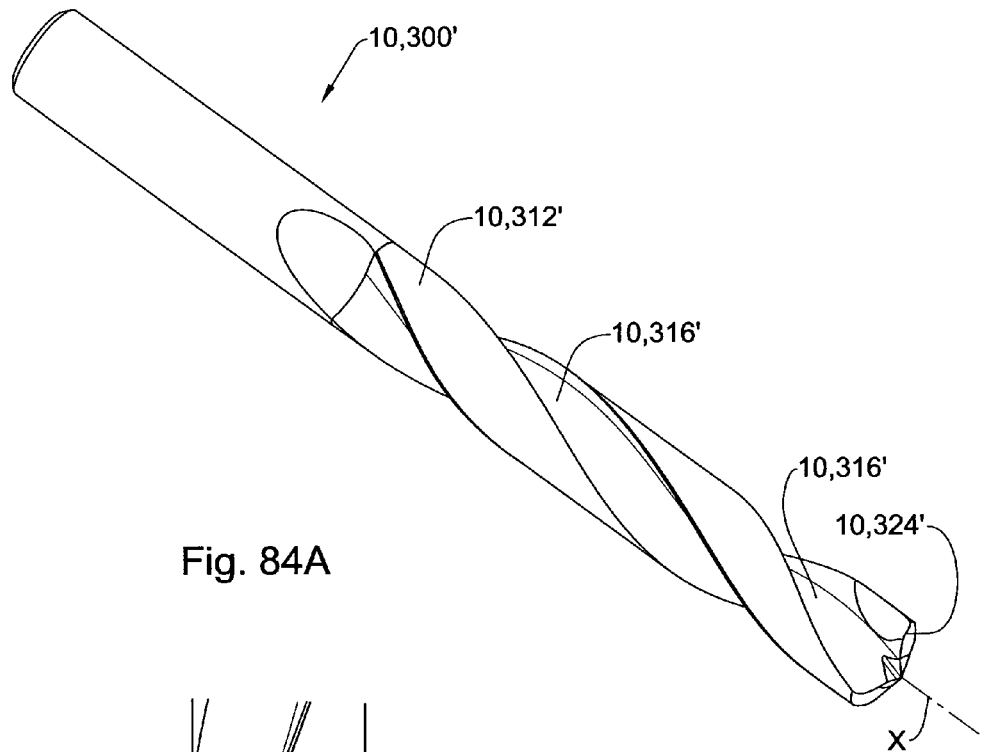
Figure 84B:
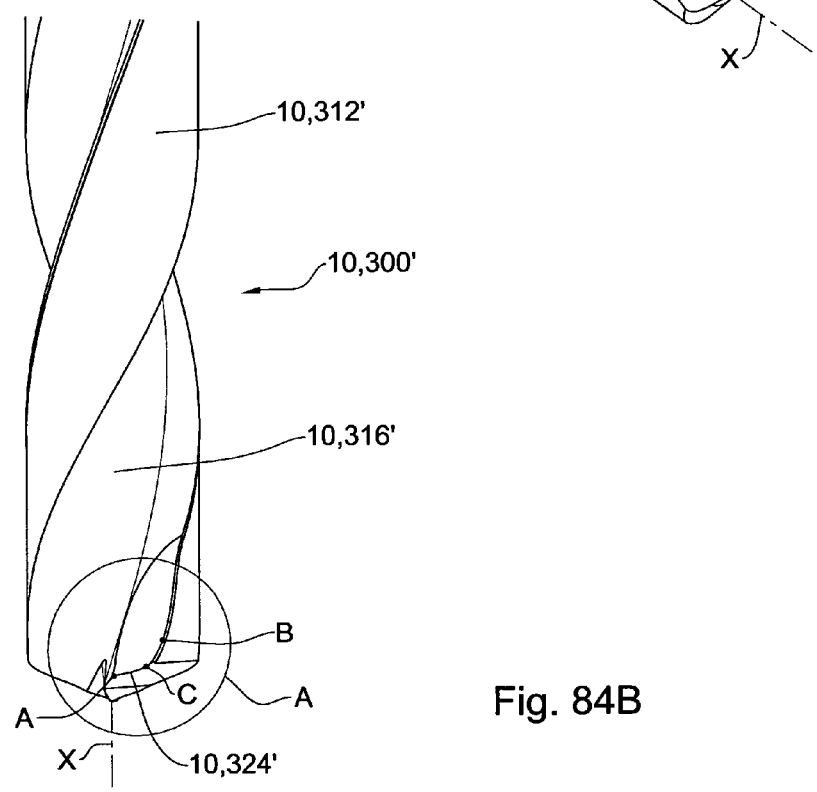
Figure 84C:
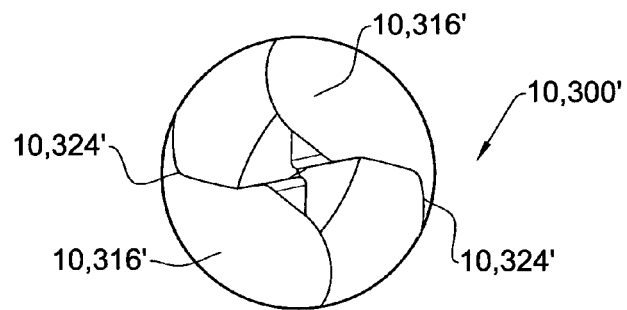
Figure 84D:
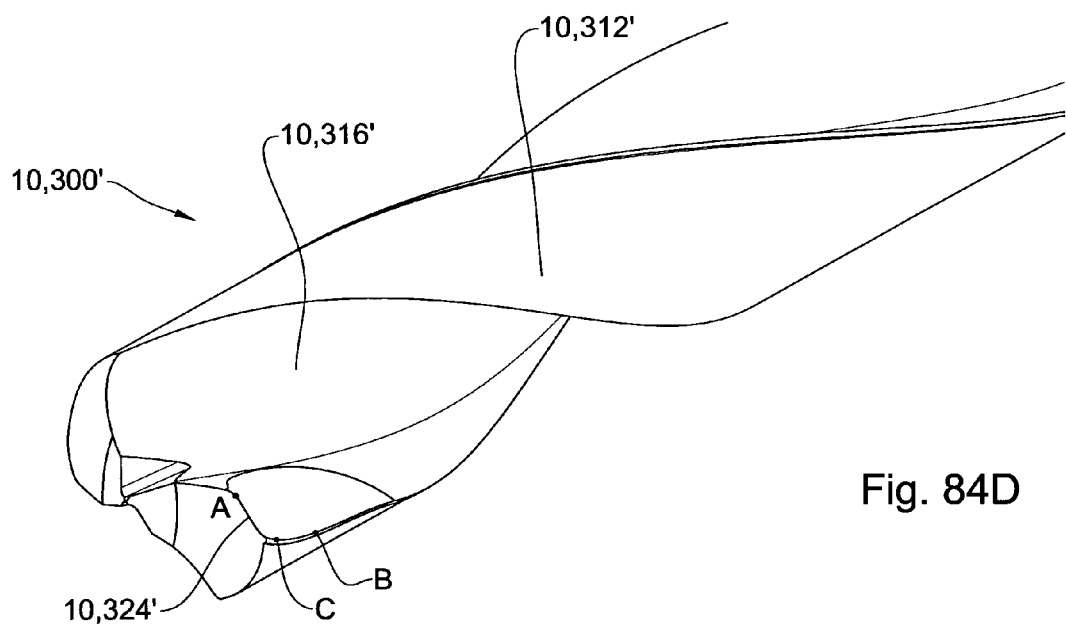
Figure 84E:
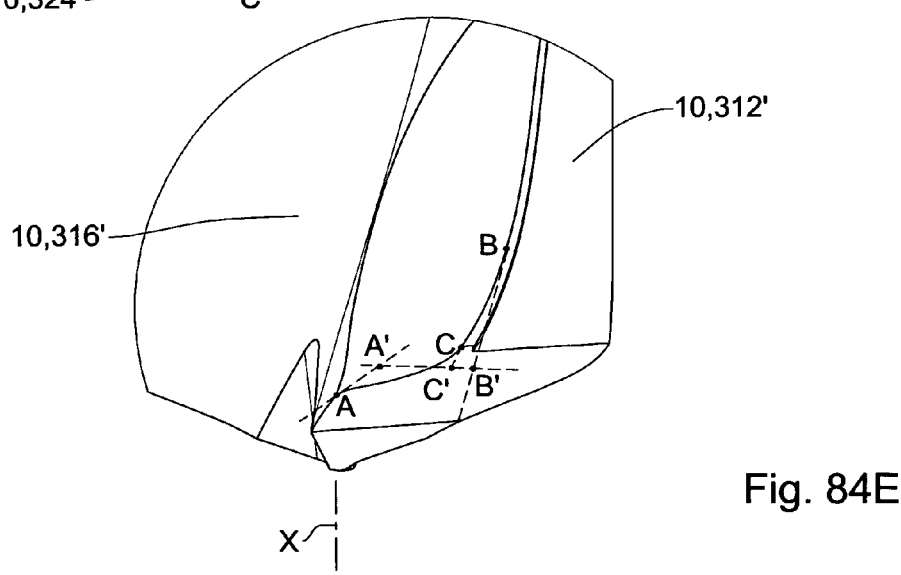
Figure 85A:
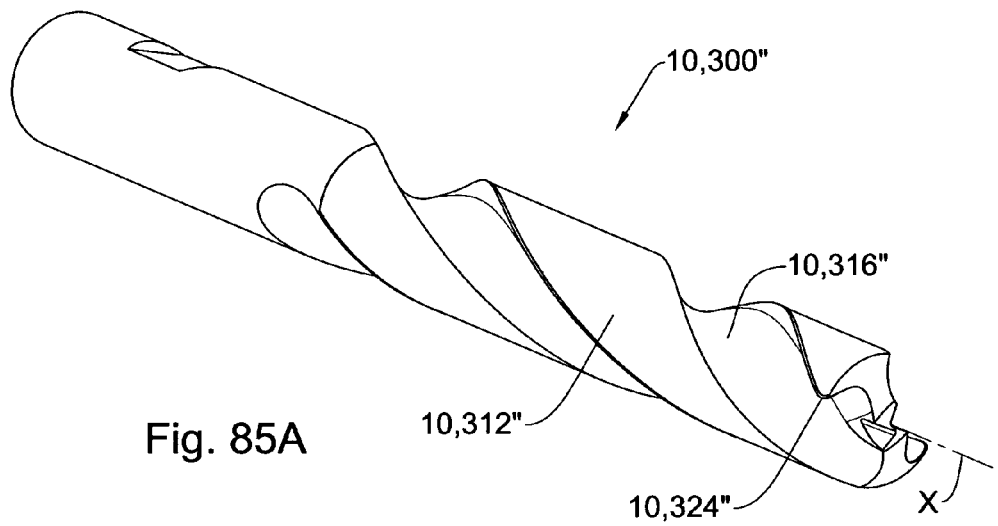
Figure 85B:
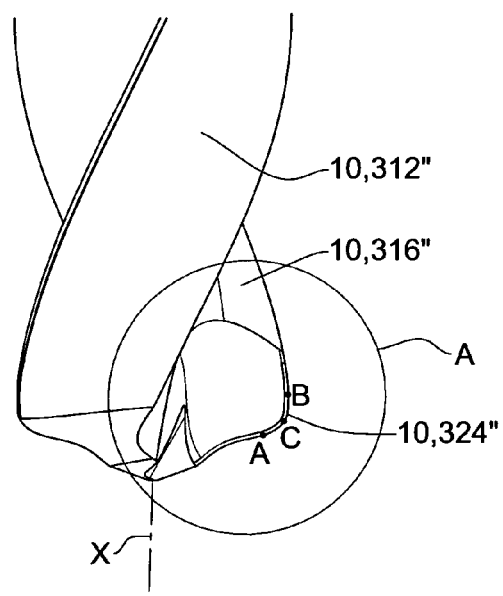
Figure 85C:
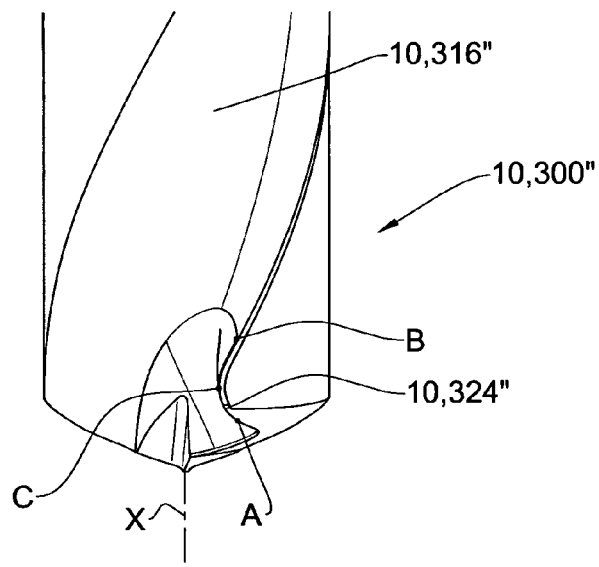
Figure 85D:
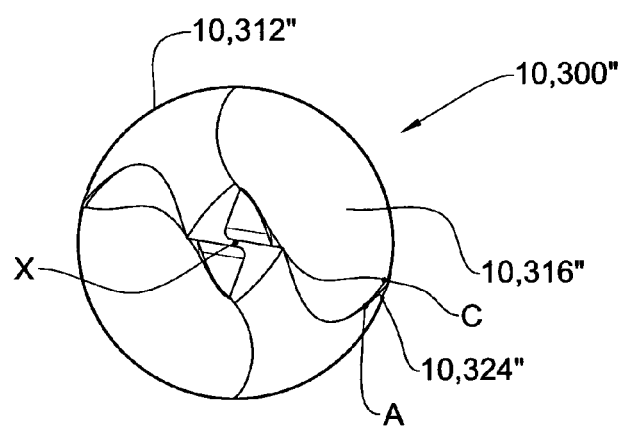
Figure 85E:
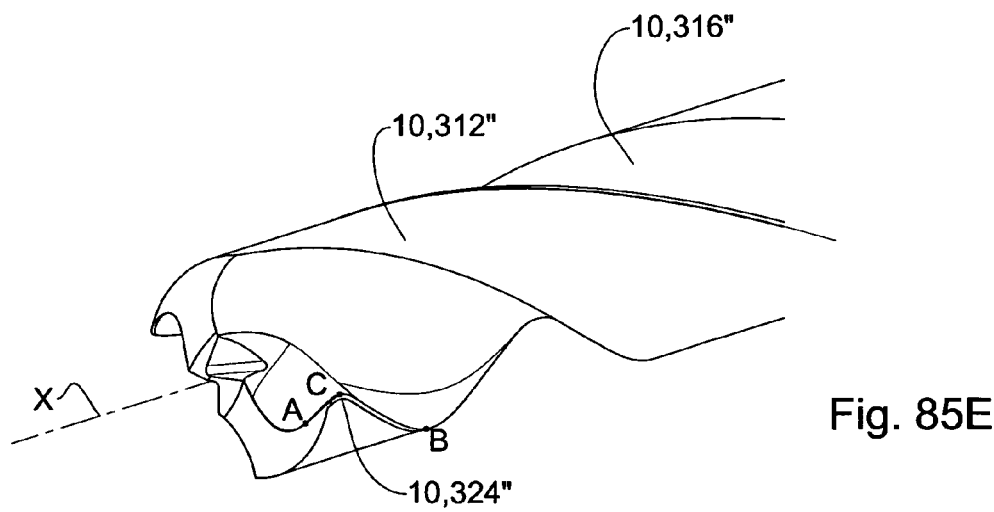
Figure 85F:
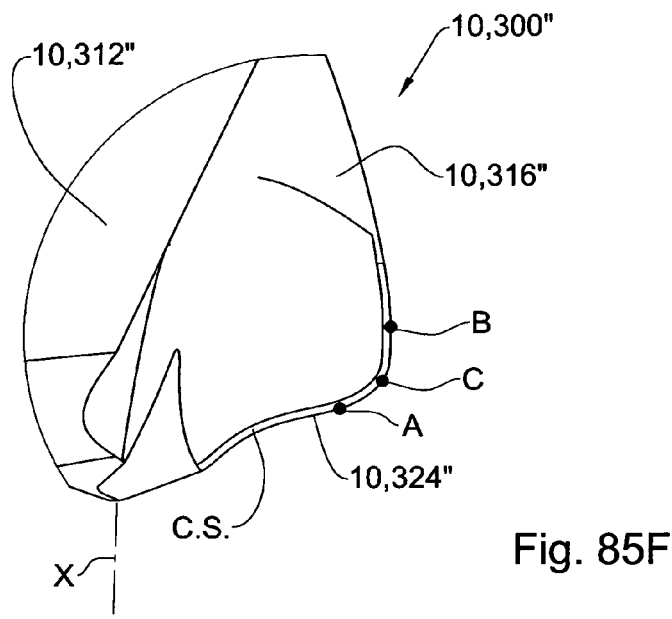
Figure 85G:
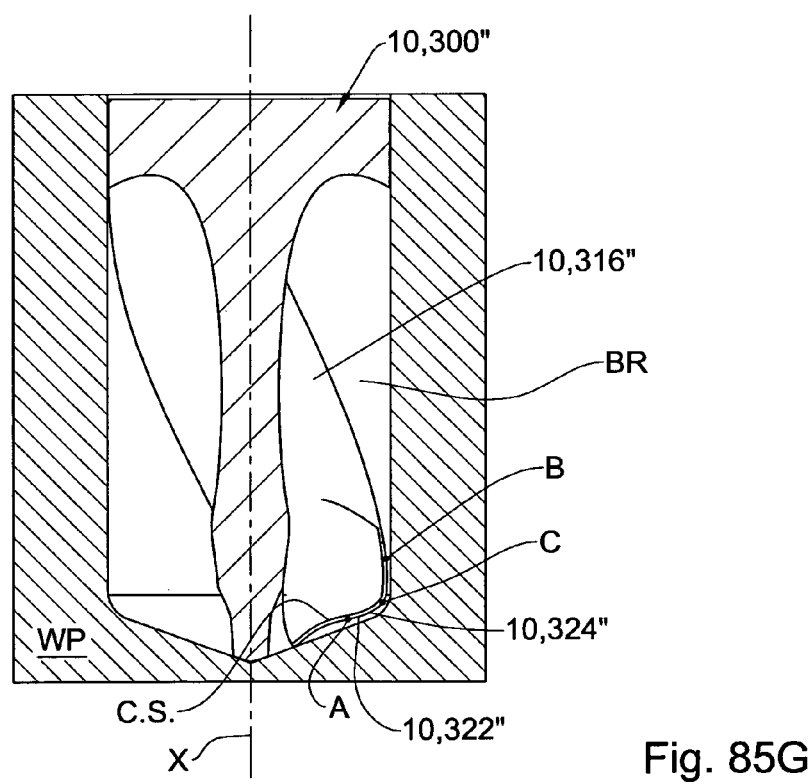
Figure 86A:
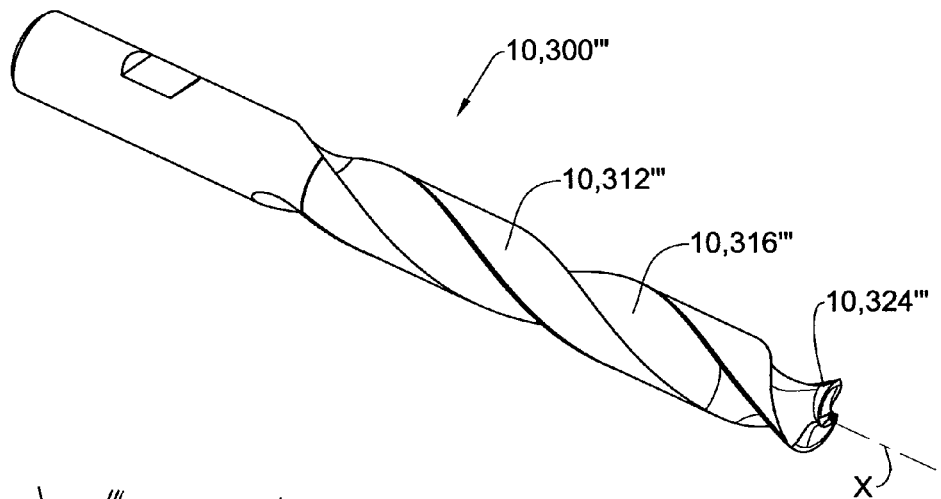
Figure 86B:
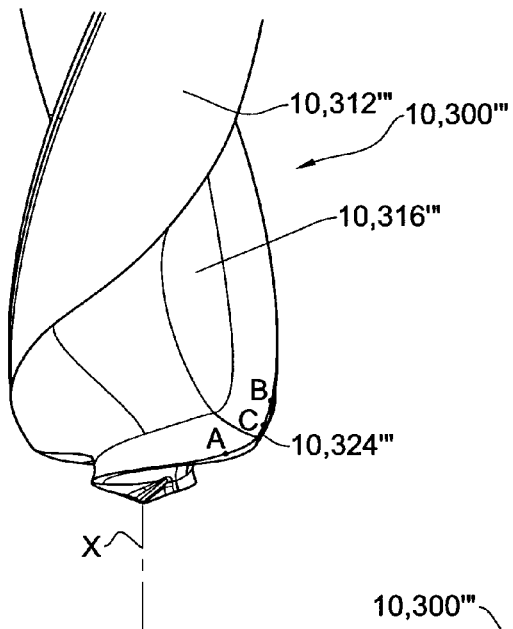
Figure 86C:
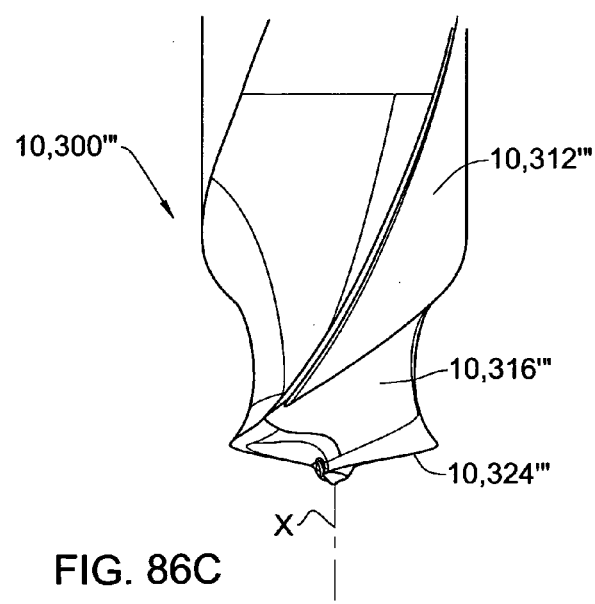
Figure 86D:
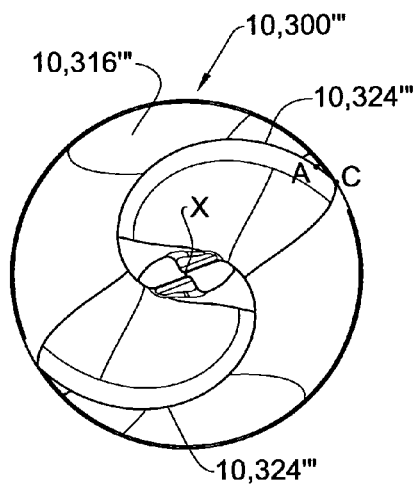
Figure 86E:
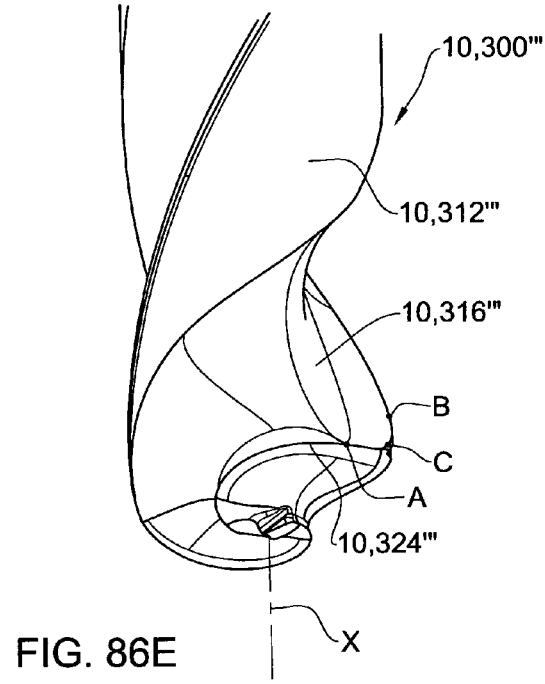
Figure 86F:
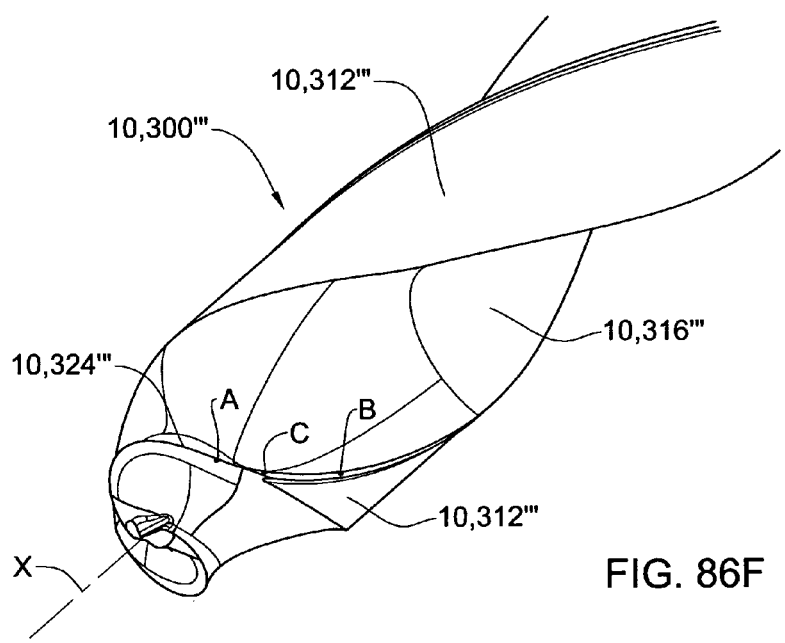
Figure 87A:
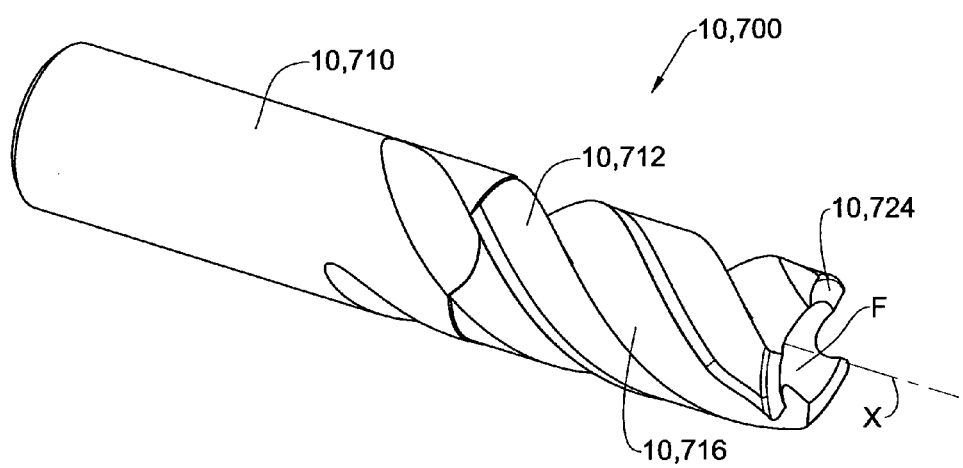
Figure 87B:
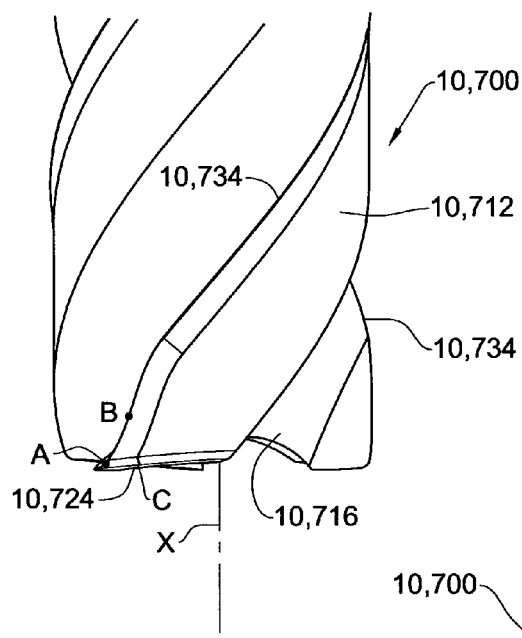
Figure 87C:
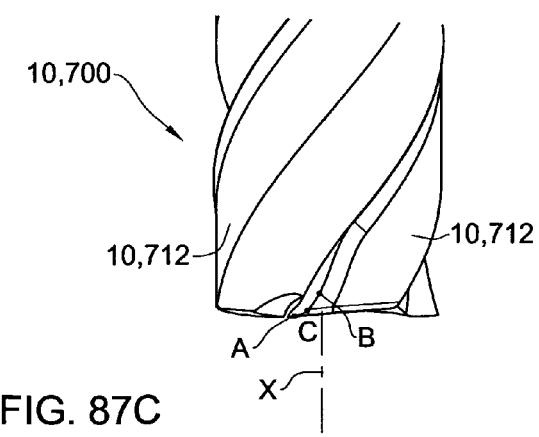
Figure 87D:
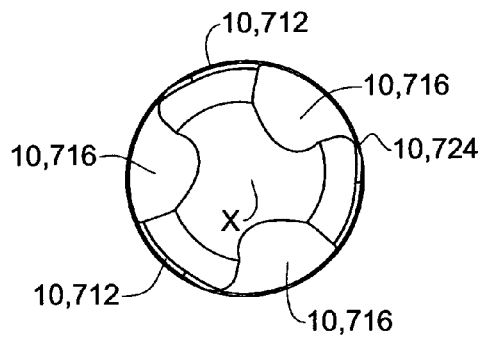
Figure 87E:
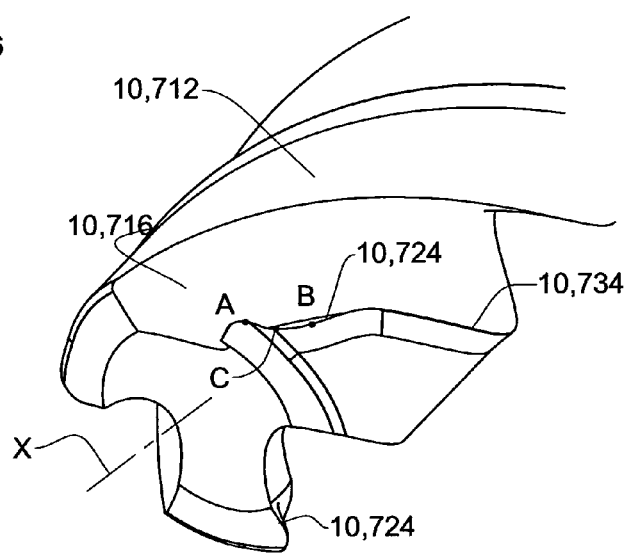
Figure 87F:
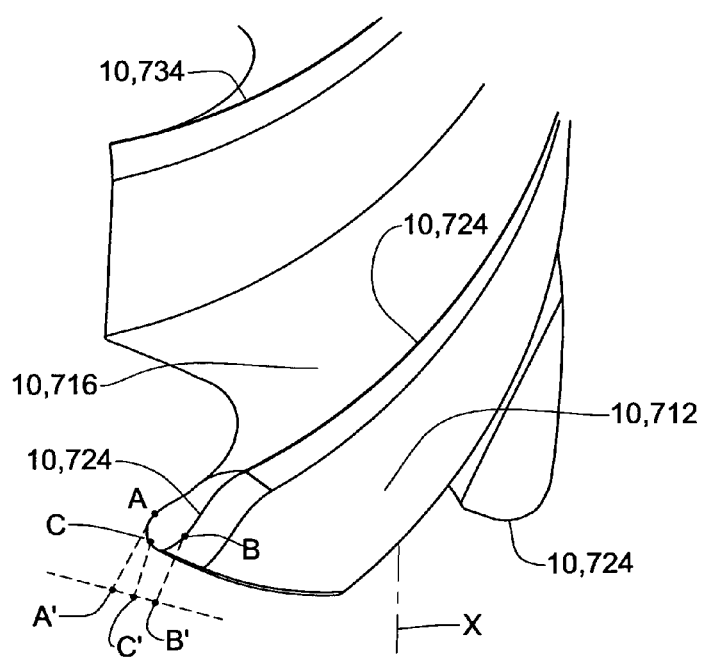
Figure 89A:
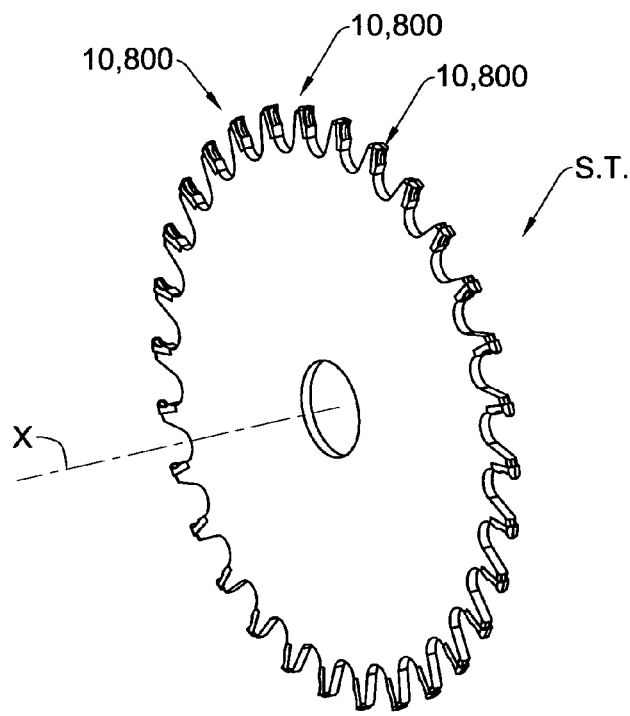
Figure 89B:
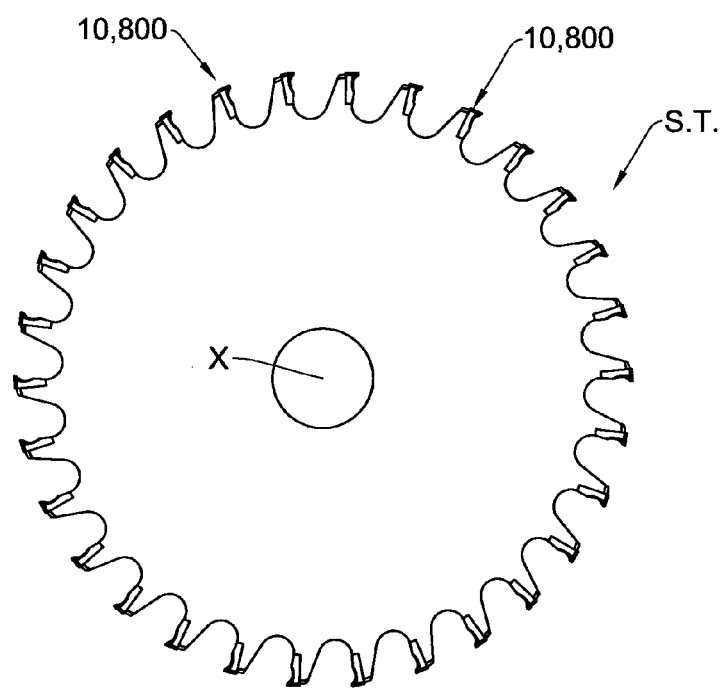
Figure 89C:
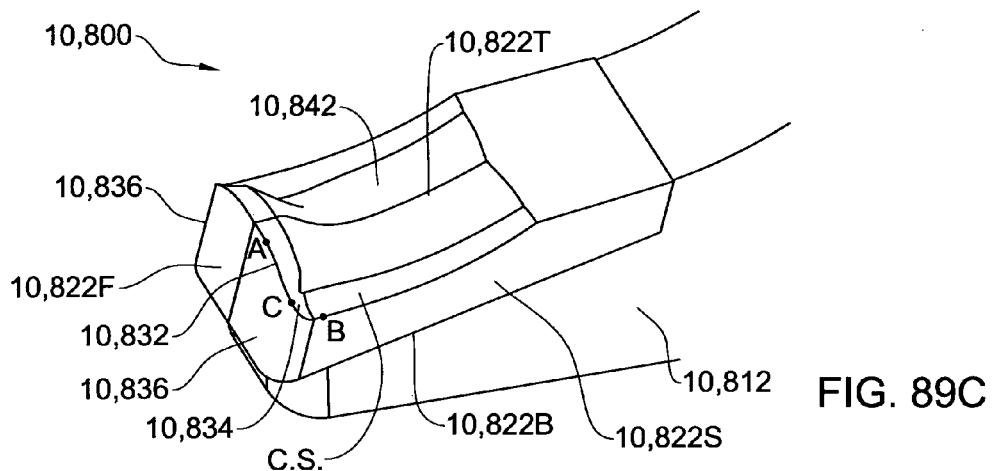
Figure 89D:
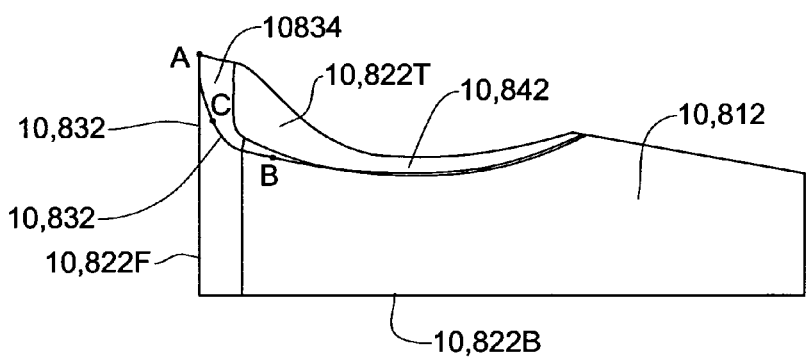
Figure 89E:
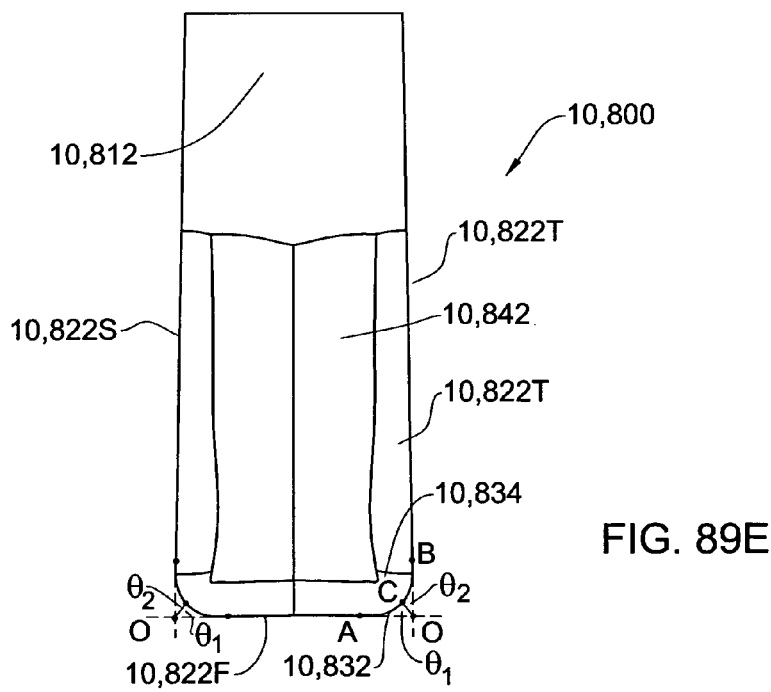
Figure 91A:
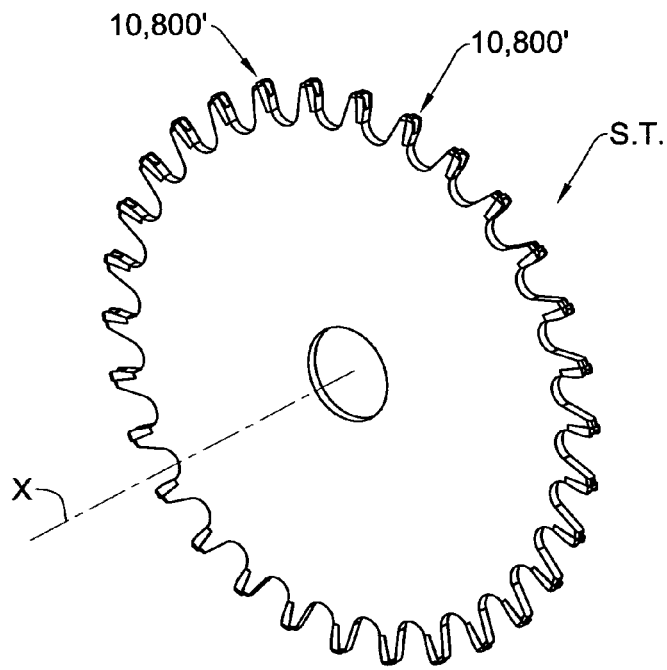
Figure 91B:
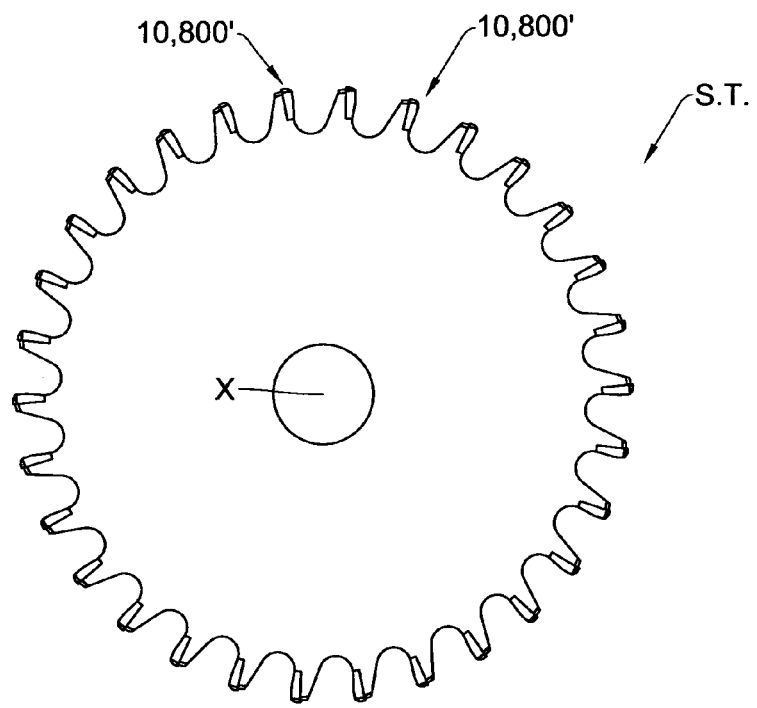
Figure 91C:
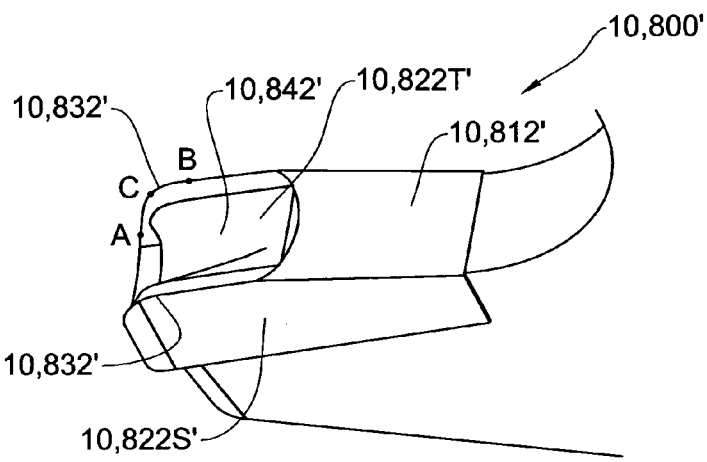
Figure 91D:
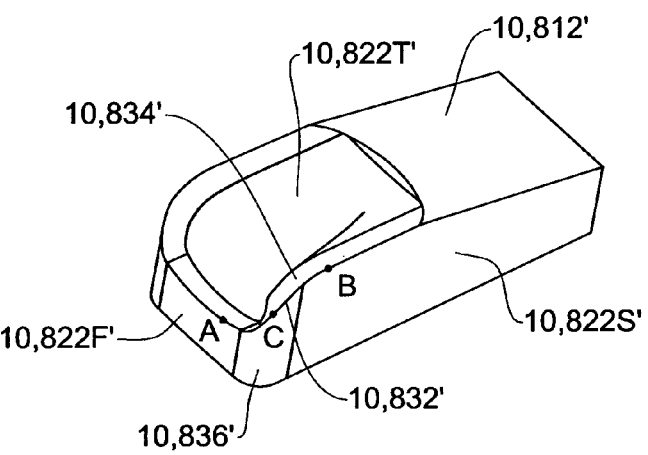
Figure 91E:
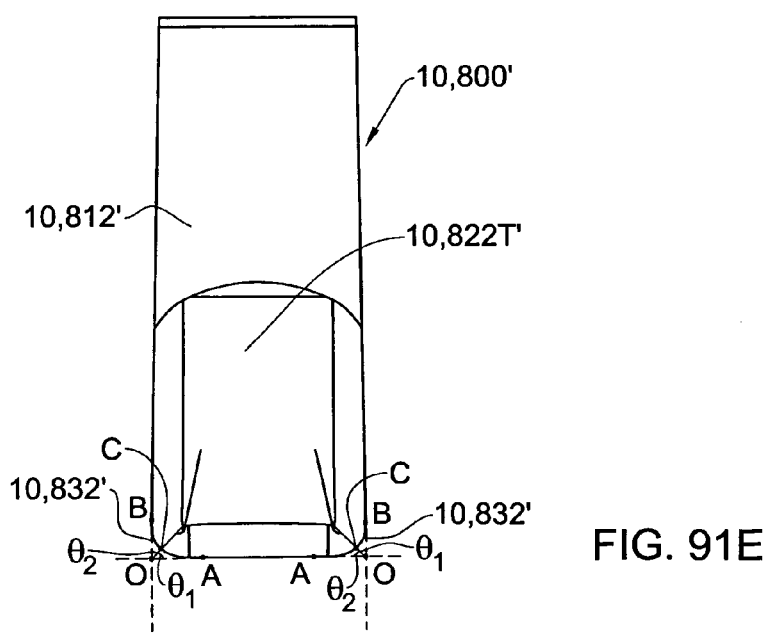
Figure 91F:
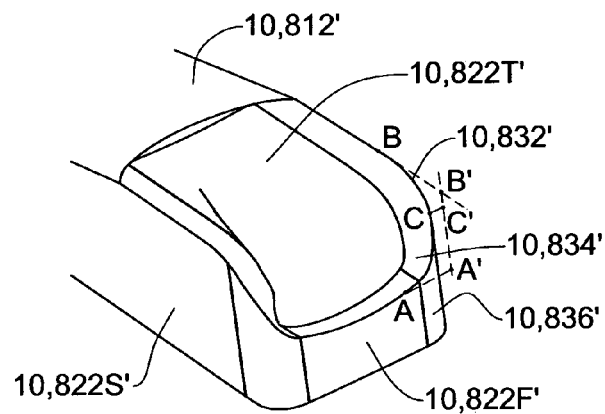
Figures 92A, 92B:
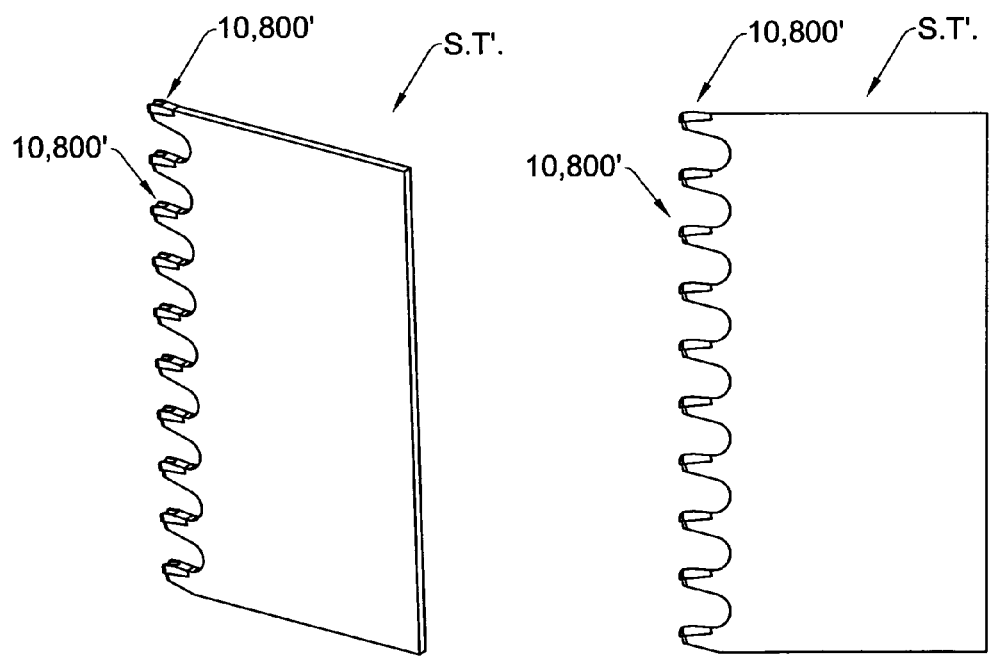
Figure 93A:
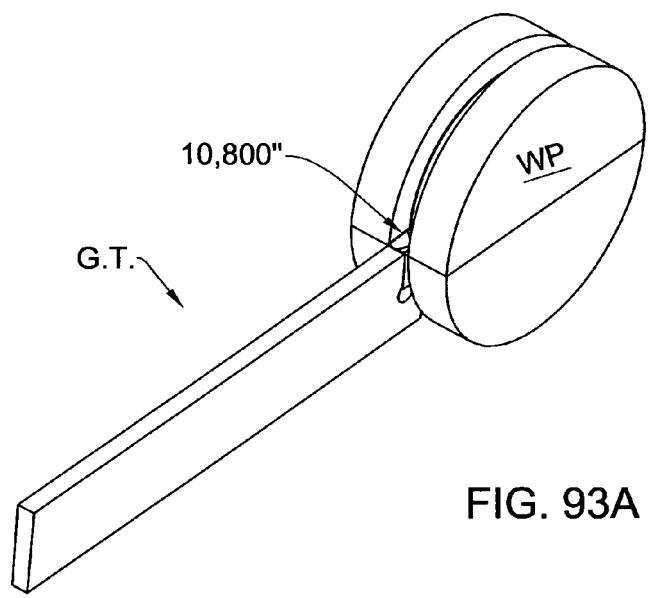
Figure 93B:
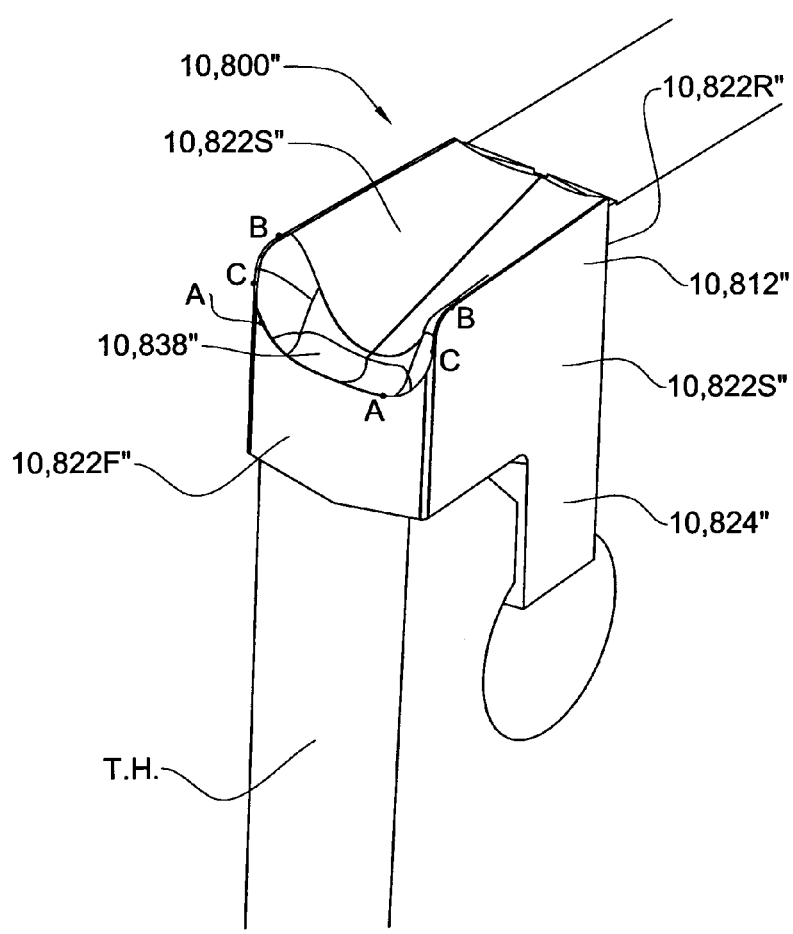
Figure 93C:
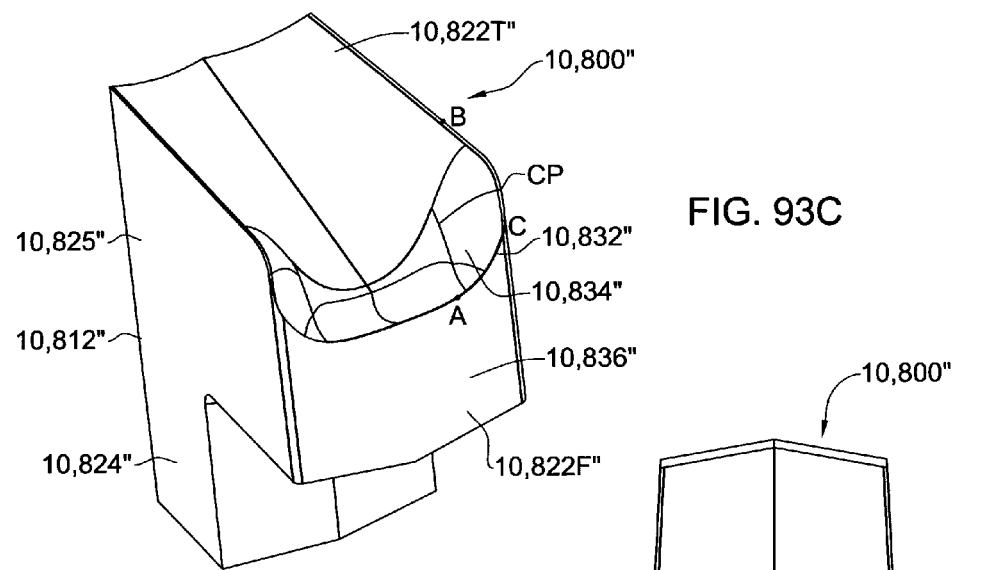
Figure 93D:
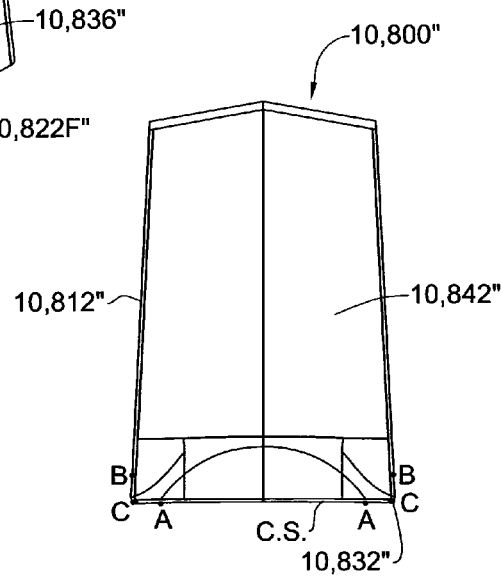
Figure 93E:
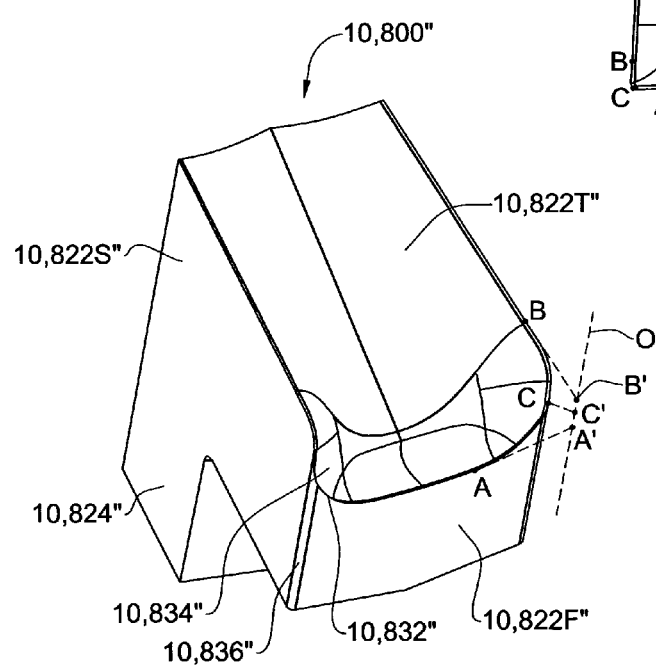
Figure 94A:
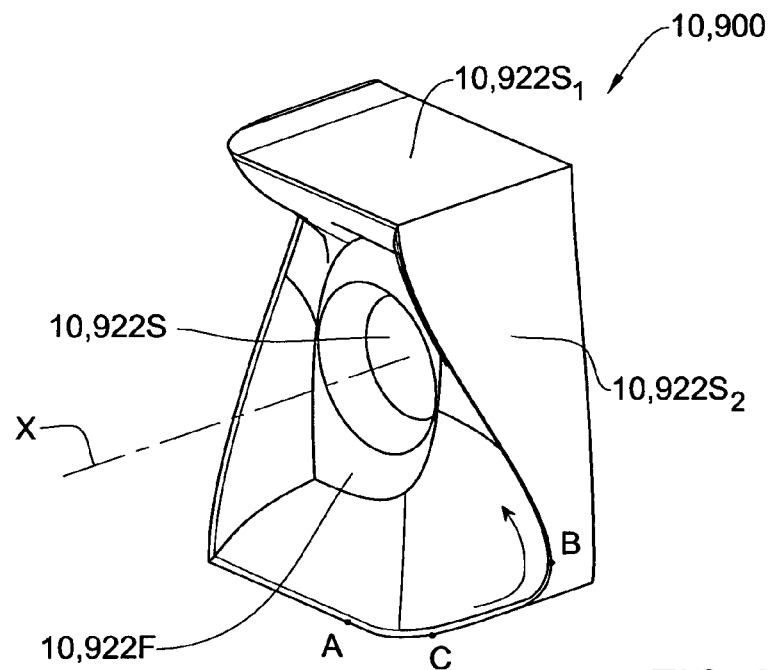
Figure 94B:
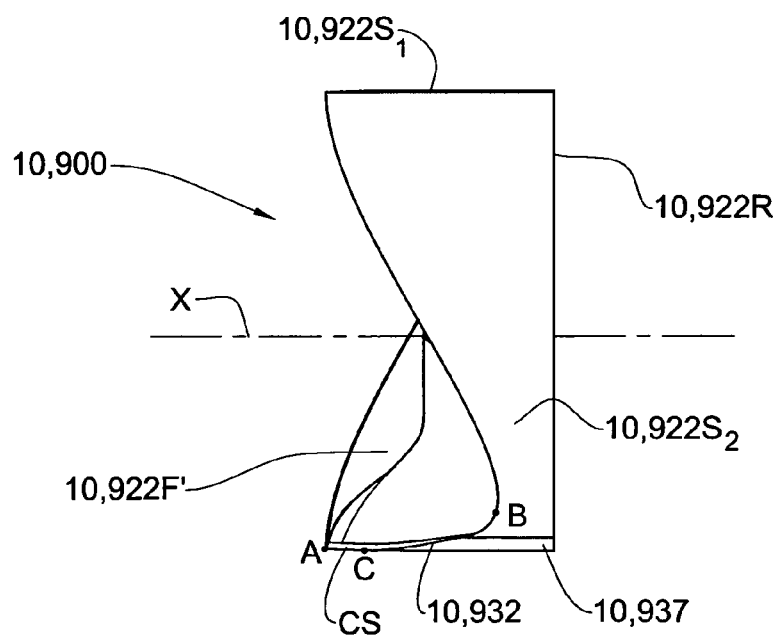
Figure 94C:
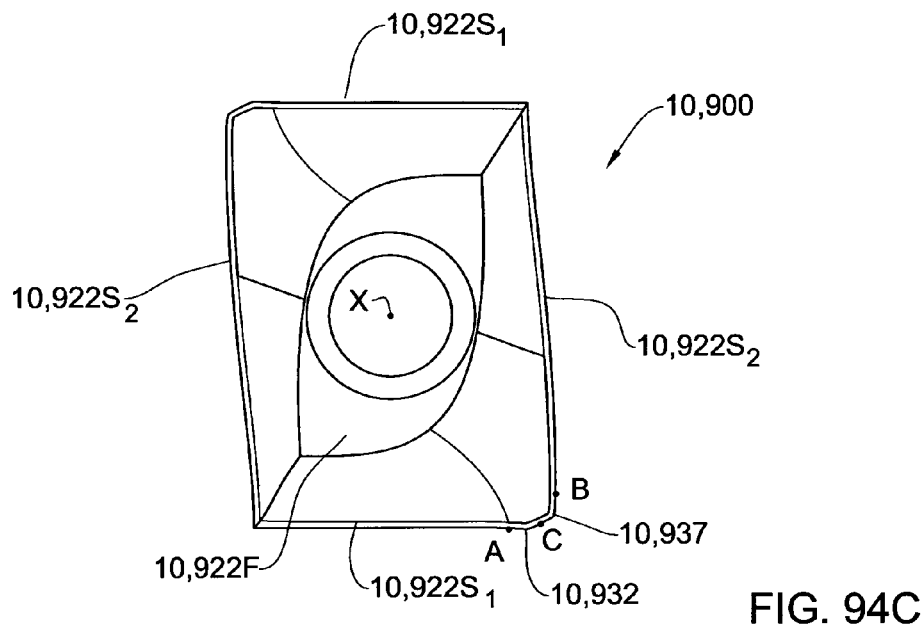
Figure 94D:
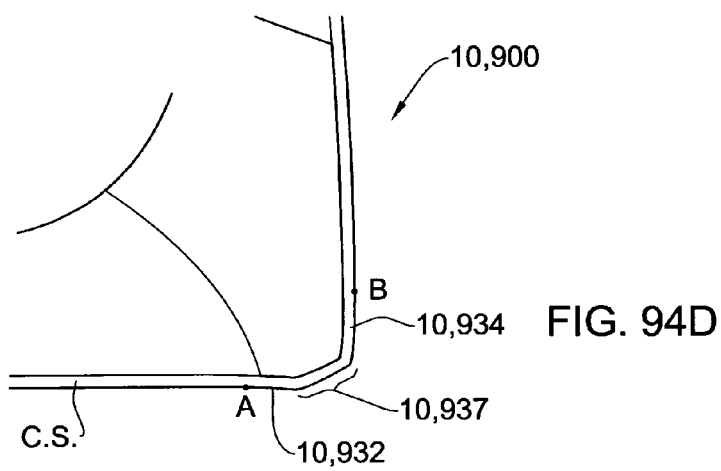
Figure 94E:
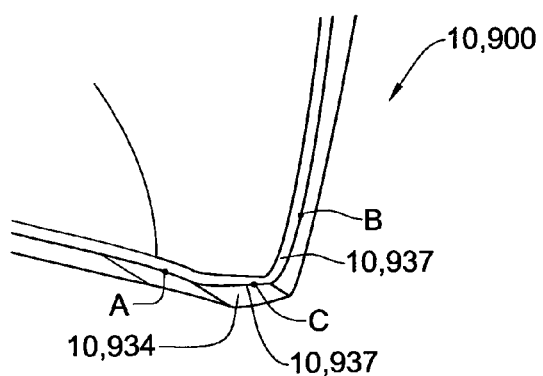
Figure 95A:
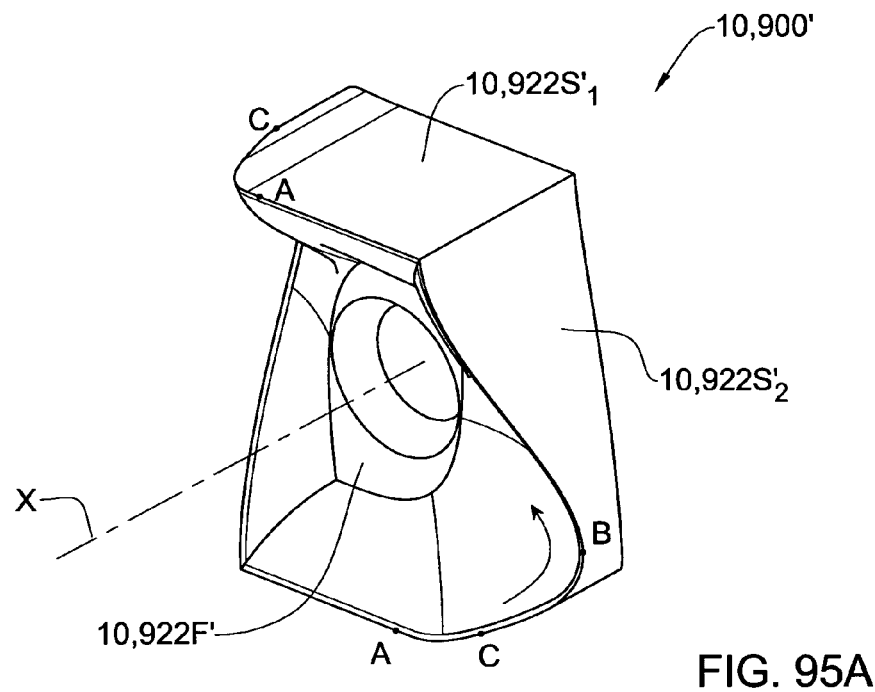
Figure 95B:
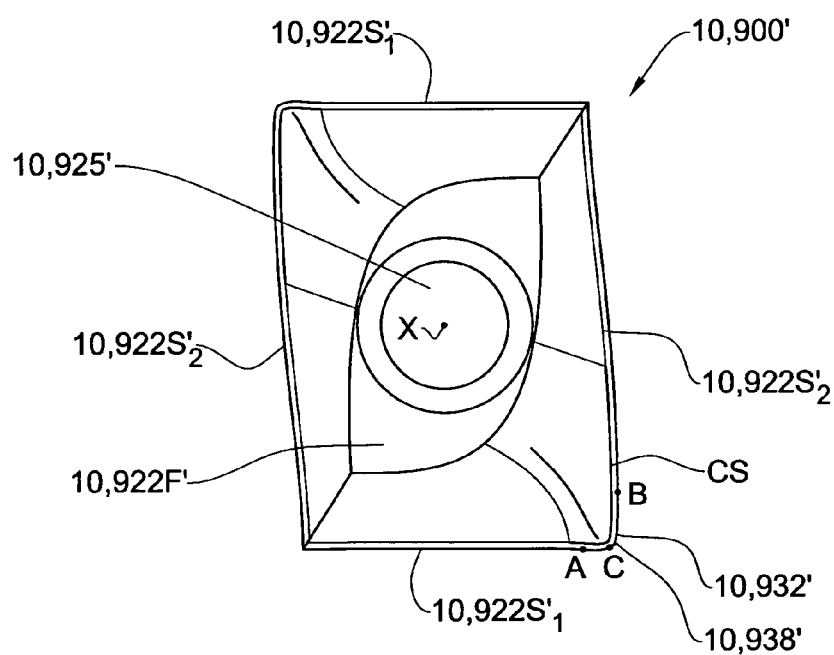
Figure 95C:
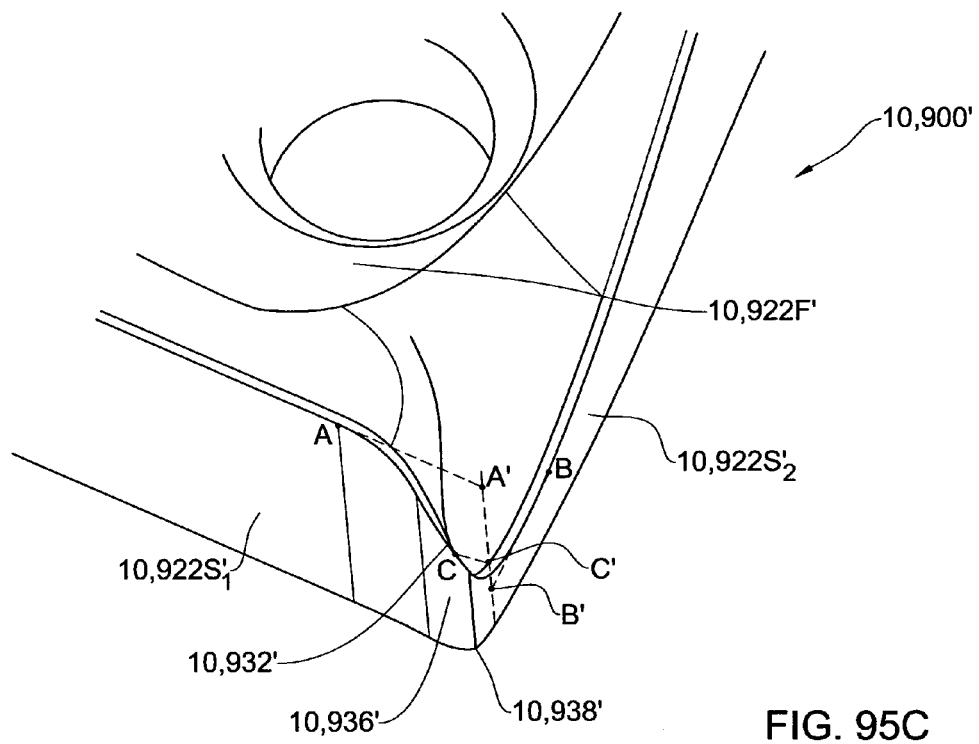
Figure 95D:
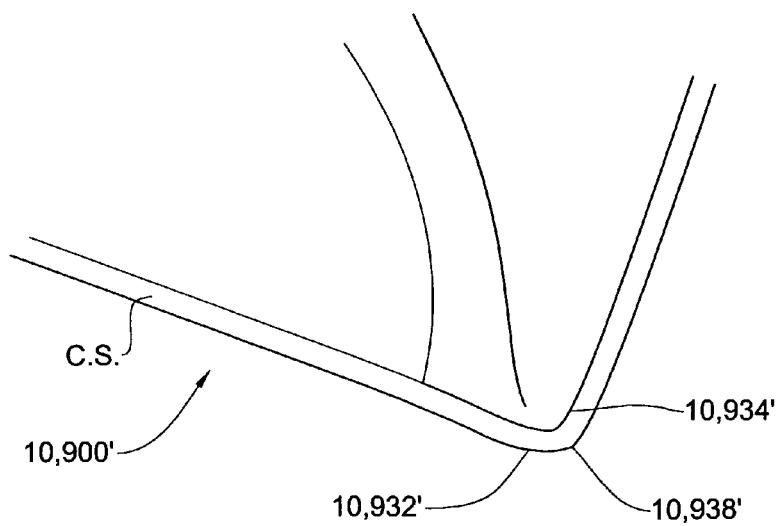

FIG. 71A;

FIGS. 72A to 72C are schematic isometric, front and side views of a cutting insert according to another example of the subject matter of the present application;

FIG. 72D is a schematic enlarged view of a portion of the cutting insert shown in FIG. 72A;

FIG. 73A is a schematic isometric view of a cutting tool comprising a cutting insert according to yet another example of the subject matter of the present application;

FIG. 73B is a schematic isometric view of the cutting insert shown in FIG. 73A;

FIG. 73C is a schematic enlarged view of a portion of the cutting insert shown in FIG. 73B;

FIGS. 74A to 74C are schematic isometric, front and side views of a cutting insert according to another example of the subject matter of the present application;

FIG. 74D is a schematic enlarged view of a portion of the cutting insert shown in FIG. 74A;

FIGS. 75A to 75C are schematic isometric, front and side views of a cutting insert according to another example of the subject matter of the present application;

FIG. 75D is a schematic enlarged view of a portion of the cutting insert shown in FIG. 75A;

FIGS. 76A to 76D are schematic isometric, side-isometric, front and rear views of a cutting insert according to another example of the subject matter of the present application;

FIG. 76E is a schematic right side view of the cutting insert shown in FIG. 76A;

FIG. 76F is a schematic left side view of the cutting insert shown in FIG. 76A;

FIG. 76G is a schematic enlarged view of a portion of the cutting insert shown in FIGS. 76A to 76D;

FIGS. 77A and 77B are schematic isometric and front views of a cutting tool incorporating a cutting insert according to still another example of the subject matter of the present application;

FIGS. 78A to 78C are schematic isometric, enlarged portion and top views of the cutting insert used in the cutting tool shown in FIGS. 77A and 77B;

FIG. 79 is a schematic isometric view of a cutting tool incorporating a cutting insert according to still another example of the subject matter of the present application;

FIGS. 80A and 80B are schematic isometric and top views of the cutting insert used in the cutting tool shown in FIG. 79;

FIG. 80C is a schematic enlarged view of a portion of the cutting insert shown in FIG. 80A;

FIGS. 81A to 81D are schematic isometric, tilted-isometric, enlarged and front views of an exemplary drilling tool according to an example of the subject matter of the present application;

FIGS. 81E and 81F are schematic isometric views of cross-sections of the drilling tool shown in FIGS. 81A to 81D, taken along planes containing the central axis thereof, and shown during a cutting operation when engaged with a workpiece;

FIG. 81G is a schematic cross-sectional view of a drilling tool when positioned within a hole of a workpiece during a cutting operation;

FIGS. 82A to 82E are schematic cross-sectional views of the drilling tool shown in FIGS. 81A to 81D, taken along planes containing the central axis thereof, and shown during a cutting operation when engaged with a workpiece;

FIGS. 83A to 83C are schematic isometric, left and front views of a drilling tool according to still another example of the subject matter of the present application;

FIG. 83D is a schematic enlarged view of a portion of the drilling tool shown in FIG. 83C;

FIG. 83E is a schematic bottom view of the drilling tool shown in FIGS. 83A to 83C;

FIGS. 83F and 83G are schematic left isometric and front isometric views of the drilling tool shown in FIGS. 83A to 83C;

FIGS. 84A to 84C are schematic isometric, front and bottom views of a drilling tool according to yet another example of the subject matter of the present application;

FIG. 84D is a schematic front-isometric view of the drilling tool shown in FIGS. 84A to 84C;

FIG. 84E is a schematic enlarged view of a portion of the drilling tool shown in FIG. 84B;

FIGS. 85A to 85D are schematic isometric, front, left and top views of a drilling tool according to yet another example of the subject matter of the present application;

FIG. 85E is a schematic front-isometric view of the drilling tool shown in FIGS. 85A to 85D;

FIG. 85F is a schematic enlarged view of a portion of the drilling tool shown in FIG. 85B;

FIG. 85G is a schematic cross-sectional view of the drilling tool shown in FIGS. 85A to 85D, when positioned within a workpiece during a drilling operation;

FIGS. 86A to 86D are schematic isometric, front, left and bottom view of a drilling tool according to yet another example of the subject matter of the present application;

FIG. 86E is a schematic bottom isometric view of the drilling tool shown in FIG. 86A;

FIG. 86F is a schematic front isometric view of the drilling tool shown in FIG. 86A;

FIGS. 87A to 87D are schematic isometric, front, left and bottom views of a milling tool according to an example of the subject matter of the present application;

FIGS. 87E and 87F are schematic enlarge views of portions of the milling tool shown in FIGS. 87A and 87B respectively;

FIGS. 88A to 88D are schematic isometric, front, bottom and rear-isometric views of a milling tool according to still another example of the subject matter of the present application;

FIGS. 89A and 89B are schematic isometric and front views of a saw tool incorporating cutting inserts according to still another example of the subject matter of the present application;

FIGS. 89C to 89F are schematic top-isometric, side, top and rear-isometric views of the cutting insert shown in FIGS. 89A and 89B;

FIGS. 90A and 90B are schematic isometric and front views of another saw tool incorporating the cutting insert shown in FIGS. 89C to 89F;

FIGS. 91A and 91B are schematic isometric and front views of a saw tool incorporating cutting inserts according to still a further example of the subject matter of the present application;

FIGS. 91C to 91F are schematic rear-isometric, isometric, top and front-isometric views of the cutting insert shown in FIGS. 91A and 91B;

FIGS. 92A and 92B are schematic isometric and front views of another saw tool incorporating the cutting insert shown in FIGS. 91C to 91F;

FIGS. 93A and 93B are schematic isometric and enlarged views of a parting tool incorporating a cutting insert according to still another example of the subject matter of the present application;

FIGS. 93C to 93E are schematic isometric, top and tilted-isometric vies of the cutting insert shown in FIGS. 93A and 93B;

FIGS. 94A to 94C are schematic isometric, side and front views of a cutting insert according to still another example of the subject matter of the present application;

FIG. 94D is a schematic enlarged view of a portion of the cutting insert shown in FIG. 94C;

FIG. 94E is a schematic enlarged tilted view of a portion of the cutting insert shown in FIG. 94C;

FIGS. 95A and 95B are schematic isometric and front views of a cutting insert according to still another example of the subject matter of the present application;

FIG. 95C is a schematic enlarged view of a portion of the cutting insert shown in FIG. 95C; and FIG. 95D is a schematic enlarged view of a portion of the cutting insert shown in FIG. 95B.

DETAILED DESCRIPTION OF EMBODIMENTS

Figure 1A:
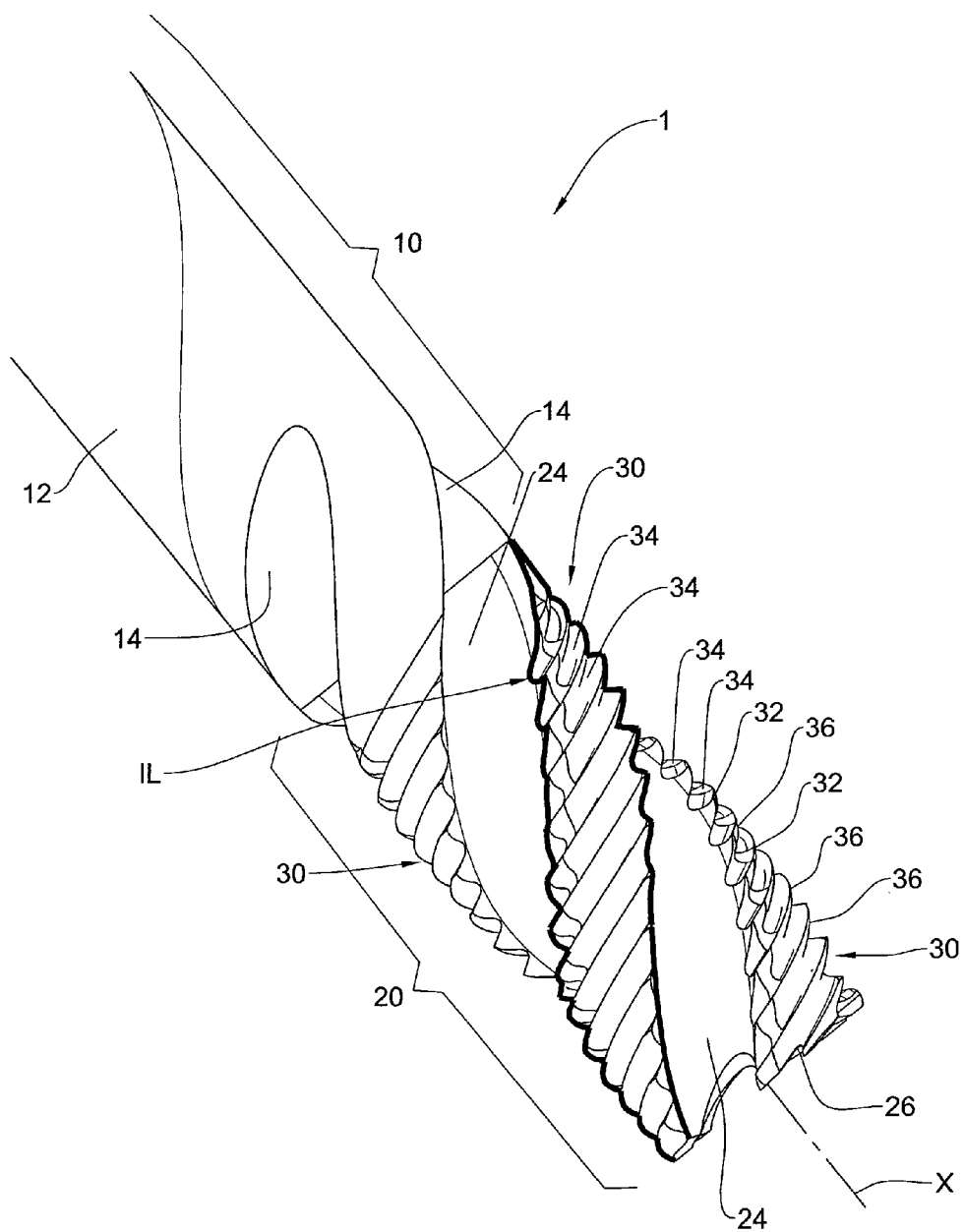
FIG. 1A is a schematic isometric view of a milling tool according to one example of the disclosed subject matter.

With reference to FIG. 1A, an integral milling tool generally designated as 1 is shown having a cylindrical design, extending along a central axis X, and being divided into a mounting segment 10 and a cutting segment 20. The milling tool 1 is also formed with three chip evacuation channels 14, 24, helically extending about central axis X, spanning along both the mounting segment 10 and the cutting segment 20.

The mounting segment has a body portion 12 adapted for being gripped by a holder, for example, a head of a CNC machine (not shown) adapted to provide the milling tool 1 with the necessary drive for rotation about the central axis X in order to perform the milling operation for which it is designed.

The cutting segment 20 of the milling tool 1 is formed with three cutting portions 30 separated therebetween by the three corresponding chip evacuation flutes 24. Each of the cutting portions 30, and consequently each of the chip evacuation flutes 24 extends helically about the central axis X, along the entire cutting segment 20, i.e. between the mounting segment 10 and a bottom face 26 of the cutting segment 20 of the milling tool 1.

Figure 1B:
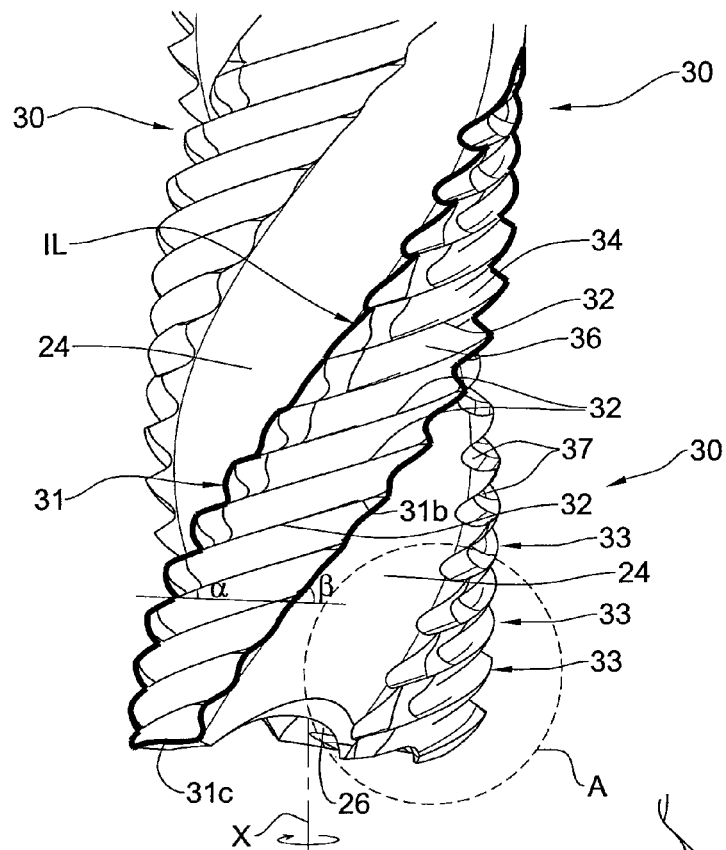
FIG. 1B is a schematic enlarged front view of a cutting segment of the milling tool shown in FIG. 1A, with a cutting portion thereof being marked-up for emphasis.

Turning now to FIG. 1B, the milling tool 1 of the present example is formed with an intersection line IL spiraling about the central axis X, defined at the intersection between an external surface of the cutting portion 30 of the milling tool 1 and a surface of the chip evacuation flute 24. In the conventional milling tool MT shown in FIG. 3J, the equivalent intersection line is a cutting edge and is defined as the intersection between a rake surface Re and a relief surface Rf of the conventional milling tool. However, in the milling tool 1, this intersection line IL does not necessarily need to be a cutting edge, and the external surface of the cutting portion and the surface of the flute do not necessarily have to constitute respective rake and relief surface Re, Rf for the intersection line IL.

Instead, the milling tool 1 is formed a plurality of cutting edges 32 which are oriented transversely to the intersection line IL (rather than lying along it). Nonetheless, as will be further described, the intersection line IL may optionally be used as a cutting edge, in which case it serves as an auxiliary cutting edge of the milling tool 1. In comparison, reverting back to FIG. 3J, the conventional milling tool MT is formed with four cutting edges CE and four chip evacuation flutes CF. It is observed that in the conventional milling tool MT, each of the cutting edges CE lies only along an intersection line defined between an external surface of the milling tool MT and a flute surface thereof, which, in the conventional milling tool constitute a rake surface Re and a relief surface Rf. It is noted that in the conventional milling tool MT, the intersection lines are the only cutting edges CE of the milling tool MT.

It is observed that in the milling tool 1, the cutting portion 30 has a cutting surface CS defined by a boundary line 31, which, in this particular example, is defined by three boundary line segments: a first boundary line 31a being the above mentioned intersection line IL between the cutting portion 30 and the chip evacuation flute 24 located clockwise thereof (with respect to the X axis), a second boundary line 31b being the intersection line between the cutting portion 30 and the chip evacuation flute 24 located counter clockwise thereof (with respect to the X axis), and a third intersection line 31c being the intersection line between the cutting portion 30 and the bottom surface 26.

Figure 1C:
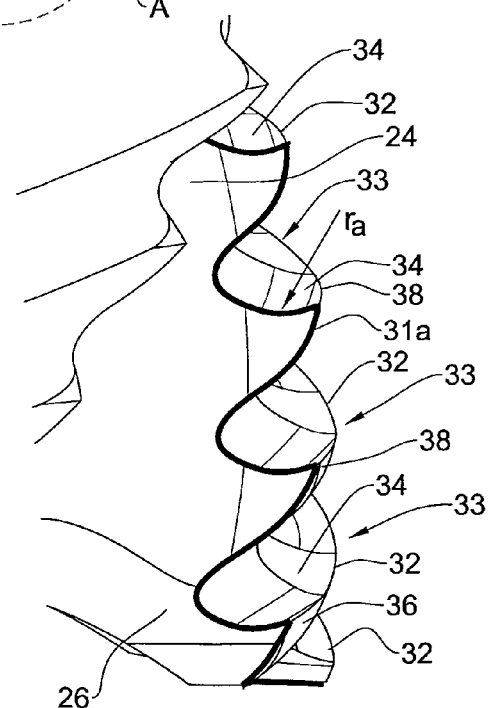
FIG. 1C is a schematic enlarged view of detail A shown in FIG. 1B.

With reference also to FIG. 1C, it is further observed that the cutting portion 30 is formed with a plurality of cutting teeth 33, each extending helically upwards between the boundary lines 31a and 31b, and is oriented transversely thereto. Each cutting tooth 33 is formed with a cutting edge 32 defined as the intersection between a rake surface 34 located axially above the cutting edge 32 and a relief surface 36 located axially below the cutting edge 32.

Each rake surface 34 is concave and has a predetermined negative curvature defined by a radius $r_a$, and each relief surface 36 is convex and has a predetermined positive curvature defined by radius $r_b$.

Between each two cutting teeth 33, there extends a chip evacuation channel 37. It is noted that the design of the cutting segment 20 of the milling tool 1 is such that the chip evacuation flutes 24 extend helically at a major inclination angle β which is equal to or greater than 45°, while the chip evacuation channels 37 extend helically at a minor inclination angle α which is considerably smaller than 45°, e.g. 30°, 20°, 10° and even less. The advantages of this design will be later discussed with respect to the operation of the milling tool 1.

Reverting back to FIG. 1B, it is also noted that the cutting teeth 33 are arranged such that the cutting edges 32 of each cutting portion 20 overlap each other. More particularly, the uppermost point T of a first cutting edge 32 of one cutting tooth 33 is located axially above the lowermost point B of the cutting edge 32 of a neighboring cutting tooth 33 located above the first cutting tooth 33. Thus, there is formed a continuous cutting edge (the term 'continuous cutting edge' refers herein to the cutting edge experienced by the workpiece WP).

Figure 1D:
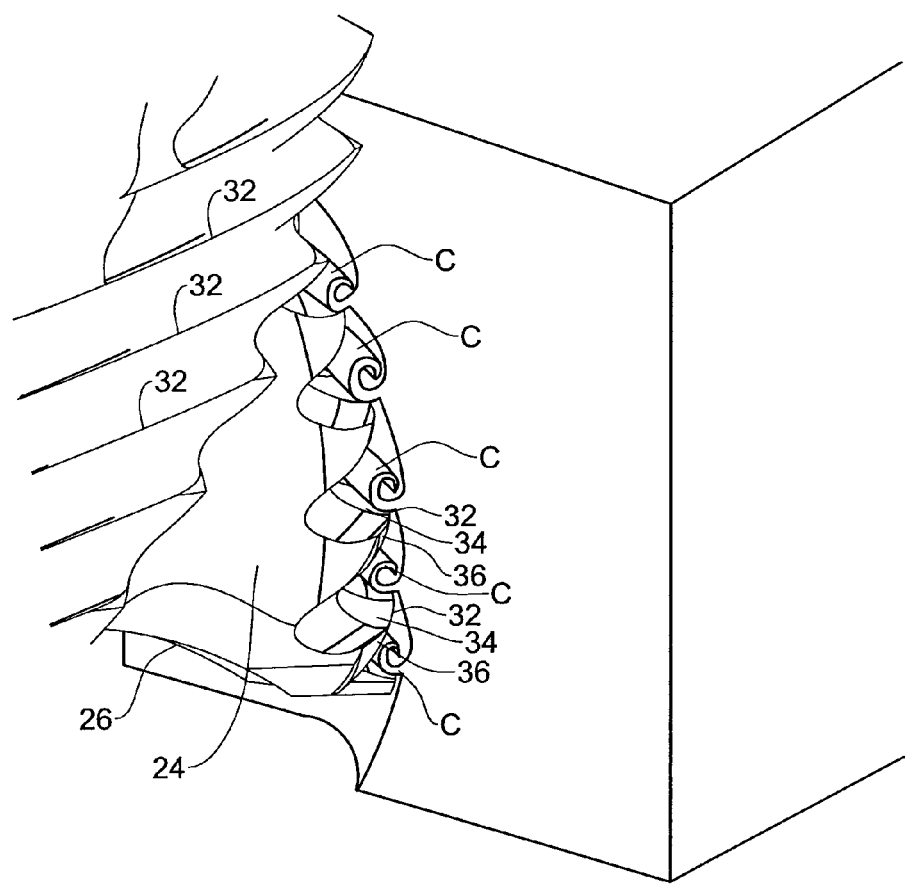
FIG. 1D is a schematic isometric view of the cutting segment shown in FIG. 1B when engaging a workpiece for a cutting operation.

Attention is now drawn to FIG. 1D, in which the milling tool 1 is shown during a milling operation on a workpiece WP. The milling tool 1 is adapted to be rotated about the central axis X thereof at high velocity, and engage the workpiece WP in order to remove material therefrom in the form of chips C. The milling tool 1 is adapted to be oriented such with respect to the workpiece that at the moment of engagement, the cutting edges 32 penetrate into the workpiece.

When the milling tool 1 engages the workpiece WP, each cutting edge 32, in turn, penetrates into the workpiece WP, and begins pealing off a chip C of material from the workpiece WP. It is noted that due to the minor inclination angle α of the cutting edges 32, the chips C curl upwards, as shown in FIG. 1D, rather than being curled forwards (with the direction of rotation) as it happens in some common milling tools.

Once a chip C has been pealed off, it will gradually progress along the appropriate chip evacuation channel 37 of the cutting tooth 33 in an upward and CCW direction, until it exits therefrom and discharged into the chip evacuation flute 24. From there, the chip C continues to progress through the chip evacuation flute 24 until it is discharged from the milling tool 1.

According to the above arrangement, and contrary to common milling tools, instead of progressing through and being discharged from a chip evacuation flute located CW of the cutting edge, the chip C in the milling tool 1 of the disclosed subject matter is discharged through a chip evacuation flute located CCW of the cutting edge 32.

One of the advantages of the above described design is that the cutting edges 32 penetrate into the workpiece WP at a very minor inclination angle α, which may be as little as 20°, thereby reducing the load on the cutting edge 32 and on the cutting tooth 33. Another advantage of the above described design is that the overall length of the cutting edge of the cutting portion 20 is times greater than in common milling tools, due to the unique orientation of the cutting edges 32.

Figure 2A:
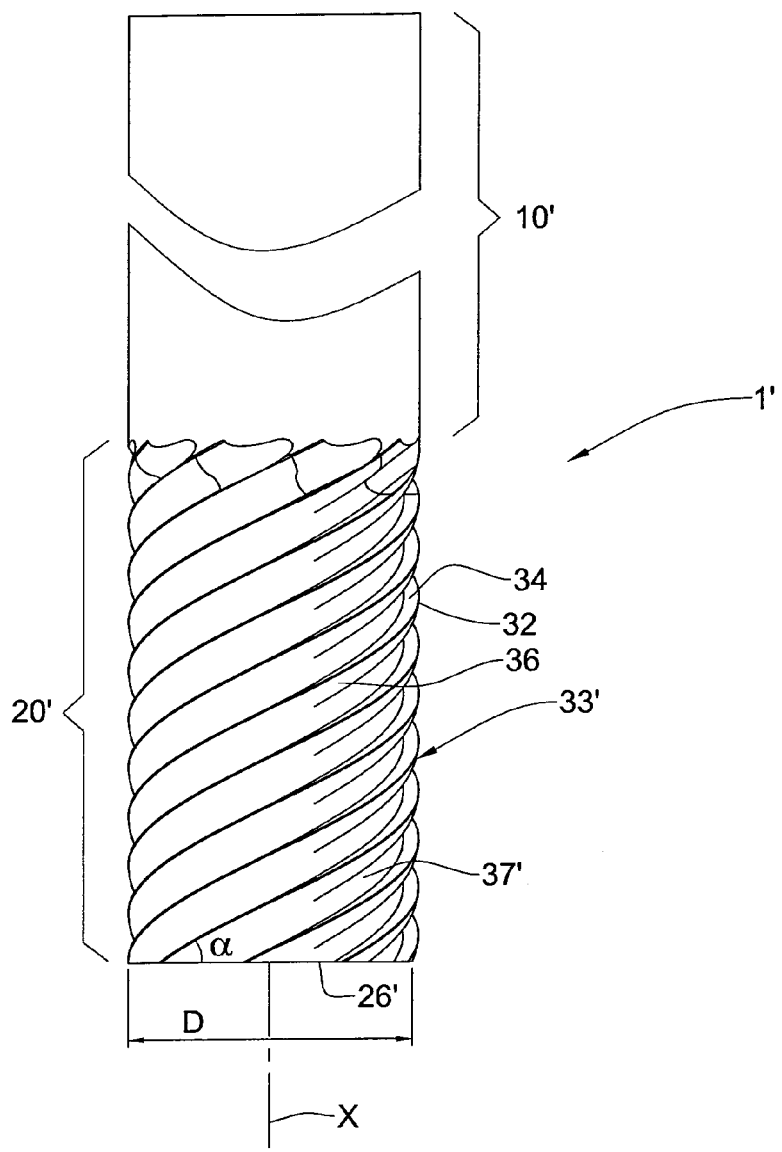
FIG. 2A is a schematic front view of a semi-product from which the milling tool shown in FIG. 1A is manufactured.
Figure 2B:
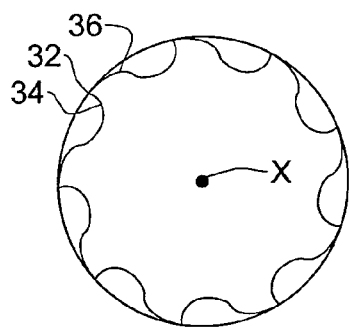
FIG. 2B is a schematic bottom view of the semi-product shown in FIG. 5A.

Further attention is now drawn to FIGS. 2A and 2B, showing a semi-product generally designated 1', from which the milling tool 1 is manufactured. The semi-product 1' comprises a mounting segment 10' and a cutting segment 20'. The cutting segment 20' is formed with nine cutting ridges 33', spirally extending about the central axis X at a substantially minor inclination angle α. Each cutting ridge 33' has a cutting edge 32' formed at the intersection between a rake surface 34 and a relief surface 36. The cutting ridges 33' are separated therebetween by minor channels 37'.

In order to complete the manufacture of the milling tool 1 from the semi-product 1', several operations are performed, the first one being the forming of chip evacuation flutes 24 (shown FIG. 1A). The number and size of the chip evacuation flutes 24 defines the number and size of the cutting portions 30 of the milling tool 1. However, it should be noted that the number of cutting edges per cutting portion is defined by the number and inclination angle of the cutting ridges 33' of the semi-product 1'.

It should also be appreciated that when forming the chip evacuation flutes 24, the new-formed boundary line 31 of the cutting portion 30 may also be sharp enough so as to constitute an auxiliary cutting edge of the cutting tool 1, in addition to the cutting edges 32. Thus, in operation, it is possible to increase the feed of the milling tool 1, wherein the milling tool penetrates that deep into the workpiece WP such that the boundary line 31 operates as a cutting edge, similar to conventional milling tools.

According to the above, during operation, two chip removal operations may take place at once: removal of some chips by the auxiliary cutting edge constituted by IL 31a, which are discharged to the chip removing flute 24 to the left of the cutting portion, and removal of the remainder of the chips by the cutting edges 32, which is urged into the chip evacuation channels 37 and eventually discharged through the chip removing flute 24 to the right of the cutting portion as previously described.

In this case, after the auxiliary cutting edge removes material from the workpiece, the surface of the workpiece assumes an undulated shape having peaks and valleys mirroring the undulating shape of the intersection line 31a. Thus, the cutting edges 32, upon further rotation, engage the peaks formed by the auxiliary cutting edge and remove them, leaving a clean surface.

Figure 1E:
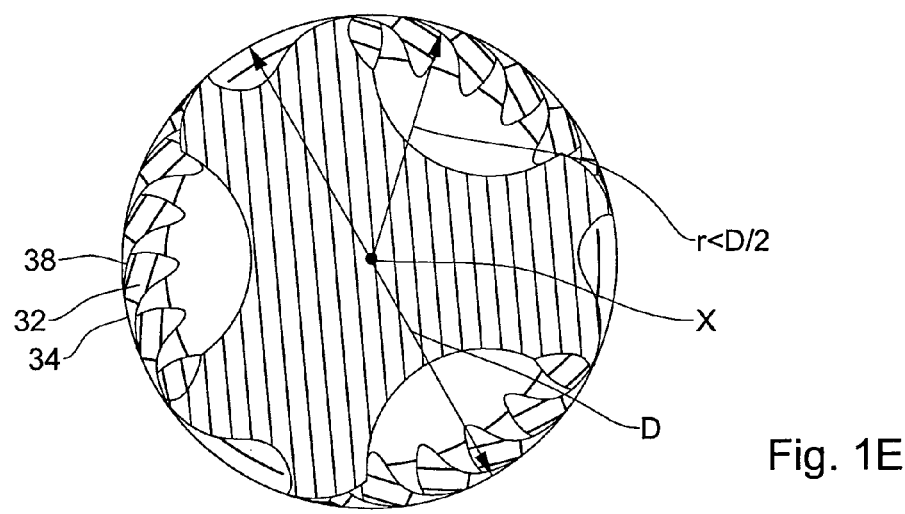
FIG. 1E is a schematic cross-sectional view of the milling tool shown in FIG. 1A, taken along a plane perpendicular to the central axis X of the milling tool.

Another manufacturing operation performed on the semi-product is the forming of the rounded portion 38 of the cutting teeth 33, as shown in FIG. 1E. It is observed, that the rounded portion 38 is of a smaller diameter than the diameter of the envelope of the milling tool 1, or in other words, smaller that the diameter D of the semi-product 1'. Such a rounded portion 38, facilitates smoother penetration of the cutting edge 32 of the cutting tooth 33 into the workpiece WP (shown FIG. 1D), when the feed of the milling tool 1 during penetration is in a direction perpendicular to the axial direction (axis X).

Figure 3A:
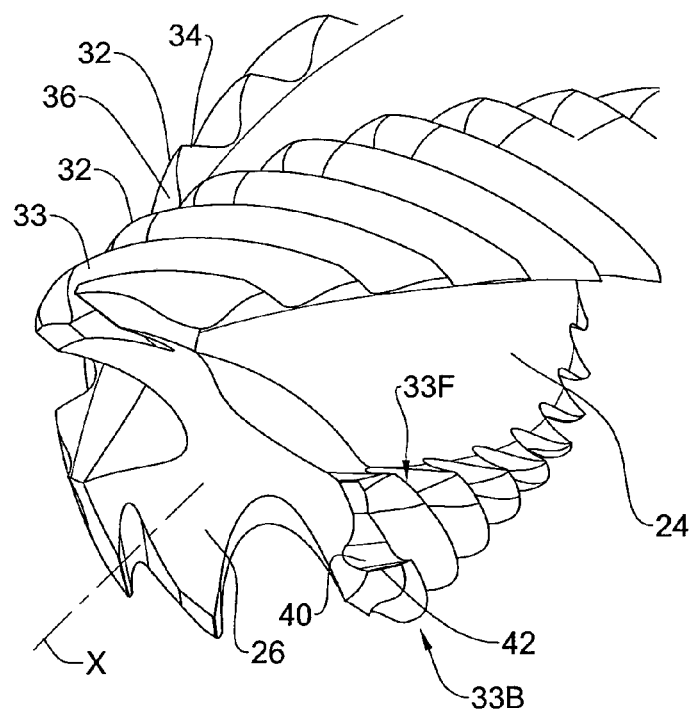
FIG. 3A is a schematic enlarged bottom isometric view of the milling tool shown in FIG. 1A.
Figure 3B:
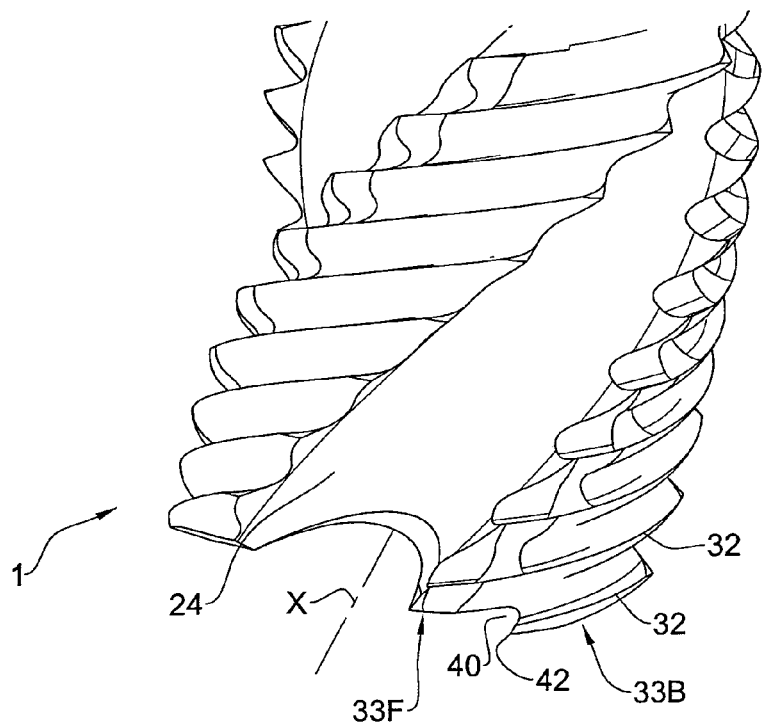
FIG. 3B is a schematic front isomeric view of a part of the milling tool shown in FIG. 1A.
Figure 3C:
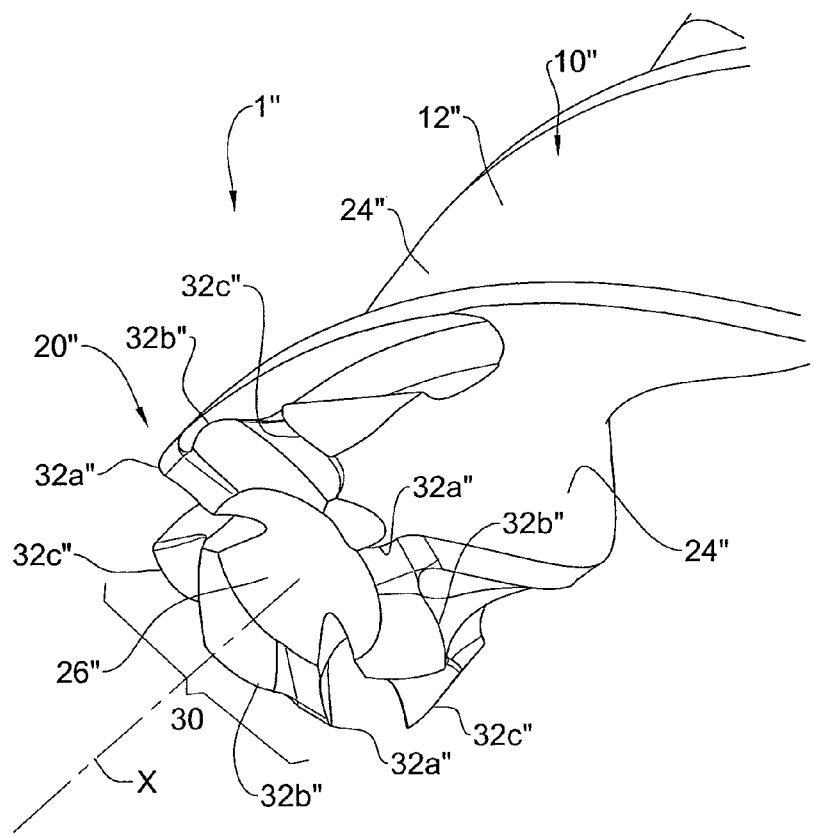
FIG. 3C is a schematic front isometric view of a part of a milling tool according to another example.

Attention is now drawn to FIGS. 3A and 3B, where a bottom isometric view of the milling tool 1 demonstrates the result of two additional manufacturing operations on the semi-product 1', the forming of a spherical bottom and the forming of bottom teeth.

Forming a spherical bottom—the bottom surface 26' of the semi-product 1' is formed into a spherical surface 26. This design allows the milling tool 1 to enter a workpiece WP also from a top side thereof (not only from the side), i.e. during penetration into the workpiece WP, the feed of the milling tool 1 is in the axial direction (axis X); and Forming bottom teeth—a portion of the axially bottom-most cutting tooth is removed, thus forming two cutting teeth. For purpose of clarity, the cutting tooth 33 located adjacent the chip evacuation flute 24 located CW of the cutting portion 30 will be referred to as a front cutting tooth 33F and the cutting tooth 33 located adjacent the chip evacuation flute 24 located CCW of the cutting portion 30 will be referred to as a back cutting tooth 33B.

During the above operation, an auxiliary channel 40 is formed between the front cutting tooth 33F and the back cutting tooth 33B, such that a cutting corner 42 is formed. This design allows an arrangement in which the cutting corner 42 of the back cutting tooth 33B 'covers' the front cutting tooth 33F, i.e. it is able to remove material left in the workpiece WP which was not removed by the front cutting tooth 33F.

It should be noted that in milling tools, the bottom cutting teeth are the first to wear out, this due to the great impact thereon during penetration of the milling tool into the workpiece. Thus, one important advantage of this design is that, since the back cutting tooth 33B 'covers' for the front cutting tooth 33F, the latter may be rounded in order to decrease the loads applied thereto during penetration, and thereby increase the overall lifespan of the cutting tooth 33F, and consequently of the entire milling tool 1.

It should be clear that most principles and features described above with respect to cutting tool 1 and/or shown in FIGS. 1A to 3B, are not restricted to the cutting tool 1 in connection with which they are described/shown, and may independently be applied, mutatis mutandis, to other tools, in any combinations considered to be appropriate by a person skilled in the art.

It should also be understood that the principles of the above features, illustrated here with respect to an integral milling tool, may be interchangeably applied to cutting inserts adapted to be mounted on cutting tool holders in order to form cutting tools.

Turning now to FIGS. 3C to 3I, another integral milling tool, generally designated 1" is shown having a cylindrical design, extending along a central axis X, and being divided into a mounting segment 10" and a cutting segment 20". The milling tool 1" is also formed with three cutting portions 30" helically extending about central axis X, each two neighboring cutting portions 30" being separated from one another by a chip evacuation channel 24", also helically extending about central axis X.

Figure 3D:
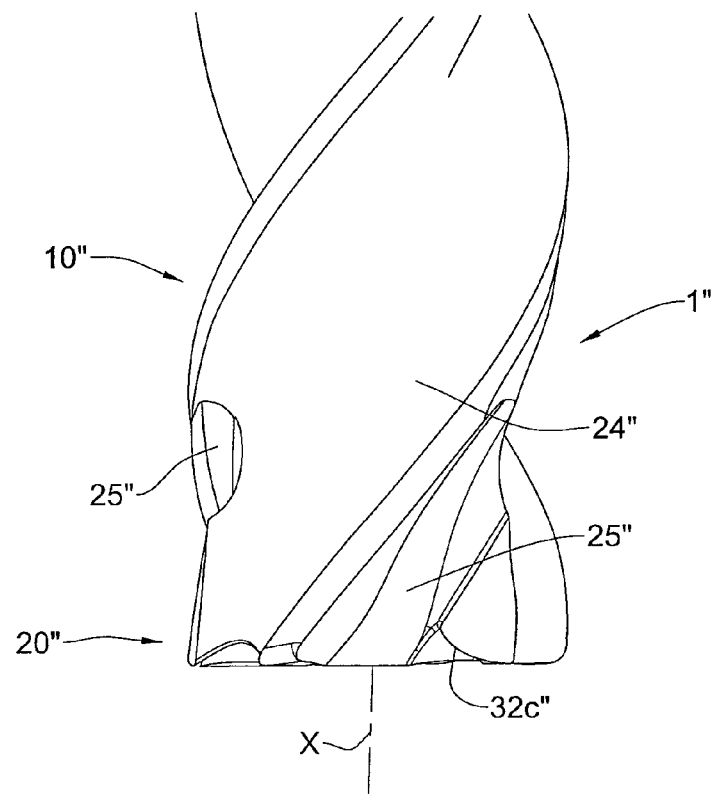
FIG. 3D is a schematic side view of the milting tool shown in FIG. 3C.
Figure 3E:
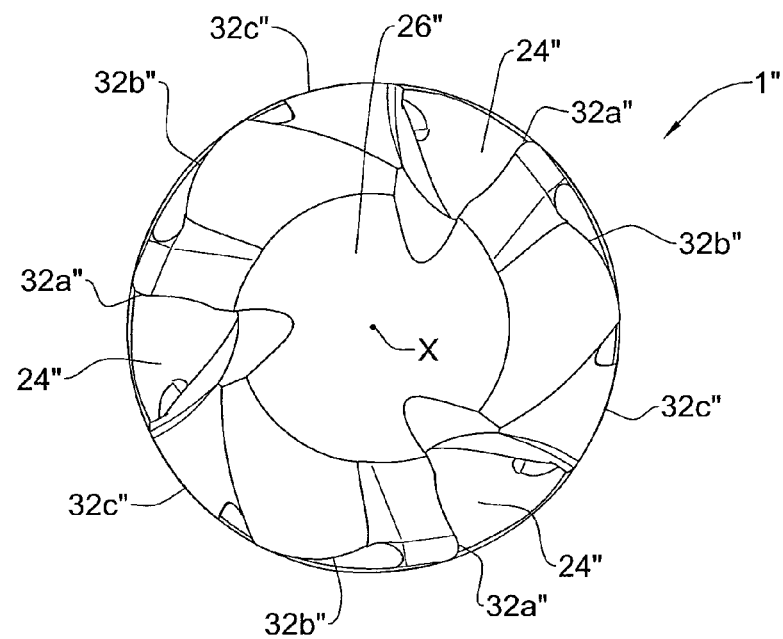
FIG. 3E is a schematic bottom view of the milling tool shown in FIG. 3C.
Figure 3F:
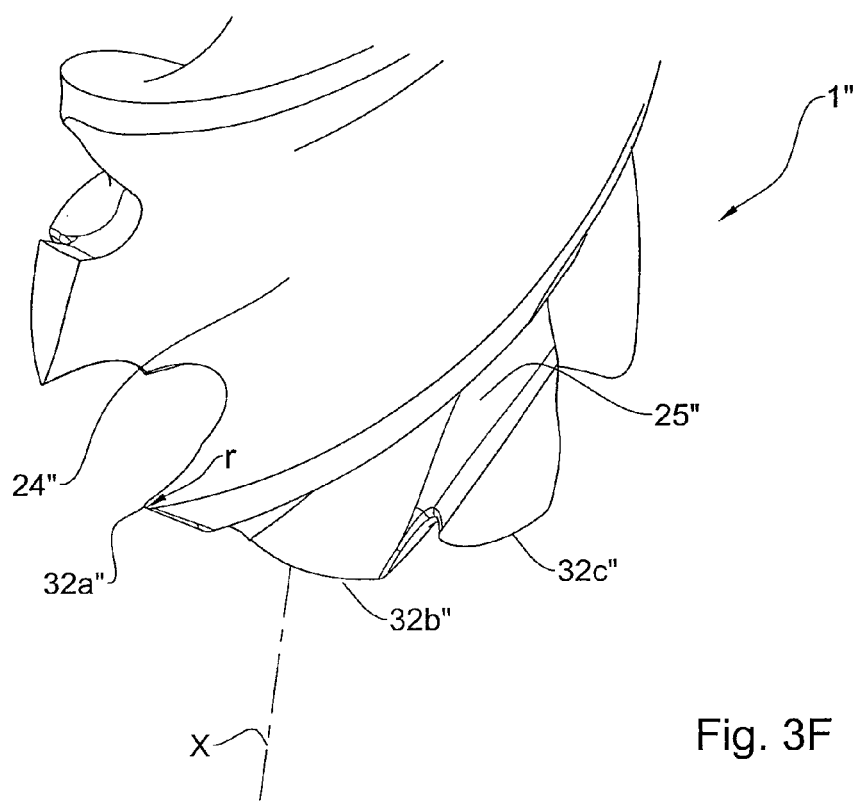
FIG. 3F is a schematic enlarged first isometric view of a portion of the milling tool shown in FIG. 3C.
Figure 3G:
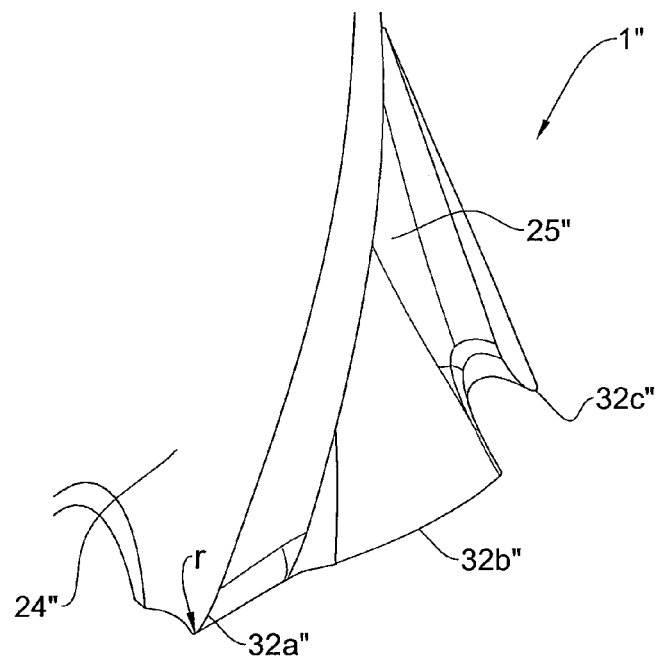
FIG. 3G is a schematic enlarged first isometric view of a portion of the milling tool shown in FIG. 3C.
Figure 3H:
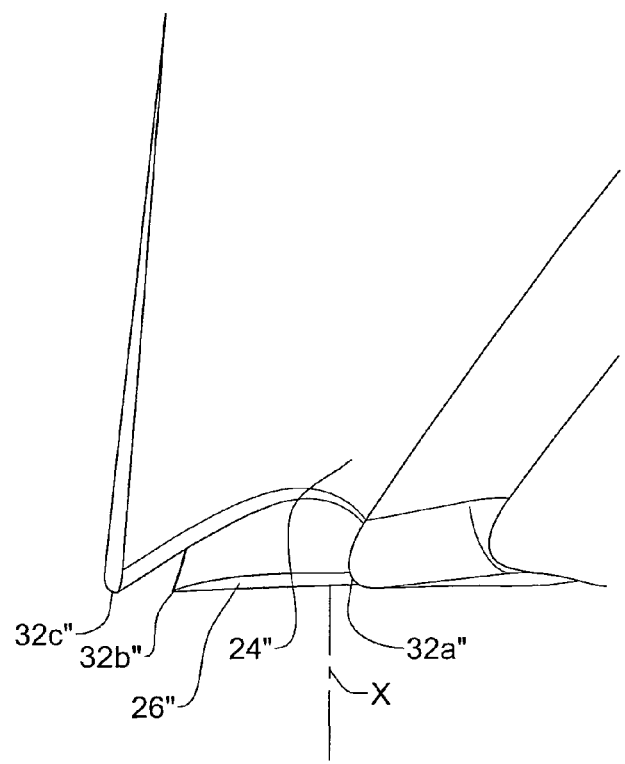
FIG. 3H is a schematic enlarged front view of a portion of the milling tool shown in FIG. 3C.

The milling tool 1" is formed with a first, a second and a third consecutive cutting edges 32a", 32b" and 32c" respectively, located one behind the other with respect to a revolution of the milling tool 1" during operation. With particular reference being drawn to FIGS. 3D to 3F, the following is observed:

the first cutting edge 32a" has a cutting corner with a radius r bridging between the envelope of the milling tool 1" and the front face 26" thereof;

the second cutting edge 32b" extends along the front face 26" of the milling tool and has at least a portion thereof lying on the envelope (see FIG. 3E); and the third cutting edge 32c" extends along the envelope of the milling tool 1" and has at least a portion thereof lying on the front surface 26" (see FIG. 3D).

Figure 3I:
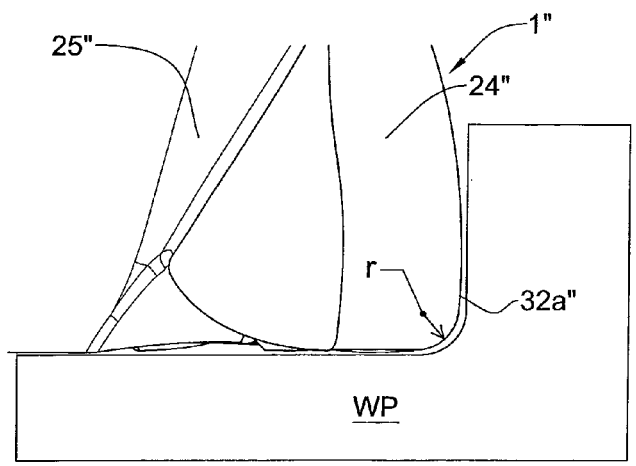
FIGS. 3I to 3K are schematic enlarged views of the milling tool shown in FIG. 3C during three consecutive stages of operation.
Figure 3J:
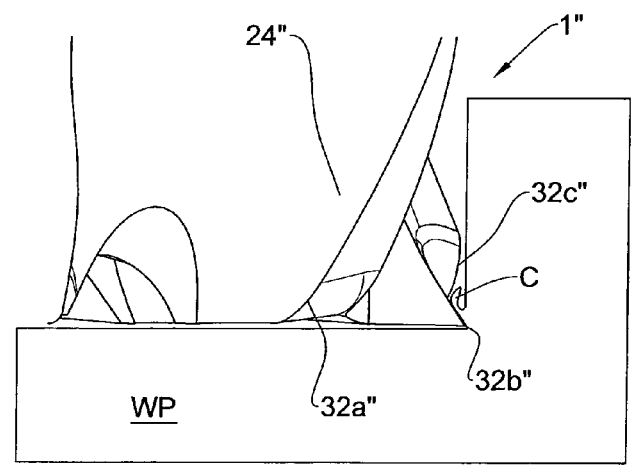
Figure 3K:
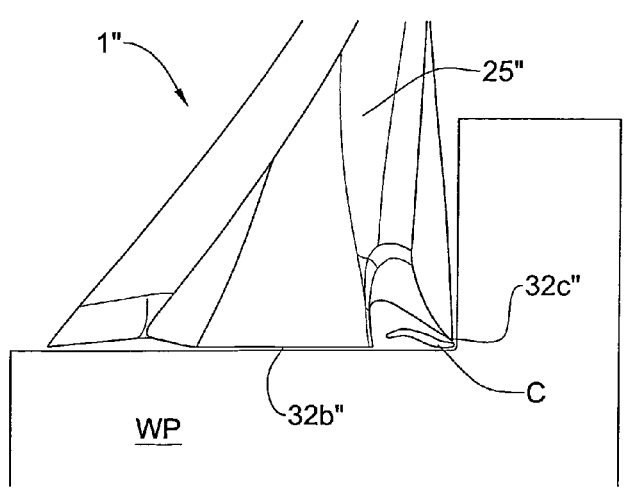
Figure 3L:
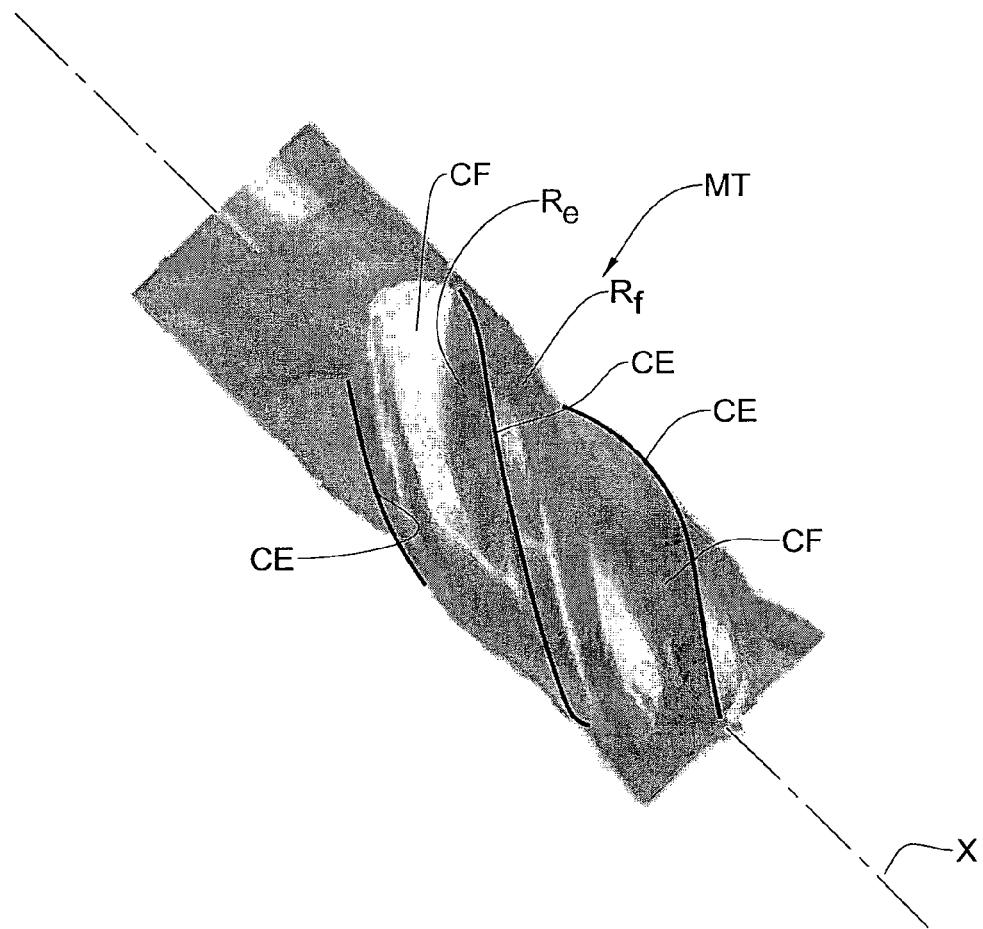
FIG. 3L is a schematic isometric view of a milling tool according to prior art.

With reference to FIGS. 3I to 3K, in operation of the above milling tool 1", when the milling tool 1" penetrates a workpiece WP, the first cutting edge to come in contact with the workpiece WP is the first cutting edge 32a". Upon penetration of the first cutting edge 32a" into the workpiece (FIG. 3I), it removes therefrom a chip and leaves the workpiece WP with a straight bottom surface BS, a straight side surface SS and a bridging rounded corner RC of radius r, corresponding to the radius r of the first cutting edge 32a".

Thereafter, the second cutting edge 32b" penetrates the workpiece WP at the rounded corner RC left by the first cutting edge 32a", and peels off a chip C in an axially upwards direction (FIG. 3J), leaving the workpiece with a straight bottom surface BS, extending all the way to the side surface SS, i.e. straightening the bottom portion of the rounded corner RC.

At the final stage, the third cutting edge 32c" penetrates the workpiece WP to come in contact with the side of the rounded corner RC (FIG. 3K), and peeling off the remainder of the chip C so as to leave a completely straight, non-rounded corner NRC in the workpiece WP.

In milling tools, the first cutting edge to penetrate a workpiece WP takes on the majority of the load. Under the above arrangement, since the first cutting edge 32a" to penetrate the workpiece WP is succeeded by to additional cutting edges 32b" and 32c", it may be rounded, making it more resistible to the load applied thereto during the cutting operation.

It is also noticed that both the second cutting edge 32b" and the third cutting edge 32c" are oriented transversely to the cutting edge 32a", in a manner similar to the unique orientation of cutting edges as discussed in the previous example of the milling tool 1.

It should be clear that most principles and features described above with respect to cutting tools 1 and 1" and/or shown in FIGS. 1A to 3J, are not restricted to those cutting tools (1, 1") in connection with which they are described/shown, and may independently be applied, mutatis mutandis, to each other or to any other tools, in any combination considered to be appropriate by a person skilled in the art.

Figure 4A:
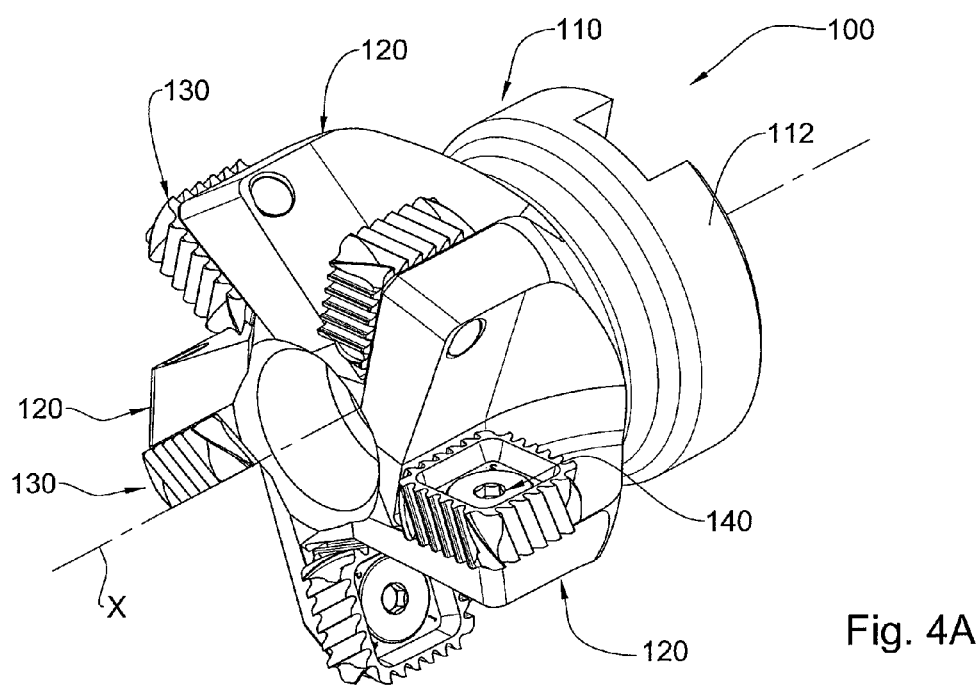
FIG. 4A is a schematic isometric view of a milling tool according to another example of the disclosed subject matter.
Figure 4B:
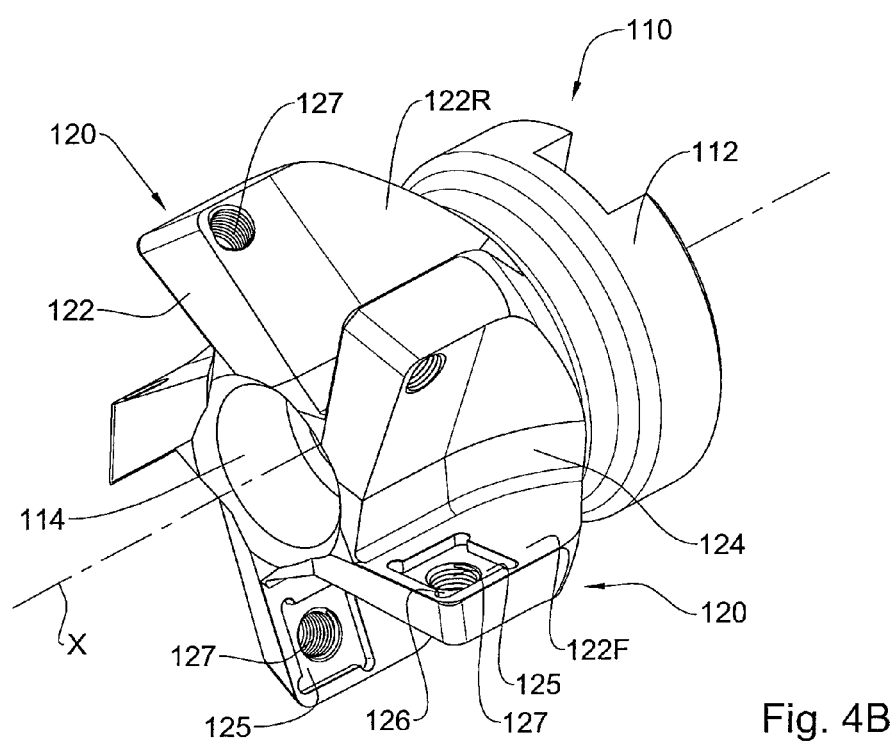
FIG. 4B is a schematic isometric view of a milling tool holder used in the milling tool shown in FIG. 4A.

Turning now to FIGS. 4A and 4B, there is shown another milling tool generally designated as 100, and comprising a milling tool holder 110 having five insert mounting portions 120, each having an insert seat 125 adapted to receive therein a cutting insert 130. Each of the cutting inserts 130 is secured to its respective insert seat 125 by a fastening bolt 140.

The milling tool 100 is adapted to rotate about a central axis X thereof, and to engage a workpiece WP (not shown) such that cutting edges 132 of the cutting inserts 130 come in contact with the workpiece WP and remove material therefrom in the form of chips.

Each mounting portion 120 is formed as a radial extension 122, such that chip evacuation flutes 124 extend between each two neighboring extensions 122. Each such extension has a front face 122F facing in the CW direction with respect to the central axis X, and a rear face 122R facing in the CCW direction with respect to the central axis X.

The front face 122F of each extension 122 is formed with an indented insert seat 125, having a rectangular shape, and adapted to receive therein a corresponding rectangular bulge of the cutting insert 130. The insert seat 125 is further formed with a threaded hole 127 adapted to receive therethrough the fastening bolt 140, and four release recesses 126, each formed at a corner of the rectangular insert seat 125.

Turning now to FIGS. 5A to 5D, a rectangular cutting insert 130 is shown having a top face 130T, a bottom face 130B, and four side faces 130S extending therebetween. The cutting insert 130 is formed with a central cavity 135 extending part-way from the top face 130T towards the bottom face. The cutting insert 130 is further formed with a fastening hole 137 adapted to receive therein the fastening bolt 140, and defining a central axis X of the cutting insert 130.

Figure 5B:
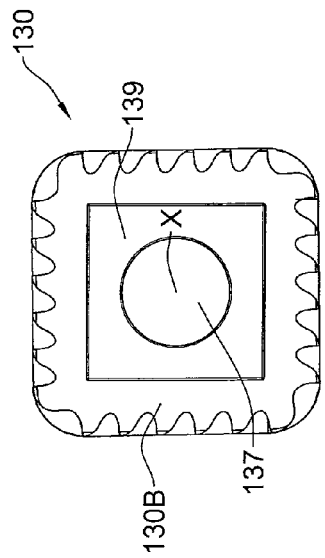
FIGS. 5A to 5D are, respectively, schematic isometric, front, top and bottom views of a cutting insert used in the milling tool shown in FIG. 4A.
Figure 5D:
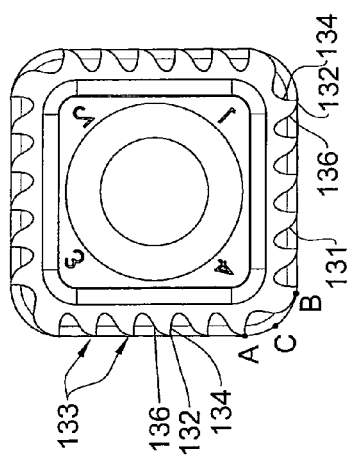
Figure 5A:
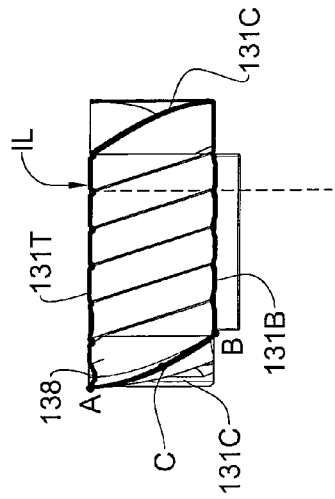
Figure 5C:
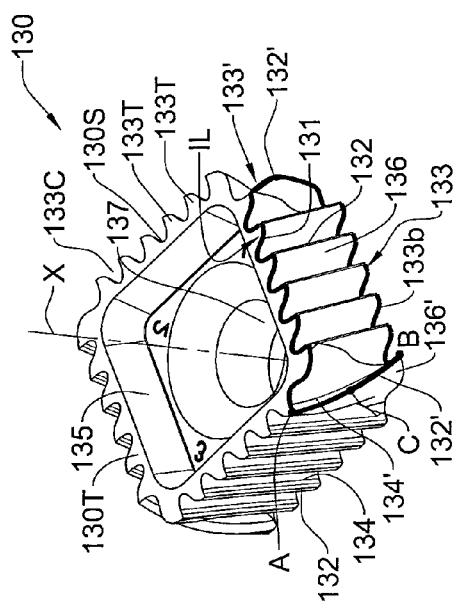
Figure 5E:
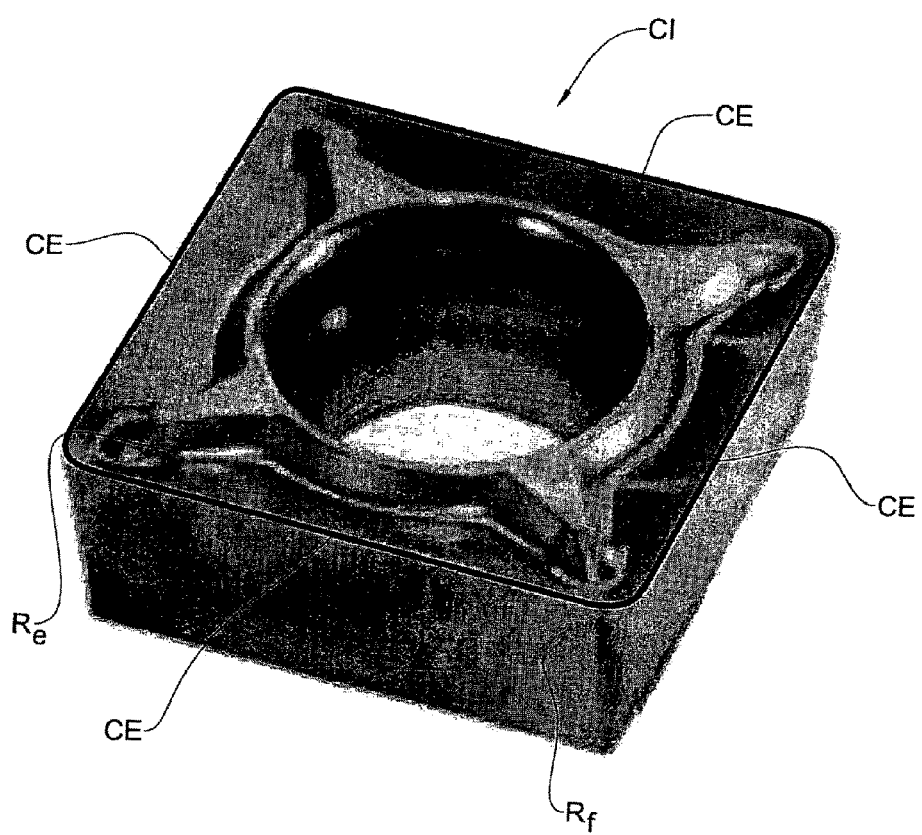
FIG. 5E is a schematic isometric view of a cutting insert according to prior art.

The cutting insert 130 of the present example is formed with an intersection line IL defined at the intersection between the top face 130T and the side face 130S of the cutting insert 130. However, this intersection line IL does not necessarily need to be a cutting edge, and the top face 130T and the side face 130S of the cutting insert 130 do not necessarily have to constitute respective rake and relief surface Re, Rf for the intersection line IL. This is in view of the cutting insert 130 being formed a plurality of cutting edges 132 which are oriented transversely to the intersection line IL (rather than lying along it). Nonetheless, as will be further described, the intersection line IL may optionally be used as a cutting edge, in which case it serves as an auxiliary cutting edge of the cutting insert 130. In comparison, with reference to FIG. 5E, a conventional cutting insert CI is shown which is formed with four cutting edges CE, each lying only along an intersection line defined between a top face and a side face of the conventional cutting insert CI, which constitute a rake surface Re and a relief surface Rf for the intersection line. It is noted that in the conventional cutting insert CI, the intersection lines serve as the only cutting edges CE of the cutting insert CI.

Reverting back to FIGS. 5A to 5D, in the cutting insert 100, each of the side faces 130S forms a cutting portion having a cutting surface CS, defined by a closed-contour boundary line 131 extending along a portion 131a of the top face 130T which is constituted by the intersection line IL, a portion 131b of the bottom face 130B and along portions 131c of two corner cutting edges 132'.

The cutting surface CS is formed thereon with five cutting teeth 133 extending within the cutting surface CS from the boundary line portion located on the top face 130T and the boundary line portion located on the bottom face 130B. Each cutting tooth is formed with a cutting edge 132 defined at the intersection between a rake surface 134 and a relief surface 136, similar to the cutting teeth 33 previously described with respect to the integral milling tool 1.

It is observed that the cutting edges 132 are angled at a minor inclination angle α with respect to the axis X of the cutting insert 130, and with respect to the axis X of the milling tool 100, when the cutting inserts 130 are mounted onto the insert seats 120. The inclination angle α is considerably smaller than 45°, e.g. 30°, 20°, 10° and even less. Between each two neighboring cutting teeth 133, there extends a minor chip evacuation channel 133C, adapted to evacuate chips of material removed from the workpiece WP.

The cutting edges 132, and in particular the inclination angle α, are designed such, that a top portion of one cutting edge 132 overlaps the bottom portion of an adjacent cutting edge 132, so that there is formed, in projection, a continuous cutting edge (the term 'continuous cutting edge' refers herein to the cutting edge experienced by the workpiece WP). This is better demonstrated by the reference line RL shown in FIG. 5B.

It is further noted that the cutting insert 130 is further formed with four corner teeth 133', each being formed with a corner cutting edge 132', defined as an intersection between a rake surface 134' and a relief surface 136'. The corner cutting edge 132' extends helically from a top portion 133T of a cutting tooth 133 formed on one side face 130S to the bottom portion 133B of a cutting tooth formed on an adjacent side face 130S. The arrangement is such that each corner cutting edge 132' is shared by two adjacent cutting surfaces CS. The purpose of the cutting edge 132' will be explained in detail later with respect to the operation of the cutting insert 130.

It is further noted that, in this particular example, the boundary line portion 131a also serves as auxiliary cutting edge, i.e. it is adapted, under appropriate conditions to remove material from a workpiece WP in addition to the cutting edges 132. It is observed that a portion 133T of each cutting tooth 133 curls upwards, forming an auxiliary rake surface 138 adapted to work in conjunction with the boundary line portion 131a. Thus, during operation, two chip removal operations may take place at once: removal of chip by the portion 131a which are discharged to the chip removing flute 124 to the left of the cutting portion, and removal of the remainder of the chip of material by the cutting edges 132, which are eventually discharged through the chip removing flute 124 to the right of the cutting portion as previously described.

At the bottom face 130B thereof, the cutting insert 130 is formed with a rectangular extension 139 adapted to be received within a corresponding insert seat 125 formed in the extension 122 of the cutting tool holder.

Figure 4C:
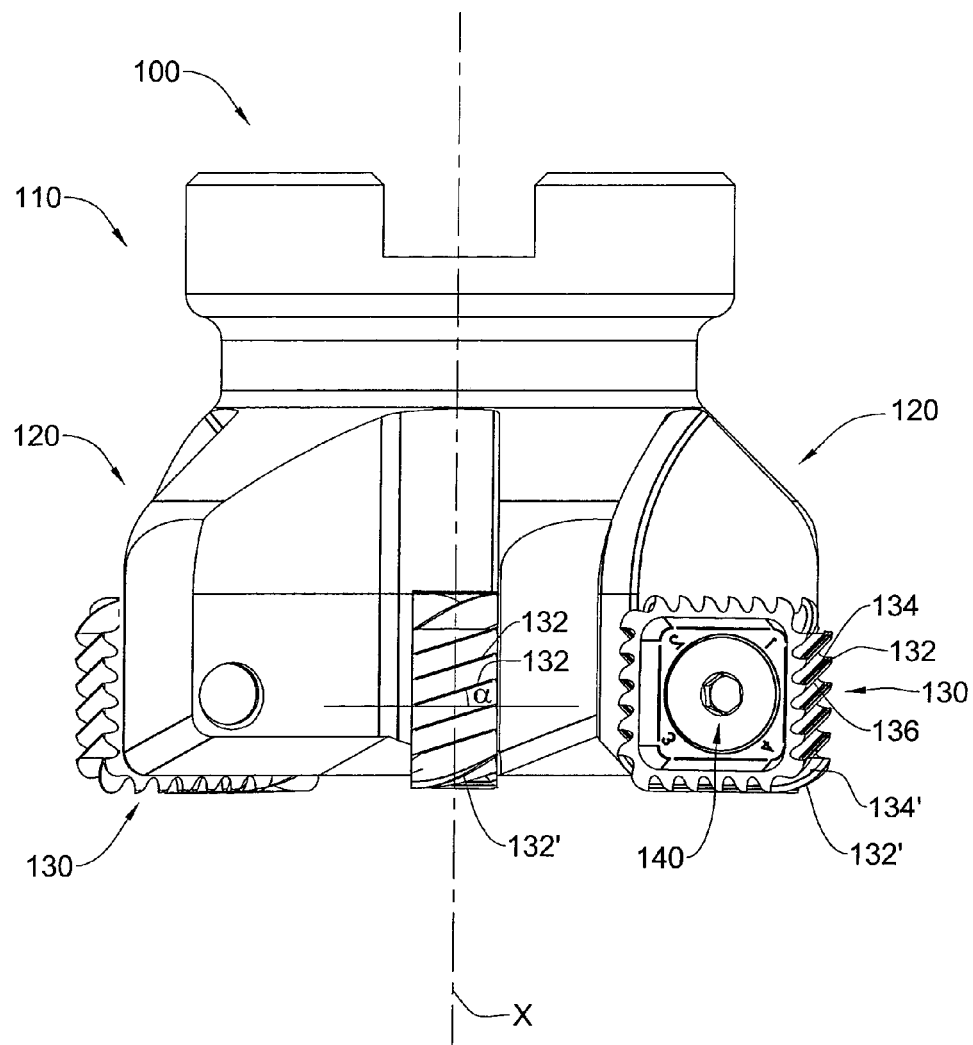
FIG. 4C is a schematic front view of the milling tool shown in FIG. 4A.

Turning now back to FIG. 4C, in assembly, each cutting insert 130 is mounted onto a respective insert seat 125, such that the rectangular extension 139 thereof is received therein. Thereafter, the fastening bolt 140 is inserted through the fastening hole 137 of the cutting insert 130 and is threaded into the threaded fastening hole 127 of the insert seat 125. It is noted that each of the cutting inserts 130 is indexable, having four cutting surfaces CS, indexing being performed by rotating the cutting insert 130 about its central axis X.

In operation, the milling tool 100 is adapted to rotate about the central axis X, such that the cutting edges 132 come in contact with a workpiece WP (not shown), to remove material therefrom. Thus, similar to the previously described milling tool 1, in particular with reference to FIG. 1D, during operation, the cutting edges 132 penetrate the workpiece WP at a very minor inclination angle α, and peal away chips of material from the workpiece WP. Thereafter, the chips progress through the chip evacuation channels 133C in a CCW (i.e. in a direction opposite the direction of rotation of the milling tool 100), and are discharged to the chip evacuation flutes 124 between each two extensions 122, to be then evacuated from the milling tool 100 in a conventional manner.

It should also be mentioned that due to the unique orientation of the cutting edges 132 of the cutting insert 130, during a cutting operation, the loads applied thereto, attempt to rotate the cutting insert 130 about the central axis thereof. However, due to the specific rectangular shape of the insert seat 125 and corresponding shape of the extension 139, the cutting insert 130 is prevented from performing such rotation.

It is noted that during operation of the milling tool 100, the corner cutting edge 132' allows the milling tool 100 to remove material both from a side of the milling tool 100 and a bottom of the milling tool 100, i.e. the milling tool 100 is able to penetrate a workpiece sideways and/or from above. Thus, the corner cutting edge 132' completes the continuous projected cutting edge (i.e. the effective cutting edge experienced by the workpiece) formed by plurality of cutting edges 132.

In general, the operation of the milling tool 100 is similar to the operation of the milling tool 1 previously described, with the only difference being in the structure of the milling tool, i.e. integral milling tool (1) vs. a milling tool (100) comprising cutting inserts 130.

It should be clear that most principles and features described above with respect to cutting tools 1, 1" and 100 and/or shown in FIGS. 1A to 5D, are not restricted to those cutting tools (1, 1", 100) in connection with which they are described/shown, and may independently be applied, mutatis mutandis, to each other or to any other tools, in any combination considered to be appropriate by a person skilled in the art.

Figure 6A:
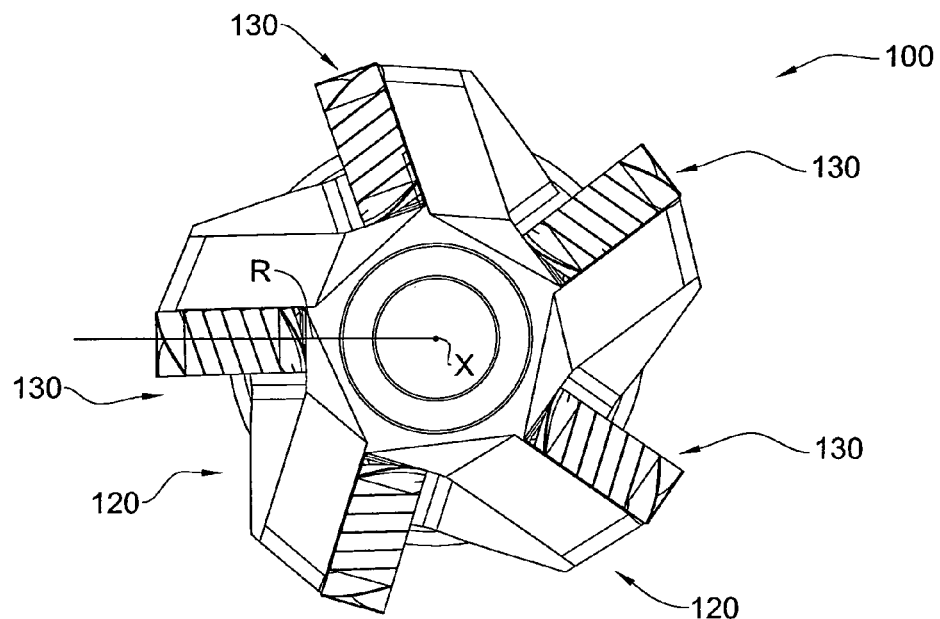
FIGS. 6A and 6B are schematic bottom views of two examples of milling tools according to the disclosed subject matter, in which the cutting inserts used therein have different mounting orientations.
Figure 6B:
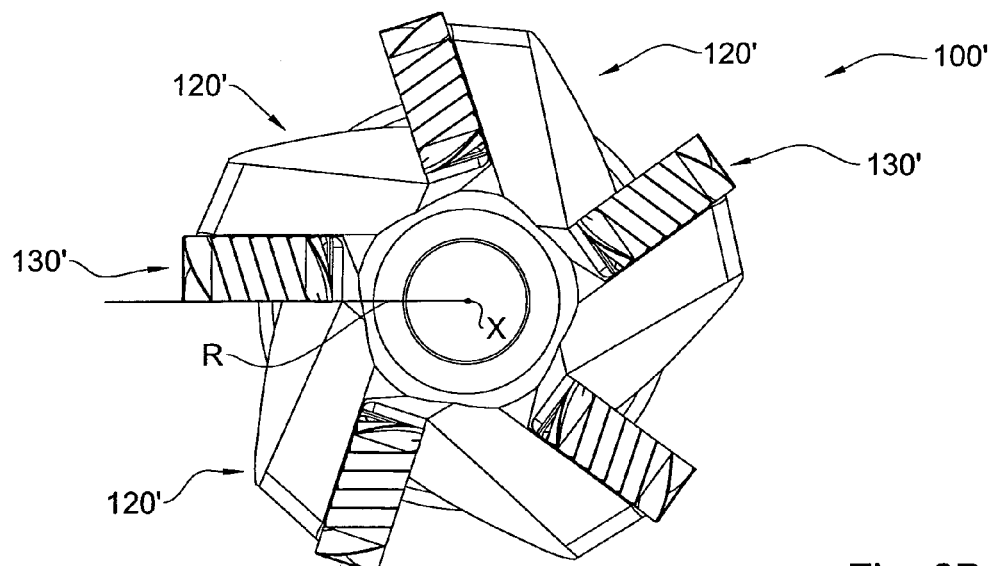

Turning now to FIGS. 6A and 6B, the milling tool 100 and an additional milling tool 100' are shown respectively, differing from one another by their tool holders, and in particular, by the resulting orientation of the cutting inserts 130 thereon.

It is observed that in the milling tool 100, the cutting inserts 130 are oriented such that the mid-plane thereof, i.e. a plane extending between the top face 130T and the bottom face 130B and parallel thereto, is aligned with the central axis X of the milling tool 100, i.e. the axis X is located on the mid-plane. Contrary to the milling tool 100, in the milling tool 100', the cutting inserts are oriented such that the plane of the top face 130T (and not the mid-plane) is aligned with the central axis X of the milling tool 100'.

Figure 7A:
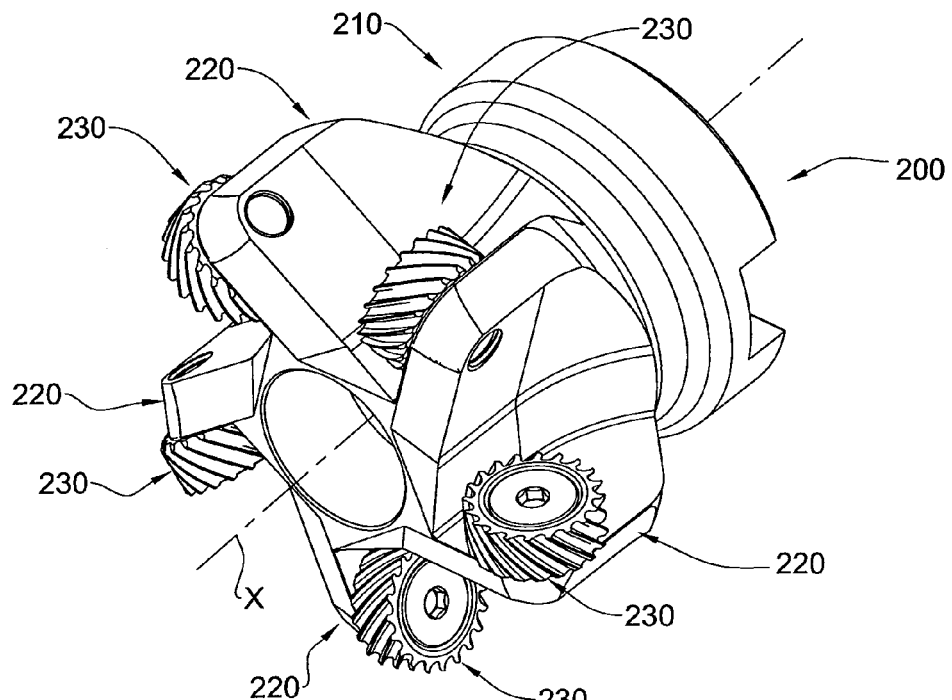
FIG. 7A is a schematic isometric view of a milling tool according to still another example of the disclosed subject matter.
Figure 7B:
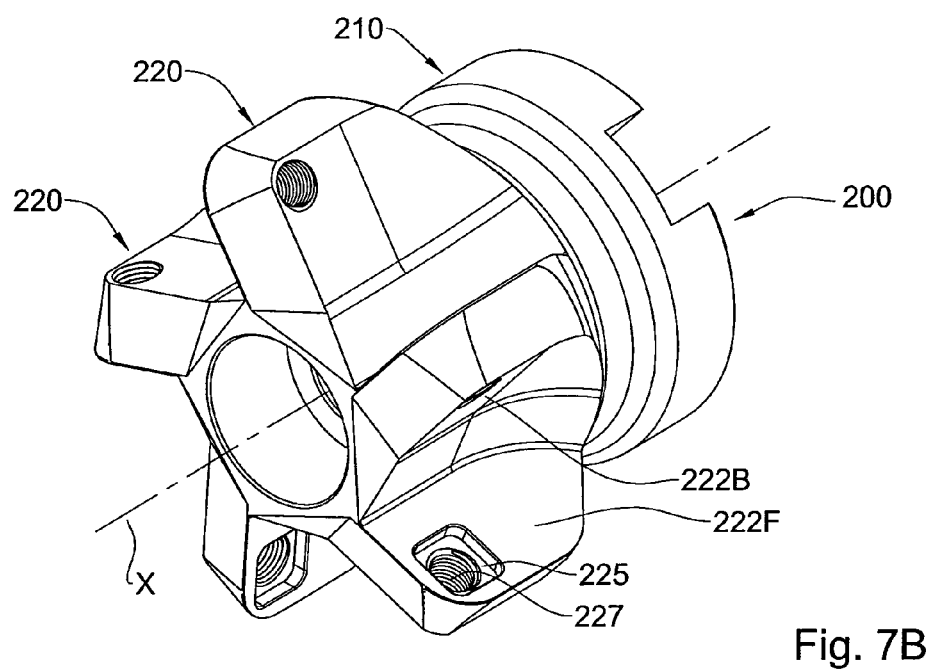
FIG. 7B is a schematic isometric view of a milling tool holder used in the milling tool shown in FIG. 7A.

Turning now to FIGS. 7A and 7B, there is shown an additional milling tool, generally designated as 200, and comprising a milling tool holder 210 having five insert mounting portions 220, each having an insert seat 225 adapted to receive therein a cutting insert 230. Each of the cutting inserts 230 is secured to its respective insert seat 225 by a fastening bolt 240. For purpose of convenience, elements in the milling tool 200 which are similar to elements of the milling tool 100 were designated with similar designation number, but upped by 100 (e.g. cutting tool holder 210 of the milling tool 200 is similar to the cutting tool holder 110 of the milling tool 100).

The milling tool 200 is generally similar to the milling tool 100 previously described, with the difference being in the shape of the cutting inserts 230, which are circular rather than rectangular. Another difference between the milling tools 100, 200 lies in the design of the cutting insert seat 125, 225, in that the milling tool 200 does not have corner recesses similar to the corner recesses 126 of the milling tool 100. However, it should be clear that this feature is fully interchangeable, i.e. such recesses may be easily formed and provide the milling tool 200 with the same advantages as provided in the milling tool 100.

Turning now to FIGS. 8A to 8D, the circular cutting insert 230 is shown having a top face 230T, a bottom face 230B, and a side face 230S extending therebetween. The cutting insert 230 is formed with a central cavity 235 extending part-way from the top face 230T towards the bottom face 230B. The cutting insert 230 is further formed with a fastening hole 237 adapted to receive therein the fastening bolt 240, and defining a central axis X of the cutting insert 230.

Figure 8B:
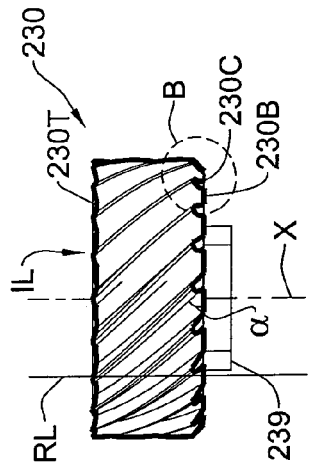
FIGS. 8A to 8D are, respectively, schematic isometric, front, top and bottom views of a cutting insert used in the milling tool shown in FIG. 7A.
Figure 8D:
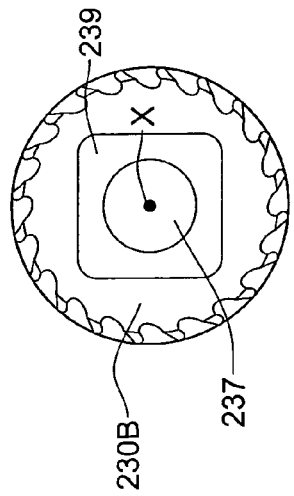
Figure 8A:
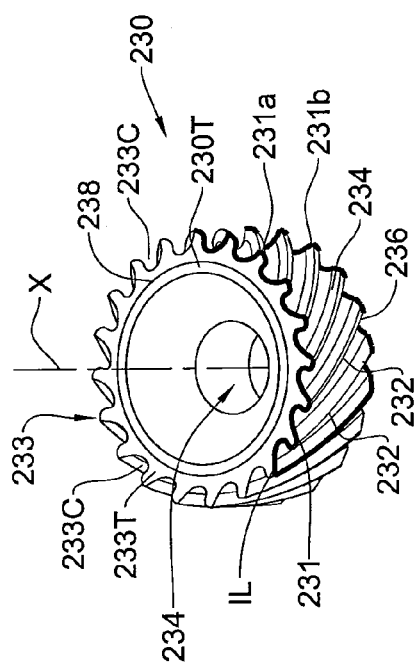
Figure 8C:
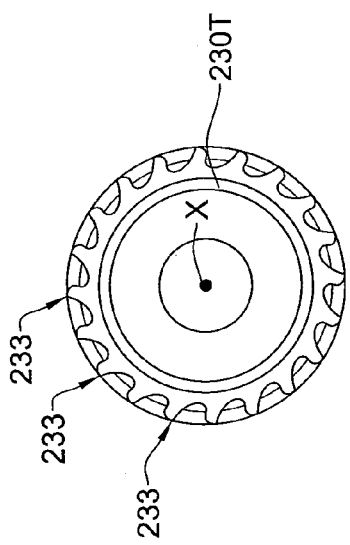
Figure 8E:
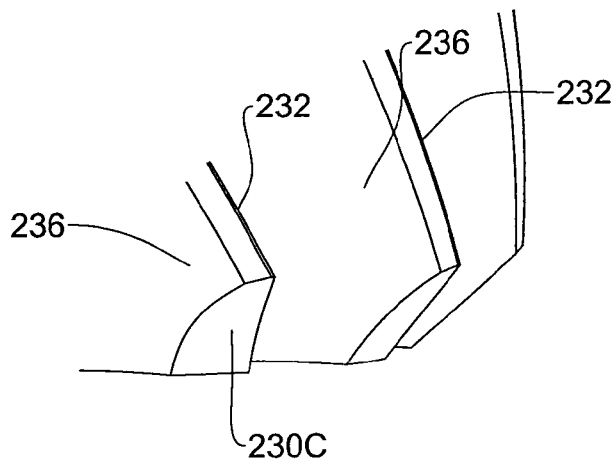
FIG. 8E is a schematic enlarged view of detail B shown in FIG. 8B.
Figure 8F:
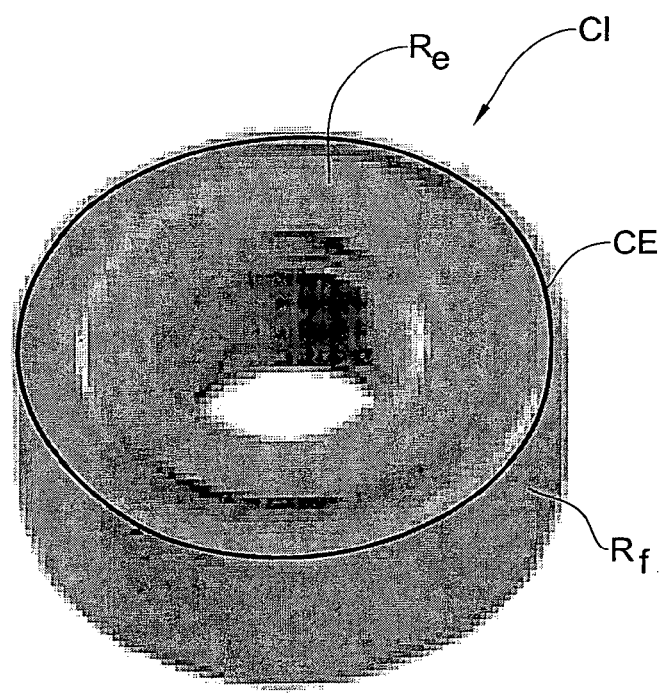
FIG. 8F is a schematic isometric view of a cutting insert according to prior art.

The cutting insert 230 of the present example is formed with an intersection line IL defined at the intersection between the top face 230T and the side face 230S of the cutting insert 230. However, this intersection line IL does not necessarily need to be a cutting edge, and the top face 230T and the side face 230S of the cutting insert 230 do not necessarily have to constitute respective rake and relief surface Re, Rf for the intersection line IL. This is in view of the cutting insert 230 being formed a plurality of cutting edges 232 which are oriented transversely to the intersection line IL (rather than lying along it). Nonetheless, as will be further described, the intersection line IL may optionally be used as a cutting edge, in which case it serves as an auxiliary cutting edge of the cutting insert 230. In comparison, with reference to FIG. 8F, a conventional cutting insert CI is shown which is formed with a circular cutting edge CE lying only along an intersection line defined between a top face and a side face of the conventional cutting insert CI, which constitute a rake surface Re and a relief surface Rf for the intersection line. It is noted that in the conventional cutting insert CI, the intersection line serves as the only cutting edge CE of the cutting insert CI.

A portion of the side face 230S forms a cutting portion having a cutting surface CS, defined by a closed-contour boundary line 231 extending along a portion 231a of the top face 230T constituted by the intersection line IL, a portion 231b of the bottom face 230B and along two cutting edges 232. In this particular example of a circular cutting insert 232, the cutting surface CS may be defined as the surface adapted to engage the material of the workpiece WP. Alternatively, it may be simpler defined as half the side face 230S (i.e. spanning 180°).

The cutting surface CS is thus formed thereon with nine cutting teeth 233 extending within the cutting surface CS from the boundary line portion 231a located on the top face 230T and the boundary line portion 231b located on the bottom face 230B. Each cutting tooth 233 is formed with a cutting edge 232 defined at the intersection between a rake surface 234 and a relief surface 236, similar to the cutting teeth 133 previously described with respect to the integral milling tool 100.

It is observed that the cutting edges 232 are angled at an inclination angle α with respect to the axis X, and with respect to the axis X of the milling tool 200, when the cutting inserts 230 are mounted onto the insert seats 220. The inclination angle α is about 45°, but it is appreciated that it may also be smaller, e.g. 30°, 20°, 10° and even less. Between each two cutting teeth 233, there extends a chip evacuation channel 233C, adapted to evacuate chips of material removed from the workpiece WP.

The cutting edges 232, and in particular the inclination angle α, are designed such, that a top portion of one cutting edge 232 overlaps the bottom portion of an adjacent cutting edge 232, so that there is formed, in projection, a continuous cutting edge (the term 'continuous cutting edge' refers herein to the cutting edge experienced by the workpiece WP). This is better demonstrated by the reference line RL shown in FIG. 8B. In this particular example, each cutting edge 232 overlaps not only the bottom portion of the cutting edge 232 adjacent thereto, but also the bottom cutting portion of the cutting edge 232 which is spaced therefrom by this adjacent cutting edge 232.

It is further noted, in this particular example, that the boundary line portion 131a also serves as an auxiliary cutting edge, i.e. it is adapted, under appropriate conditions to penetrate the workpiece WP in addition to the cutting edges 232, and remove material therefrom. It is also observed that a top portion 233T of each cutting tooth 233 curls upwards, forming an auxiliary rake surface 238 adapted to work in conjunction with the boundary line portion 231a. Thus, during operation, two chip removal operations may take place at once: removal of chip by the top portion 231a which are discharged to the chip removing flute 224 to the left of the cutting portion, and removal of the remainder of the material by the cutting edges 232 which are eventually discharged through the chip removing flute 224 to the right of the cutting portion as previously described.

In addition, the bottom of the cutting teeth 233 is formed with a chamfer portion 230C, which is adapted to better withstand the loads applied to the cutting teeth 233 during penetration into and progression through the workpiece WP.

At the bottom face 230B thereof, the cutting insert 230 is formed with a rectangular extension 239 adapted to be received within a corresponding insert seat 225 formed in the extension 222 of the cutting tool holder.

In assembly, each cutting insert 230 is mounted onto a respective insert seat 225, such that the rectangular extension 239 thereof is received therein. Thereafter, the fastening bolt 240 is inserted through the fastening hole 237 of the cutting insert 230 and is threaded into the threaded fastening hole 227 of the insert seat 225. It is noted that each of the cutting inserts 230 is indexible, and due to the four sides of the rectangular extension 239, may assume four different orientations, indexing being performed by rotating the cutting insert 230 about its central axis X.

In operation, the milling tool 200 is similar to the milling tool 100 previously disclosed. As in the previous milling tool 100, the milling tool 200 is adapted to rotate about the central axis X, such that the cutting edges 232 come in contact with a workpiece WP (not shown), to remove material therefrom. Thus, similar to the previously described milling tool 1, in particular with reference to FIG. 1D, during operation, the cutting edges 232 penetrate the workpiece WP at an inclination angle α, and peal away chips of material from the workpiece WP. Thereafter, the chips progress through the chip evacuation channels 233C in a CCW (i.e. in a direction opposite the rotation of the milling tool 200), and are discharged to the chip evacuation flutes 224 between each two extensions 222, to be evacuated from the milling tool 200 in a conventional manner.

It should also be mentioned that due to the unique orientation of the cutting edges 232 of the cutting insert 230, during a cutting operation, the loads applied thereto, attempt to rotate the cutting insert 230 about the central axis thereof. However, due to the specific rectangular shape of the insert seat 225 and corresponding shape of the extension 239, the cutting insert 230 is prevented from performing such rotation.

As in the previously described milling tool 1, upon sufficiently rapid penetration of the milling tool 200 into the workpiece WP and sufficient feed, the auxiliary cutting edge 231a will also come in contact with the workpiece WP, and will remove material therefrom.

It should be clear that most principles and features described above with respect to cutting tools 1, 1", 100, 100' and 200, and/or shown in FIGS. 1A to 8E, are not restricted to those cutting tools (1, 1", 100, 100' and 200) in connection with which they are described/shown, and may independently be applied, mutatis mutandis, to each other or to any other tools, in any combination considered to be appropriate by a person skilled in the art.

Figure 9:
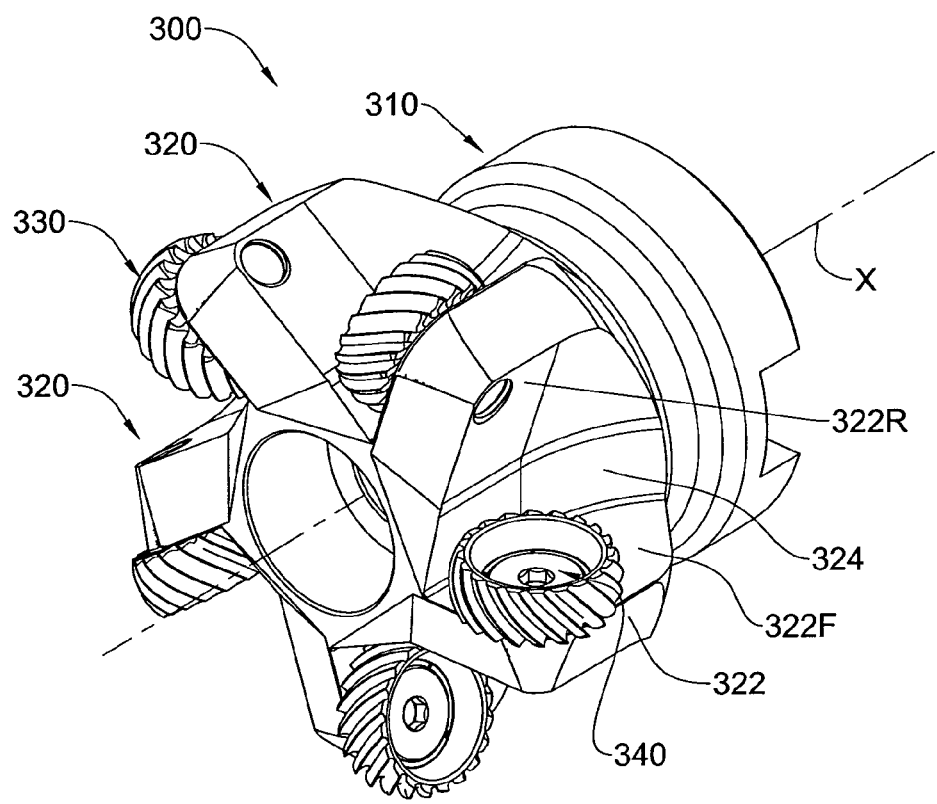
FIG. 9 is a schematic isometric view of a milling tool according to still another example of the disclosed subject matter.

Turning now to FIG. 9, there is shown still another milling tool, generally designated as 300, and comprising a milling tool holder 310 having five insert mounting portions 320, each having an insert seat 325 (not seen) adapted to receive therein a cutting insert 330. Each of the cutting inserts 330 is secured to its respective insert seat 325 by a fastening bolt 340. For purpose of convenience, elements in the milling tool 300 which are similar to elements of the milling tool 200 were designated with similar designation number, but upped by 100 (e.g. cutting tool holder 310 of the milling tool 300 is similar to the cutting tool holder 210 of the milling tool 200).

The milling tool 300 is generally similar to the milling tool 200 previously disclosed, with the difference being in the shape of the cutting inserts 230, in which the side face 330S is convex, rather than straight, i.e. Barrel shaped.

Turning now to FIGS. 10A to 10D, the circular cutting insert 330 is shown having a top face 330T, a bottom face 330B, and a side face 330S extending therebetween. The cutting insert 330 is formed with a central cavity 335 extending part-way from the top face 330T towards the bottom face 330B. The cutting insert 330 is further formed with a fastening hole 337 adapted to receive therein the fastening bolt 340, and defining a central axis X of the cutting insert 330.

The cutting insert 330 of the present example is formed with an intersection line IL defined at the intersection between the top face 330T and the side face 330S of the cutting insert 330, similar to the cutting insert 230 previously described. Similarly, this intersection line IL does not necessarily need to be a cutting edge, and the top face 330T and the side face 330S of the cutting insert 330 do not necessarily have to constitute respective rake and relief surface Re, Rf for the intersection line IL. This is in view of the cutting insert 330 being formed a plurality of cutting edges 332 which are oriented transversely to the intersection line IL (rather than lying along it). Nonetheless, as will be further described, the intersection line IL may optionally be used as a cutting edge, in which case it serves as an auxiliary cutting edge of the cutting insert 330. In comparison, with reference to previously described FIG. 8F, a conventional cutting insert CI is shown which is formed with a circular cutting edge CE lying only along an intersection line defined between a top face and a side face of the conventional cutting insert CI, which constitute a rake surface Re and a relief surface Rf for the intersection line. It is noted that in the conventional cutting insert CI, the intersection line serves as the only cutting edge CE of the cutting insert CI.

As in the cutting insert 230 previously described, a portion of the side face 330S forms a cutting portion having a cutting surface CS, defined by a closed-contour boundary line 331 extending along a portion 331a of the top face 330T, a portion 331b of the bottom face 230B and along two cutting edges 332. In this particular example of a circular cutting insert 332, the cutting surface CS may be defined as the surface adapted to engage the material of the workpiece WP. Alternatively, it may be simpler defined as half the side face 330S (i.e. spanning 180°).

The difference between the cutting inserts 230 and 330 lies in the barrel shape design of the cutting insert 330. In particular, the cutting insert 330 has a diameter D at the center thereof which is greater than the diameter d of the top face 330T or bottom face 330B. The term 'at the center' refers to a diameter measured along a plane parallel to the top face 330T and bottom face 330B, and located therebetween.

The cutting surface CS is defined in the present cutting insert 330 similarly to the cutting surface CS of the cutting insert 230. Also, as in the previously described cutting insert 230, the inclination angle α is about 45°, but it is appreciated that it may also be smaller, e.g. 30°, 20°, 10° and even less. Between each two cutting teeth 333, there extends a chip evacuation channel 333C, adapted to evacuate chips of material removed from the workpiece WP.

Although not shown specifically, the milling tool 300 has a similar structure of the insert seat 325 as that of the milling tool 225, and a design of the rectangular extension 339 of the cutting insert 330 which is similar to the design of the corresponding rectangular extension 239 of the cutting insert 230.

However, contrary to the cutting insert 230, the present cutting insert 330 is formed without a chamfer portion at the bottom of the cutting teeth 333. One of the reasons for this is that the barrel shape of the cutting insert 330 gives the cutting teeth 333 a natural acute angle with the bottom face 330B, making a chamfer portion redundant.

In operation, the milling tool 300 is similar to the milling tool 200 previously disclosed. As in the previous milling tool 200, the milling tool 300 is adapted to rotate about the central axis X, such that the cutting edges 332 come in contact with a workpiece WP (not shown), to remove material therefrom. Thus, similar to the previously described milling tool 1, in particular with reference to FIG. 1D, during operation, the chips removed from the workpiece progress through the chip evacuation channels 333C in a CCW (i.e. in a direction opposite the rotation of the milling tool 300), and are discharged to the chip evacuation flutes 324 between each two extensions 322, to be discharged from the milling tool 300 in a conventional manner.

As in the previously described milling tool 1, upon sufficiently rapid penetration of the milling tool 300 into the workpiece WP, the auxiliary cutting edge 331a will also come in contact with the workpiece WP, and will remove material therefrom.

An additional feature of the cutting insert 330 is the design of the cutting teeth 333. With particular reference to FIGS. 10C and 10D, it is observed that the width of each cutting tooth 333 varies gradually between the top face 330T and the bottom face 330B. More specifically, the width of the cutting tooth 333 at the top face 330T is T, which the width of the cutting tooth 333 at the bottom face 330B is t, which is smaller than T, i.e. t≤T. Since the majority of the load exerted on the cutting teeth 333 by the workpiece WP is applied to the top portion of the cutting teeth 333 during penetration into the workpiece WP, it is possible to 'save' on material at the bottom portion of the cutting teeth 333, thereby reducing the cost of the cutting insert 330.

It should be clear that most principles and features described above with respect to cutting tools 1, 1", 100, 100', 200 and 300, and/or shown in FIGS. 1A to 10D, are not restricted to those cutting tools (1, 1", 100, 100', 200 and 300) in connection with which they are described/shown, and may independently be applied, mutatis mutandis, to each other or to any other tools, in any combination considered to be appropriate by a person skilled in the art.

Figure 11:
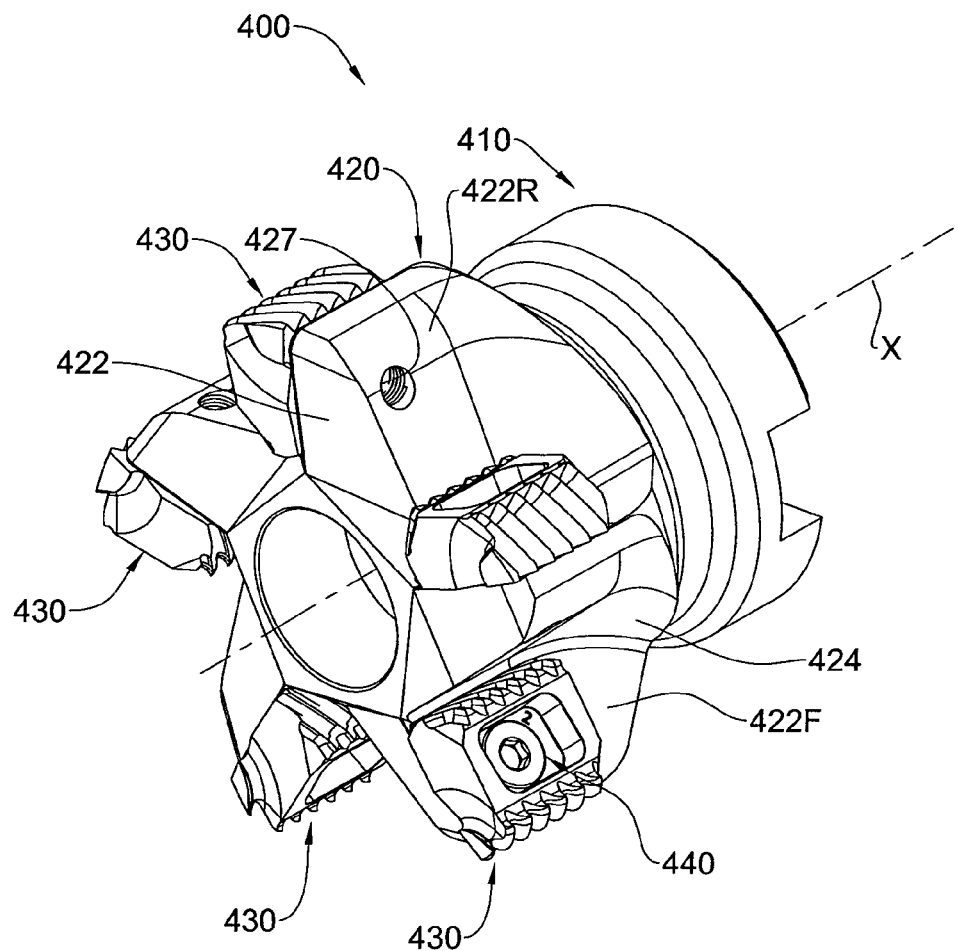
FIG. 11 is a schematic isometric view of a milling tool according to still another example of the disclosed subject matter.
Figure 12E:
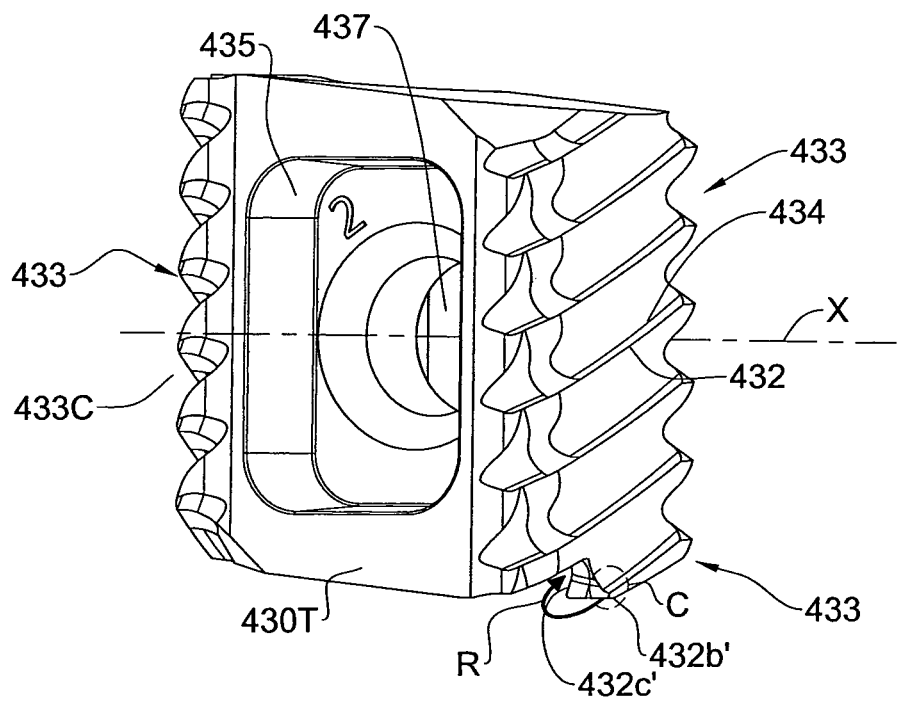
FIG. 12E is a schematic front isometric view of the cutting insert shown in FIGS. 12A to 12D.
Figure 12F:
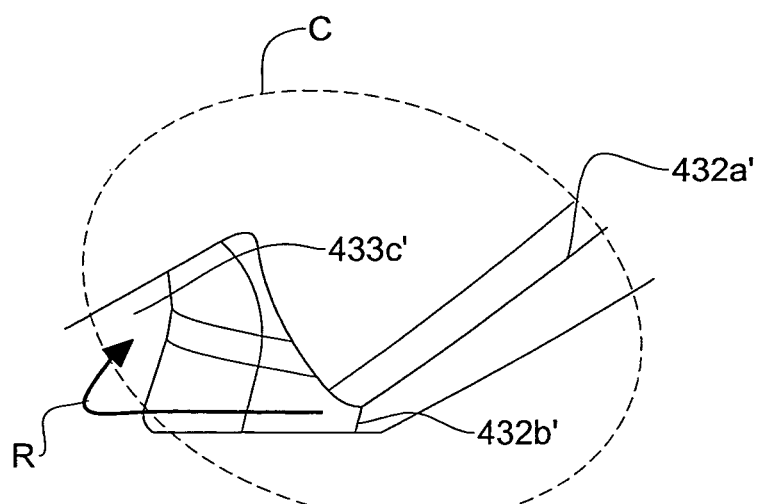
FIG. 12F is a schematic enlarged view of detail C shown in FIG. 12E.

Attention is now drawn to FIG. 11, there is shown yet another milling tool, generally designated as 400, and comprising a milling tool holder 410 having five insert mounting portions 420, each having an insert seat 425 (not seen) adapted to receive therein a cutting insert 430. Each of the cutting inserts 430 is secured to its respective insert seat 425 by a fastening bolt 440. For purpose of convenience, elements in the milling tool 300 which are similar to elements of the milling tool 300 were designated with similar designation number, but upped by 100 (e.g. cutting tool holder 410 of the milling tool 400 is similar to the cutting tool holder 310 of the milling tool 300).

The milling tool 400 is generally similar to the milling tool 300 previously disclosed, with the difference being in the design of the cutting edges 432 of the cutting inserts 430, as will now be explained.

Turning now to FIGS. 12A to 12E, the cutting insert 430 is shown having a top face 430T, a bottom face 430B, and side face 430S extending therebetween. The cutting insert 430 is formed with a central cavity 435 extending part-way from the top face 430T towards the bottom face 430B. The cutting insert 430 is further formed with a fastening hole 437 adapted to receive therein the fastening bolt 440, and defining a central axis X of the cutting insert 430.

The cutting insert 430 of the present example is formed with an intersection line IL defined at the intersection between the top face 430T and the side face 430S of the cutting insert 430. However, this intersection line IL does not necessarily need to be a cutting edge, and the top face 430T and the side face 430S of the cutting insert 430 do not necessarily have to constitute respective rake and relief surface Re, Rf for the intersection line IL. This is in view of the cutting insert 430 being formed a plurality of cutting edges 432 which are oriented transversely to the intersection line IL (rather than lying along it). Nonetheless, as will be further described, the intersection line IL may optionally be used as a cutting edge, in which case it serves as an auxiliary cutting edge of the cutting insert 430. In comparison, with reference to previously described FIG. 5E, the conventional cutting insert CI is shown formed with four cutting edges CE, each lying only along an intersection line defined between a top face and a side face of the conventional cutting insert CI, which constitute a rake surface Re and a relief surface Rf for the intersection line. It is noted that in the conventional cutting insert CI, the intersection lines serve as the only cutting edges CE of the cutting insert CI.

Two of the side face 430S of the cutting tool 430 are formed with a cutting portion having a cutting surface CS, defined by a closed-contour boundary line 431 extending along a portion 431a of the top face 430T constituted by the intersection lien IL, a portion 431*b* of the bottom face 430B and along two cutting edges 432.

The cutting surface CS is defined in the present cutting insert 430 similarly to the cutting surface CS of the cutting insert 130. Also, as in the previously described cutting insert 130, the inclination angle α is about 45°, but it is appreciated that it may also be smaller, e.g. 30°, 20°, 10° and even less. Between each two cutting teeth 433, there extends a chip evacuation channel 433C, adapted to evacuate chips of material removed from the workpiece WP.

It is noted that the cutting insert 430 is further formed with two corner teeth 433', each being formed with a first corner cutting edge 432*a'* and a second corner cutting edge 432*b'*. The first corner cutting edges 432*a'* extends parallel to the other cutting edges 432, while the second corner cutting edge 432*b'* extends generally parallel to the top face 430T of the cutting insert 430. The arrangement is such that the second corner cutting edge 432*b'* forms an approximate 90° angle, whereby, during operation, a right angle within the workpiece WP may be formed without leaving a radius (fillet).

In addition, an auxiliary chip evacuation channel 433C' is formed on the side face adjacent the side face formed with the cutting surface CS, adapted to evacuate chips removed by the second corner cutting edge 432*b'*.

At the bottom face 430B thereof, the cutting insert 430 is formed with a rectangular extension 439 adapted to be received within a corresponding insert seat 425 formed in the extension 422 of the cutting tool holder. However, contrary to previously described cutting inserts, in the present example the rectangular extension 439 of the cutting insert 430 is in the form of a frame, rather than a full rectangle. Nonetheless, assembly thereof is generally similar to the assembly of previously described cutting inserts, e.g. 130.

In operation, the milling tool 400 is adapted to rotate about the central axis X, such that the cutting edges 432 come in contact with a workpiece WP (not shown), to remove material therefrom. Thus, similar to the previously described milling tool 1, in particular with reference to FIG. 1D, during operation, the cutting edges 432 penetrate the workpiece WP at a very minor inclination angle α, and peal away chips of material from the workpiece WP. Thereafter, the chips progress through the chip evacuation channels 433C in a CCW (i.e. in a direction opposite the rotation of the milling tool 400), and are discharged to the chip evacuation flutes 424 between each two extensions 422, to be discharged from the milling tool 400 in a conventional manner.

Further in operation, upon penetrating the material of the workpiece WP, the corner cutting tooth 433' performs two operations simultaneously: the first corner cutting edge 432*a'* removes material from the workpiece WP in the same manner as the cutting edges 432, while the second corner cutting edge 432*b'* removes material in a conventional manner, similar to the portion 31*a* of cutting tool 1 previously described. More particularly, while the chips removed by the first corner cutting edge 432*a'* are pealed in a generally upward direction (see FIG. 1D) and progress through the chip evacuation channel 433C, the chips removed by the second corner cutting edge 432*b'* are pealed generally forwards (direction of rotation). Once these chips have been removed by the second corner cutting edge 432*b'*, they are first forced forward (direction of rotation) but since they cannot be evacuated therethrough, are pushed back (as indicated by arrow R) towards the auxiliary chip evacuation channel 433C' (referred herein as 'auxiliary channel'), and are eventually discharged with the remainder of the chips through the chip evacuation flute 424 positioned CCW of the cutting insert 430.

The above described principle of removing material from a workpiece WP in stages, each time leaving a different, smaller radius in the workpiece will be referred herein as "back tooth". In other words, each consecution cutting edge of the same cutting portion is adapted to remove the material left by the previous cutting edge. It should be stressed that reference is made here to cutting edge which are on the same cutting portion, rather than on different cutting portions.

It is further noted that, as in previous examples, that the boundary line portion 431*a* also serves as auxiliary cutting edge, i.e. it is adapted, under appropriate conditions to remove material from a workpiece WP in addition to the cutting edges 432. It is observed that a portion 433T of each cutting tooth 433 curls upwards, forming an auxiliary rake surface 438 adapted to work in conjunction with the boundary line portion 431*a*. Thus, during operation, two chip removal operations may take place at once: removal of chip by the portion 431*a* which are discharged to the chip removing flute 424 to the left of the cutting portion, and removal of the remainder of the chip of material by the cutting edges 432, which are eventually discharged through the chip removing flute 424 to the right of the cutting portion as previously described.

It is noted that during operation of the milling toll 400, the corner cutting edges 432*a'*, 432*b'* provide the milling tool 400 with the ability to remove material both from a side of the milling tool 400 and a bottom of the milling tool 400, i.e. the milling tool 400 is able to penetrate a workpiece sideways and/or from above.

It should be clear that most principles and features described above with respect to cutting tools 1, 1", 100, 100', 200, 300 and 400, and/or shown in FIGS. 1A to 12F, are not restricted to those cutting tools (1, 1", 100, 100', 200, 300 and 400) in connection with which they are described/shown, and may independently be applied, mutatis mutandis, to each other or to any other tools, in any combination considered to be appropriate by a person skilled in the art.

Turning now to FIGS. 13A to 13D, there is shown a turning tool generally designated as 500, and comprising a turning tool holder 510 and a cutting insert 130, which is the same cutting insert used in the milling tool 100 previously described.

In the present example, the turning tool holder 510 is formed with a top face 510T, a bottom face 510B, side faces 510S and a front face 510F. The top face 510T is formed with a insert seat 512 which is generally similar to the insert seat 125 of the milling tool 100 previously described. The insert seat 512 is of rectangular shaped recess and is formed therein with a fastening hole 514 adapted to receive a fastening bolt 530 (shown FIG. 13A).

In assembly, the cutting insert 130 is positioned in the insert seat 512 in a manner similar to its positioning in the insert seat 125 of the milling tool 100 as described previously.

Since the cutting insert 130 is the same cutting insert used for the milling tool 100, it should be understood that the definitions of the cutting portion, cutting surface cutting teeth and cutting edges are as described with respect to FIGS. 5A to 5D.

Figure 13A:
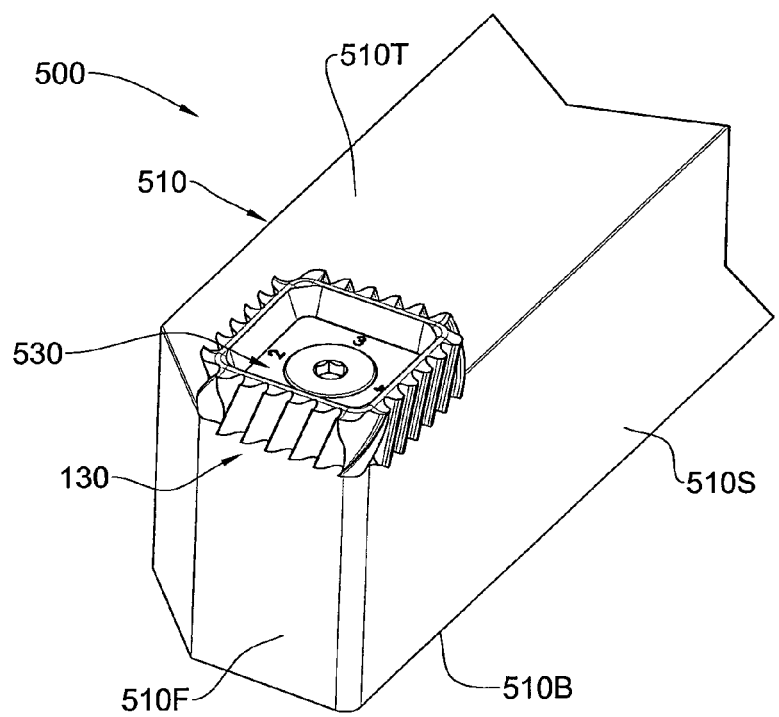
FIG. 13A is a schematic isometric view of a turning tool according to one example of the disclosed subject matter.
Figure 13B:
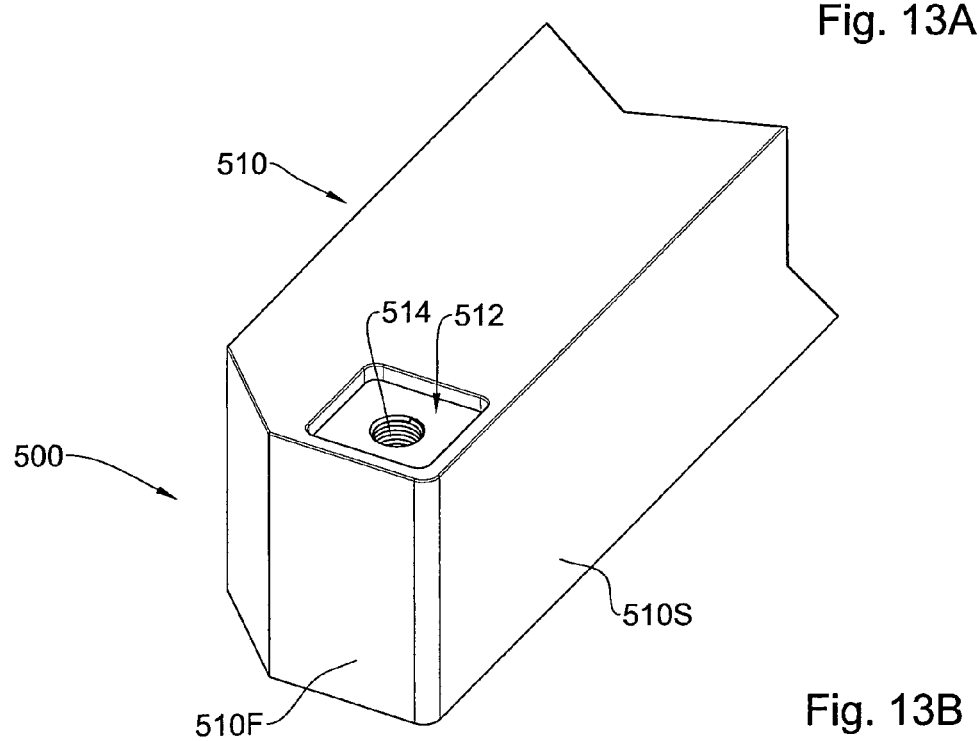
FIG. 13B is a schematic isometric view of a turning tool holder used in the milling tool shown in FIG. 13A.
Figure 13C:
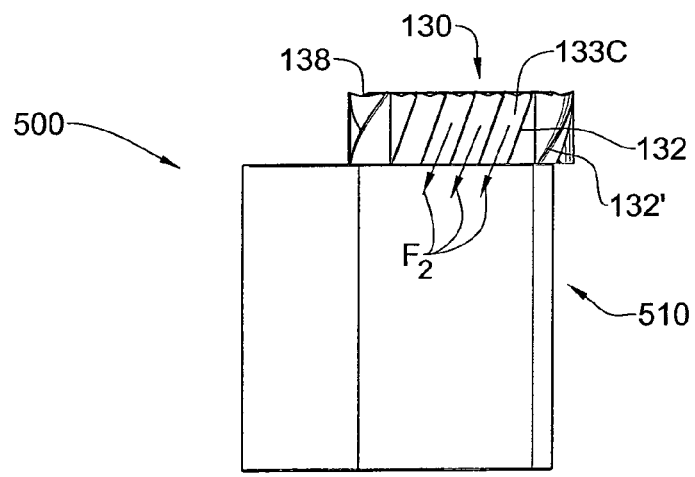
FIGS. 13C and 13D are, respectively, schematic front and top views of the turning tool shown in FIG. 13A.
Figure 13D:
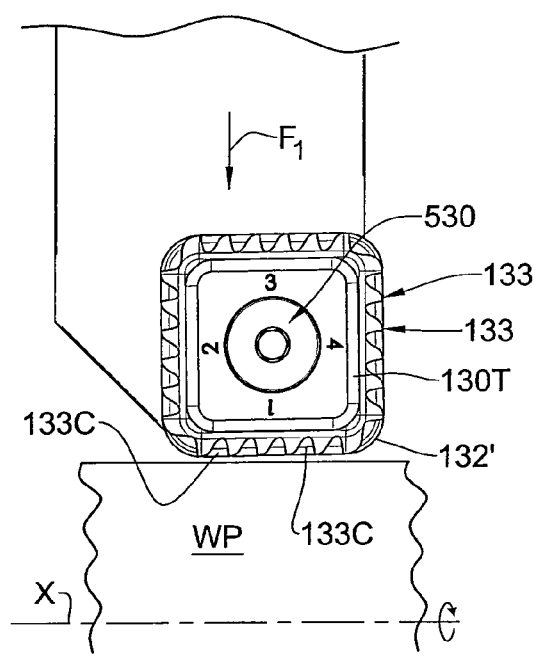

With particular reference to FIG. 13D, in operation, the turning tool 500 is adapted to engage a workpiece WP, rotating about a central axis X which is perpendicular to the side faces 510S of the turning tool holder 510. The turning tool 500 is adapted to progress towards the workpiece WP in the feed direction denoted by arrow $F_1$ until the cutting edges 132 of the cutting insert 130 penetrate into the workpiece WP.

In a manner equivalent to the operation described with respect to the milling tool 100, once the cutting edges 132 penetrate into the workpiece WP, they begin pealing off chips of material (not shown) from the workpiece WP. Once such a chip is pealed off, due to the inclination angle α of the cutting edges 132, it will progress along the chip evacuation channel 133C until it is discharged towards the bottom face of turning tool holder 510, as denoted by arrows $F_2$.

It should also be noted that since the rotation of the workpiece WP and the progression of the chip C are generally in the same direction, the rotation of the workpiece WP facilitates in evacuation of the chip C from chip evacuation channels 133C, thereby reducing the risk of chip C remaining therein and applying unwanted loads on the cutting insert 130.

The above described manner of turning operation stands in complete contrast to the conventional turning operation, in which the cutting edge is disposed along a top face of the cutting insert, causing the chips of material to be discharged upwards rather than downwards.

However, it should be appreciated that the top portion 131a of the boundary line 131 of the cutting surface CS may also serve as a cutting edge. Thus, under appropriate conditions during operation, two chip removal operations may take place at once: removal of chip by the top portion 131a which are discharged upwards, and removal of the remainder of chips of the material by the cutting edges 132 which are eventually discharged downwards.

It should be clear that most principles and features described above with respect to cutting tools 1, 1", 100, 100', 200, 300, 400 and 500, and/or shown in FIGS. 1A to 13D, are not restricted to those cutting tools (1, 1", 100, 100', 200, 300, 400 and 500) in connection with which they are described/shown, and may independently be applied, mutatis mutandis, to each other or to any other tools, in any combination considered to be appropriate by a person skilled in the art.

Attention is now drawn to FIGS. 14A to 14D, in which there is shown a turning tool generally designated as 600, and comprising a turning tool holder 610 and a cutting insert 230, which is the same cutting insert used in the milling tool 200 previously described.

In the present example, the turning tool holder 610 is formed with a top face 610T, a bottom face 610B, side faces 610S, a front face 610F and a relief face 610R. The top face 610T is formed with a insert seat 612 which is generally similar to the insert seat 225 of the milling tool 200 previously described. The insert seat 612 is of rectangular shaped recess and is formed therein with a fastening hole 614 adapted to receive a fastening bolt 630 (shown FIG. 14A).

In assembly, the cutting insert 230 is positioned in the insert seat 612 in a manner similar to its positioning in the insert seat 225 of the milling tool 200 as described previously.

Since the cutting insert 230 is the same cutting insert used for the milling tool 200, it should be understood that the definitions of the cutting portion, cutting surface cutting teeth and cutting edges are as described with respect to FIGS. 8A to 8D.

Figure 14A:
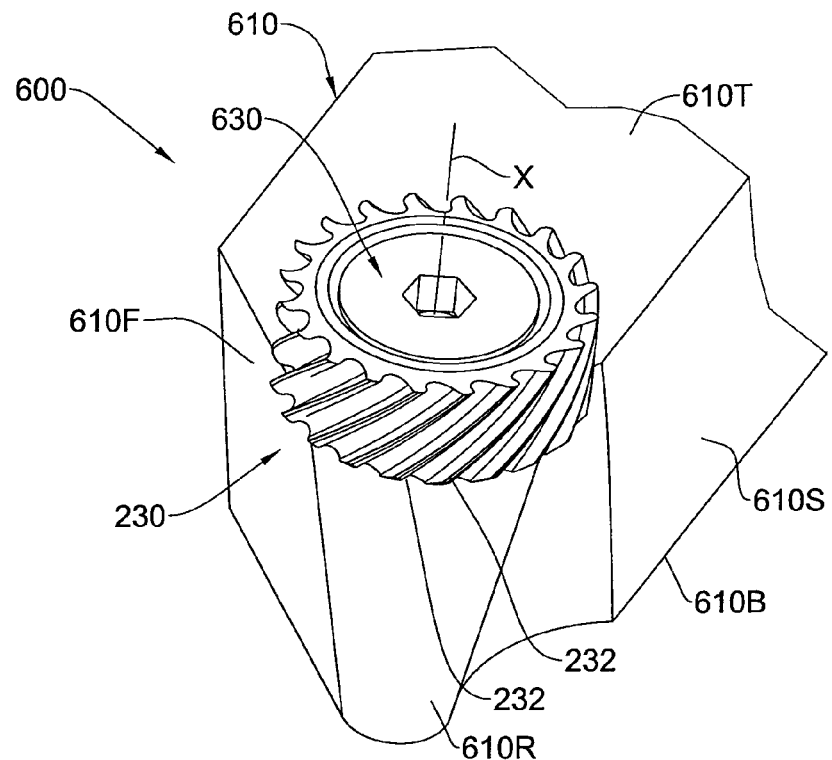
FIG. 14A is a schematic isometric view of a turning tool according to another example of the disclosed subject matter.
Figure 14B:
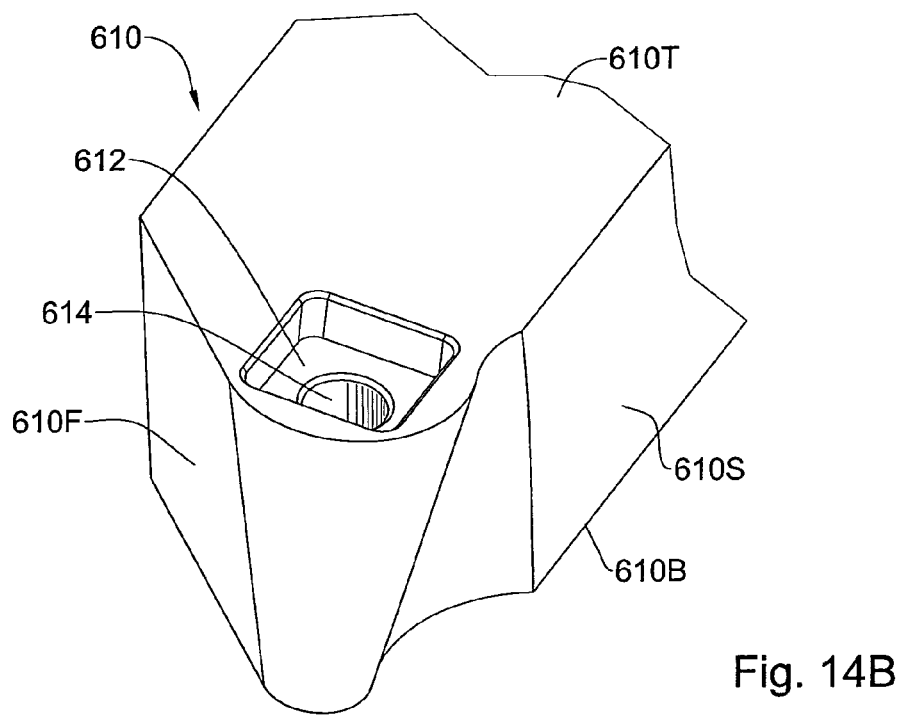
FIG. 14B is a schematic isometric view of a turning tool holder used in the milling tool shown in FIG. 14A.
Figure 14C:
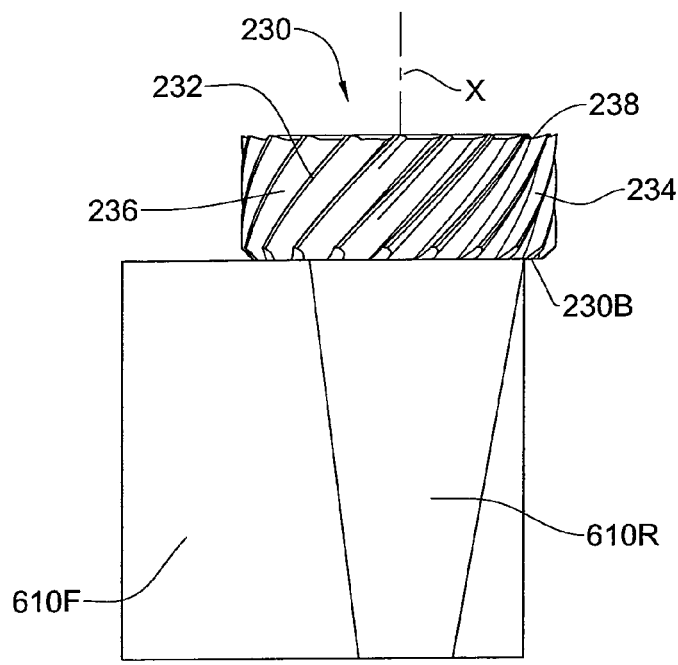
FIGS. 14C and 14D are, respectively, schematic front and top views of the turning tool shown in FIG. 14A.
Figure 14D:
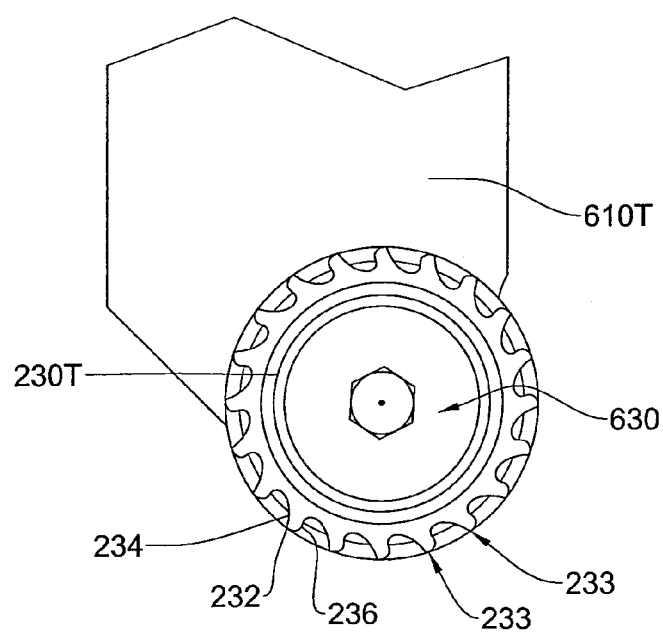

With particular reference to FIG. 14D, in operation, the turning tool 600 is adapted to engage a workpiece WP, rotating about a central axis X which is perpendicular to the side faces 610S of the turning tool holder 610. The turning tool 600 is adapted to progress towards the workpiece WP in the feed direction denoted by arrow $F_1$ until the cutting edges 232 of the cutting insert 230 penetrate into the workpiece WP.

In a manner equivalent to the operation described with respect to the turning tool 500, once the cutting edges 232 penetrate into the workpiece WP, they begin pealing off chips of material (not shown) from the workpiece WP. Once such a chip is pealed off, due to the inclination angle α of the cutting edges 232, it will progress along the chip evacuation channel 233C until it is discharged towards the bottom face of turning tool holder 610, as denoted by arrows $F_2$.

One difference between the turning tool 600 presently described and the turning tool 600 described with respect to FIGS. 13A to 13D is the additional relief face 610R of the turning tool holder 610. In particular, the relief face 610R is formed as an inverse cone, its diameter decreasing towards the bottom face 610B of the turning tool holder 610. The conical shape allows for a certain relief surface, preventing the chips discharged towards the bottom face 610B from impacting the turning tool holder 610 upon discharge. In addition, since the area of the cutting insert 230 coming in contact with the turning tool holder 610 is smaller than the equivalent area in the cutting insert 130, it is possible to remove material from the turning tool holder 610 in order to reduce costs.

As in the previously described turning tool 500, it should be appreciated that the top portion 231a of the boundary line 231 of the cutting surface CS may also serve as a cutting edge. Thus, under appropriate conditions during operation, two chip removal operations may take place at once: removal of chip by the top portion 231a which are discharged upwards, and removal of the remainder of chips of the material by the cutting edges 232 which are eventually discharged downwards.

It should be clear that most principles and features described above with respect to cutting tools 1, 1", 100, 100', 200, 300, 400, 500 and 600, and/or shown in FIGS. 1A to 14D, are not restricted to those cutting tools (1, 100, 100', 200, 300, 400, 500 and 600) in connection with which they are described/shown, and may independently be applied, mutatis mutandis, to each other or to any other tools, in any combination considered to be appropriate by a person skilled in the art.

Attention is now drawn to FIGS. 15A to 15D, in which there is shown a turning tool generally designated as 700, and comprising a turning tool holder 710 and a cutting insert 330, which is the same cutting insert used in the milling tool 300 previously described.

In the present example, the turning tool holder 710 is formed with a top face 710T, a bottom face 710B, side faces 710S, a front face 710F and a relief face 710R. The top face 710T is formed with a insert seat 712 which is generally similar to the insert seat 325 of the milling tool 300 previously described. The insert seat 712 is of rectangular shaped recess and is formed therein with a fastening hole 714 adapted to receive a fastening bolt 730 (shown FIG. 15A).

In assembly, the cutting insert 330 is positioned in the insert seat 712 in a manner similar to its positioning in the insert seat 325 of the milling tool 300 as described previously.

Since the cutting insert 330 is the same cutting insert used for the milling tool 300, it should be understood that the definitions of the cutting portion, cutting surface cutting teeth and cutting edges are as described with respect to FIGS. 10A to 10D.

Figure 15A:
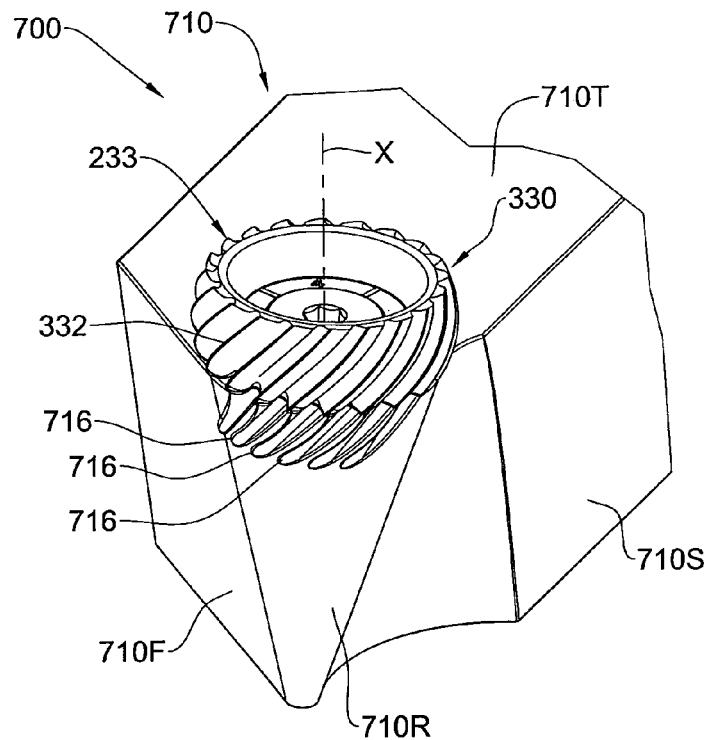
FIG. 15A is a schematic isometric view of a turning tool according to still another example of the disclosed subject matter.
Figure 15B:
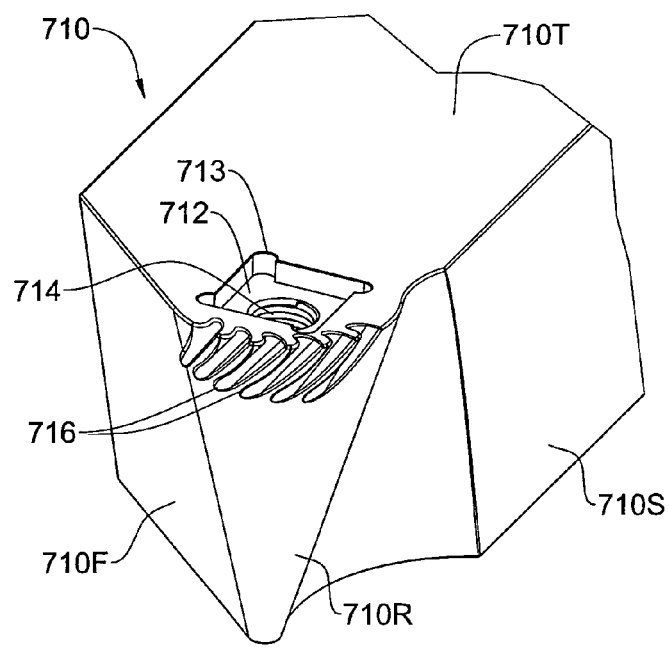
FIG. 15B is a schematic isometric view of a turning tool holder used in the milling tool shown in FIG. 15A.
Figure 15C:
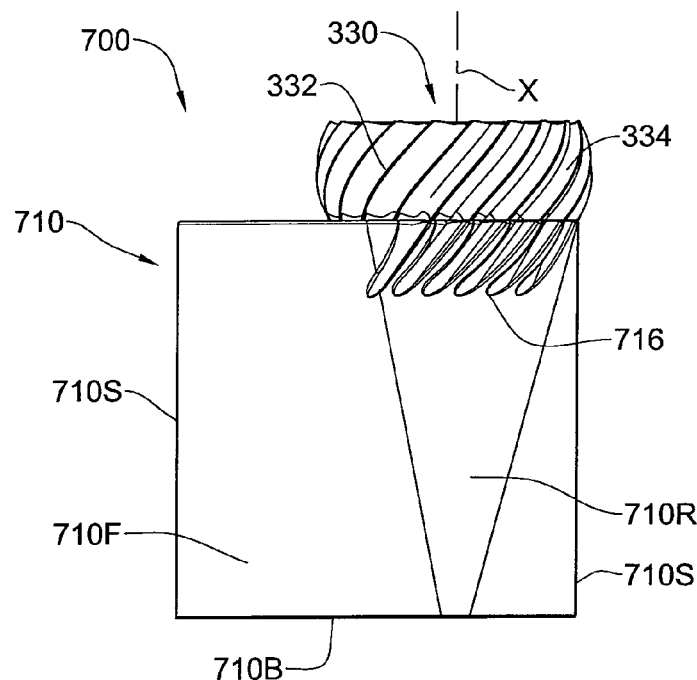
FIGS. 15C and 15D are, respectively, schematic front and top views of the turning tool shown in FIG. 15A.
Figure 15D:
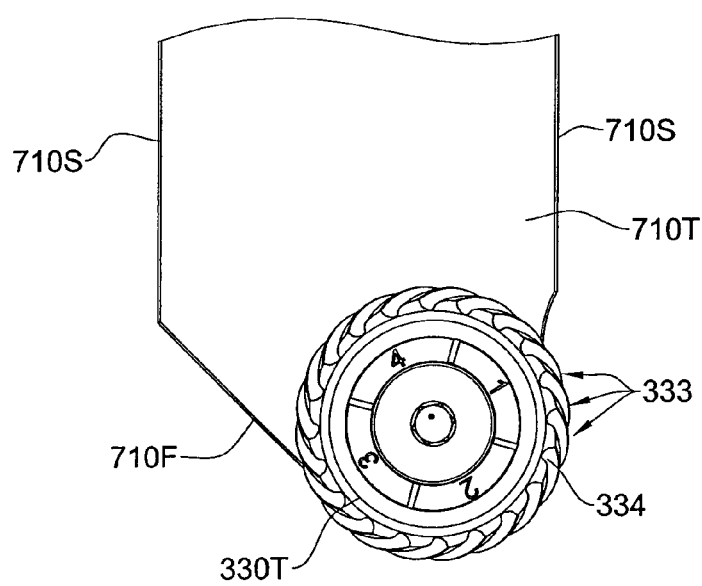

With particular reference to FIG. 15D, in operation, the turning tool 700 is adapted to engage a workpiece WP, rotating about a central axis X which is perpendicular to the side faces 710S of the turning tool holder 710. The turning tool 700 is adapted to progress towards the workpiece WP in the feed direction denoted by arrow $F_1$ until the cutting edges 332 of the cutting insert 330 penetrate into the workpiece WP.

In a manner equivalent to the operation described with respect to the turning tool 700, once the cutting edges 332 penetrate into the workpiece WP, they begin pealing off chips of material (not shown) from the workpiece WP. Once such a chip is pealed off, due to the inclination angle α of the cutting edges 332, it will progress along the chip evacuation channel 333C until it is discharged towards the bottom face of turning tool holder 710, as denoted by arrows $F_2$.

One difference between the turning tool 700 presently described and the turning tool 600 described with respect to FIGS. 14A to 14D lies in the relief face 710R of the turning tool holder 710. In particular, although the relief face 710R is formed as an inverse cone, similar to the relief surface 610R, it is also formed with auxiliary chip evacuation channels 716, being a direct extension of the chip evacuation channels 333C of the cutting insert 330. As in the previous example, the conical shape allows for a certain relief surface, preventing the chips discharged towards the bottom face 710B from impacting the turning tool holder 710 upon discharge. In the present example, the auxiliary chip evacuation channels 716 provide better evacuation of the removed chips, and during operation, a chip progresses first through the chip evacuation channels 333C, thereafter in the auxiliary chip evacuation channels 716, and only then discharged towards the bottom of the turning tool holder 710.

As in the previously described turning tool 600, it should be appreciated that the top portion 331a of the boundary line 331 of the cutting surface CS may also serve as a cutting edge. Thus, under appropriate conditions during operation, two chip removal operations may take place at once: removal of chip by the top portion 331a which are discharged upwards, and removal of the remainder of chips of the material by the cutting edges 332 which are eventually discharged downwards.

It should be clear that most principles and features described above with respect to cutting tools 1, 1", 100, 100', 200, 300, 400, 500, 600 and 700, and/or shown in FIGS. 1A to 15D, are not restricted to those cutting tools (1, 1", 100, 100', 200, 300, 400, 500, 600 and 700) in connection with which they are described/shown, and may independently be applied, mutatis mutandis, to each other or to any other tools, in any combination considered to be appropriate by a person skilled in the art.

Figure 16A:
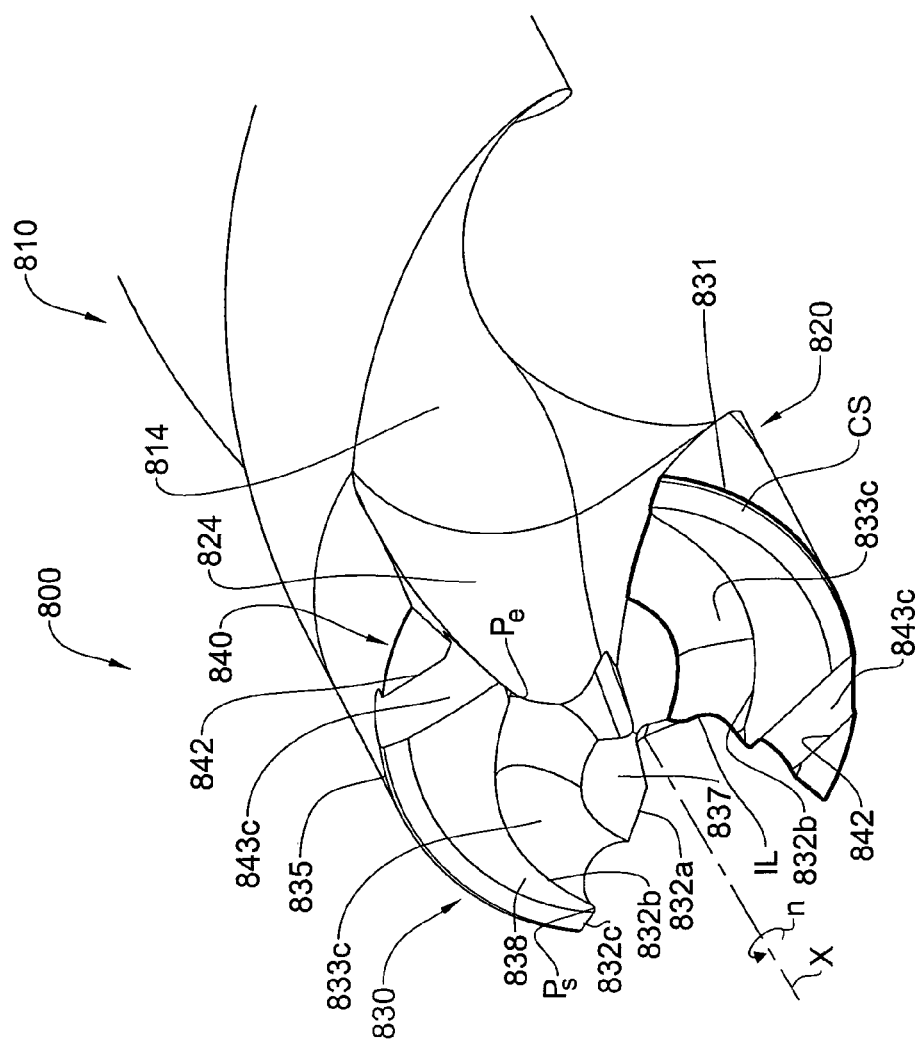
FIG. 16A is a schematic isometric view of a drilling tool according to one example of the disclosed subject matter.
Figure 16B:
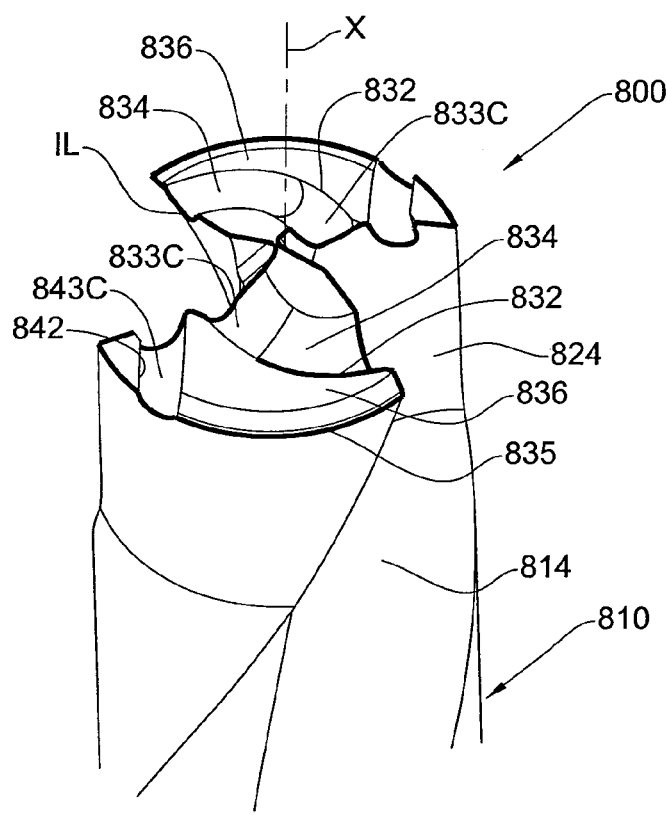
FIG. 16B is a schematic isometric enlarged view of the head of the drilling tool shown in FIG. 16B.
Figure 16C:
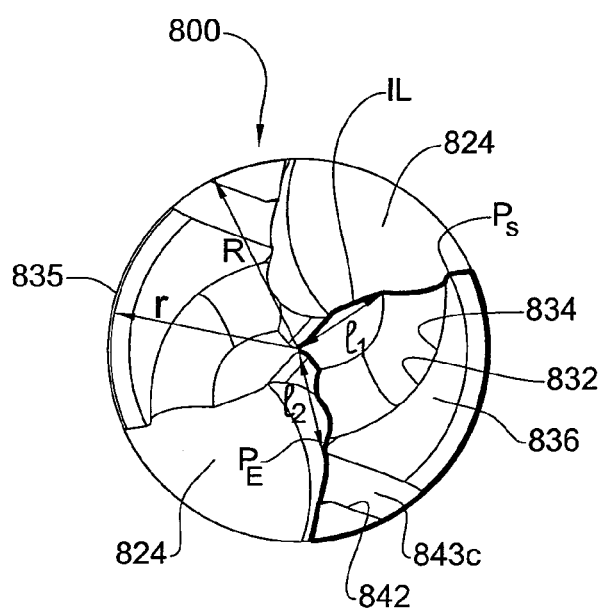
FIG. 16C is a schematic bottom view of the drilling tool shown in FIG. 16A.

Turning now to FIGS. 16A to 16C, there is shown a drilling tool generally designated as 800, and formed with a stem segment 810 and a drilling segment 820 extending along a central axis X. The drilling segment 820 is in turn formed with two cutting portions 830, each having a cutting surface CS adapted to engage a workpiece WP (not shown).

The stem segment 810 and the drilling segment 820 are each formed with two chip evacuation flutes 814, 824 respectively, adapted for evacuating chips of material removed from the workpiece WP by the cutting portions 830 of the drilling segment 820.

Each cutting portion is formed with a primary chip evacuation channel 833C extending generally spirally about the central axis X, dividing the respective cutting portion 830 into an inner cutting tooth 837 and an outer cutting tooth 838.

Thus, each such cutting portion 830 is formed with an inner cutting edge 832a belonging to the inner cutting tooth 837 and extending generally radially with respect to the central axis X, an intermediate cutting edge 832b extending along one edge of the chip evacuation channel 833C between a start point $P_S$ and an end point $P_E$ thereof, and an outer cutting edge 832c belonging to the outer cutting tooth 838 and also extending generally radially with respect to the central axis X, being the continuation of the inner cutting edge 832a.

Figure 16D:
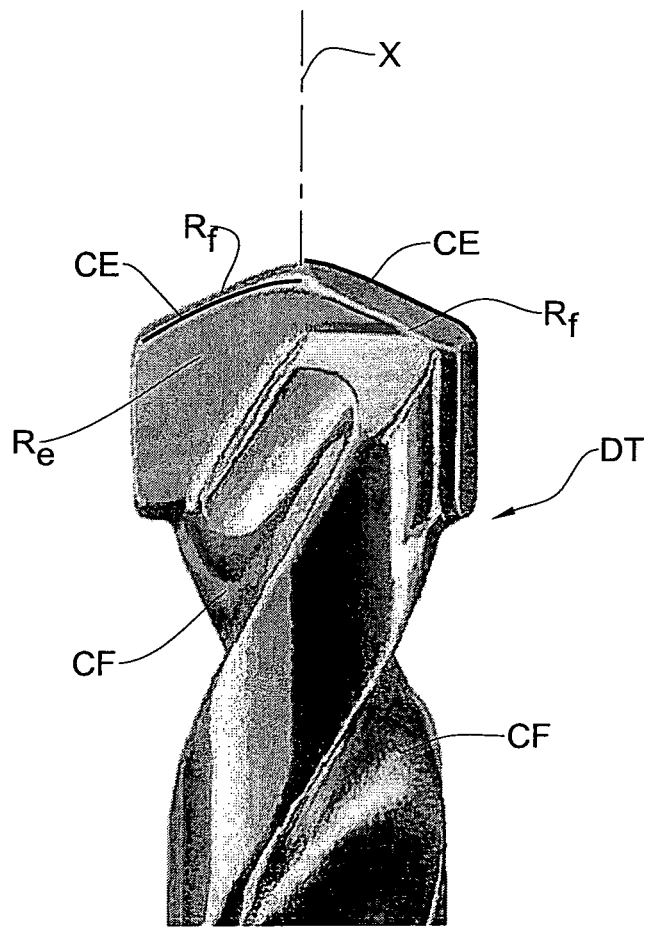
FIG. 16D is a schematic isometric view of a drilling tool according to prior art.

The drilling tool 800 of the present example is formed with an intersection line IL defined at the intersection between an external surface of the cutting portion 30 of the milling tool 1 oriented transverse to the central axis X and a surface of the chip evacuation flute 824. However, this intersection line IL does not necessarily need to be a cutting edge in its entirety (i.e. only a portion thereof may be a cutting edge), and the external surface and surface of the flute do not necessarily have to constitute the only respective rake and relief surface Re, Rf for the intersection line IL. This is in view of the drilling tool 800 being formed with a cutting edge 832b which is oriented transversely to the intersection line IL (rather than lying along it). Nonetheless, as will be further described, segments of the intersection line IL may optionally be used as cutting edges. In comparison, with reference to FIG. 16D, a conventional drilling tool DT is shown which is formed with two cutting edges CE and two chip evacuation flutes CF. It is observed that in the conventional drilling tool DT, each of the cutting edges CE lies only along an intersection line defined between a surface transverse to the central axis X of the drilling tool DT and a flute surface thereof, which, in the conventional drilling tool constitute a rake surface Re and a relief surface Rf. It is noted that in the conventional drilling tool DT, the intersection lines are the only cutting edges CE of the drilling tool DT.

Each such cutting surface CS is confined by a boundary line 831. In the present example, while the inner and outer cutting edges 832a, 832c extend along the boundary line 831, the intermediate cutting edge 832b extends within the cutting surface, generally transverse to the boundary line 831.

It should be noted that for the inner and outer cutting edges 832a, 832c, the rake surface is defined as the surface of the chip evacuation flute 824, while for the intermediate cutting edge 832b, the rake surface 834 is defined as the inner surface of the chip evacuation channel 833C.

Each cutting portion 830 is further formed with an auxiliary chip evacuation channel 843c defining a rear cutting tooth 840 located behind the cutting edge 832a-832b-832c, and having a cutting edge 842. The purpose of the rear cutting tooth 840 will be explained in detail with respect to FIGS. 17A and 17B.

In operation, the drilling tool 800 is adapted to revolve about the central axis X in the direction denoted by arrow n. Upon penetration into the workpiece WP, the inner and outer cutting edges 832a, 832c begin pealing off chips of material from the workpiece WP in the direction of rotation. These chips are urged towards the chip evacuation flute 824 bordering the inner and outer cutting edges 832a, 832c and progress therethrough and into the chip evacuation flutes 814 from which they are discharged. Simultaneously, the intermediate cutting edge 832b peals off chips of material towards the center of the drilling tool 800, such that these chips progress through the chip evacuation channel 833C and are discharged to the chip evacuation flute 824 bordering the rear cutting tooth 840 and then into the chip evacuation flute 814 from which they are finally discharged.

The drilling tool 800 thus performs a generally double chipping operation which is, in essence, similar to the operation of previously described cutting tools (e.g. 100) in which both the cutting edges 132 and the portion 131a perform a cutting operation, chips being removed by one cutting portion are simultaneously removed through two different chip evacuation flutes.

It is noted in this respect (particular reference made to FIG. 16C), that the radial distance $l_1$ of the outer most point of the inner cutting edge 832a is greater than the radial distance $l_2$ of the end point PE of the cutting edge 832b. Thus, there is formed a continuous cutting edge (the term 'continuous cutting edge' refers herein to the cutting edge experienced by the workpiece WP).

Figure 17A:
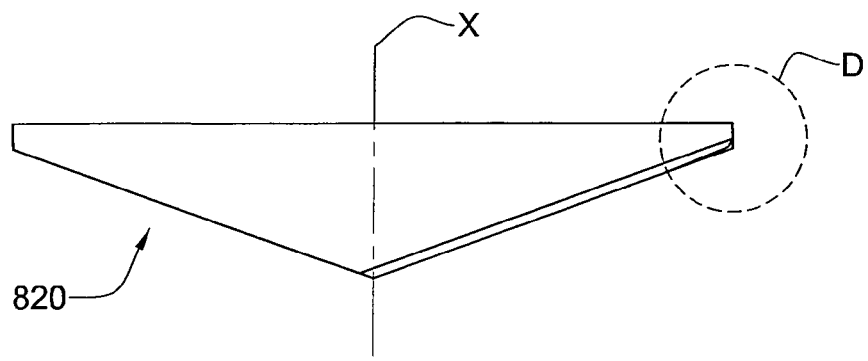
FIG. 17A is a schematic front view of the head of the drilling tool shown in FIG. 16B.
Figure 17B:
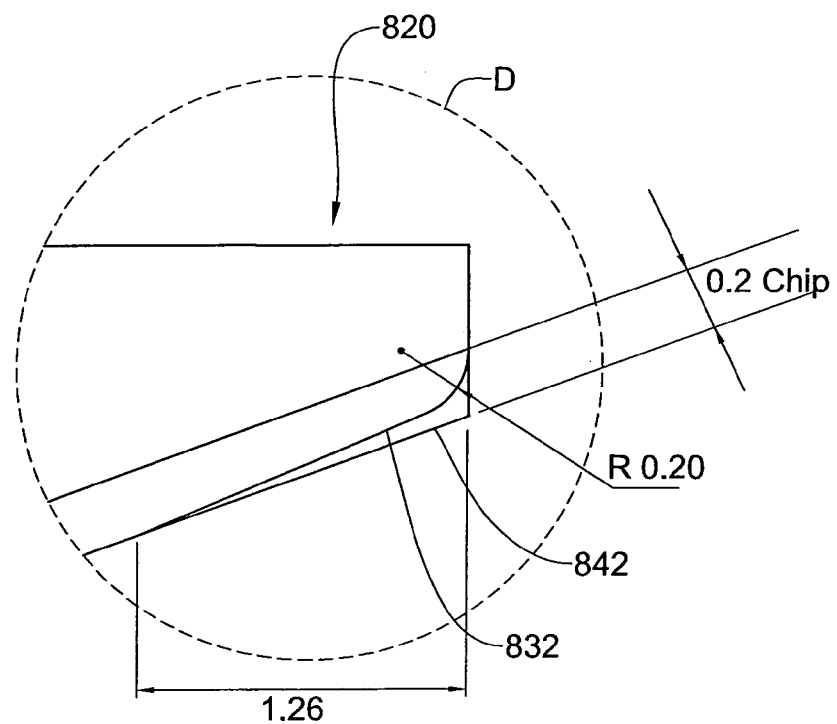
FIG. 17B is a schematic enlarged view of detail D shown in FIG. 17A.

With additional attention being drawn to FIGS. 17A and 17B, it is observed that the outer cutting tooth 838 has a considerably filleted portion 835 along the circumference of the drilling tool 800. Thus, during operation, its effective radius for cutting is r. On the other hand, the rear cutting tooth 840 is formed with a filleted portion of a smaller radius, whereby the effective radius for cutting is R>r. This arrangement provides a distribution of the loads exerted on the cutting portion 820 of the drilling tool 800, and in particular, distribution of the loads between the outer cutting tooth 838 and the rear cutting tooth 840 (the principle being hereinafter referred to as 'radius overlay').

More specifically, in operation, the outer cutting edge 832c of the outer cutting tooth 838 removes material from the workpiece WP leaving a certain radius (in this particular example 0.2 mm as seen in FIG. 17B), and then the cutting edge 842 of the rear cutting tooth 840 comes in and removes the additional material, removing the radius.

It is also noted that any material removed by the rear cutting tooth 840 is removed via the auxiliary chip evacuation channel 843C and is discharged through the chip evacuation flute adjacent thereto (i.e. located in the opposite direction of rotation of the drilling tool), similar to the discharge path of the material removed by the intermediate cutting edge 832b.

It is appreciated that since, in conventional drilling tools, the majority of wear occurs on the outer portion of the drill, the above described arrangement allows reducing the rate of wear, thereby lengthening the overall lifespan of the drilling tool 800 with respect to conventional drilling tools.

It should be clear that most principles and features described above with respect to cutting tools 1, 1", 100, 100', 200, 300, 400, 500, 600, 700 and 800, and/or shown in FIGS. 1A to 17B, are not restricted to those cutting tools (1, 1", 100, 100', 200, 300, 400, 500, 600, 700 and 800) in connection with which they are described/shown, and may independently be applied, mutatis mutandis, to each other or to any other tools, in any combination considered to be appropriate by a person skilled in the art.

Figure 18A:
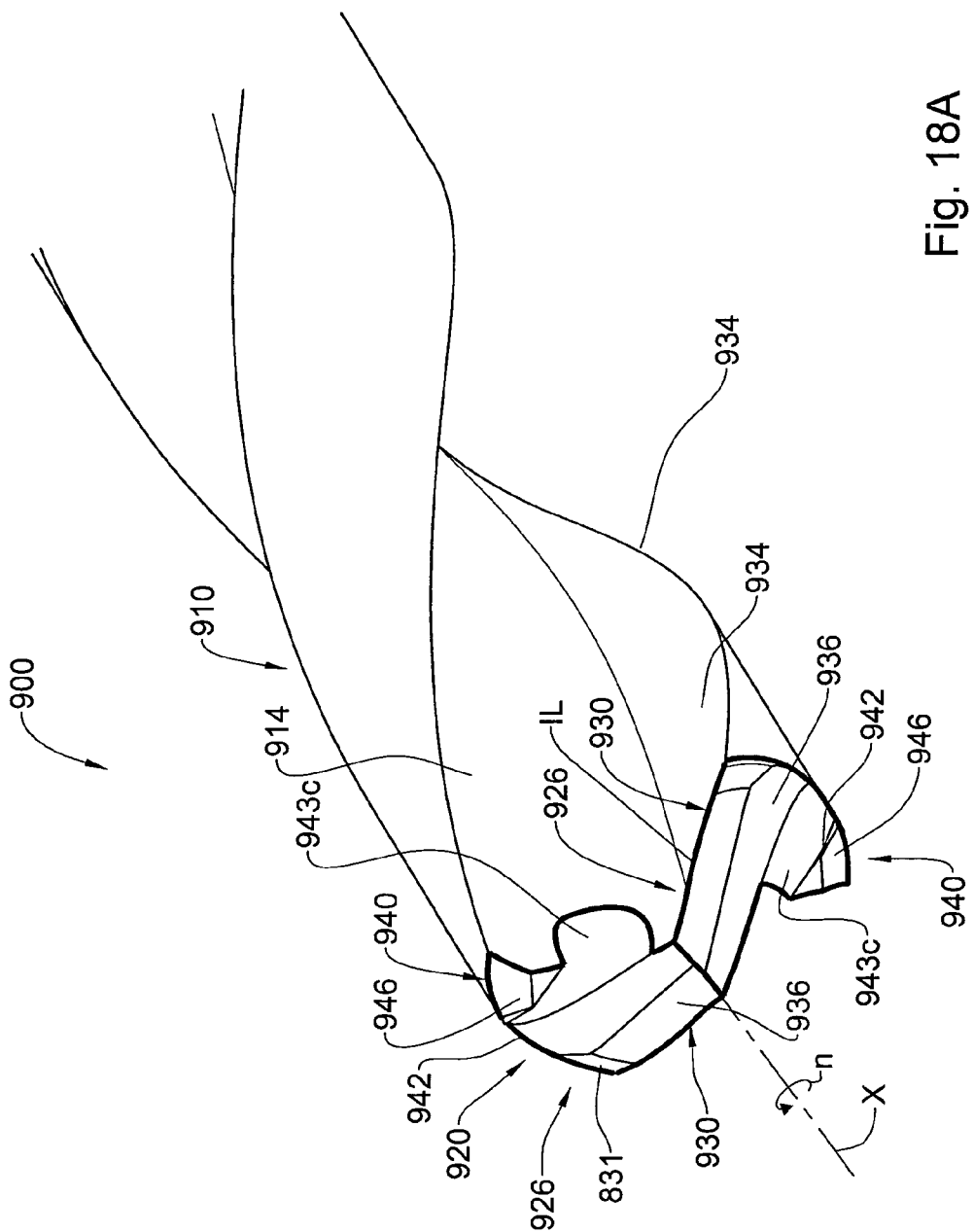
FIG. 18A is a schematic isometric view of a drilling tool according to another example of the disclosed subject matter.
Figure 18B:
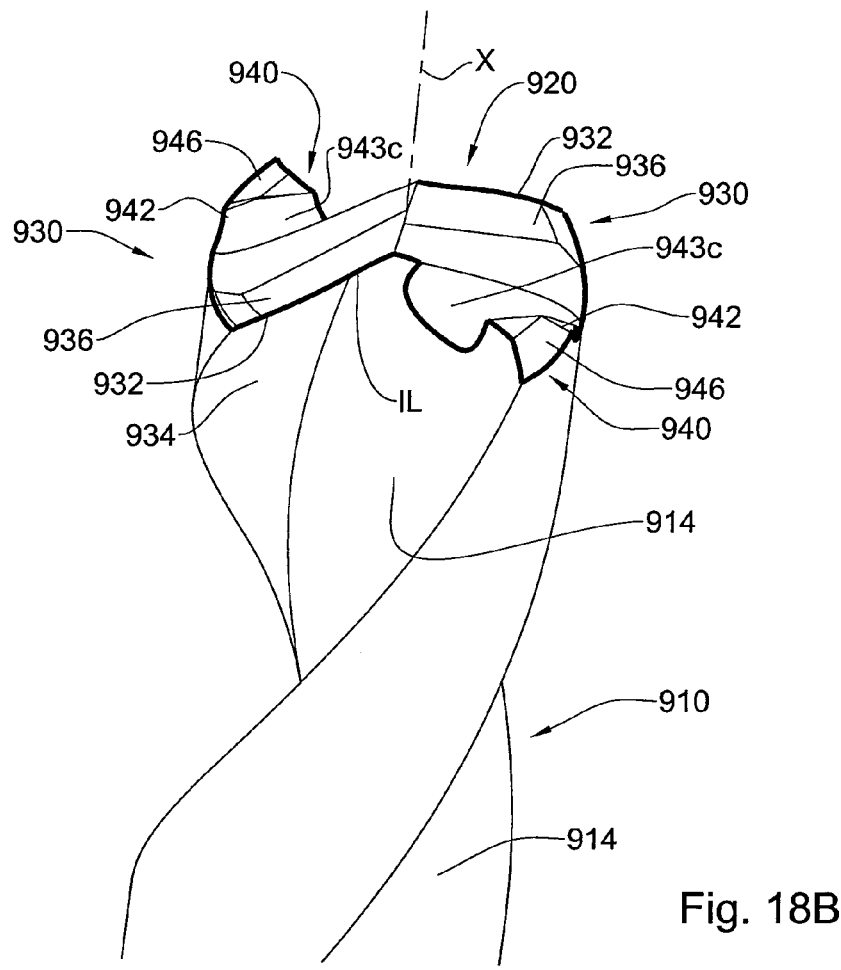
FIG. 18B is a schematic isometric enlarged view of the head of the drilling tool shown in FIG. 18B.
Figure 18C:
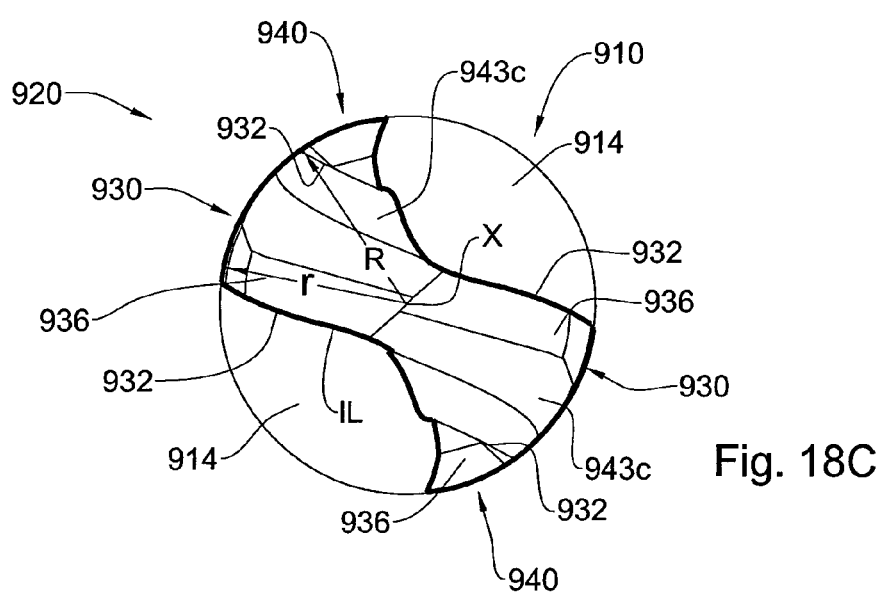
FIG. 18C is a schematic bottom view of the drilling tool shown in FIG. 18A.

Turning now to FIGS. 18a to 18C, still another drilling tool is shown, generally designated as 900, which is essentially a simplified version of the drilling tool 800 previously described, with the difference being in the absence of the chip evacuation channel 833C and a cutting edge broken into three segments 832a-832b-832c. This is also a good example how specific features of previously described tools may be used independently from one another in other cutting tools.

The drilling tool 900 is formed with a stem segment 910 extending along a central axis X and having a drilling segment 920 at the end thereof. The drilling segment 920 is in turn formed with two cutting portions 926, each having a cutting surface CS adapted to engage a workpiece WP (not shown). Each such cutting surface CS is confined by a boundary line 931.

The stem segment 910 is formed with two chip evacuation flutes 914 adapted for evacuating chips of material removed from the workpiece WP by the cutting portions 930 of the drilling segment 920.

Each cutting portion 926 is formed with a chip evacuation channel 943C dividing the cutting portion 926 into a front cutting tooth 930 and a rear cutting tooth 940, which are generally equivalent to the respective outer cutting tooth 838 and the rear cutting tooth 840 of the drilling tool 800. Each such tooth (930, 940) is formed with a respective cutting edge 932, 942, and each of the cutting edges has a respective rake surface 934, 944 and a relief surface 936, 946.

The purpose of the rear cutting tooth 940 is similar to that previously described with respect to the drilling tool 800 and FIGS. 17A and 17B, i.e. to divide the loads more evenly by reducing the load on the front tooth 930.

In operation, the drilling tool 900 is adapted to revolve about the central axis X in the direction denoted by arrow n. Upon penetration into the workpiece WP, the cutting edge 932 of the front cutting tooth 930 begins pealing off chips of material from the workpiece WP in the direction of rotation. These chips are urged towards the chip evacuation flute 914 bordering the cutting edge 932 and progress therethrough until they are discharged from the drilling tool 900.

Further in operation, as in the previous example, the cutting edge 932 of the front cutting tooth 930 removes material from the workpiece WP leaving a certain radius (e.g. 0.2 mm as seen in FIG. 17B), and then the cutting edge 942 of the rear cutting tooth 940 comes in and removes the additional material, removing the radius.

Since the effective radius for cutting of the front cutting tooth 930 is r, and the effective radius for cutting of the rear tooth 940 is R>r, there is provided a distribution of the loads exerted on the cutting portion 920 of the drilling tool 900, and in particular, distribution of the loads between the front cutting tooth 930 and the rear cutting tooth 940 (the principle being hereinafter referred to as 'radius overlay').

It is also noted that any material removed by the rear cutting tooth 940 is removed via the auxiliary chip evacuation channel 943C and is discharged through the chip evacuation flute adjacent thereto (i.e. located in the opposite direction of rotation of the drilling tool).

It should be clear that most principles and features described above with respect to cutting tools 1, 1", 100, 100', 200, 300, 400, 500, 600, 700, 800 and 900 and/or shown in FIGS. 1A to 18C, are not restricted to those cutting tools (1, 1", 100, 100', 200, 300, 400, 500, 600, 700, 800 and 900) in connection with which they are described/shown, and may independently be applied, mutatis mutandis, to each other or to any other tools, in any combination considered to be appropriate by a person skilled in the art.

Figure 19A:
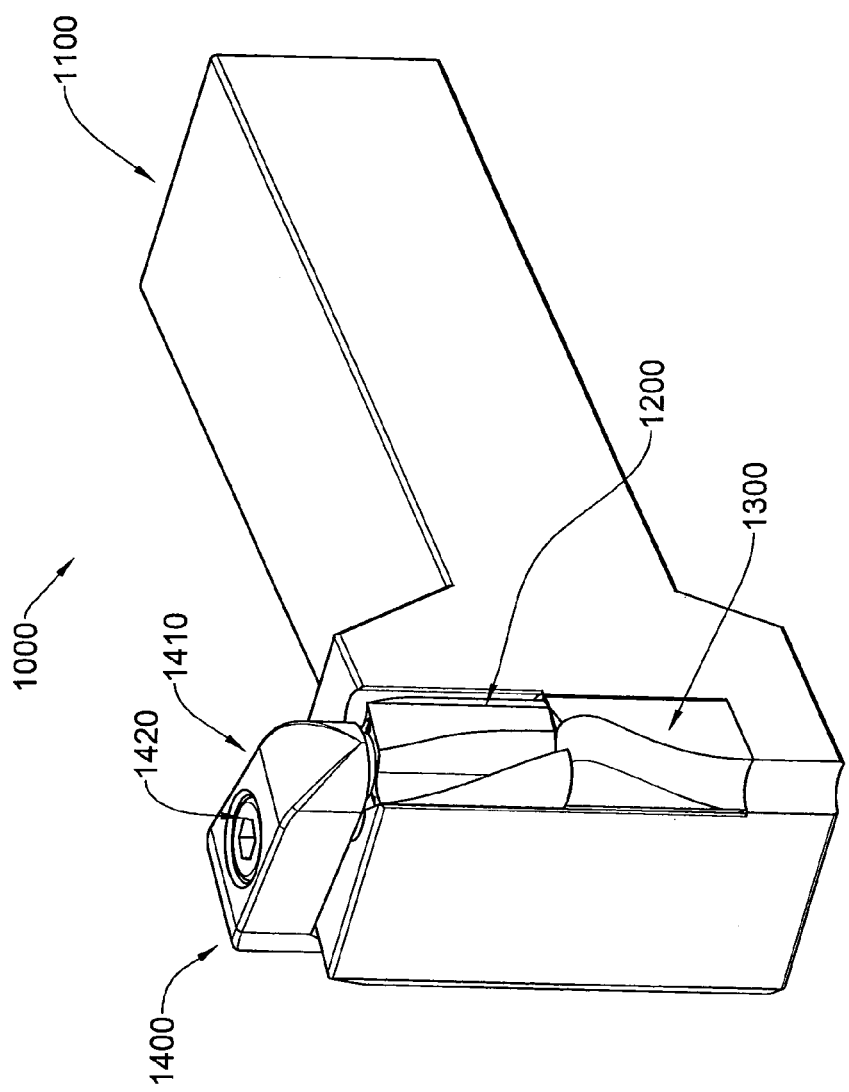
FIG. 19A is a schematic isometric view of a turning tool according to another example of the disclosed subject matter.
Figure 19B:
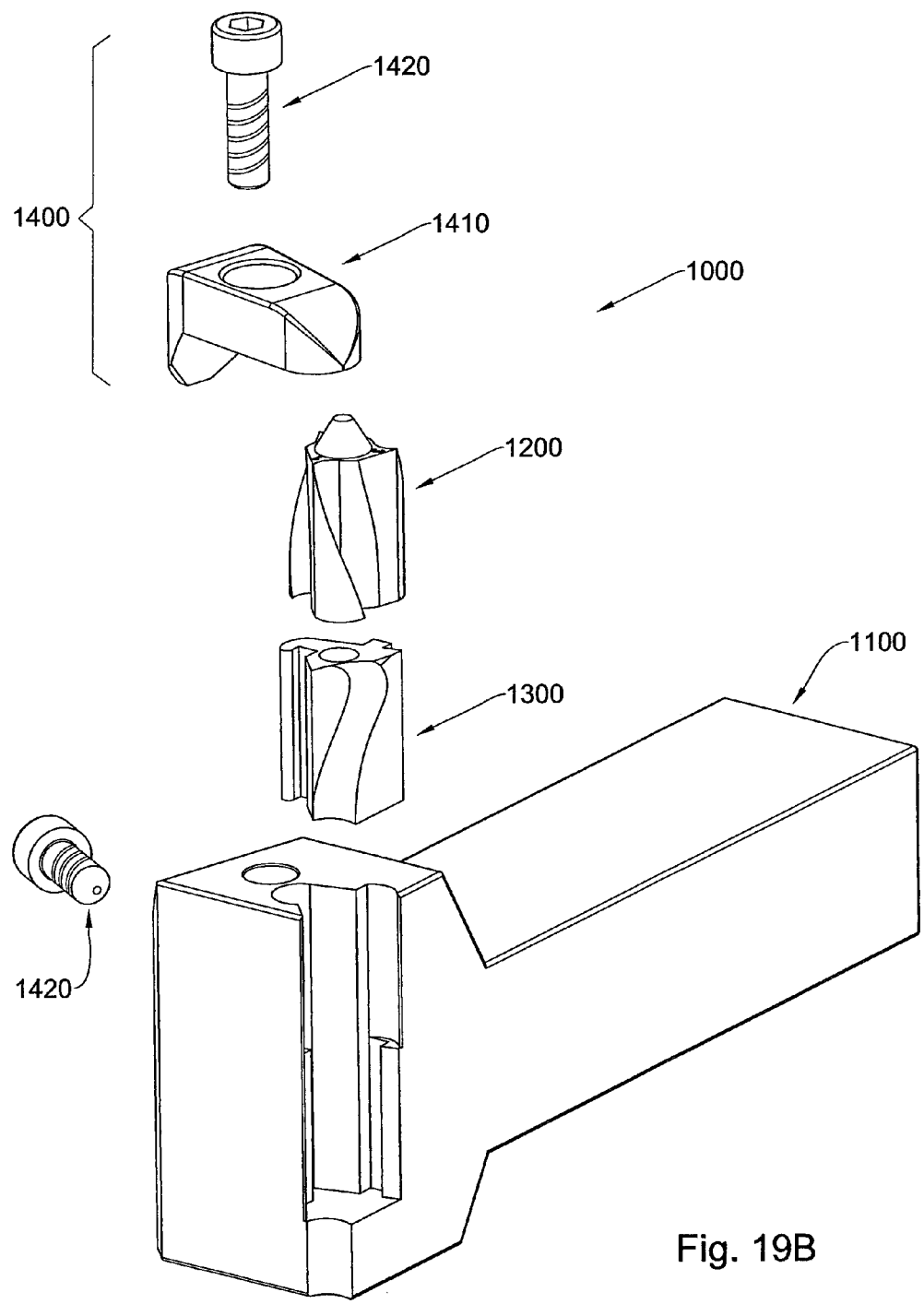
FIG. 19B is a schematic isometric exploded view of the turning tool shown in FIG. 19A.

Turning now to FIGS. 19A and 19B, a turning tool generally designated as 1000 is shown comprising a cutting tool holder 1100, a cutting insert 1200, a chip breaker 1300 and a fastening assembly 1400. The cutting tool holder 1100 is formed with a seat portion 1130 accommodating said chip breaker 1300 and the cutting insert 1200 such that the chip breaker 1300 is supported from below by the cutting tool holder 1100 and the cutting insert 1200 is positioned on the chip breaker 1300 and supported thereby.

The fastening assembly 1400 comprises a clamp 1410 and a fastening bolt 1420, and is arranged such that the clamp 1410 presses on the cutting insert 1200 from a top side thereof, holding it in place. In addition, another fastening bolt 1420 is adapted for engaging the chip breaker 1300 through the cutting tool holder 1100 and fastening it in place.

Figure 20A:
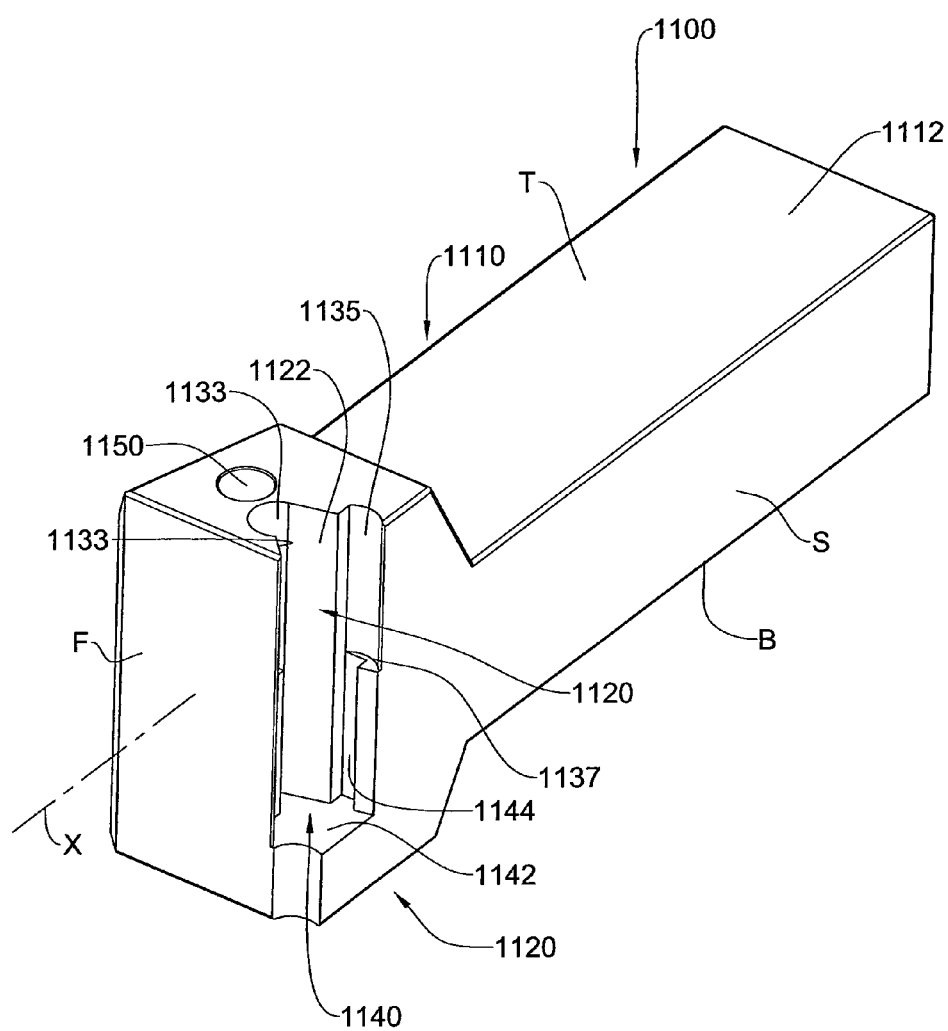
FIG. 20A is a schematic isometric view of a cutting insert holder shown in FIG. 19A.
Figure 20B:
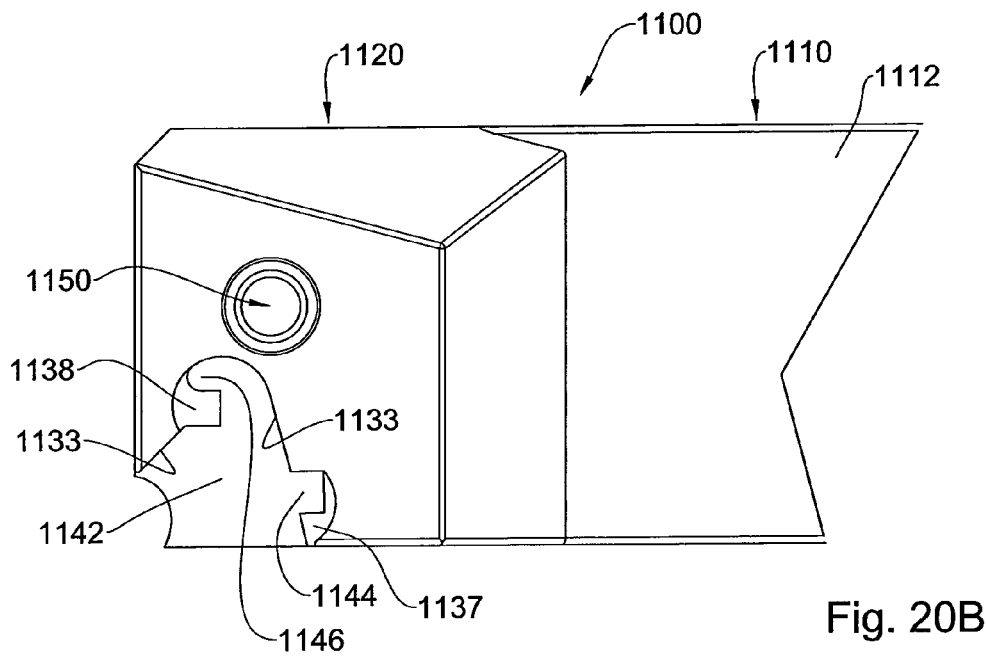
FIG. 20B is a schematic top view of the cutting insert holder shown in FIG. 20A.
Figure 20C:
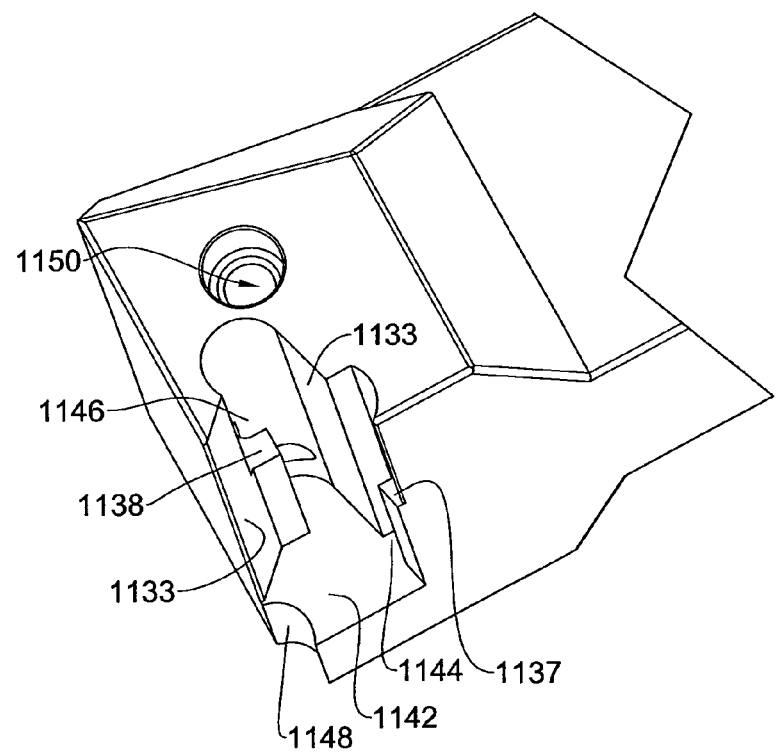
FIG. 20C is a schematic bottom isometric view of the cutting insert holder shown in FIG. 20A.
Figure 21A:
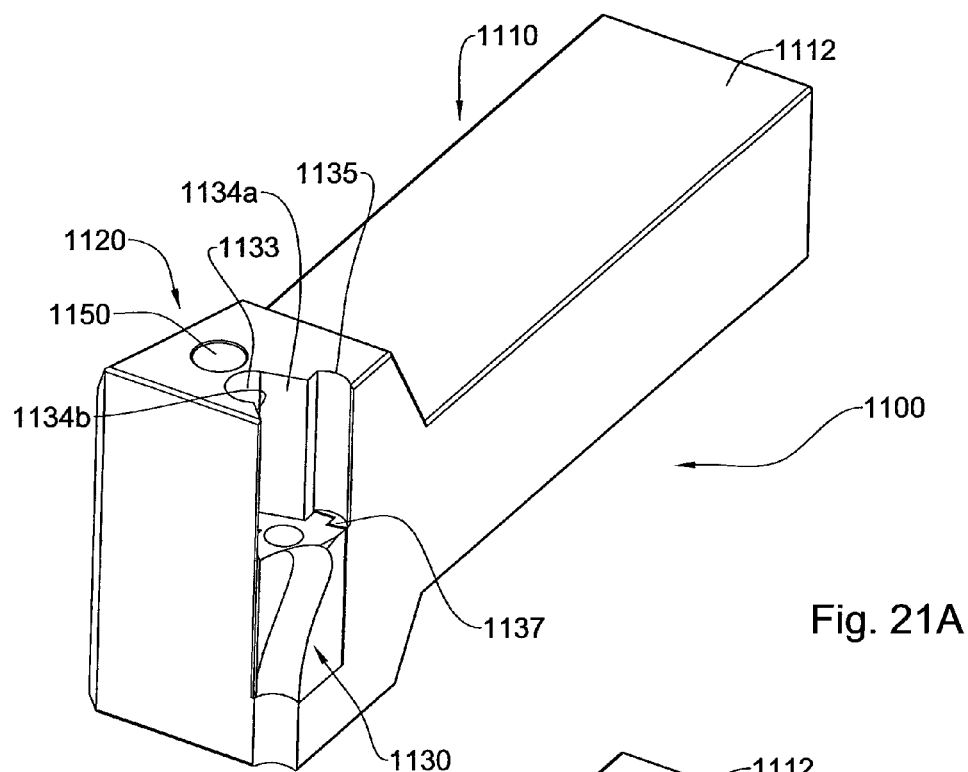
FIG. 21A is a schematic isometric view of the insert holder shown in FIG. 20A with a chip breaker as shown in FIG. 19 mounted therein.
Figure 21B:
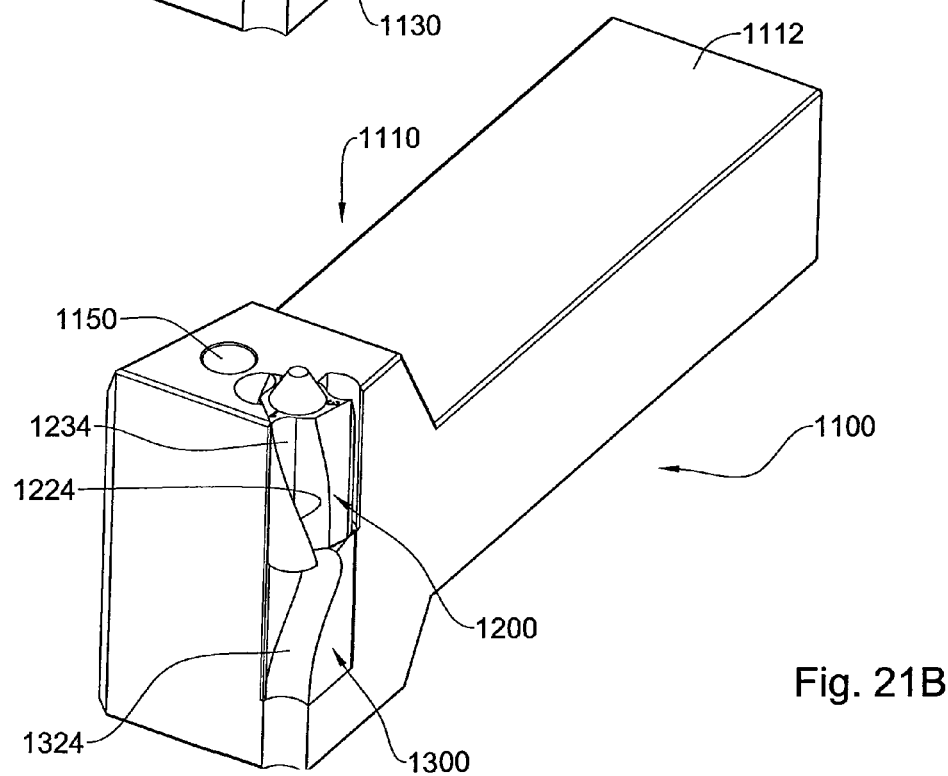
FIG. 21B is a schematic isometric view of the insert holder shown in FIG. 20A with a chip breaker and cutting insert as shown in FIG. 19 mounted therein.
Figure 22A:
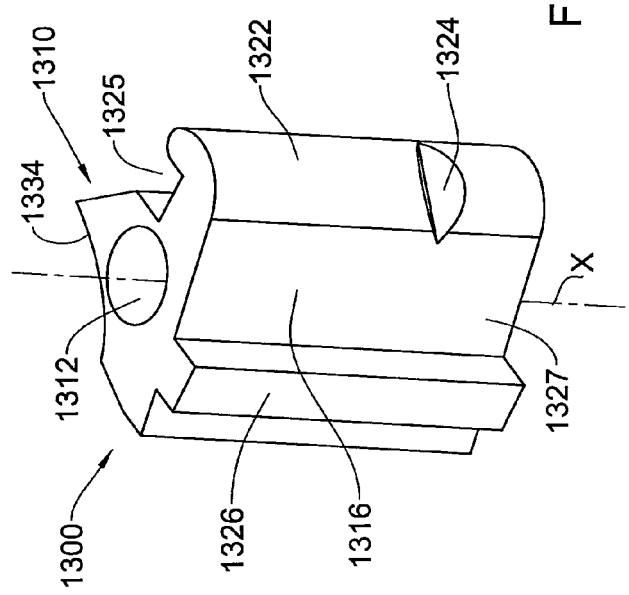
FIGS. 22A and 22b are, respectively, schematic front and rear isometric views of the chip breaker shown in FIG. 19A.
Figure 22B:
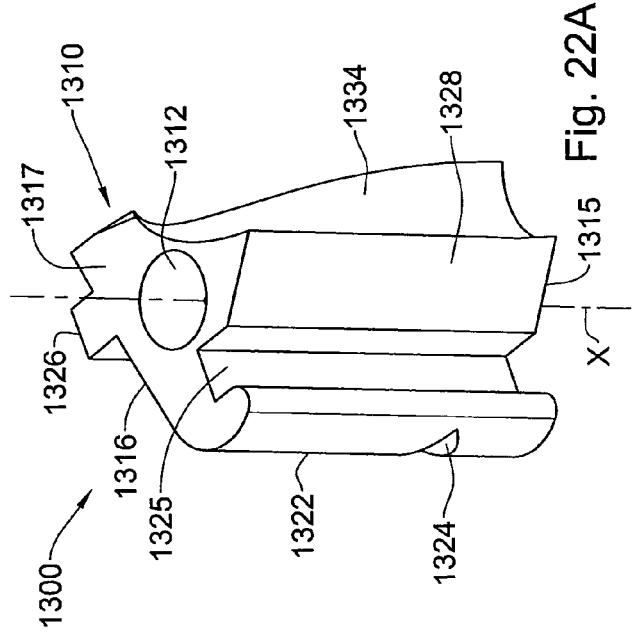
Figure 22C:
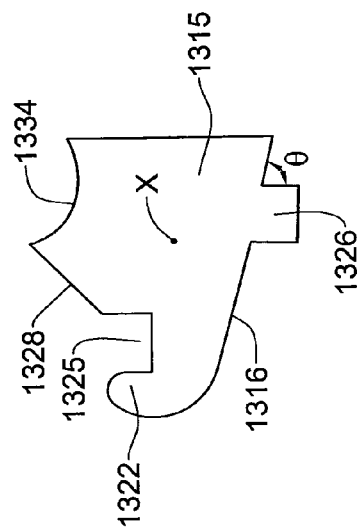
FIGS. 22C and 22D are, respectively, schematic top and bottom views of the chip breaker shown in FIG. 19A.
Figure 22D:
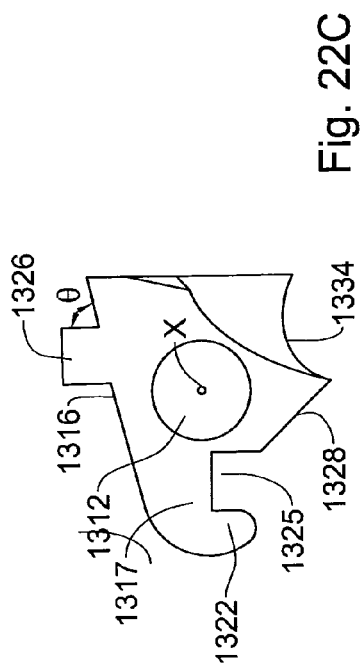
Figure 24B:
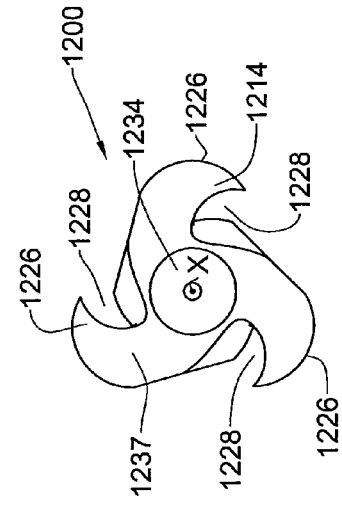
FIGS. 24A to 24D are, respectively, schematic top, bottom, front and isometric views of the cutting insert shown in FIG. 19A.
Figure 24D:
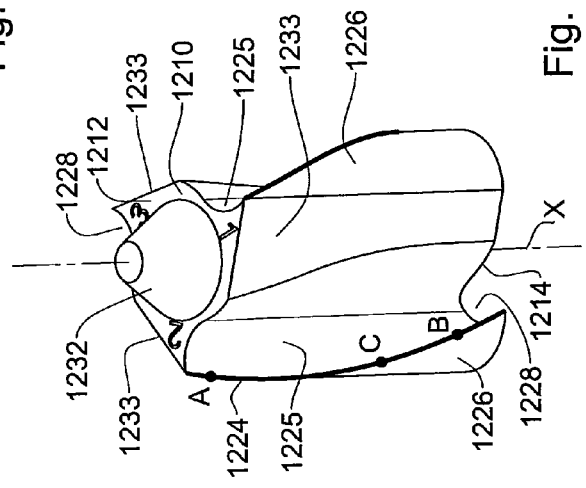
Figure 24A:
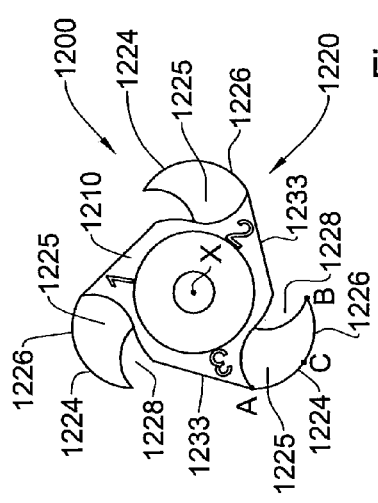
Figure 24C:
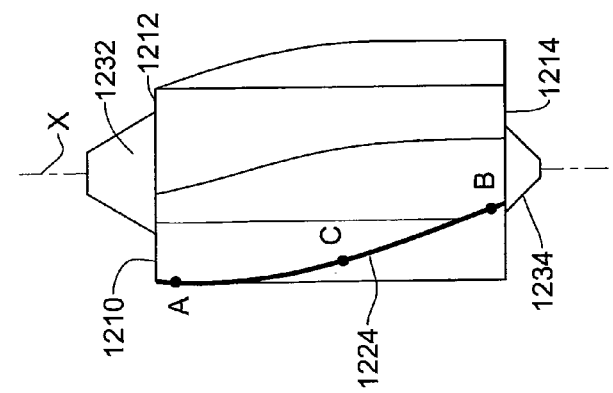

Turning now to FIGS. 20A to 20C, the cutting tool holder 1100 is shown having a body 1110 extending along a longitudinal axis X, and formed, at one end thereof, with an engaging portion 1112 adapted for attachment to a drive unit (not shown), and at an opposite end thereof with a mounting portion 1120, adapted for accommodating the chip breaker 1300 and the cutting insert 1200 and for engaging with the fastening assembly 1400. The body 1110 has a top face T, a bottom face B, side faces S and a front face F.

The mounting portion 1120 is formed with a central channel 1122 extending in a direction perpendicular to the longitudinal axis X, and serving as a seat for both the cutting insert 1200 and the chip breaker 1300. The central channel is formed with a first portion 1130 adapted for accommodating therein the cutting insert 1200, and a second portion 1140 adapted for accommodating therein the chip breaker 1300. The central channel 1122 is open at a top end thereof allowing the insertion therein of the chip breaker 1300 and the cutting insert 1200, and is delimited at a bottom side thereof with a bottom base 1142. The mounting portion 1120 is further formed with a fastening assembly port 1150 located at a top side of the cutting tool holder 1100, and is adapted for engaging with the fastening assembly 1400.

Turning now to FIGS. 22A to 22D, the chip breaker is shown having a body 1310 extending along an axis X between a top surface 1317 thereof and a bottom surface 1315 thereof. The chip breaker 1300 is formed with a mounting portion 1320 adapted for mounting and aligning the chip breaker 1300 in the cutting tool holder 1100, a breaking portion 1330 adapted for breaking chip removed by the cutting insert 1200 during a turning operation, and a socket 1312 aligned with the central axis X, adapted for engaging the cutting insert 1200 when the cutting insert 1200 is located within the cutting tool holder 1100, above the chip breaker 1300.

The mounting portion 1320 is formed with a side rail 1322 extending the entire length between the top face 1317 and the bottom face 1315, and having an L shape. The rail 1322 is adapted to be received within a corresponding guide of the cutting tool holder 1100. The rail 1322 is formed therealong, at a location adjacent the bottom face 1315, with a nook 1324 adapted for engaging a fastening bolt 1420. The mounting portion 1320 is further formed with a rear rail 1326, adapted to be received within another corresponding guide of the cutting tool holder 1100. It is also noted that the rear face 1316 of the chip breaker 1300 is at an angle θ to the second rail 1326.

The breaking portion 1330 is formed with a chip breaking channel 1334 extending the entire length between the top face 1317 and the bottom face 1315 of the chip breaker 1330. The channel 1334 is curved so as to apply pressure on chips being evacuated therethrough in order to break them.

Turning now to FIGS. 24A to 24D, the cutting insert 1200 is shown having a body 1210 extending along a central axis X, and having a to face 1212 and a bottom face 1214. The body 1210 is formed with a central mounting portion 1230 and three cutting portions 1220 extending about the central axis X. The top face 1212 is formed with a top aligning bulge 1232 adapted for engagement thereof with the clamp 1410 of the fastening assembly 1400, and the bottom face 1214 is formed with a bottom aligning bulge 1234 adapted for engagement with the chip breaker 1300. The body is further formed with three aligning faces 1233 adapted for engaging corresponding faces of the first portion 1130 of the central channel 1122 of the cutting tool holder 1100.

Each cutting portion 1220 is in the form of a flap curving about the central axis X, each such flap being formed with a cutting edge 1224 defined between a rake surface 1225 and a relief surface 1226. The curving of the flap forms a chip evacuation channel 1228 adapted for allowing chips removed from the workpiece WP to be removed from the cutting tool 1100 during a turning operation.

Reverting now to FIGS. 20A to 20C, the second portion 1140 of the central channel 1120 of the cutting tool holder 1100 is formed with a bottom base 1142, a right guide channel 1144 and a left guide channel 1146, adapted for receiving therein the rails 1324 and 1326 of the chip breaker 1300. The guides are adapted both for aligning the chip breaker 1300 during insertion thereof into the second portion 1140, and for securely retaining it in place, keeping it aligned at a specific orientation. The second portion 1140 is further formed with a cut-out 1148 adapted for allowing the evacuation of chips removed from the workpiece WP during a turning operation as will be explained in detail with reference to FIGS. 25A, 25B regarding operation of the cutting tool 1000.

The first portion 1130 is formed with two side walls 1133 adapted for engaging the faces 1233 of the cutting insert 1200, when the cutting insert 1200 is positioned within the first portion 1130. The first portion 1130 is further formed with two supports 1137, 1138 adapted for engagement with the bottom face 1214 of the cutting insert 1200 and supporting it from below.

Turning now to FIGS. 21A, 21B, 23A and 23B, the arrangement is such that the first portion 1130 is located above the second portion 1140, such that the order of assembly is as follows: first inserting the chip breaker 1300 into the second portion 1140 of the central channel 1122, and thereafter, inserting the cutting insert 1200 into the first portion 1130 such that it is supported from a bottom side thereof by the chip breaker. Only then, may the clamp 1410 be placed on the top face T of the cutting tool holder 1110 and be fastened using the fastening bolt 1420 so as to clamp the cutting insert 1200 and the chip breaker 1300.

When the chip breaker 1300 is inserted into the second portion 1140, the bottom face 1315 thereof engages the bottom base 1142, and the rails 1324, 1326 are received within the guides 1144, 1146 respectively. In this position, the top socket 1312 is facing upwards, adapted to receive therein the bottom bulge 1234 of the cutting insert 1200. In addition, it is observed that the support surfaces 1137, 1138 are aligned (flush) with the top face 1317 of the chip breaker 1300, forming a continuous surface for the cutting insert 1200 to be supported by. It is also observed that in this position, i.e. when the chip breaker 1300 is mounted into the second portion 1140, the cut-out 1148 forms a continuous surface with the surface of the breaking channel 1334 of the chip breaker 1300.

When the cutting insert 1200 is mounted onto the cutting tool holder 1100 and is positioned within the first portion 1130, the faces 1233 thereof become flush with the walls 1133 of the first portion, thereby holding it in place. The bottom bulge 1234 of the cutting insert 1200 is received within the socket 1312 of the chip breaker 1300 so that the central axis X of the cutting insert 1200 is aligned with the central axis X of the chip breaker 1300. Also, it is observed that in this position, one cutting portion 1220 of the cutting insert 1220 extends outwardly from the cutting tool holder 1100 to be used in the cutting operation, while the other two cutting portions 1220 are securely received within the first portion 1130.

Figure 25A:
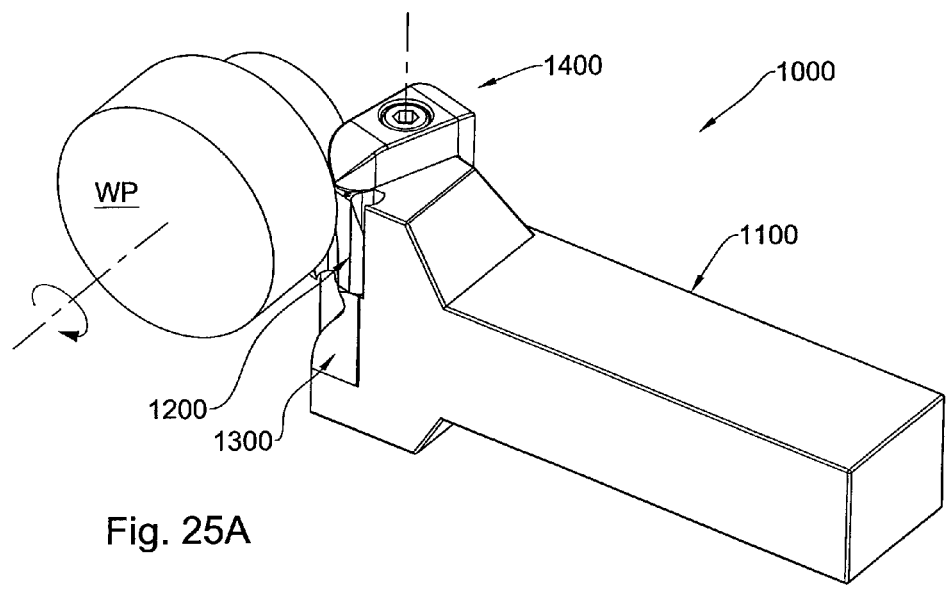
FIG. 25A is a schematic isometric view of the turning tool shown in FIG. 19A when coming in contact with a workpiece.
Figure 25B:
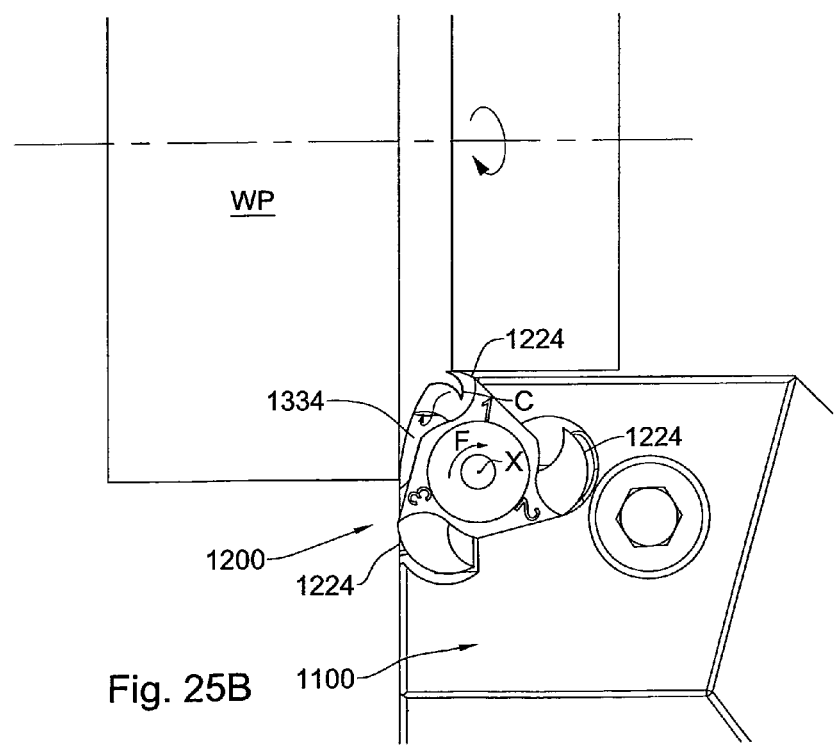
FIG. 25B is a schematic enlarged top view of the turning tool shown in FIG. 25A, with the clamp being removed for clearer view of the cutting insert.

Turning now to FIGS. 25A and 25B, in operation, as in the previously described, the chip C removed from the workpiece WP is pushed downwards, and thus, in this case, is urged into the breaking channel 1334 of the chip breaker 1300. Due to the curved shape of the breaking channel 1334, the chip is broken and evacuated through a bottom side of the cutting tool 1000. It should be noted that during operation of the cutting tool 1000, a resultant force F is applied to the cutting insert 1200, trying to revolve it about the central axis X. The side walls 1133 of the first portion 1130 provide the necessary support to the cutting insert 1200 via faces 1233, preventing such a rotation.

It should be clear that most principles and features described above with respect to cutting tools 1, 1", 100, 100', 200, 300, 400, 500, 600, 700, 800, 900 and 1000 and/or shown in FIGS. 1A to 25B, are not restricted to those cutting tools (1, 1", 100, 100', 200, 300, 400, 500, 600, 700, 800, 900 and 1000) in connection with which they are described/shown, and may independently be applied, mutatis mutandis, to each other or to any other tools, in any combination considered to be appropriate by a person skilled in the art.

Figure 26A:
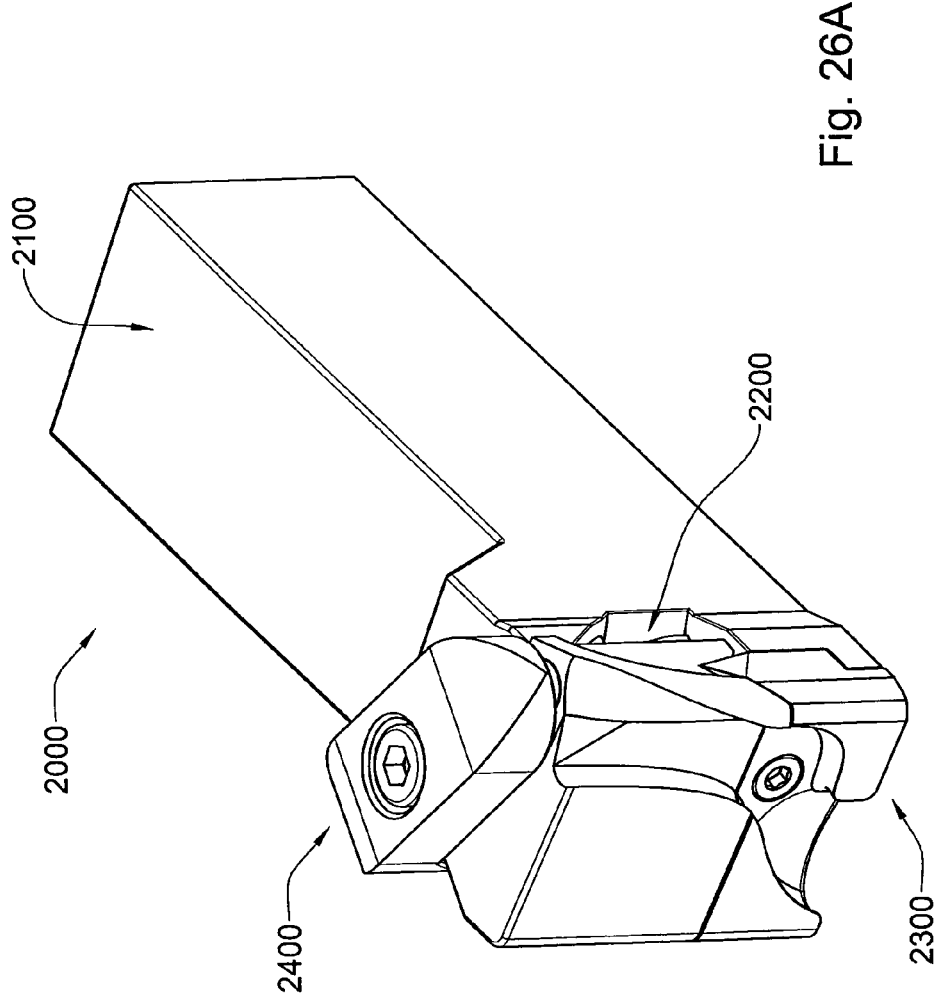
FIG. 26A is a schematic isometric view of a turning tool according to still another example of the disclosed subject matter.
Figure 26B:
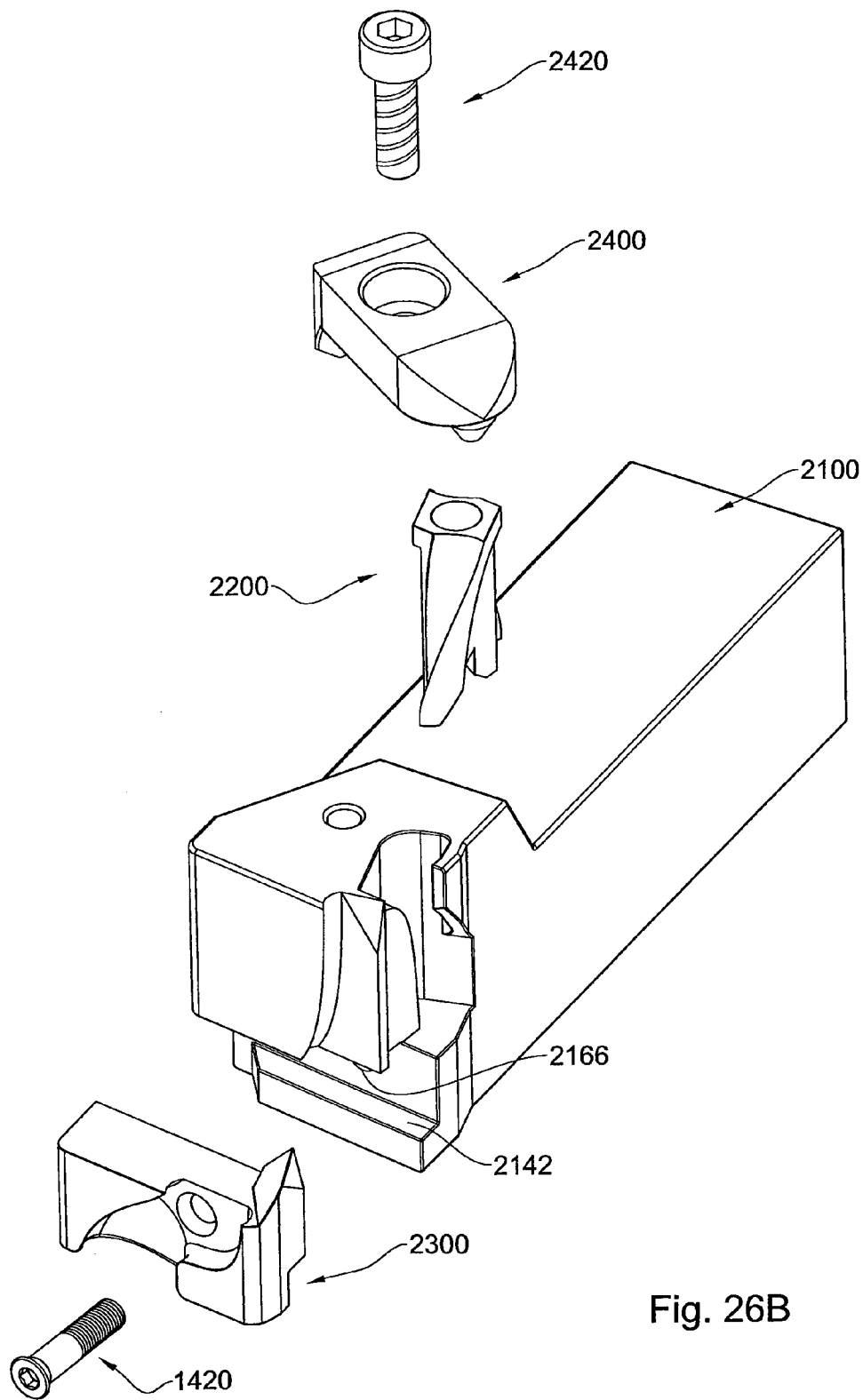
FIG. 26B is a schematic isometric exploded view of the turning tool shown in FIG. 26A.

Turning now to FIGS. 26A and 26B, another turning tool generally designated as 2000 is shown comprising a cutting tool holder 2100, a cutting insert 2200, a chip breaker 2300 and a fastening assembly 2400. The cutting tool holder 2100 is formed with a seat portion 2130 accommodating said chip breaker 2300 and the cutting insert 2200 such that the cutting insert 2200 is positioned on the chip breaker 2300 and is supported thereby.

In general, the turning tool 2000 is similar to the previously described turning tool 1000, with the difference being that the chip breaker 2300 is not received within the cutting tool holder 2100 and supported by a bottom base thereof, but rather is attached to the cutting tool holder 2100 from the front of the cutting tool holder 2100 using a fastening bolt 2420. For purpose of convenience, elements in the turning tool 2000 which are similar to elements of the milling tool 1000 were designated with similar designation numbers, but upped by 1000 (e.g. cutting tool holder 1100 of the turning tool 1000 is similar to the cutting tool holder 2100 of the turning tool 2000).

In the present example, the chip breaker 2300 is formed with an under surface 2322 and the front face of the cutting tool holder 2100 is formed with a corresponding rail 2142 (FIG. 26B), such that it is adapted for mounting thereon the chip breaker 2300. The chip breaker 2300 is further formed with a fastening hole 2366, and the front surface of the cutting tool holder 2100 is formed with a corresponding fastening bore 2166 such that when the chip breaker 2300 is mounted onto the cutting tool holder 2100, a fastening bolt 1420 may be threaded into the bore 2166 via the hole 2366 in order to secure the chip breaker 2300 in place.

Figure 27A:
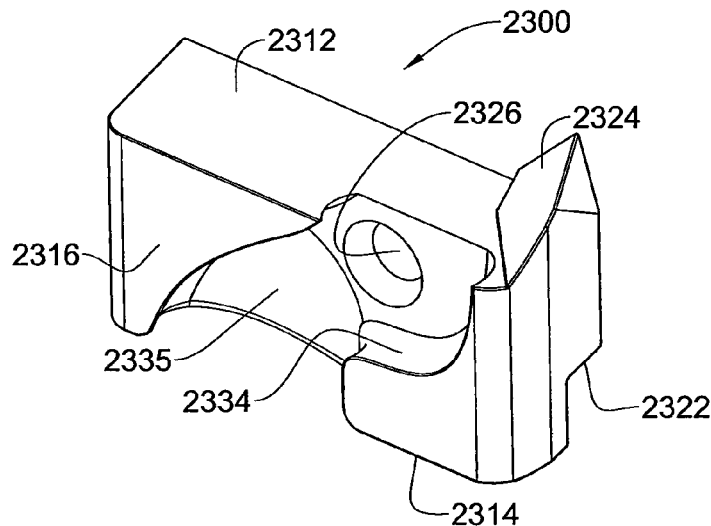
FIG. 27A is a schematic isometric view of a cutting insert holder shown in FIG. 26A.
Figure 27B:
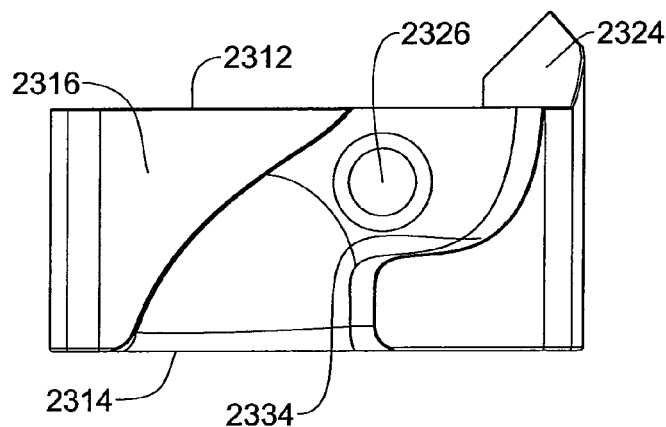
FIG. 27B is a schematic front view of the cutting insert holder shown in FIG. 27A.
Figure 27C:
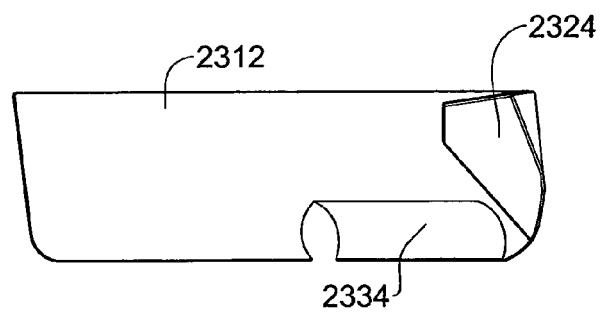
Figure 28:
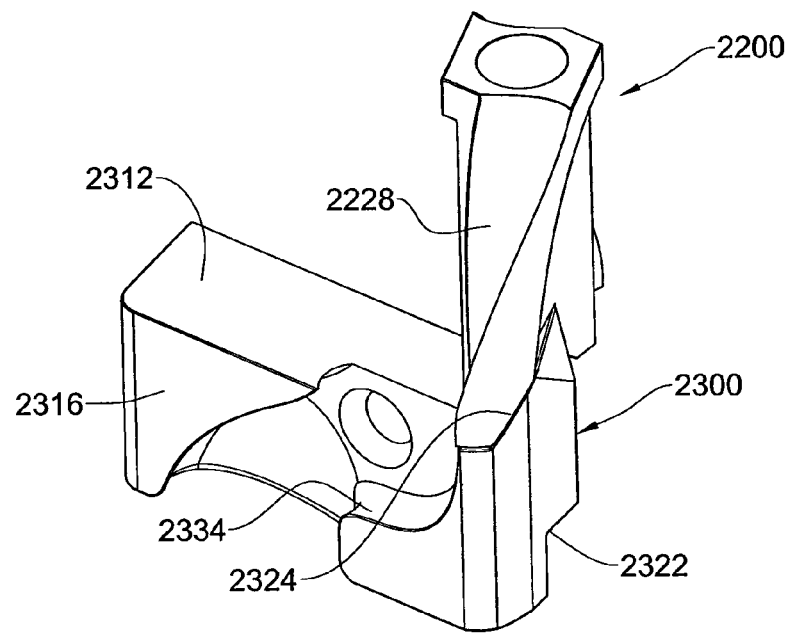
FIG. 28 is a schematic isometric view of the chip breaker as shown in FIG. 27A with a cutting insert as shown in FIG. 26A engaged therewith.

Turning now to FIG. 27A, the chip breaker 2300 is shown having a planar top surface 2312, a bottom surface 2314 and a side surface 2316. At the side surface 2316, the chip breaker 2300 is formed with a cut-out chip evacuation channel 2335 having a curved shape and comprising a chip breaker surface 2334 curved at an angle of nearly 90°. The chip breaking surface 2334 is adapted for receiving a chip during operation of the cutting tool 2000 and, owing to the right angle thereof, to break it before it is discharged from the cutting tool 2000.

The chip breaker 2300 is further formed with a support wall 2324 extending from the top surface thereof, and adapted for supporting the cutting insert 2200 when mounted onto the cutting tool 2000. The support wall 2324 is similar in shape and angle to a corresponding support surface formed in the cutting insert 2200.

Turning now to FIGS. 29A to 29E, the cutting insert is shown comprising a body 2210 extending along a central axis X and having two flaps 2220 extending on opposite sides of the central axis X.

Each of the flaps 2220 is formed with a cutting edge 2224 being the intersection between a rake surface 2225 and a relief surface 2226. Each of the flaps 2220 is also curved, thus forming a chip evacuation channel 2228 through which chip may be evacuated during operation of the cutting tool 2000.

It is further observed that the cutting insert 2200 is formed with a head portion 2230 having a planar top surface 2232 and planar side walls 2233. The planar side walls 2233 are adapted for preventing the cutting insert 2200 from revolving during operation of the cutting tool 2000.

The cutting insert 2000 is also formed with a slanted supporting surface 2234 at an end axially opposed to the head portion 2230. The slanted surface 2234 is formed at an angle corresponding to the support surface 2324 of the chip breaker 2300 such that when mounted onto one another, the surface 2234 and 2324 abut one another to allow proper support of the cutting insert 2200 by the chip breaker 2300.

Figures 29A, 29B:
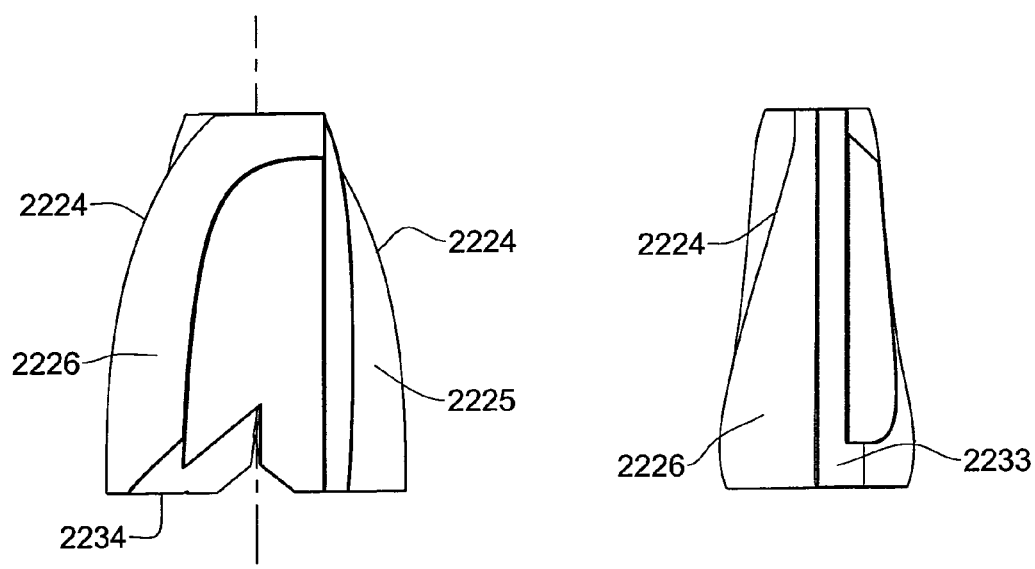
Figure 29C:
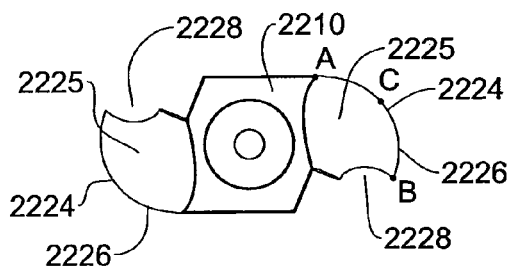
Figure 29E:
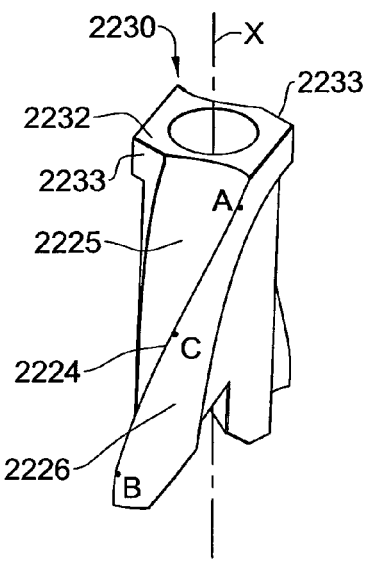
Figure 29D:
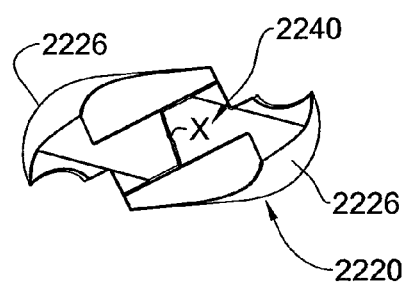
Figure 29F:
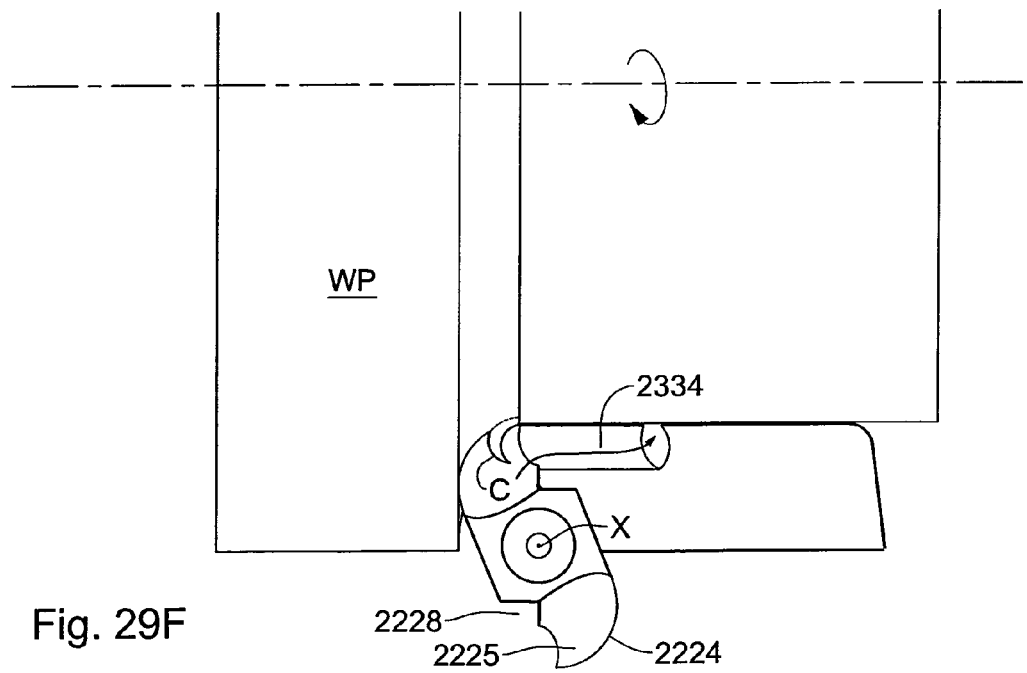
Figure 29G:
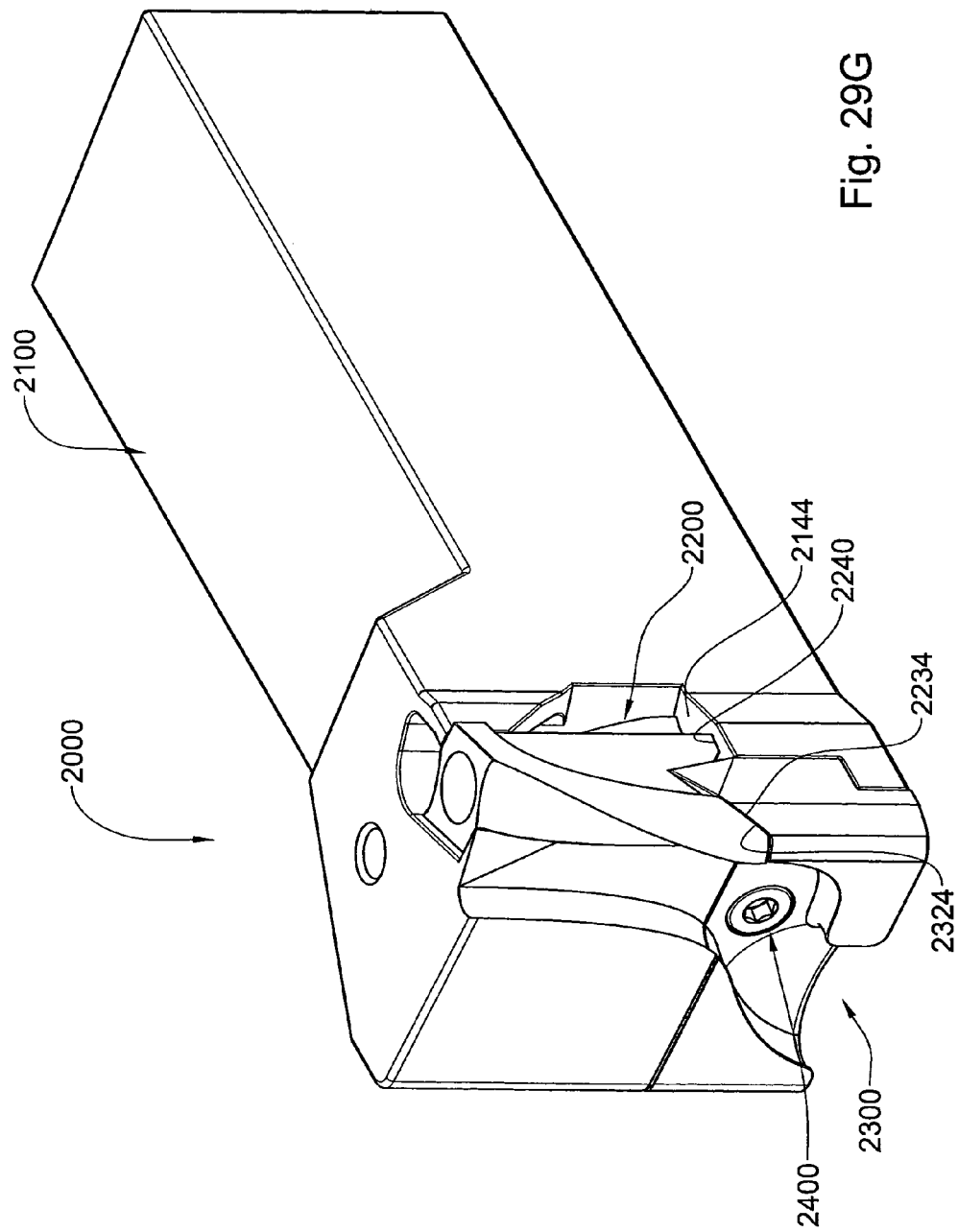
FIG. 29G is a schematic top view of the turning tool shown in FIG. 26A when coming in contact with a workpiece.

Turning now to FIG. 29G, the cutting insert 2200 is shown mounted onto the cutting tool holder 2100 and supported by the chip breaker 2300. In this position, a bottom portion 2240 of the cutting insert 2200 is supported by a support surface 2144 of the cutting tool holder 2100 while the support surface 2234 of the cutting insert is supported by the support surface 2324 of the chip breaker 2300.

Turning now to FIG. 29F, the chip evacuation flute 2234 of the chip breaker 2300 is aligned with the chip evacuation channel 2228 of the cutting insert, thereby allowing chips to flow freely during the cutting operation as shown in FIG. 29F. However, it is noted that due to the angle of the chip evacuation flute 2234, the chips removed from the workpiece are forced to be broken, and are discharged from the chip breaker 2300 in a broken state (i.e. not in a continuous string).

It should be clear that most principles and features described above with respect to cutting tools 1, 1", 100, 100', 200, 300, 400, 500, 600, 700, 800, 900, 1000 and 2000 and/or shown in FIGS. 1A to 29F, are not restricted to those cutting tools (1, 1", 100, 100', 200, 300, 400, 500, 600, 700, 800, 900, 1000 and 2000) in connection with which they are described/shown, and may independently be applied, mutatis mutandis, to each other or to any other tools, in any combination considered to be appropriate by a person skilled in the art.

Figure 30A:
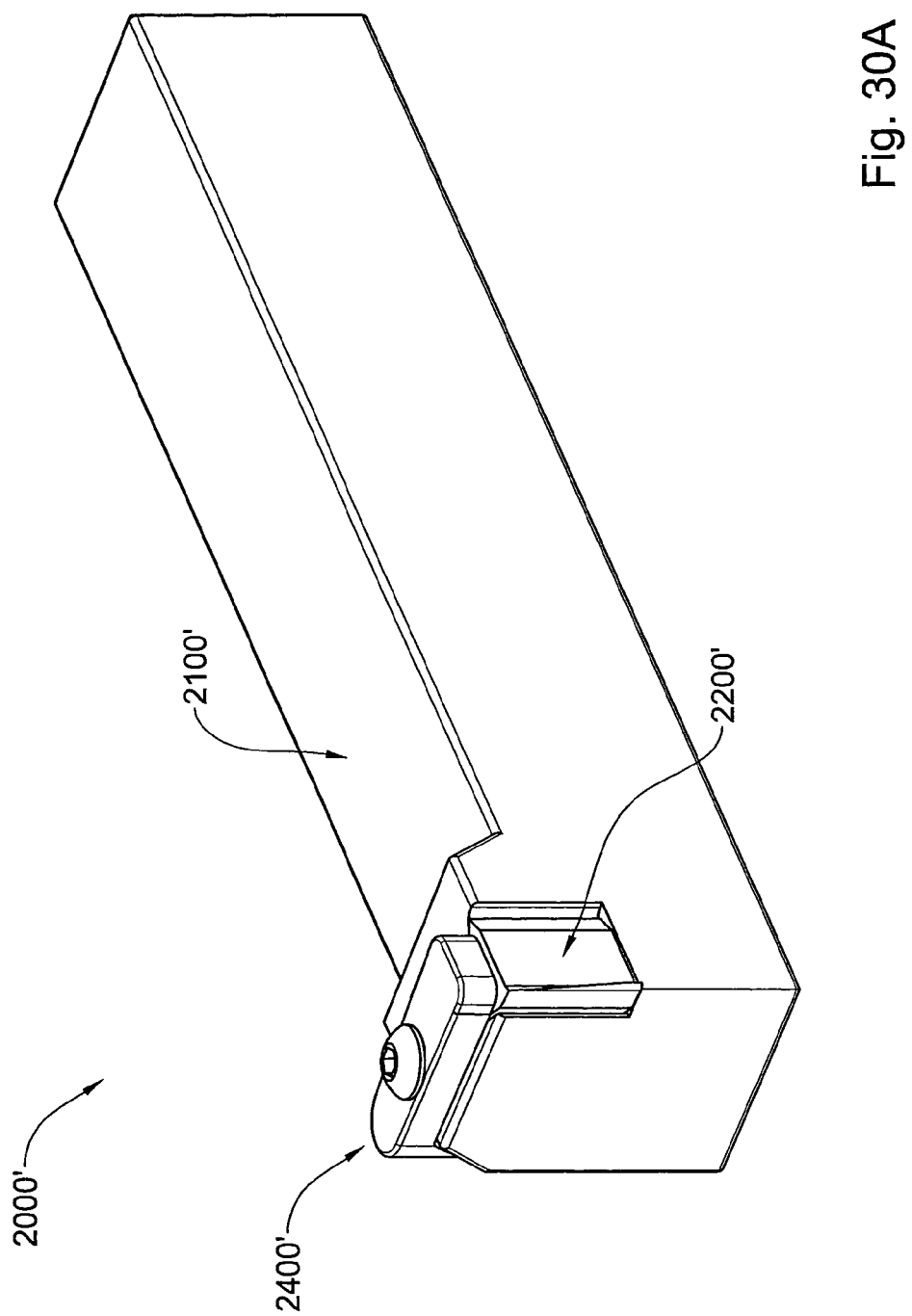
FIG. 30A is a schematic isometric view of a finishing tool according to still another example of the disclosed subject matter.
Figure 30B:
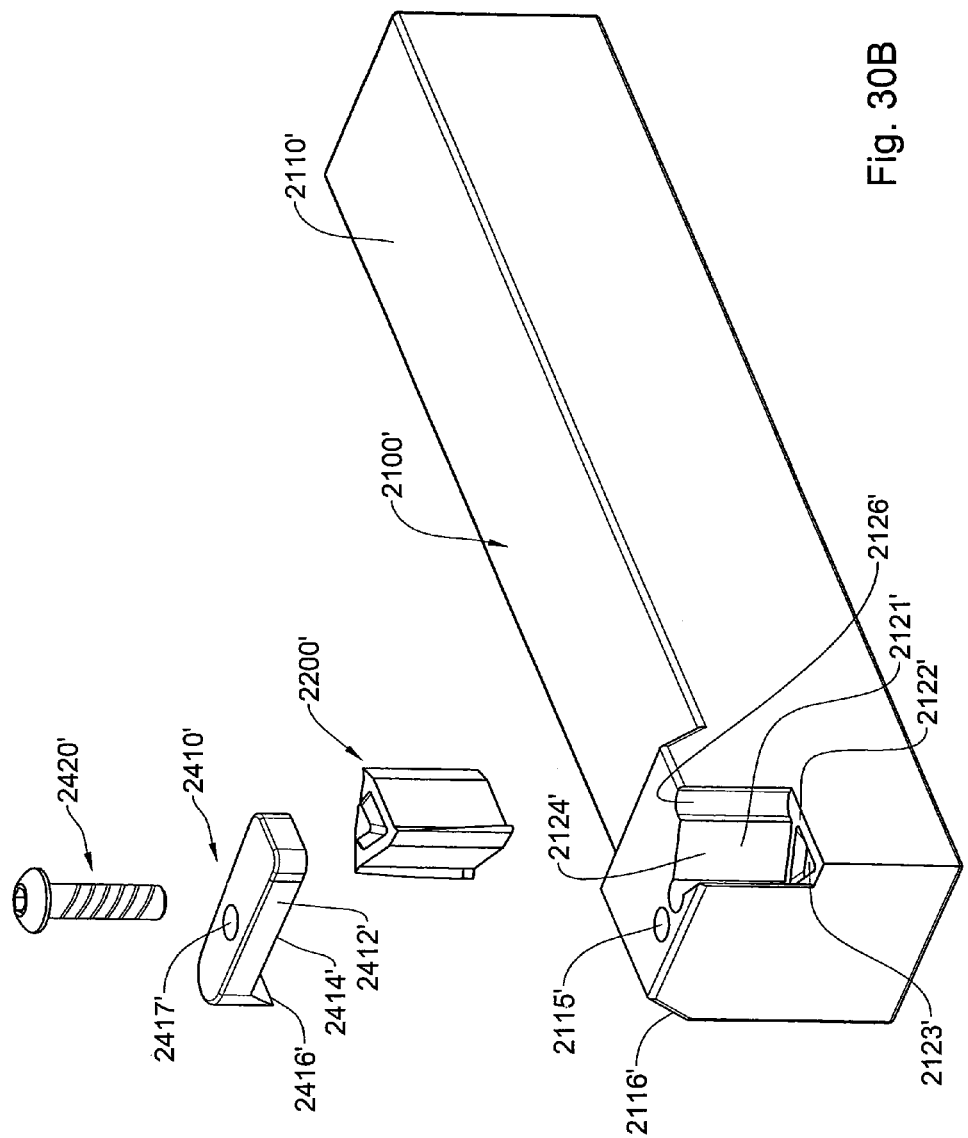
FIG. 30B is a schematic isometric exploded view of the finishing tool shown in FIG. 30A.
Figure 30C:
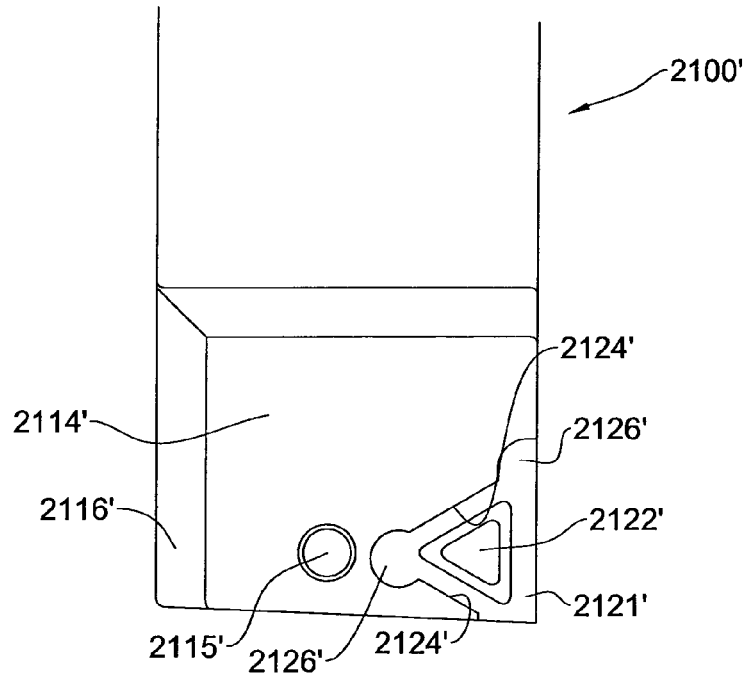
FIGS. 30C and 30D are schematic respective top and isometric views of a cutting tool holder of the finishing tool shown in FIG. 30A.
Figure 30D:
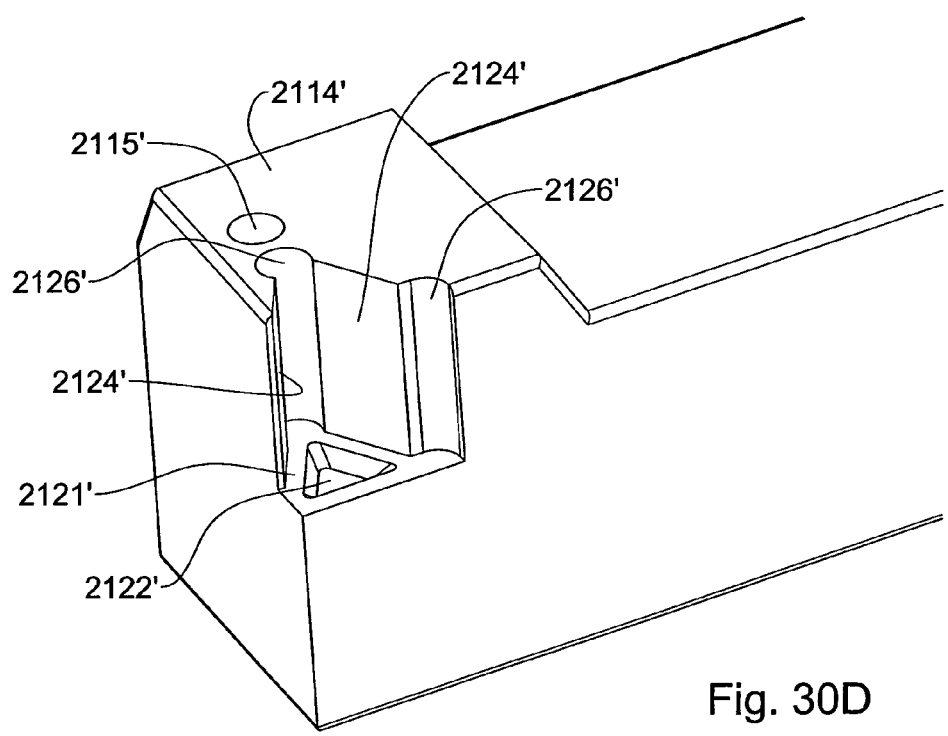
Figure 31A:
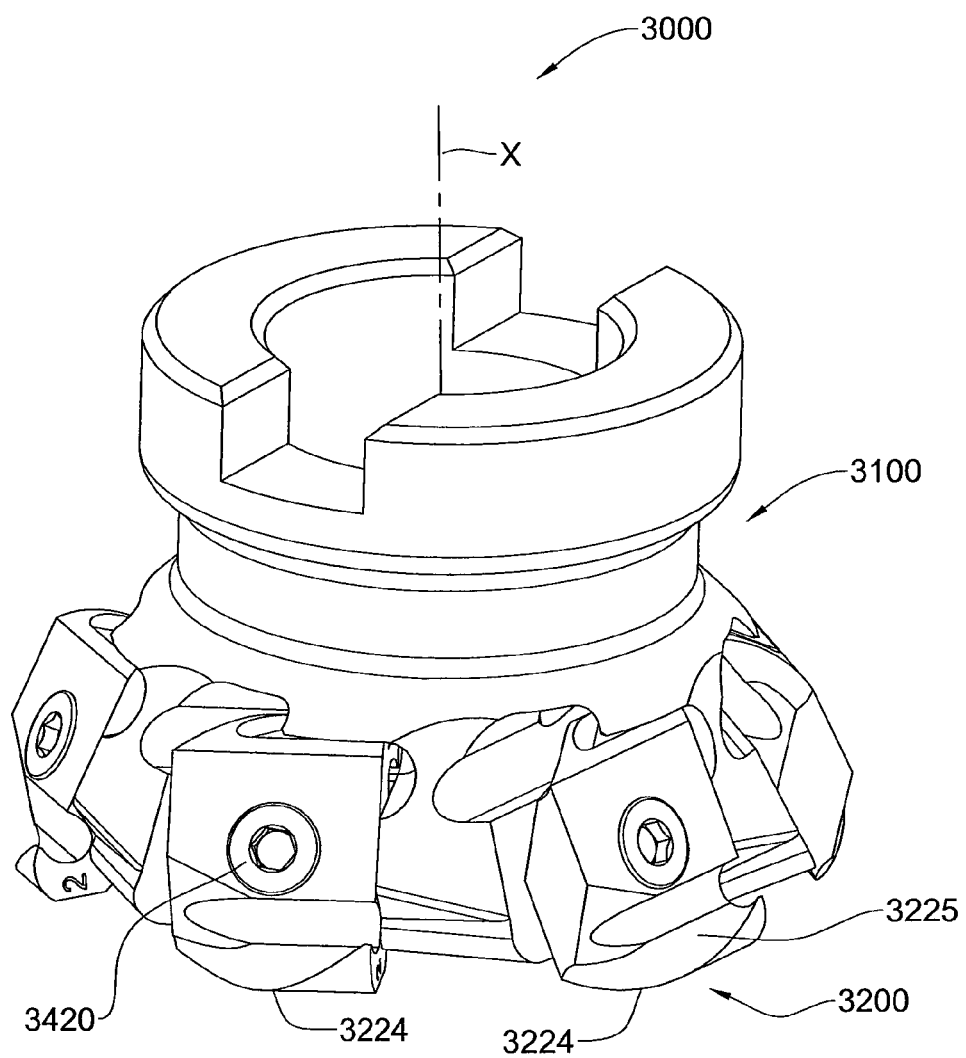
FIG. 31A is a schematic isometric view of a milling tool according to another example of the disclosed subject matter.
Figure 32A:
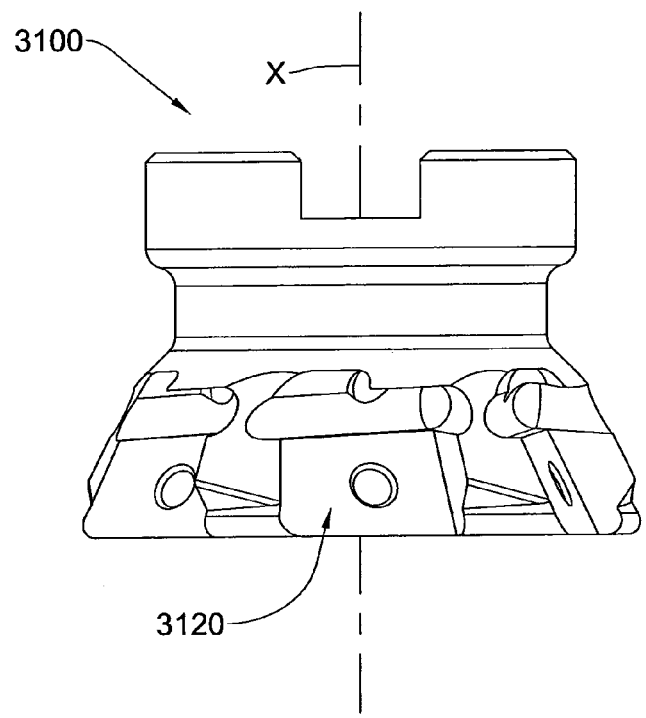
FIGS. 32A to 32D are, respectively, schematic front, top, bottom and isometric view of the milling tool holder as shown in FIG. 13A.
Figure 32B:
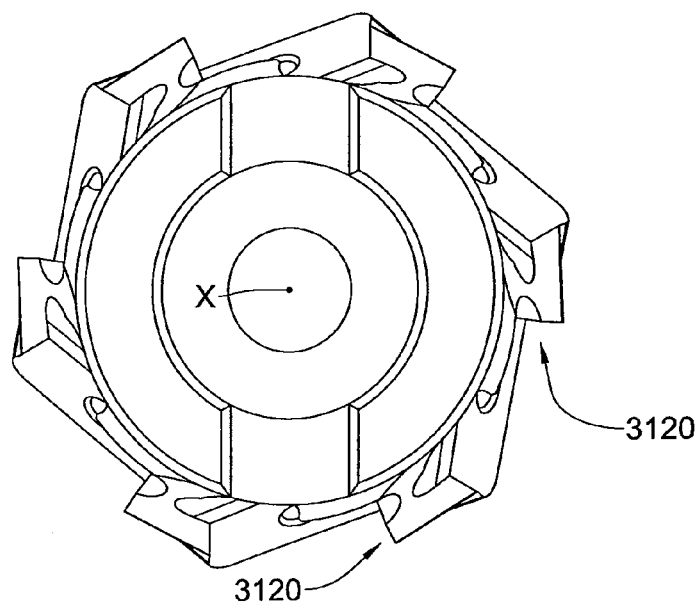
Figure 32C:
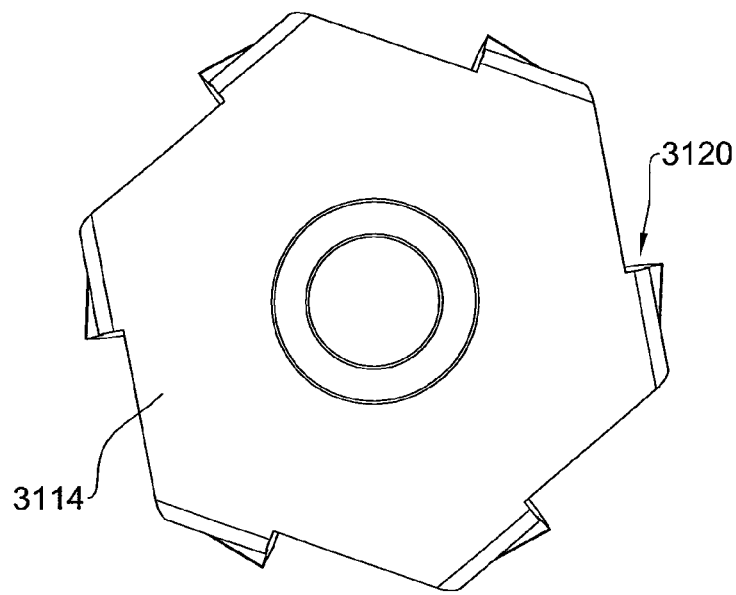
Figure 32D:
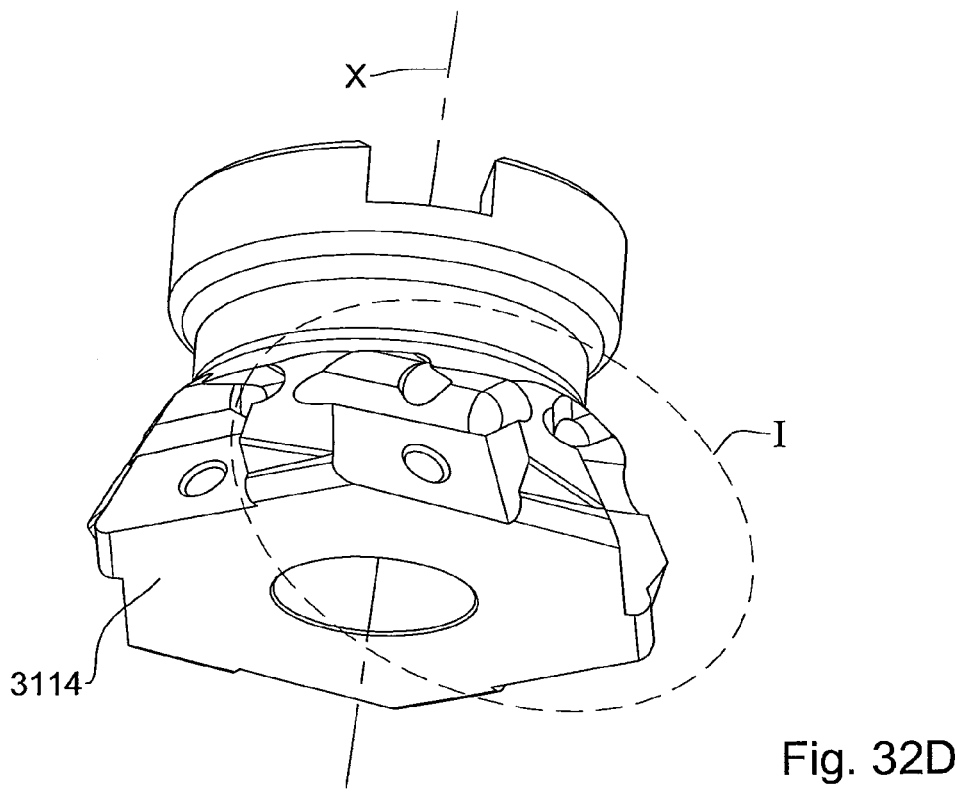
Figure 32E:
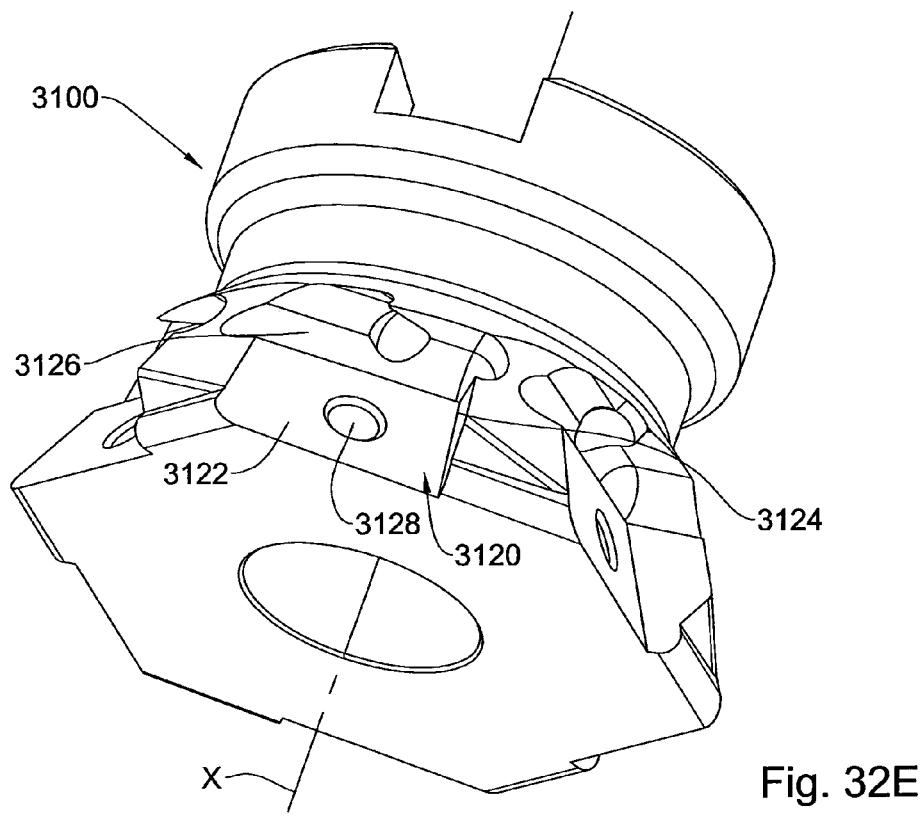
FIG. 32E is a schematic enlarged view of detail I shown in FIG. 32D.

Turning now to FIGS. 30A and 30B, a finishing tool is shown generally designated as 2000', and comprising a cutting tool holder 2100', a cutting insert 2200' and a fastening assembly 2400'. The finishing tool 2000' is generally similar to the turning tool 1000' with two main differences as will now be explained: the lack of a separate chip breaker (equivalent to chip breaker 1300 in turning tool 1000) and the size of the cutting edges 2224' (compared to the size of the cutting edges 1224 in turning tool 1000).

The cutting tool holder 2100' is formed with a body 2110' having at a distal end thereof a mounting portion 2120' in the form of a cavity 2121' adapted to receive therein the cutting insert 2200'. The cavity 2121' is delimited by a bottom support surface 2122' and side walls 2124' and shaft portions 2126' extending perpendicularly therefrom. The bottom surface 2122' is further formed with a socket 2123' adapted to receive a corresponding bulge of the cutting insert 2200'.

The side walls 2124' of the mounting portion 2120' are planar, and are adapted to engage corresponding planar faces of the cutting insert 2200'. To the contrary, the shaft portions 2126' are adapted to receive therein cutting edges of the cutting insert 2200' which do not participate in the cutting operation of the turning tool 2000'.

Turning now to FIGS. 30E to 30G, the cutting insert 2200' extends along a central axis X, and is formed with a top face 2232', a bottom face 2231' and three side faces 2234' extending therebetween. Between each two neighboring side faces 2234' there extends a cutting portion comprising a cutting edge 2224' being the intersection between a rake surface 2226' and a relief surface 2228', also extending between the top face 2232' and the bottom face 2231' in the axial direction.

As in the previously described cutting tools, the cutting edges 2224' extend between the top face 2232' and the bottom face 2231' of the cutting insert 2200', rather than extending along the intersection line between the top face 2232' and the side face 2234' as in common cutting tools.

The cutting insert 2200' is further formed with two triangular alignment bulges 2242', one protruding from the top face 2232' of the cutting insert 2200' and the other protruding from the bottom face 2231' of the cutting insert 2200'. The alignment bulges 2242' are adapted to be received within the corresponding socket 2123' of the cutting tool holder 2100'.

In assembly, the cutting insert 2200' is mounted onto the cutting tool holder 2100' such that the bottom surface 2231' thereof rests on the bottom surface 2122' of the cavity 2121', and the triangular bulge 2242' is received within the socket 2123'. In this position the side faces 2234' of the cutting insert 2200' are flush against the side walls 2124' and two cutting edges 2224' of the cutting insert are receive within the shaft portion 2126'.

In this position, the remaining cutting edge 2224' protrudes from the cutting tool holder 2100 and allows is to be used in a finishing operation performed by the finishing tool 2000.

In operation, the finishing tool 2000' operated in a manner similar to the turning tool 1000. However, since it is a finishing tool, the radial extension of the cutting edges 2224' is much smaller than the radial extension of the corresponding cutting edges 1224' of cutting tool 1000.

It should be clear that most principles and features described above with respect to cutting tools 1, 1", 100, 100', 200, 300, 400, 500, 600, 700, 800, 900, 1000, 2000 and 2000' and/or shown in FIGS. 1A to 30G, are not restricted to those cutting tools (1, 1", 100, 100', 200, 300, 400, 500, 600, 700, 800, 900, 1000, 2000 and 2000') in connection with which they are described/shown, and may independently be applied, mutatis mutandis, to each other or to any other tools, in any combination considered to be appropriate by a person skilled in the art.

Turning now to FIGS. 31A to 34D, another milling tool is shown, generally designated as 3000. The milling tool 3000 comprises a cutting tool holder 3100 and six milling insert 3200 mounted thereon and secured thereto using fastening bolts 3420. The milling tool 3000 has a central axis X and is adapted to rotate about this axis during a milling operation.

With particular reference to FIGS. 32A to 32E, the cutting tool holder 3100 is formed with six insert seats 3120, each being adapted to receive therein a cutting insert 3200. Each insert seat 3120 is formed with a bottom face 3122 and two side walls 3124 and 3126 extending generally perpendicular to the bottom face 3122 and oriented at an angle to one another. The bottom face 3122 is formed with a securing bore 3128 adapted to receive therein a fastening bolt in order to secure the cutting insert 3200 in place.

Figure 34A:
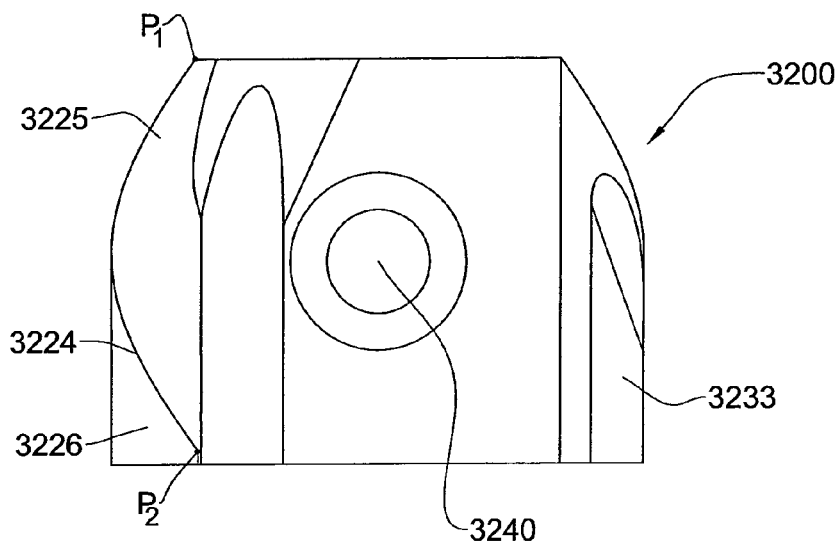
FIGS. 34A to 34C are, respectively, schematic front, side and isometric views of the cutting insert shown in FIG. 31A.
Figure 34B:
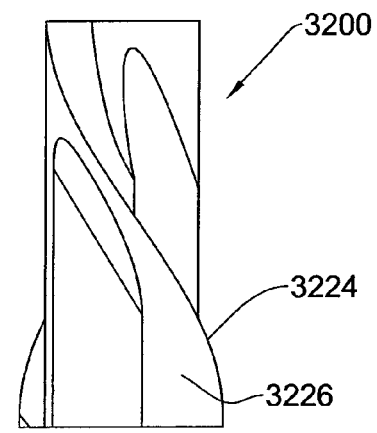
Figure 34C:
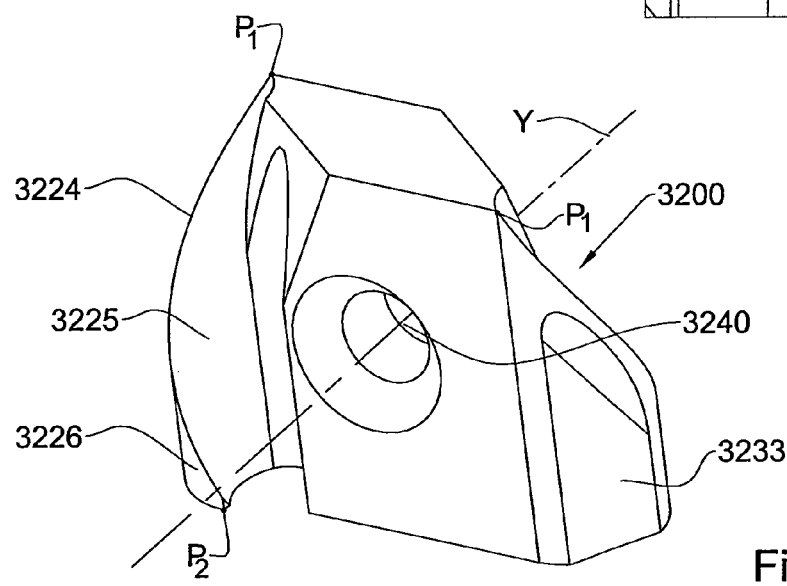

Turning now to FIGS. 34A to 34C, the milling insert 3200 comprises a central mounting portion 3210 extending along an axis X, and two peripheral cutting portions 3220 also extending along the X axis at opposite ends of the mounting portion 3210. The The mounting portion 3210 has a top face 3212, a bottom face 3213 and two side faces 3214 extending therebetween. The mounting portion 3210 is further formed with a fastening bore 3240 extending between the side faces 3214, having a central axis Y. The fastening bore 3240 is adapted to receive therethrough a fastening bolt 3420 in order to secure the cutting insert 3200 when the latter is mounted onto the insert seat of the cutting tool holder 3100.

Each of the cutting portions 3220 is formed with a cutting edge 3224 defined as an intersection between a rake surface 3225 and a relief surface 3226. The cutting edge 3224 extends between a first end point $P_1$ located adjacent the top face 3212 of the mounting portion 3210, and a second end point $P_2$ and the bottom face 3213 of the mounting portion 3210, and has a helical shape. In particular, the first end point $P_1$ and second end point $P_2$ are axially offset with respect to one another, the first end point $P_1$ being closer to one side face 3214 of the mounting portion 3210 and the second end point $P_2$ being closer to the other side face 3214 of the mounting portion 3210.

It should also be noted that the cutting insert 3200 is reversible and has rotational symmetry with respect to a central plane located between the two side faces 3214 and generally parallel thereto (this plane containing the axis X). It should also be noted in this respect that, due to this symmetry, the first end point of one cutting edge 3224 is closer to one side face 3214 while the first end point of the other cutting edge 3224 is oppositely closer to the other side face 3214.

Figure 33:
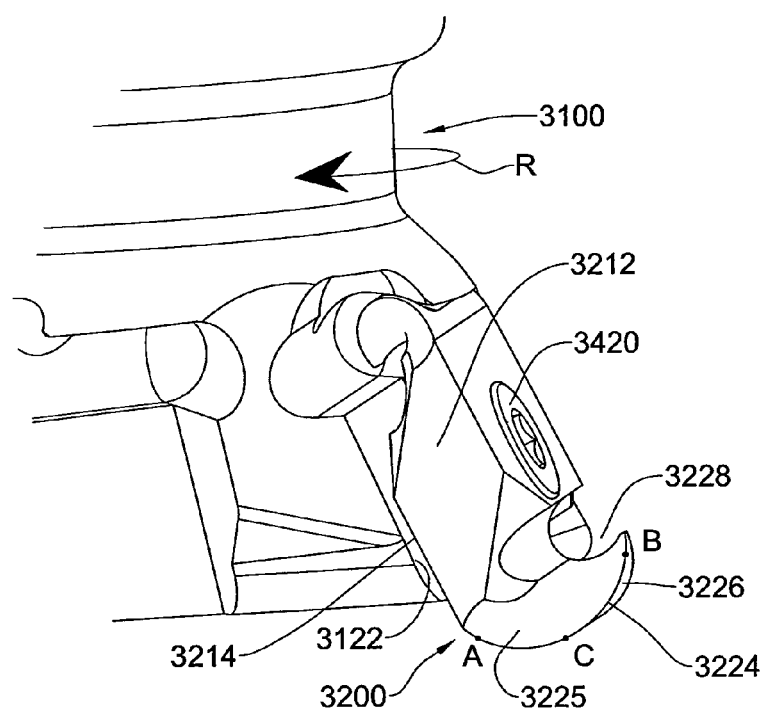
FIG. 33 is a schematic enlarged isometric view of a milling cutting insert shown in FIG. 31A when mounted onto the milling holder also shown in FIG. 31A.

With particular reference to FIG. 33, the cutting insert 3200 is shown when mounted onto the cutting tool holder 3100. In the mounted position, a fastening bolt 3400 secures the cutting insert 3200 onto the insert seat 3120. It is observed that the cutting insert 3200 is mounted such that one side face 3214 thereof is flush against the base surface 3122 of the insert seat 3120, and such that the top face 3212 thereof is facing in the revolution direction R of the revolution of the cutting tool 3200 during the cutting operation.

Figure 34D:
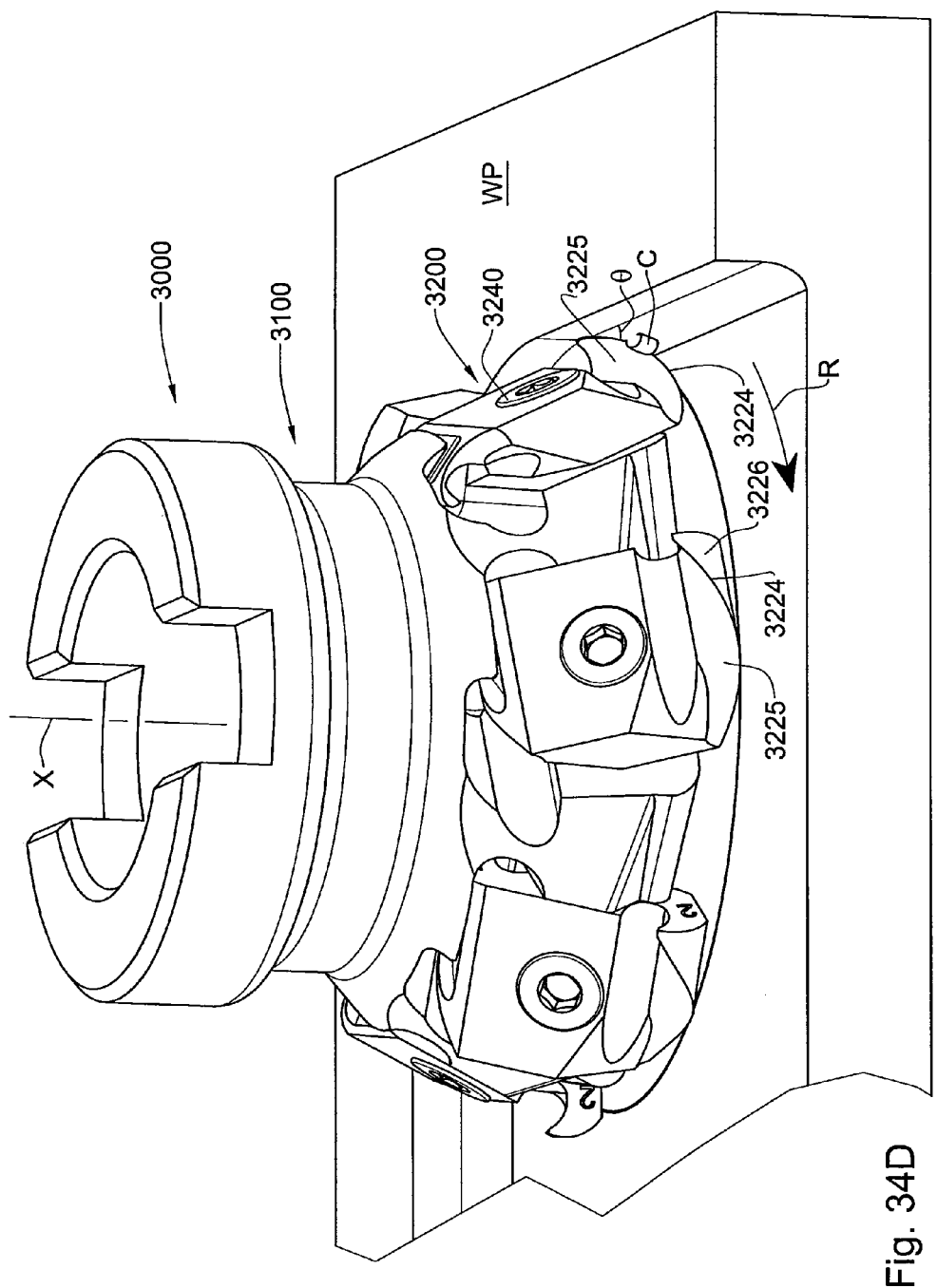
FIG. 34D is a schematic isometric view of the milling tool shown in FIG. 31A when coming in contact with a workpiece.

In operation, as illustrated in FIG. 34D, as the cutting tool 3000 revolves about the central axis X thereof and has a feed such that the cutting inserts 3200 come in contact with the workpiece WP, the cutting edge 3224 removes a chip from the workpiece by "scraping" it off. Thus, similarly to the previously described cutting tools, the cutting edge 3224 penetrates the workpiece at a generally acute angle θ.

Figure 35A:
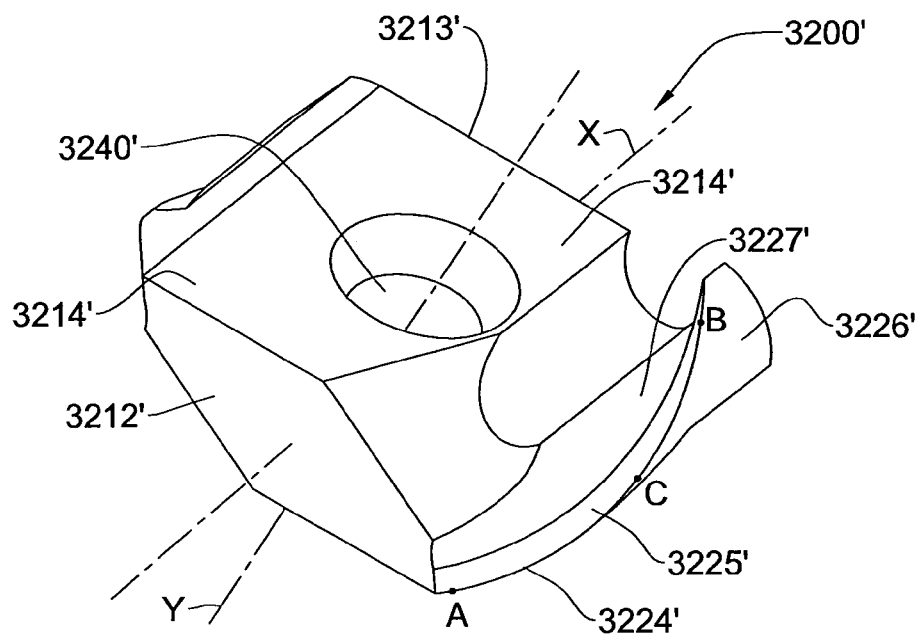
FIGS. 35A and 35B are schematic respective isometric and front views of another example of a cutting insert to be used in the cutting tool shown in FIG. 31A.
Figure 35B:
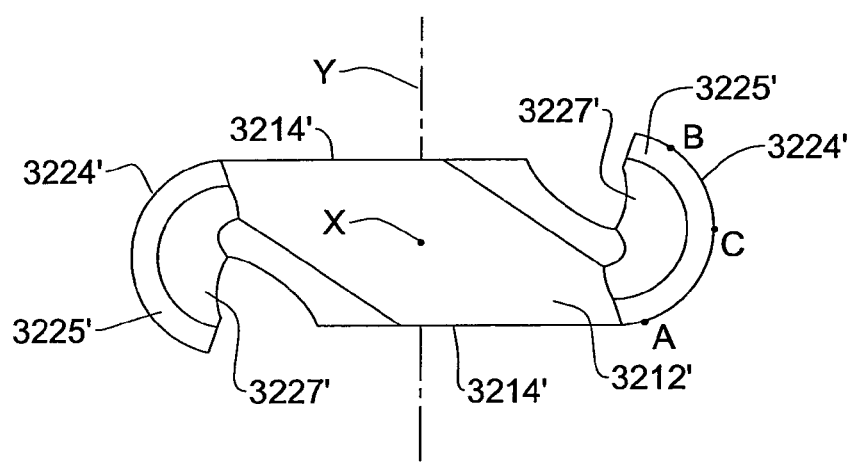
Figure 36:
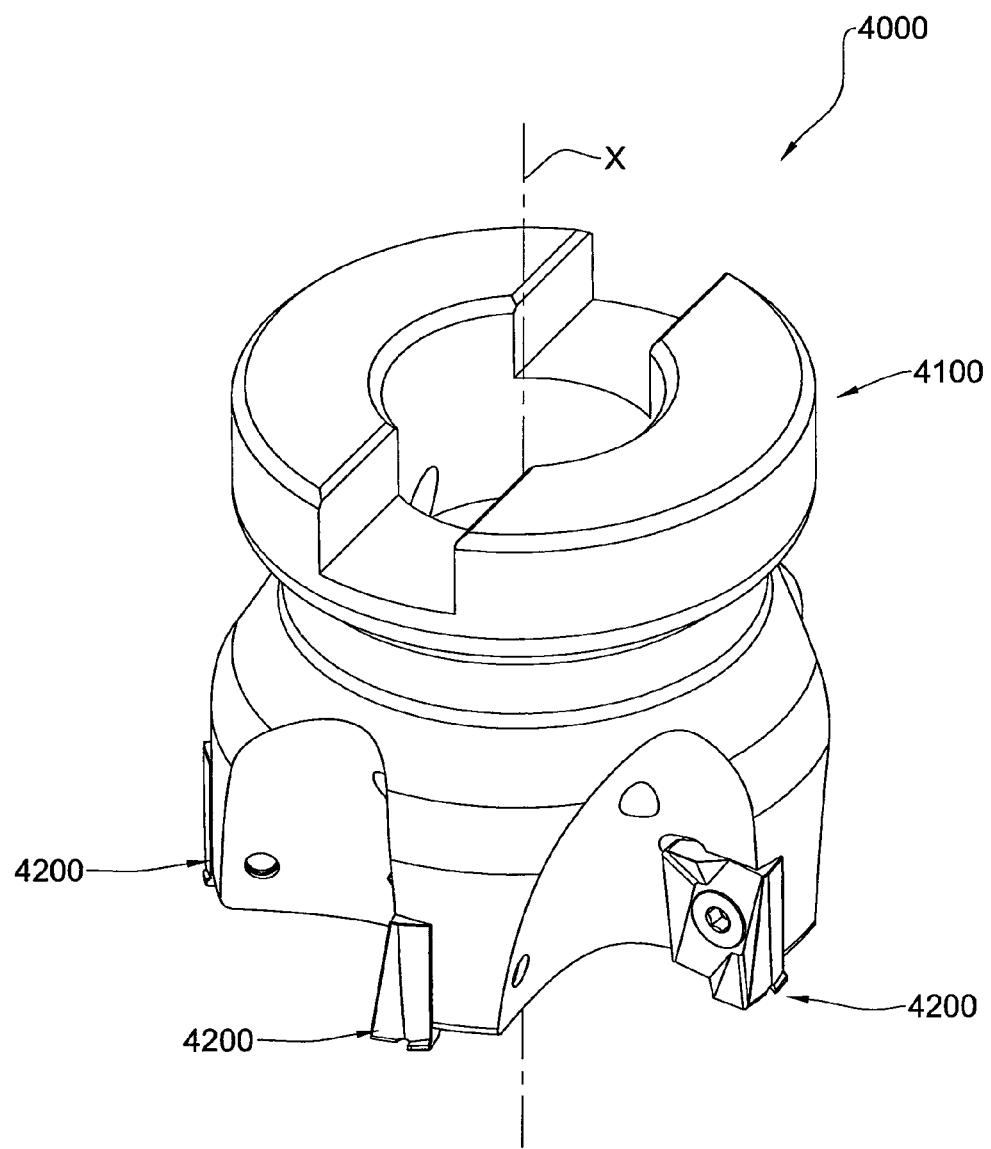
FIG. 36 is a schematic isometric view of a milling tool according to yet another example of the disclosed subject matter, in which each cutting insert has two cutting edges.

Turning now to FIGS. 35A and 35B, another cutting insert, generally designated 3200' is shown. The cutting insert 3200' is generally similar to the cutting insert 3200 and therefore elements of the cutting insert 3200' which are similar elements to elements of the cutting insert 3200 are denoted by similar numerals, with the addition of a ('), i.e. cutting edge 3224' of the cutting insert 3200 is similar to cutting edge 3224' of the cutting insert 3200'.

The difference between the cutting insert 3200' and the cutting insert 3200 lies in the shape of the cutting edge 3224'. In particular, the cutting edge 3224' of the cutting insert 3200' is produced by chamfering the cutting edge 3224 of the cutting insert 3200. Thus, in the cutting insert 3200', the rake surface 3225 is now constituted by a rake surface 3225' and an additional surface 3227'. The chamfering provides for a sturdier cutting edge 3224' which may withstand a greater load during a cutting operation.

It should be clear that most principles and features described above with respect to cutting tools 1, 1", 100, 100', 200, 300, 400, 500, 600, 700, 800, 900, 1000, 2000, 2000', 3000 and 3000' and/or shown in FIGS. 1A to 35B, are not restricted to those cutting tools (1, 1", 100, 100', 200, 300, 400, 500, 600, 700, 800, 900, 1000, 2000, 2000', 3000 and 3000') in connection with which they are described/shown, and may independently be applied, mutatis mutandis, to each other or to any other tools, in any combination considered to be appropriate by a person skilled in the art.

Turning now to FIGS. 36 through 38D, another milling tool is shown generally designated as 4000, and comprising a cutting tool holder 4100 and five cutting inserts 4200 secured thereto using bolts 4420. The milling tool 4000, as well as milling tools 4000' and 4000" to be further described with respect to FIGS. 39A to 40D and FIGS. 41 to 42C respectively, are all based on the principle referred herein as "back tooth".

Figure 37A:
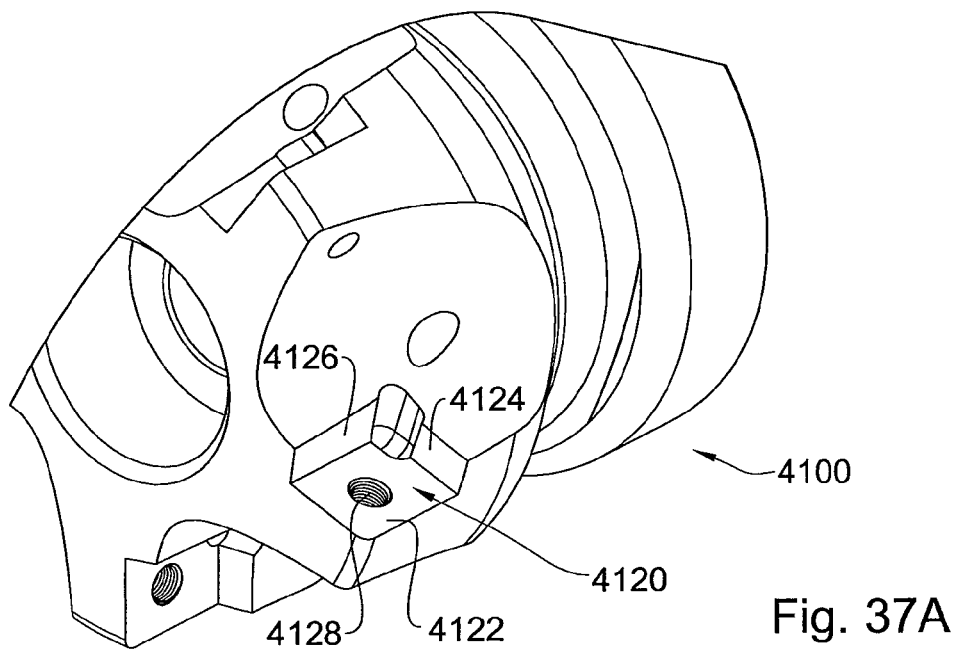
FIG. 37A is a schematic enlarged isometric view of a milling tool holder shown in FIG. 36.

With particular reference to FIG. 37A, the milling tool holder 4100 is formed with five insert seats 4120, each having a base surface 4122 and two side walls 4124, 4126 extending generally perpendicular to the base surface 4120 and oriented generally perpendicular to one another. The base surface 4122 is formed with a fastening bore 4128 adapted for threading therein of a fastening bolt 4420 to secure a cutting insert 4200 onto the insert seat 4120.

Figure 37B:
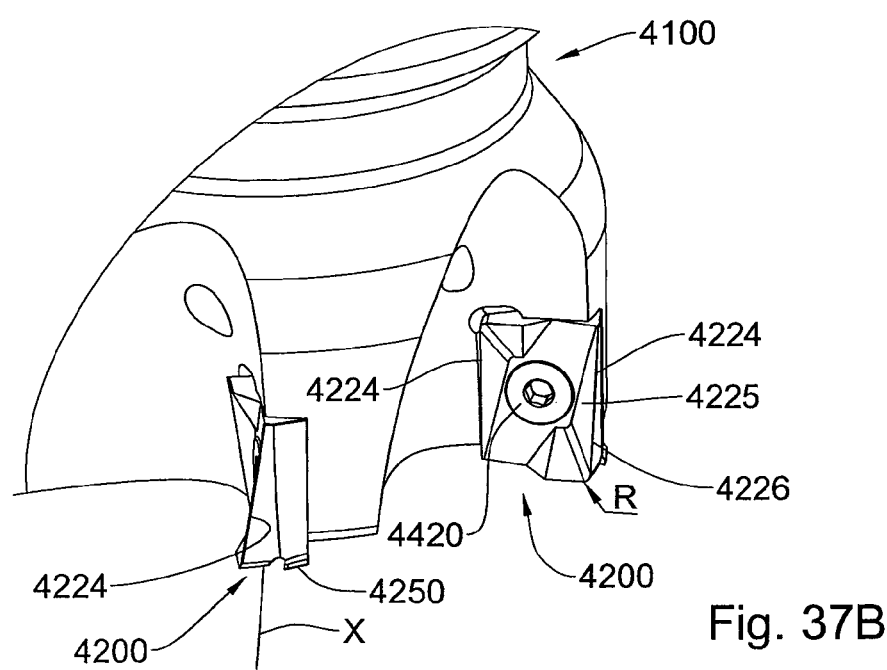
FIG. 37B is a schematic enlarged isometric view of the milling tool holder shown in FIG. 37A, with a cutting insert shown in FIG. 36 mounted therein.
Figure 38B:
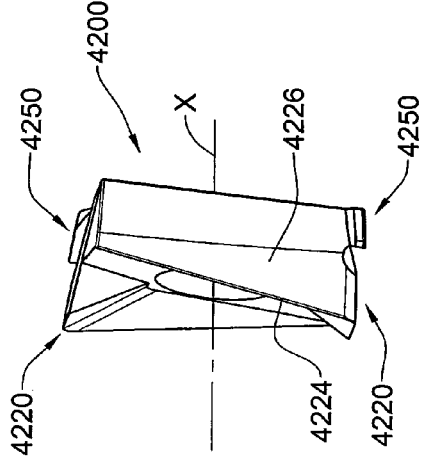
FIGS. 38A to 38D are, respectively, schematic front, side, top and isometric views of the cutting insert shown in FIG. 37A.
Figure 38D:
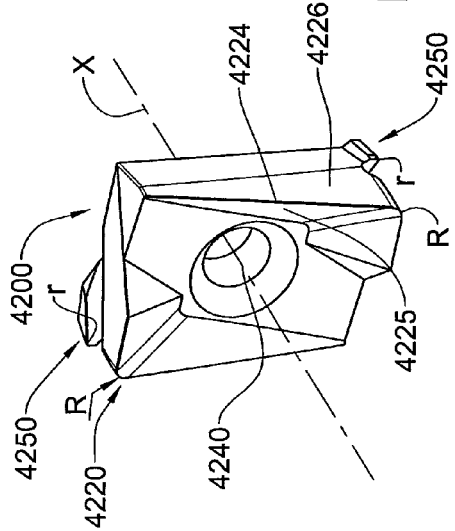
Figure 38A:
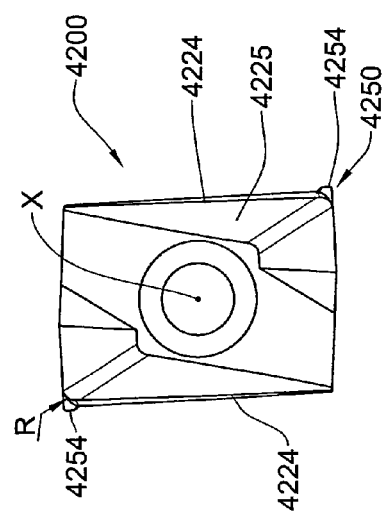
Figure 38C:
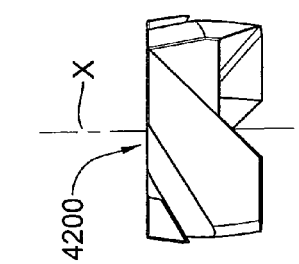
Figure 39A:
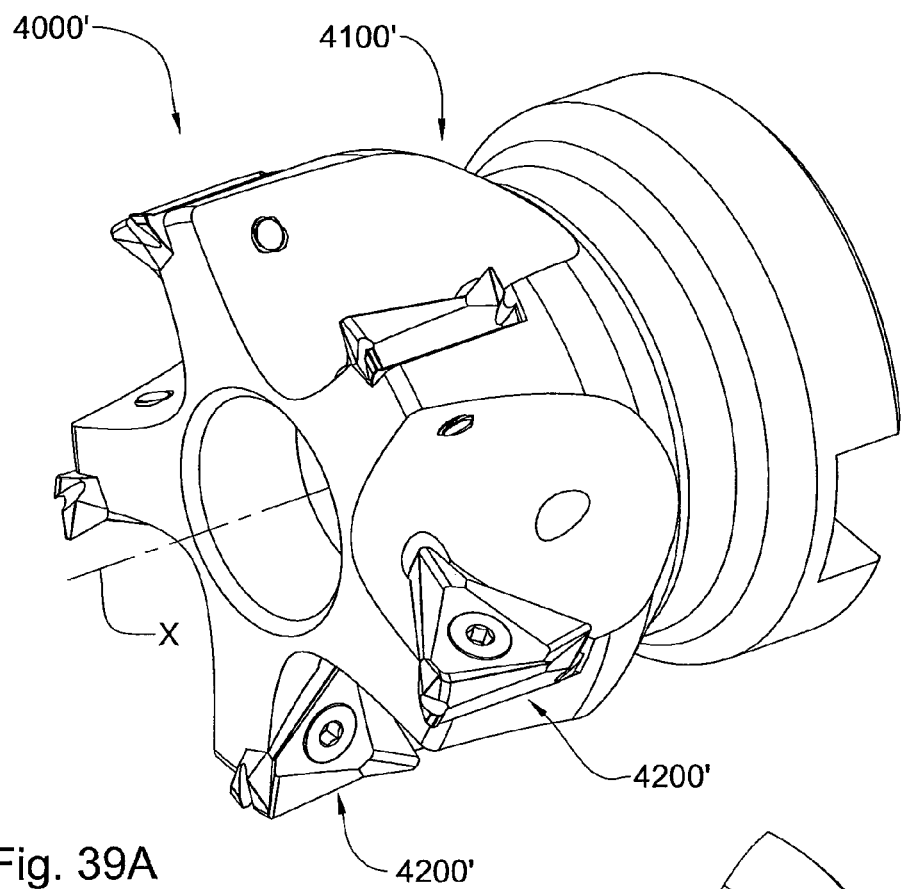
FIG. 39A is a schematic isometric view of a milling tool according to still a further example of the disclosed subject matter, in which each cutting insert has three cutting edges.
Figure 39B:
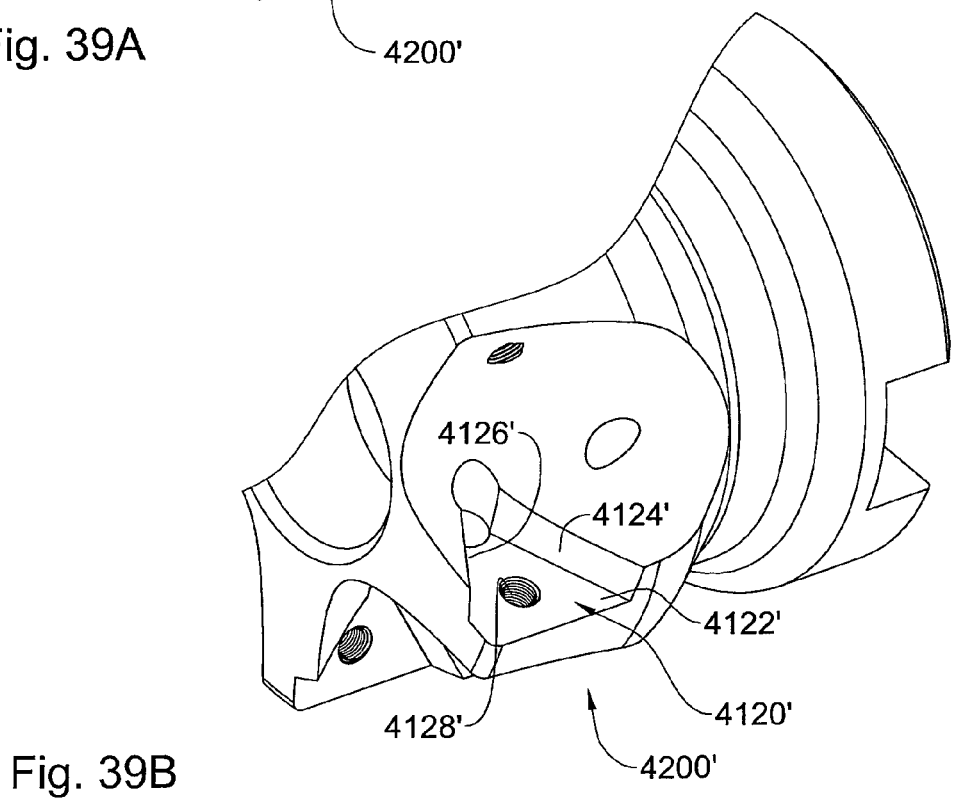
FIG. 39B is a schematic enlarged isometric view of a milling tool holder shown in FIG. 39A.

With reference to FIG. 37B, when the cutting insert 4200 s mounted onto the cutting tool holder 4100, it is received within the insert seat 4120 and the fastening bolt 4420 is passed through the bore of the cutting insert 4200 in order to secure it to the cutting tool holder 4100.

With reference to FIGS. 38A to 38D, the cutting insert 4200 has a rectangular body formed with a securing bore 4240 defining a central axis X of the cutting insert 4200, and two cutting portions counter-opposed about the central axis X. Each such cutting portion comprises a front section 4220 and a rear section 4250, each of which have a cutting edge 4224 and 4254 respectively. The cutting edge 4224 of the front section 4220 has a curved segment of radius R, while the cutting edge 4254 of the rear section 4250 has a radius r<<R.

Thus, as previously described, upon revolution of the cutting tool 4000 and its introduction to a workpiece WP (not shown), the first to come in contact with the workpiece WP is the cutting edge 4224 of the front section 4220, leaving within the workpiece a cut-out with a radius R. Thereafter, the cutting edge 4254 of the rear section 4250 comes in contact with the workpiece, further removing material therefrom to leave a cut-out with a radius r<<R.

Rear sections such as 4250 may be referred herein as a "back tooth" and so may the general principle of dividing a single cutting portion into a front section and a rear section, each of which has cutting edges adapted to leave a different cut-out in the workpiece.

Turning now to FIGS. 39A to 40D, another cutting tool 4000' is described being generally similar to the cutting tool 4000 with the difference being that the cutting inserts 4200' are of triangular shape, each cutting insert 4200' having three cutting portions rather than two. For purpose of convenience, elements in the cutting tool 4000' which are similar to elements of the cutting tool 4000 were designated with similar designation number, but with the addition of a prime (').

It is also understood that the cutting tool holder 4100' of the cutting tool 4000' is formed with insert seats 4120' which correspond in shape and dimensions to the triangular cutting inserts 4200'.

Figure 41:
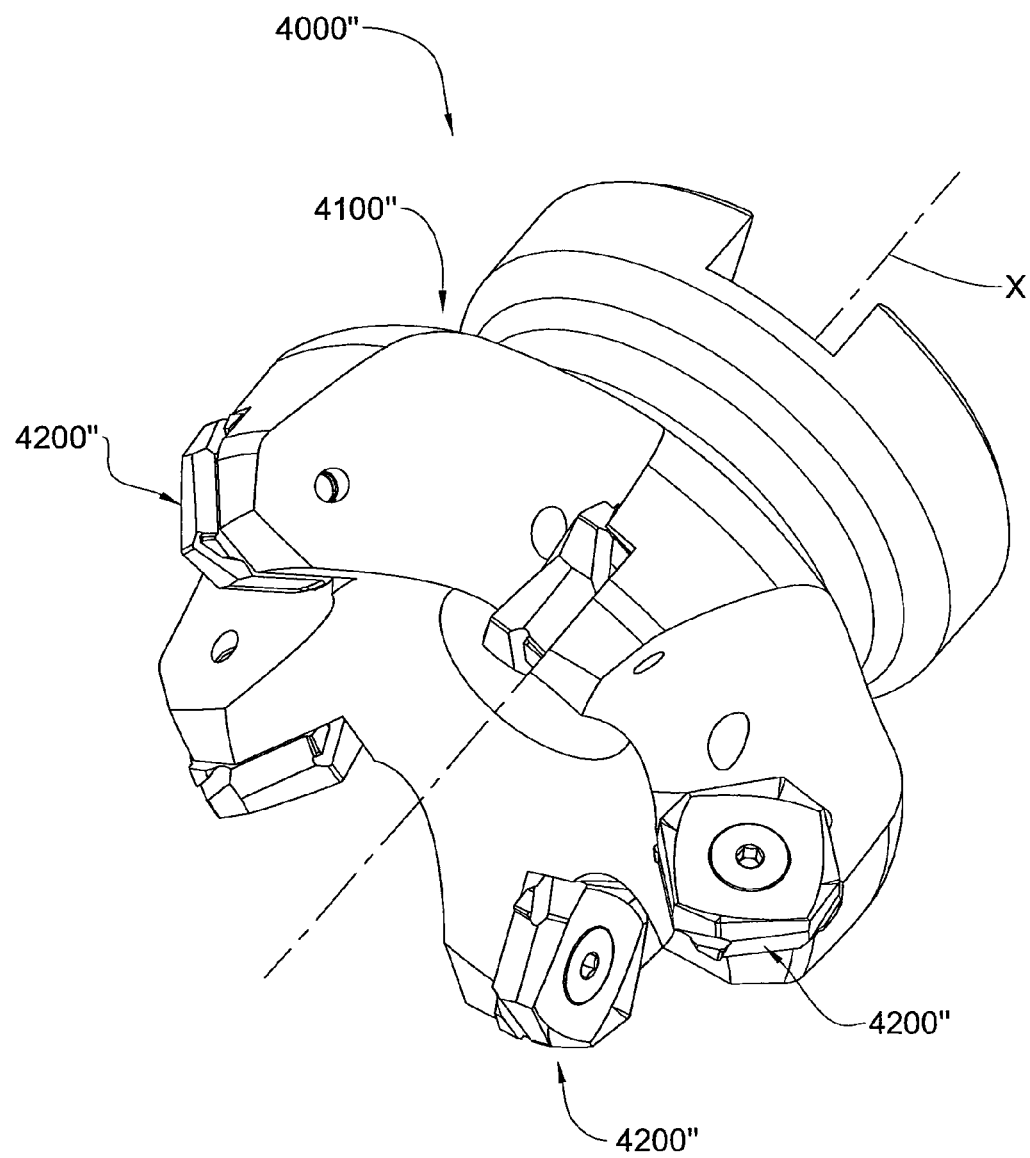
FIG. 41 is a schematic isometric view of a milling tool according to still another example of the disclosed subject matter, in which each cutting insert has four cutting edges.
Figure 42A:
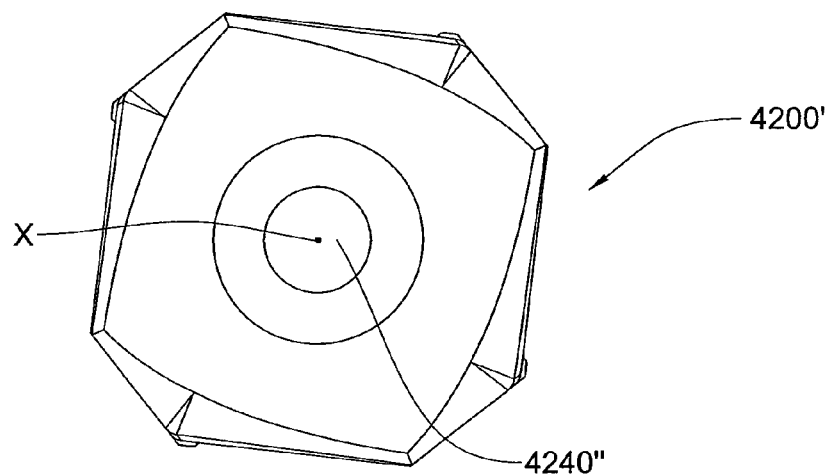
FIGS. 42A to 42C are, respectively, schematic front, bottom and isometric views of the cutting insert shown in FIG. 41.
Figure 42B:
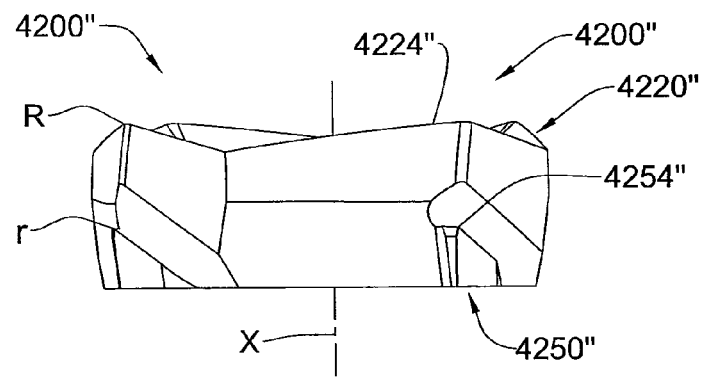
Figure 42C:
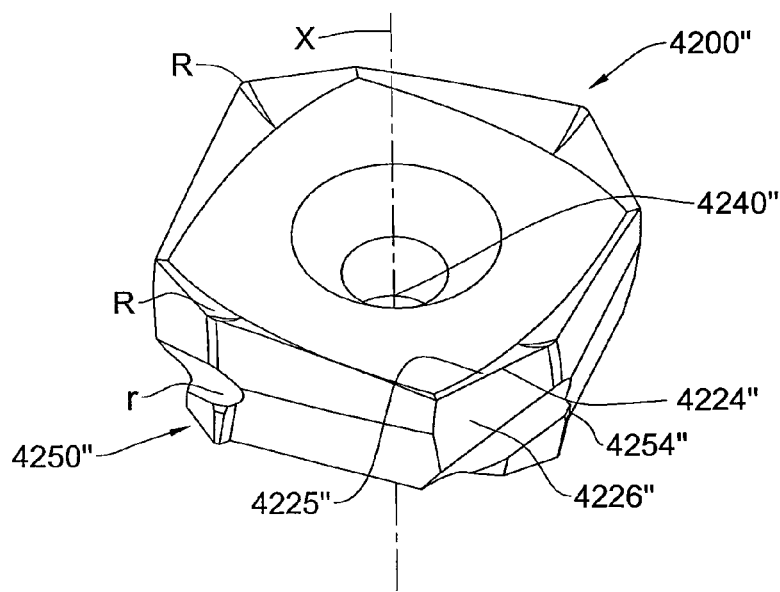
Figure 43A:
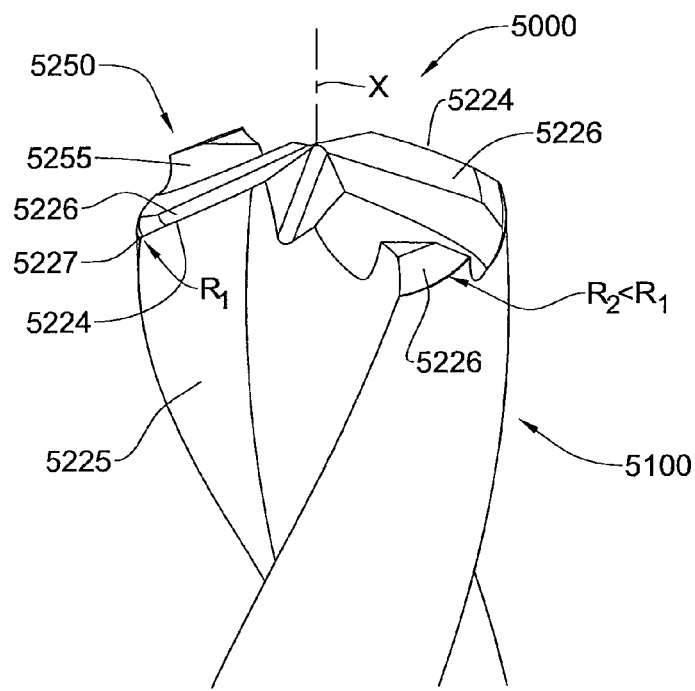
FIGS. 43A to 43D are, respectively, schematic side-isometric, front-isometric, bottom and front views of a drilling tool according to an example of the disclosed subject matter, the drilling tool having a back tooth.
Figure 43B:
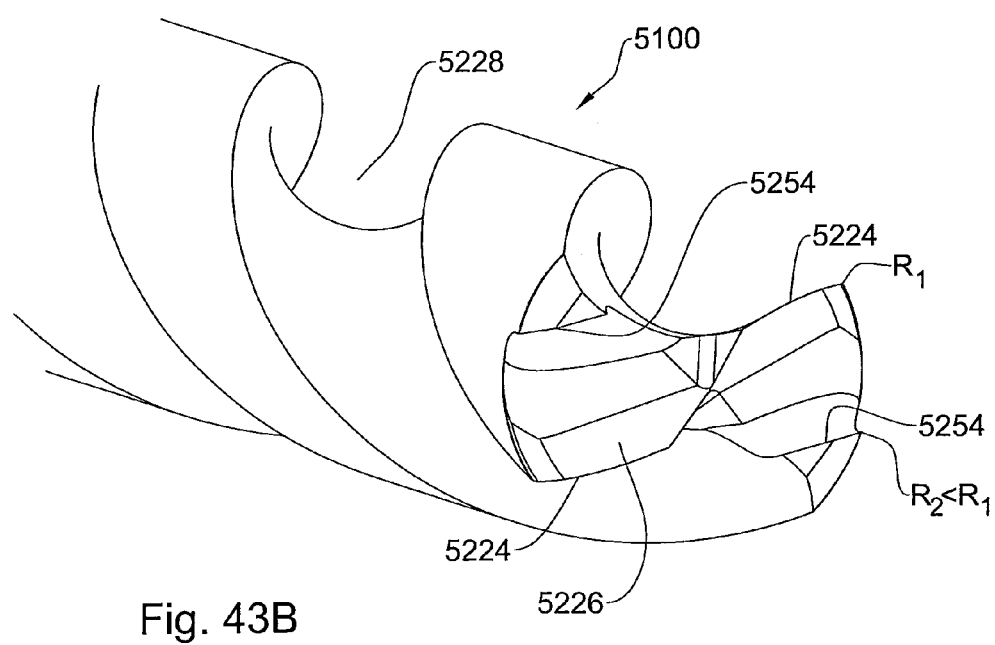
Figure 43C:
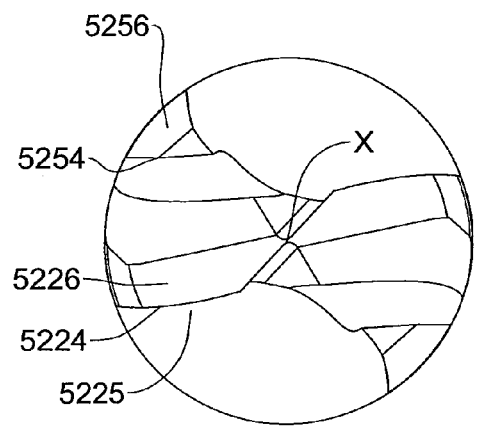
Figure 43D:
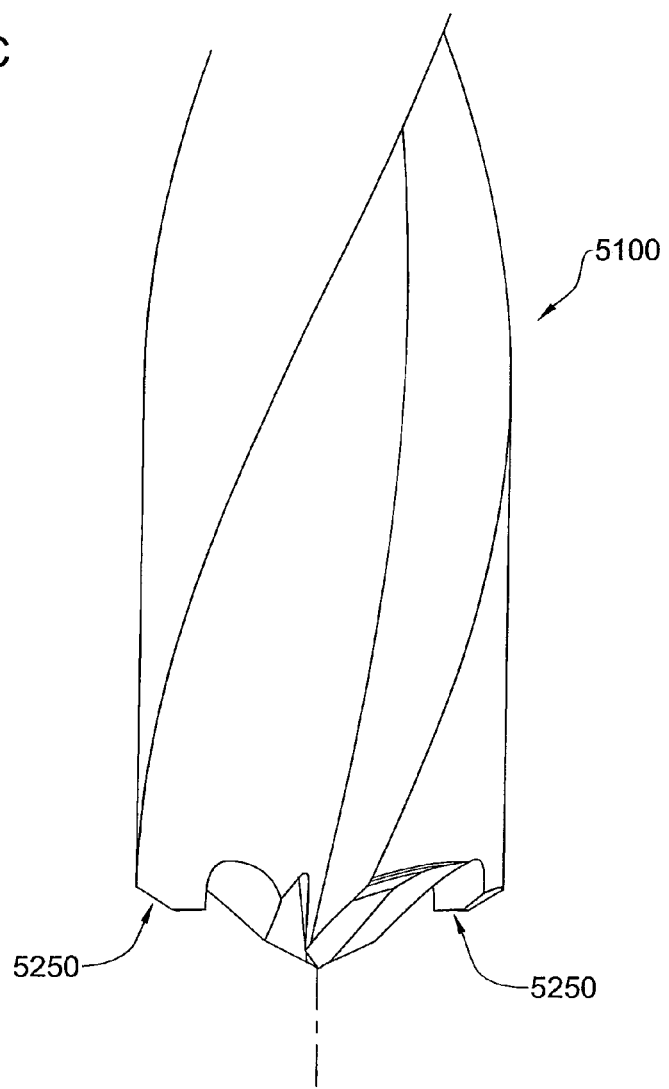
Figure 44A:
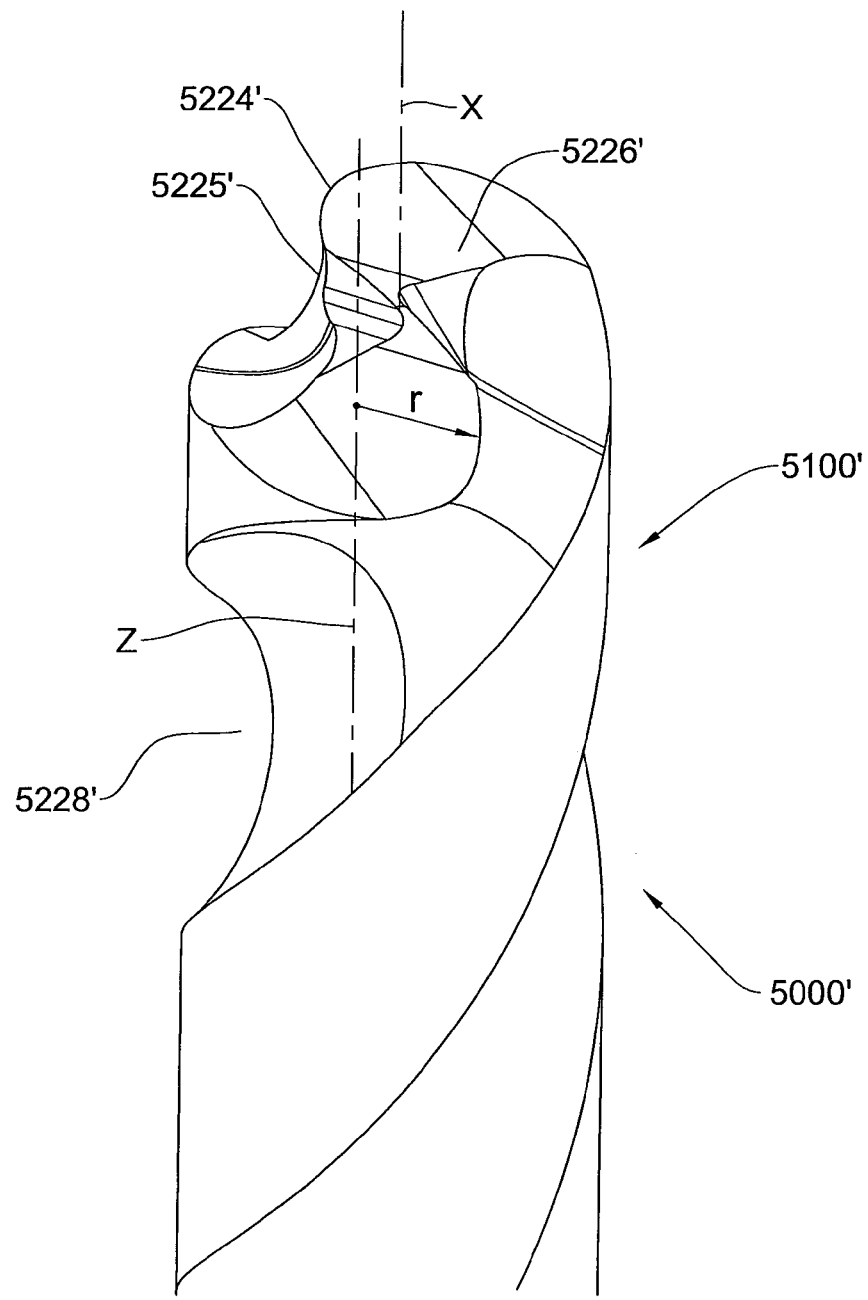
Figure 45A:
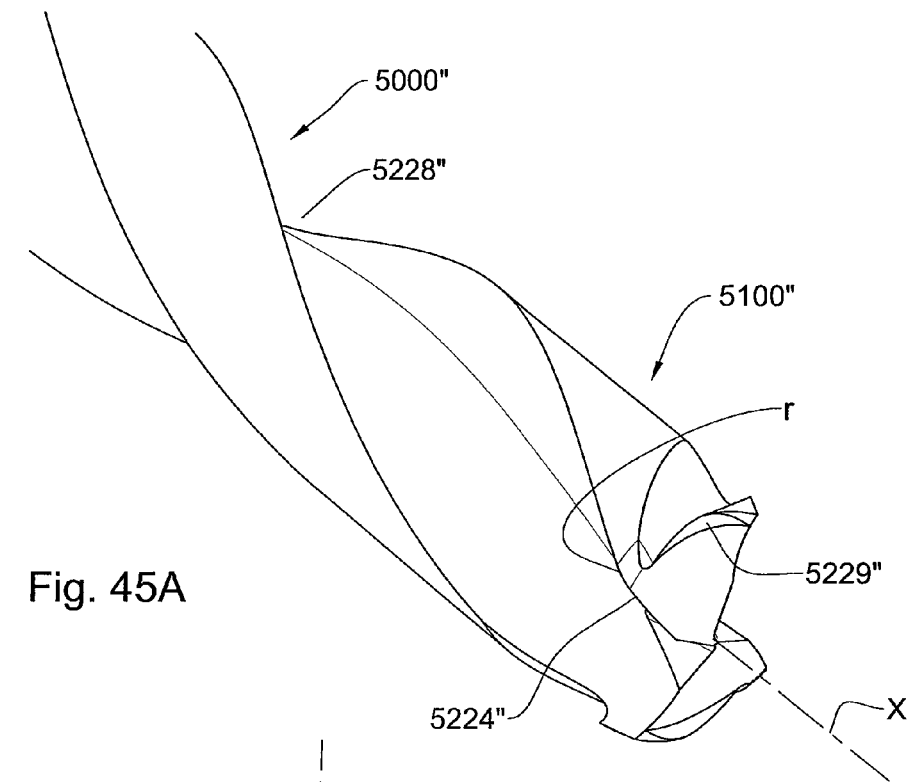
FIGS. 45A to 45D are, respectively, schematic front-isometric, side-isometric, front and bottom views of a drilling tool according to yet another example of the disclosed subject matter, with a different head design.
Figure 45B:
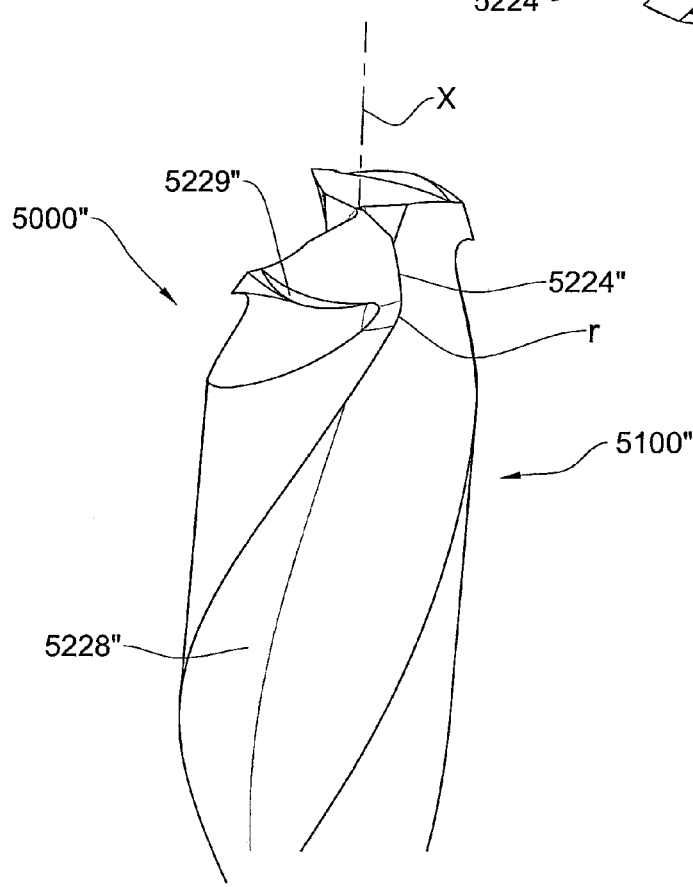
Figure 45C:
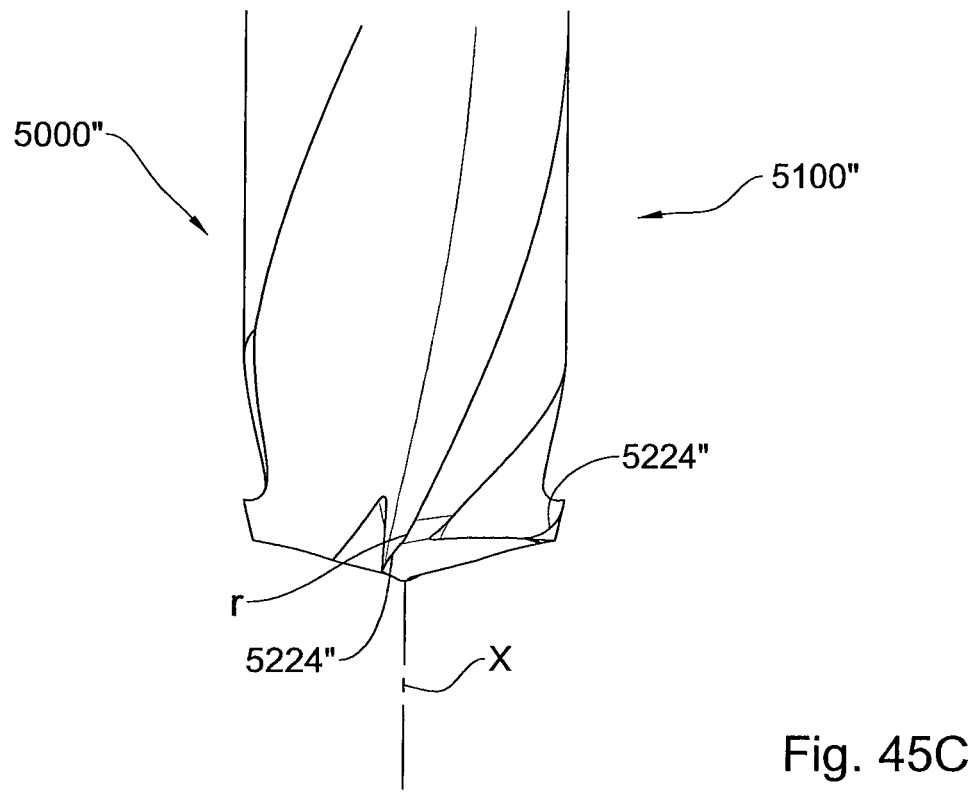
Figure 45D:
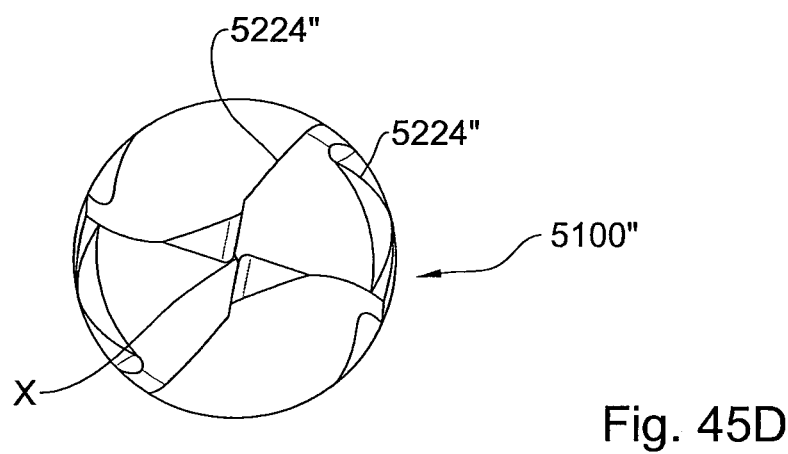
Figure 47A:
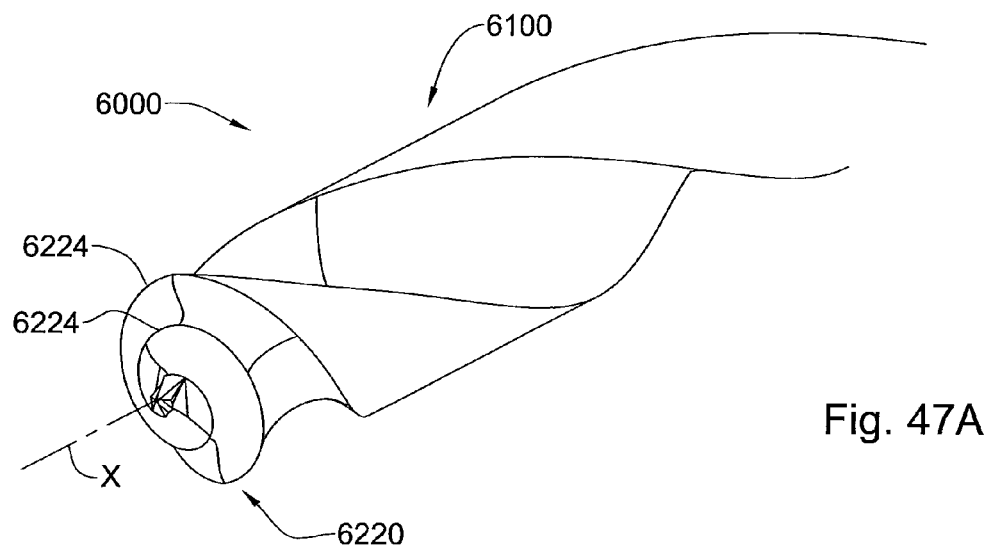
FIGS. 47A to 47C are, respectively, schematic isometric, front and bottom views of a drilling tool according to a further example of the disclosed subject matter, the drilling tool having a spiraling cutting edge with two beginnings.
Figure 47B:
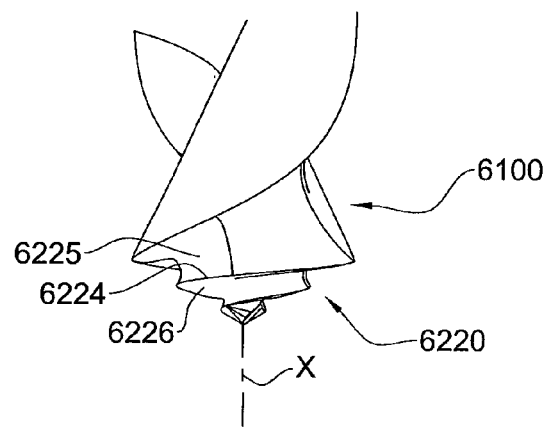
Figure 47C:
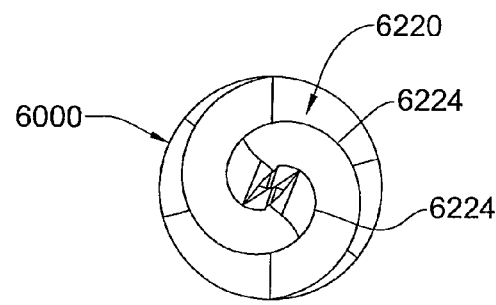
Figure 48A:
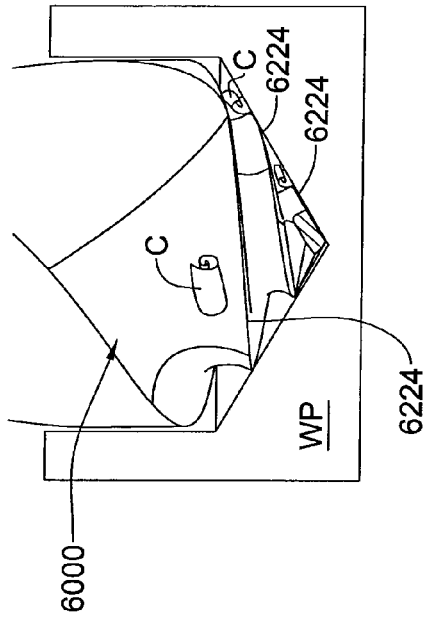
FIGS. 48A to 48D are, respectively, schematic front views of the drilling tool shown in FIGS. 47A to 47C when located within a workpiece, during four different stages of operation thereof.
Figure 48C:
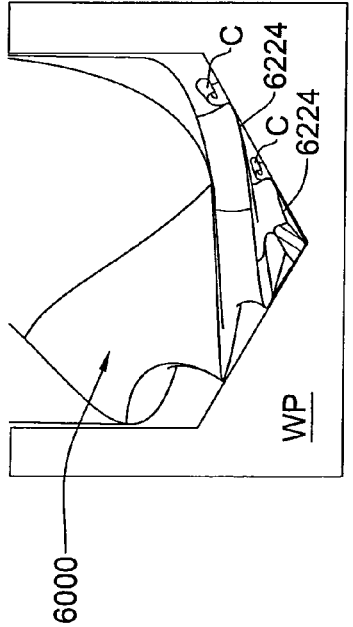
Figure 48B:
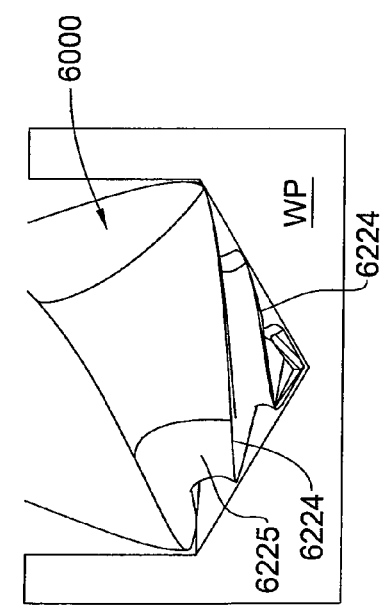
Figure 48D:
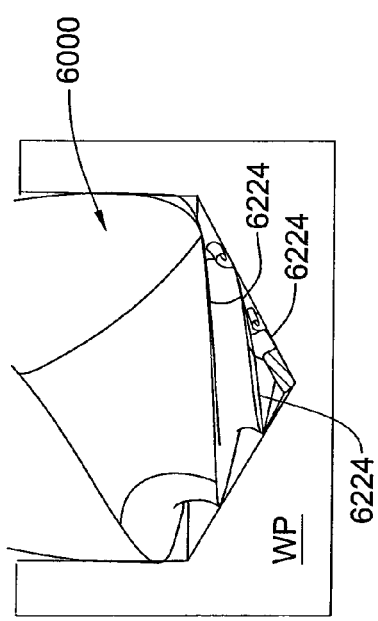

With reference to FIGS. 41 to 42C, another cutting tool 4000" is described being generally similar to the cutting tool 4000 with the difference being that the cutting inserts 4200" are of generally square, each cutting insert 4200" having four cutting portions rather than two. For purpose of convenience, elements in the cutting tool 4000" which are similar to elements of the cutting tool 4000 were designated with similar designation number, but with the addition of two primes (").

It is also understood that the cutting tool holder 4100" of the cutting tool 4000" is formed with insert seats 4120" which correspond in shape and dimensions to the square cutting inserts 4200".

It should be clear that most principles and features described above with respect to cutting tools 1, 1", 100, 100', 200, 300, 400, 500, 600, 700, 800, 900, 1000, 2000, 2000', 3000, 3000', 4000, 4000' and 4000" and/or shown in FIGS. 1A to 42C, are not restricted to those cutting tools (1, 1", 100, 100', 200, 300, 400, 500, 600, 700, 800, 900, 1000, 2000, 2000', 3000, 3000', 4000, 4000' and 4000") in connection with which they are described/shown, and may independently be applied, mutatis mutandis, to each other or to any other tools, in any combination considered to be appropriate by a person skilled in the art.

Turning now to FIGS. 43A to 43D, there is illustrated a drilling tool generally designated as 5000. The drilling tool 5000 has a body 5100 extending along a central axis X, and is formed at one axial end thereof with two cutting portions 5200, which are counter-opposed with respect to the central axis X. the drilling tool 5000 is adapted to revolve about the central axis X and, while revolving, come in contact with a workpiece WP (not shown) to remove material therefrom.

The drilling tool 5000, as well as drilling tools 5000', 5000" and 5000''' to be further described with respect to FIGS. 44A to 44D, 45A to 45D and 46A to 46C respectively, are all based on the "back tooth" principle as employed in drilling tools.

Reverting to FIGS. 43A to 43D, each of the cutting portions 5200 is formed with a front section 5220 and a rear section 5250, and each section is formed with a cutting edge 5224 and 5254 respectively. Each of these cutting edges 5224, 5254 has a curved portion, the former with a radius R and the latter with a radius r<<R.

It should be clear that in this example (as well as in the examples of drilling tools 5000', 5000" and 5000''' to be further described), the terms 'front' and 'rear' refer to the revolution direction of the cutting tool about the central axis X. In other words, the 'front' section 5220 is that which is adapted to come in contact with the workpiece first, while the 'rear' section 5250 is that which is adapted to come in contact with the workpiece after the 'front' section.

In operation, the drilling tool 5000 operates similarly to the milling tools 4000, 4000' and 4000" previously described. In other words, as previously described, upon revolution of the drilling tool 5000 and its introduction to a workpiece WP (not shown), the first to come in contact with the workpiece WP is the cutting edge 5224 of the front section 5220, leaving within the workpiece a cut-out with a radius R. Thereafter, the cutting edge 5254 of the rear section 5250 comes in contact with the workpiece, further removing material therefrom to leave a cut-out with a radius r<<R.

The chips removed from the workpiece WP are emitted into the chip evacuation flutes 5228 of the drilling tool 5000 to be further removed therefrom in a conventional manner.

It should also be noted that in the present example, the front section 5220 has a cutting edge 5224 which extends from the central axis X to the periphery of the drilling tool body 5100, the cutting edge 5224 being single and continuous.

Turning now to FIGS. 44A to 44D, another drilling tool generally designated 5000' is shown, being generally similar to the drilling tool 5000 with the difference being that the cutting portions of the drilling tool 5000' do not comprise a front section and a back section. For purpose of convenience, elements in the cutting tool 5000' which are similar to elements of the cutting tool 5000 were designated with similar designation number, but with the addition of one prime (').

In particular, the drilling tool 5000' has a body 5100' extending along a central axis X, and has at one end thereof two cutting portions 5220', counter-opposed about the central axis X. Each of the cutting portions 5220' has a cutting edge 5224' which is in the form of an arc extending from the central axis X towards the periphery of the body 5100' about an imaginary axis z parallel to the central axis.

It is noted that in this particular example, the principle of the 'back tooth' is not utilized.

In operation, the drilling tool 5000' revolves about the central axis X and is brought into contact with a workpiece WP (not shown), such that the cutting edge 5224' may remove material therefrom. In particular, owing to the arcuate design, the cutting edge 5224' is adapted to penetrate the workpiece smoothly and at a minor angle, so as to reduce the load exerted on the drilling tool 5100'.

Turning now to FIGS. 45A to 45D, another drilling tool generally designated 5000" is shown, being generally similar to the drilling tool 5000 with the difference being that the drilling tool 5000" is provided with a wiper 5229" adapted to deflect the chip removed from the workpiece WP (not shown) in an outwardly radial direction. For purpose of convenience, elements in the cutting tool 5000" which are similar to elements of the cutting tool 5000 were designated with similar designation number, but with the addition of two primes (").

Turning now to FIGS. 46A to 46C, another drilling tool generally designated 5000" is shown, being generally similar to the drilling tool 5000 with the difference being that most of the cutting edge is formed of two segments —5224₁" and 5224₂", such that the first segment 5224₁" is formed as a standard cutting edge of a drill, while the second segment 5224₂" is curved as in previously described examples. For purpose of convenience, elements in the cutting tool 5000''' which are similar to elements of the cutting tool 5000 were designated with similar designation number, but with the addition of three primes ('").

It should be clear that most principles and features described above with respect to cutting tools 1, 1", 100, 100', 200, 300, 400, 500, 600, 700, 800, 900, 1000, 2000, 2000', 3000, 3000', 4000, 4000', 4000", 5000, 5000', 5000" and 5000''' and/or shown in FIGS. 1A to 46C, are not restricted to those cutting tools (1, 1", 100, 100', 200, 300, 400, 500, 600, 700, 800, 900, 1000, 2000, 2000', 3000, 3000', 4000, 4000', 4000", 5000, 5000', 5000" and 5000''') in connection with which they are described/shown, and may independently be applied, mutatis mutandis, to each other or to any other tools, in any combination considered to be appropriate by a person skilled in the art.

Turning now to FIGS. 47A to 49, another drilling tool is shown, generally designated 6000, and comprising a body 6100 extending along a central axis X. The body 6100 is formed with a cutting portion 6220 having, in turn, two cutting edges 6224. Each of the cutting edges 6224 extends spirally from the central axis towards the outer periphery of the body 6100 of the drilling tool 6000.

The design of the cutting edges 6224 is such that any radial line (i.e. a line extending from the central axis in the radial direction) intersecting the cutting edge 6224, is generally perpendicular to the cutting edge 6224.

In operation, the drilling tool 6000 is adapted to operate in a similar manner to the previously described drilling tools 5000, 5000', 5000" and 5000'''. Thus, the drilling tool 6000 is adapted to revolve about the central axis X, i.e. every point on the drilling tool displaces along a circular path about the central axis X. Under the unique design of the cutting edges 6224, upon coming in contact with the workpiece WP, each cutting edge 6224 penetrates and progresses within the workpiece in a direction almost parallel to the direction of extension of the cutting edge 6224, i.e. at a minute angle. This is as opposed to known cutting/milling/drilling/turning tools, in which the cutting edge progresses in a direction generally transverse to the direction of its extension.

With particular reference being drawn to FIGS. 48A to 48D, cross-sections of the drilling tool 6000 are shown during various stages of operation thereof, when located within a workpiece WP. It is observed that as the drilling tool 6000 revolves about the central axis X, the cutting edges 6224 come in contact with the workpiece WP and peal off chips C therefrom in an axial, generally upward direction, contrary to common drilling tools in which the chips are urged, at the moment of their removal from the workpiece WP, in a tangent direction, i.e. the revolution direction of the drilling tool.

Figure 49:
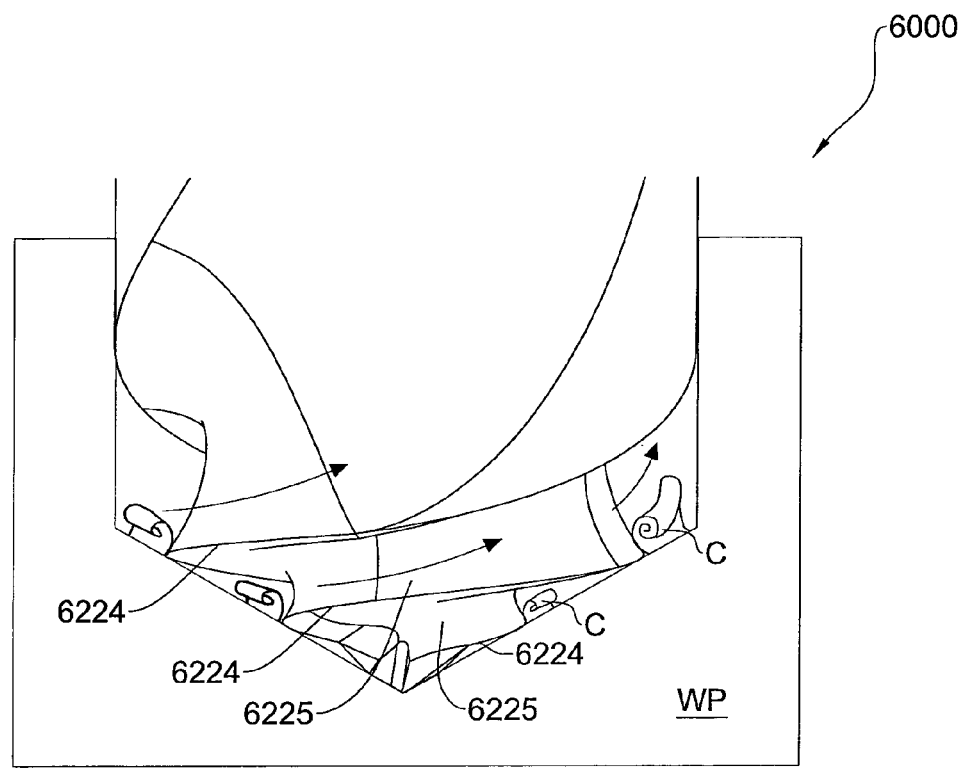
FIG. 49 is a schematic front view of the drilling tool shown in FIGS. 47A to 47C when located within a workpiece during operation thereof.
Figure 50A:
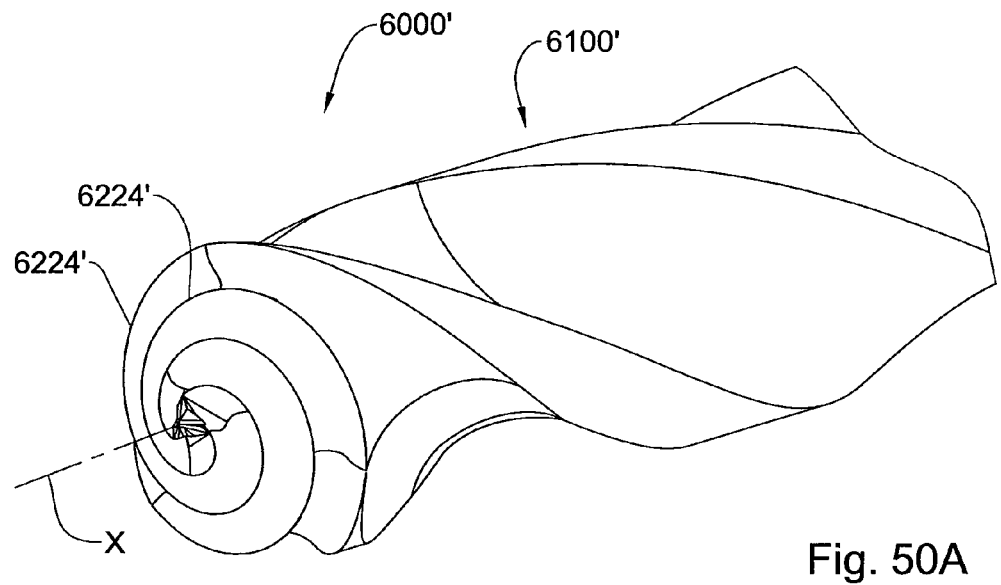
FIGS. 50A to 50D are, respectively, schematic side-isometric, front-isometric, bottom and front views of a drilling tool according to still a further example of the disclosed subject matter, the drilling tool having a spiraling cutting edge with three beginnings.
Figure 50B:
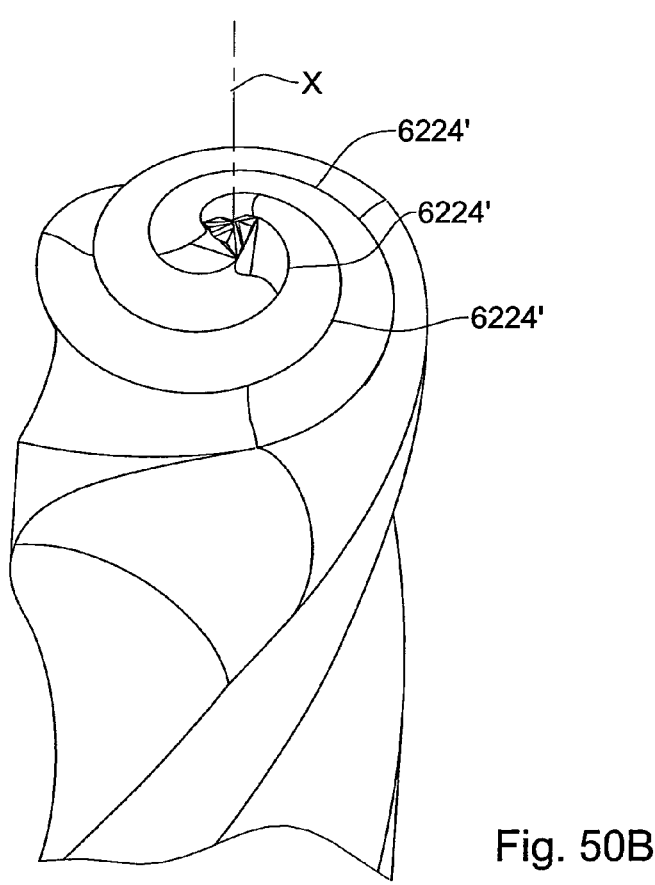
Figure 50C:
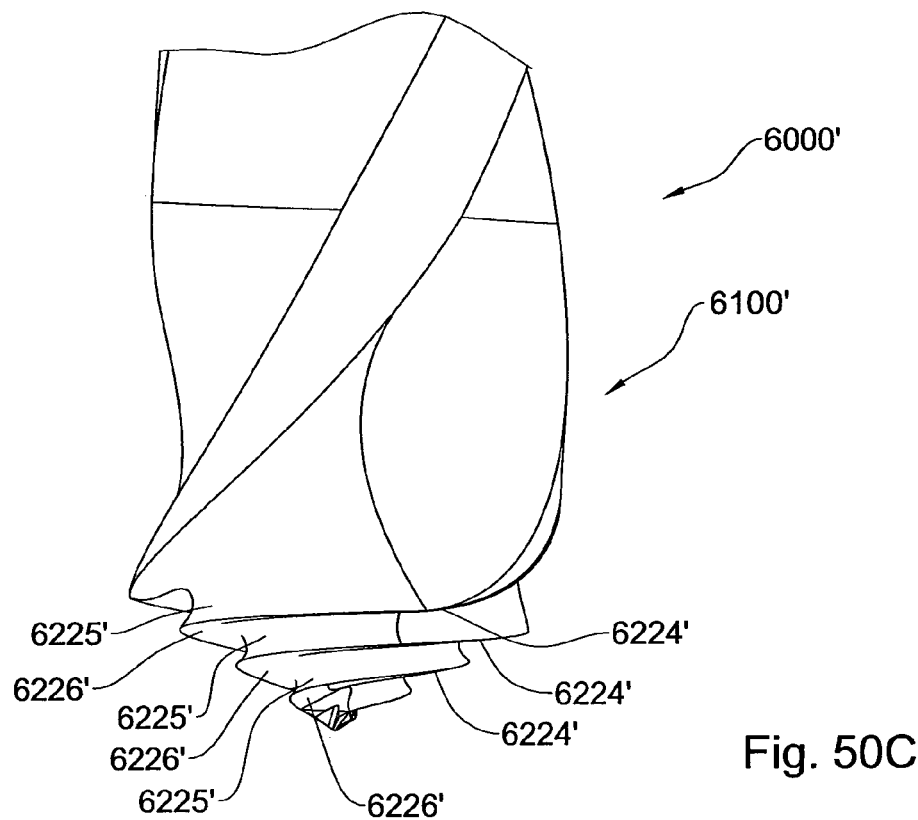
Figure 50D:
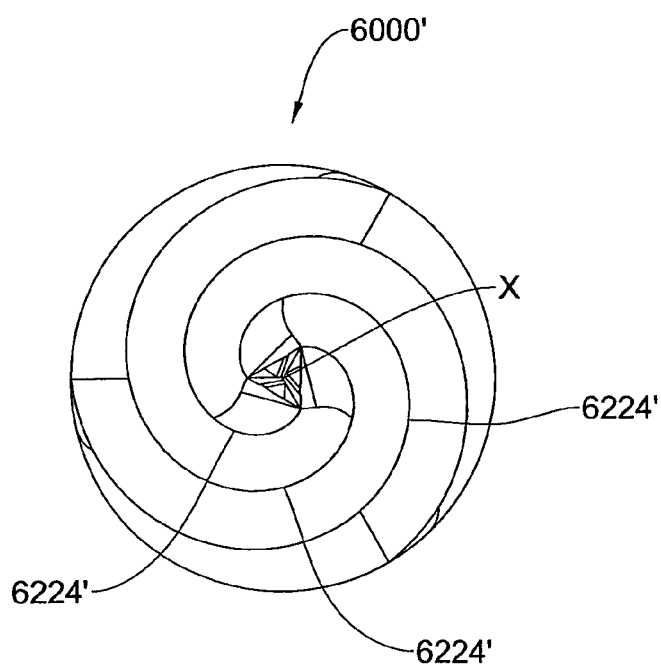
Figure 51:
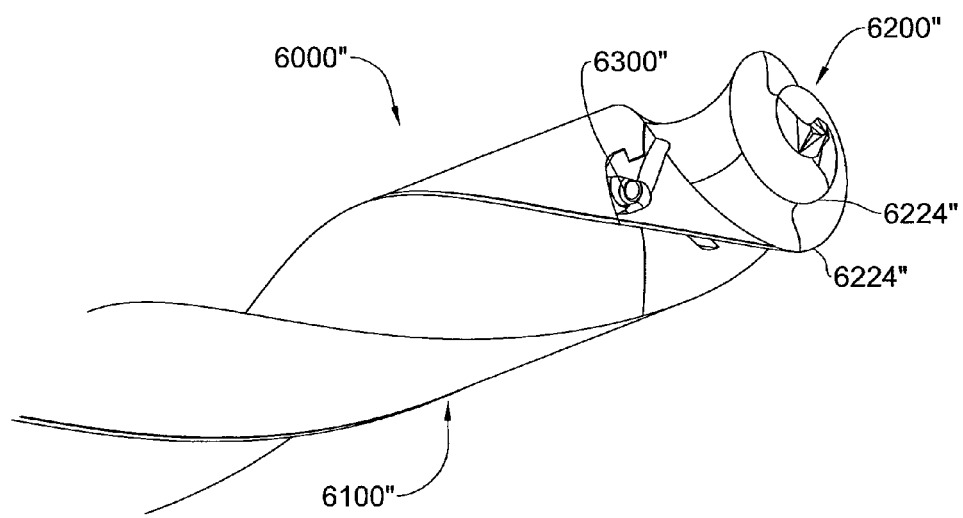
FIG. 51 is a schematic isometric view of a drilling tool according to yet a further example of the disclosed subject matter, the drilling tool having a removable drilling bit, the drilling bit having a spiraling cutting edge with two beginnings, the drilling bit adapted for attachment to the drilling tool holder using a 'no screw' engagement.
Figures 52A, 52B:
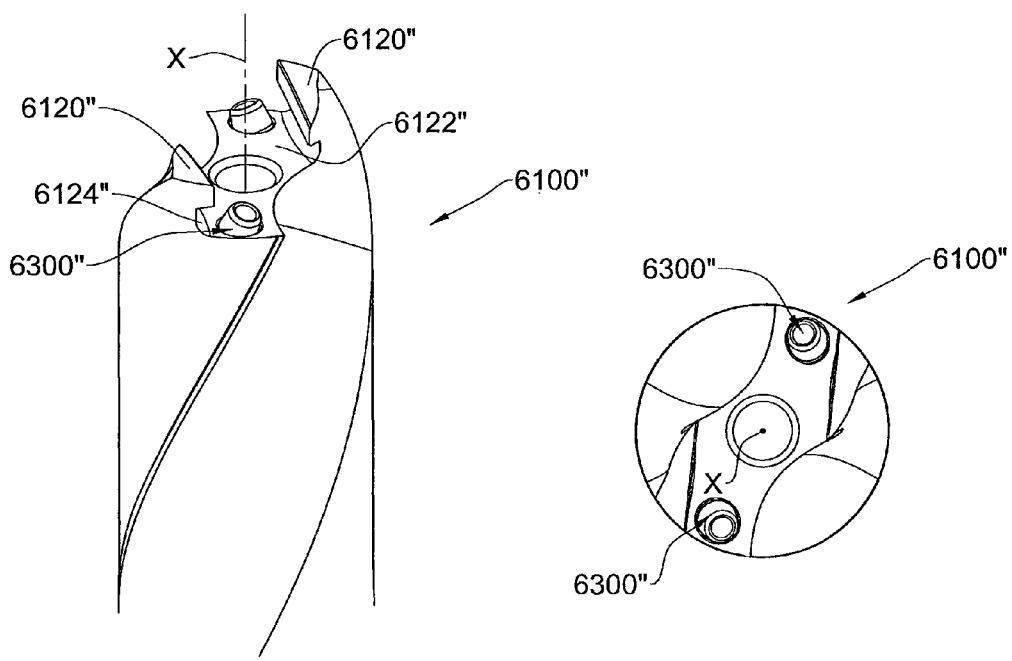
FIGS. 52A and 52B are, respectively, schematic isometric and bottom views of a drilling tool holder and securing mechanism of the drilling tool shown in FIG. 51.

With respect to FIG. 49, it is also noted that in the present example, the chips removed from the workpiece are gradually pealed from the surface of the workpiece due to the spiral design (i.e. gradually expanding diameter) of the cutting edge 6224.

Once a chip has been removed from the workpiece WP, it is urged into the chip evacuation flutes 6225, in which it progresses in a direction which is counter opposed to the direction of revolution of the cutting tool 6000.

With reference to FIGS. 50A to 50D, another drilling tool is shown generally designated 6000', which is similar to the drilling tool 6000 with the difference being that the drilling tool 6000' is formed with three cutting edges 6224' instead of two. For purpose of convenience, elements in the cutting tool 6000' which are similar to elements of the cutting tool 6000 were designated with similar designation number, but with the addition of a prime (').

Attention is now drawn to FIGS. 51 to 53E, in which another drilling tool is shown generally designated 6000", which is similar to the drilling tool 6000 with the difference being that the drilling tool 6000' comprises a drill holder 6100" and a removable drill head 6200" which is not an integral part of the drilling tool 6000". As opposed to previously disclosed cutting/milling/drilling/turning tools, in the present example the removable drill head 6200" is adapted for mounting onto the drill holder 6100" and being secured thereon using a securing mechanism 6300" which includes a spring biased securing pin.

It should be appreciated that the securing mechanism disclosed above is generally similar to the securing mechanism disclosed in patent application U.S. Ser. No. 12/314, 428 to the applicant, which is incorporated herein by reference, in particular, the portions of the specification of the above application pertaining to FIGS. 2A to 44, FIGS. 47 to 49C and FIGS. 59A to 66B therein. Therefore, the securing mechanism 6300" will not be discussed in detail herein, and the manner of operation thereof should be apparent to any person skilled in the art familiar with the above incorporated patent application.

For purpose of convenience, elements in the cutting tool 6000" which are similar to elements of the cutting tool 6000 were designated with similar designation number, but with the addition of two primes (").

The drill head 6200 has a cutting portion 6220" which is generally similar to the cutting portion 6220 of the drilling tool 6000, i.e. with two spirally extending cutting edges 6224".

In operation, the drilling tool 6000" is also generally similar to the drilling tool 6000, having the advantage that once the cutting portion 6220" of the cutting head 6200 becomes worn-out, it may be replaced with a new drill-head.

Figure 53F:
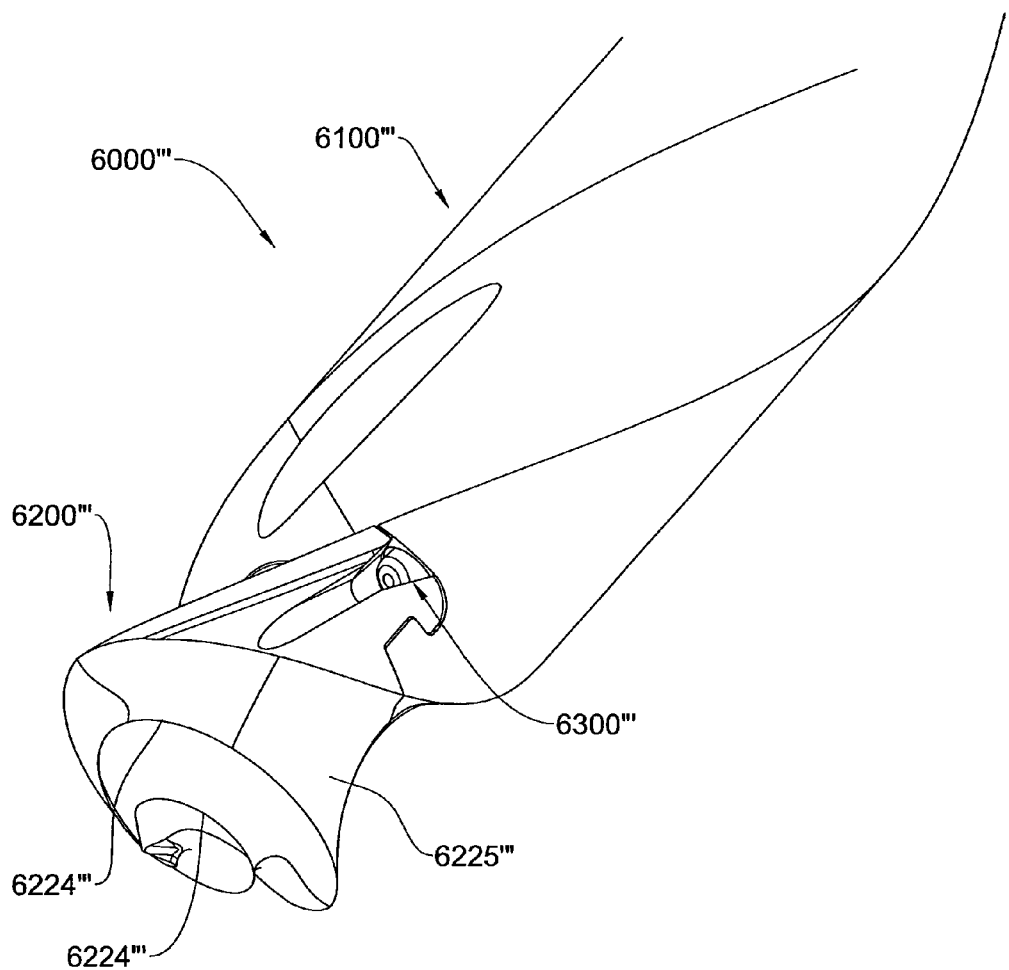
FIG. 53F is a schematic isometric view of a drilling tool according to another example of the disclosed subject matter.

Attention is now drawn to FIGS. 53F to 53H, in which another drilling tool is shown generally designated 6000''', which is similar to the drilling tool 6000" with the difference being that the drilling tool 6000''' comprises a drill head 6200''' which has a slightly different profile shape. In particular, the chip evacuation flutes are deeper. For purpose of convenience, elements in the cutting tool 6000" which are similar to elements of the cutting tool 6000 were designated with similar designation number, but with the addition of three primes (''').

Figure 53I:
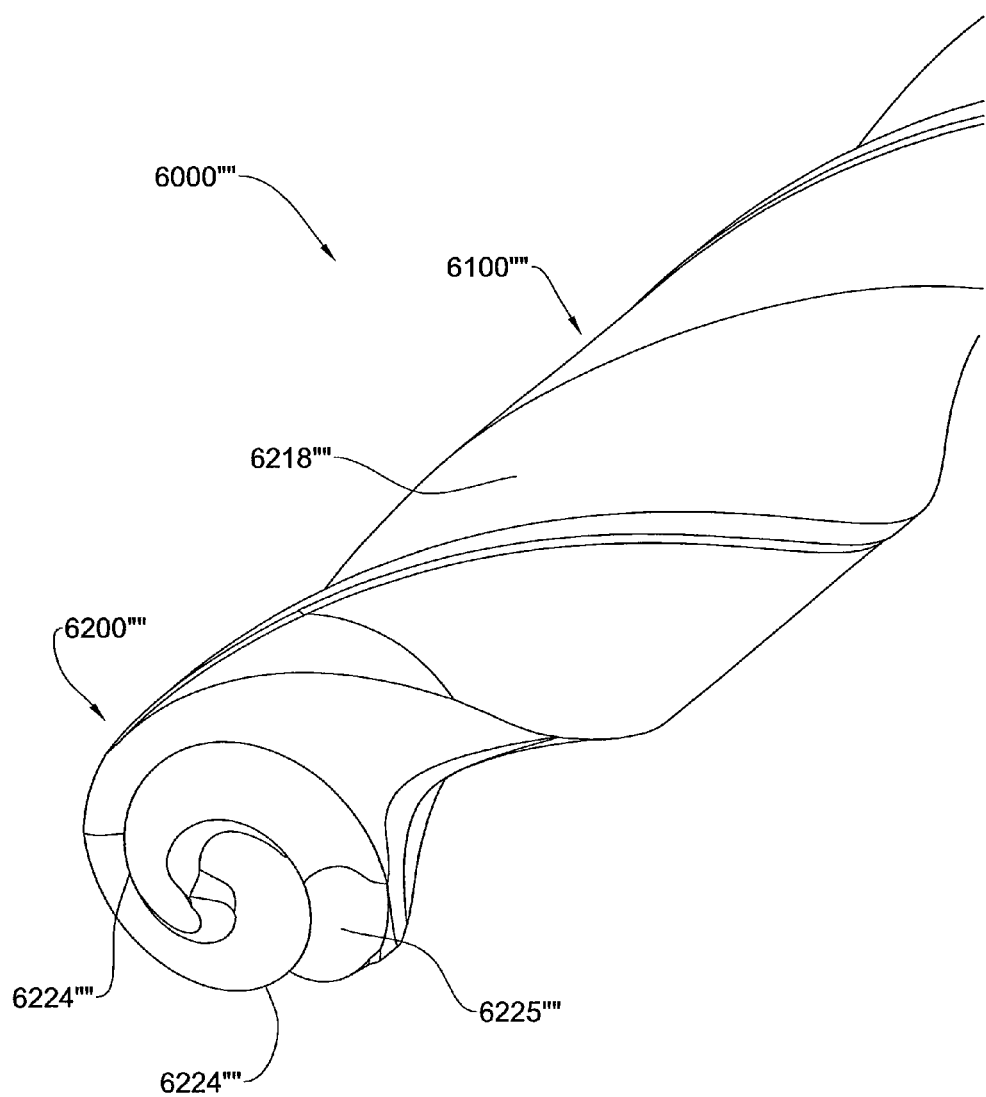
FIG. 53I is a schematic isometric view of a drilling tool according to yet another example of the disclosed subject matter.

Turning now to FIG. 53I, yet another drilling tool is shown generally designated as 6000'''', which is similar to the drilling tool 6000''' with the difference being that the drilling tool 6000'''' is an integral drilling tool (like drilling tool 6000), and is formed with deeper chip evacuation flutes 6225''''. For purpose of convenience, elements in the cutting tool 6000" which are similar to elements of the cutting tool 6000 were designated with similar designation number, but with the addition of four primes ('''').

It should be clear that most principles and features described above with respect to cutting tools 1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''' and 6000'''' and/or shown in FIGS. 1A to 53I, are not restricted to those cutting tools (1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''' and 6000'''') in connection with which they are described/shown, and may independently be applied, mutatis mutandis, to each other or to any other tools, in any combination considered to be appropriate by a person skilled in the art.

Figure 54A:
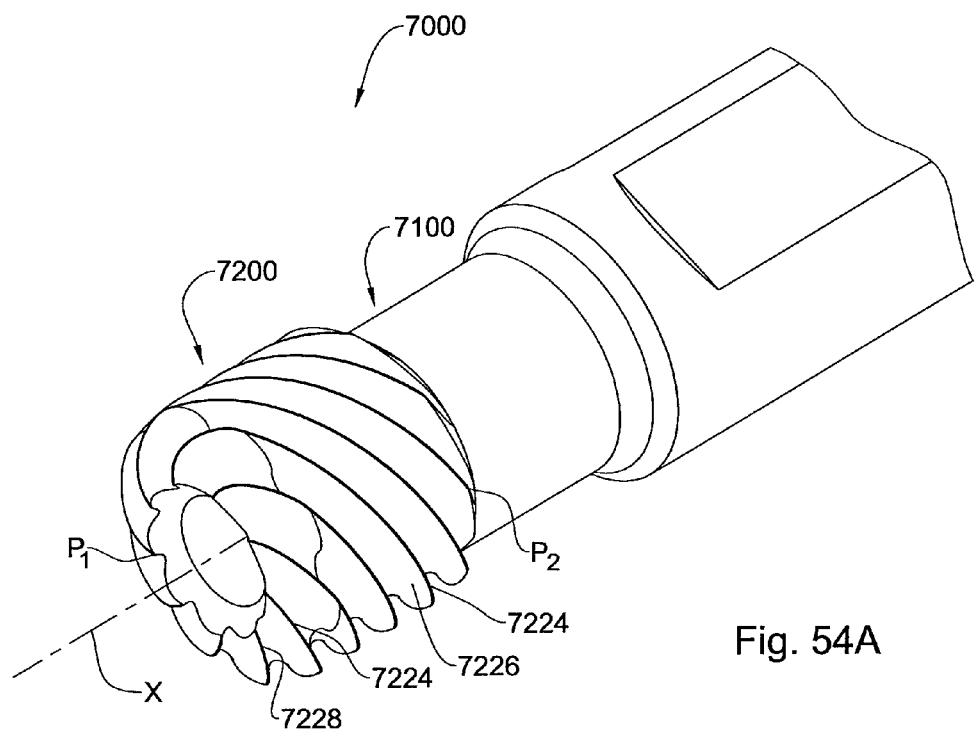
FIG. 54A is a schematic isometric view of a milling tool according to yet another example of the disclosed subject matter, the milling tool having a central chip evacuation channel.
Figure 54B:
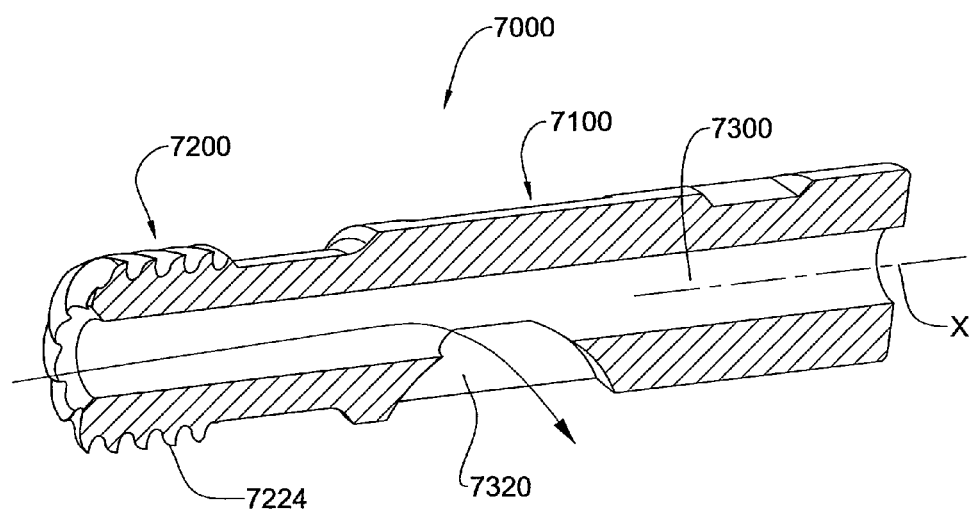
FIG. 54B is a schematic isometric section-view taken along a plane P1 shown in FIG. 54A.

Attention is now drawn to FIGS. 54A and 54B, in which another cutting tool is shown being generally designated as 7000, and comprising a body 7100 extending along a central axis X, a cutting portion 7200 formed at a distal end of the body 7100, and a central chip evacuation channel 7300 axially extending along the entire body 7100.

The cutting tool 7000 is designed for milling operations, and the cutting portion 7200 thereof is formed with a plurality of cutting edges 7224, which extend spirally about the central axis X. Each cutting edge has a start point $P_1$ located at a rim of the central chip evacuation channel 7300, and a second point $P_2$ at the periphery of the body 7100, the cutting edge 7224 extending spirally between point $P_1$ and $P_2$. Each of the cutting edges 7224 is defined as the intersection between a rake surface 7225 and a relief surface 7226.

In operation, the cutting tool 7000 is adapted to revolve about the central axis X thereof and coming in contact with a workpiece WP (not shown) to remove material therefrom. Upon contact, some of the chips removed from the workpiece WP by the cutting edges 7224 are urges into the chip evacuation flutes 7228, while another portion of the chips is urged into the central chip evacuation channel 7300.

As chips enter the central chip evacuation channel 7300, they urge chips which are already within the channel 7300 (chip previously removed by the cutting edges) to progress through the channel 7300 until they are emitted, due to the revolution of the cutting tool 700 via opening 7320 formed at the side of the body 7100.

It should be clear that most principles and features described above with respect to cutting tools 1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''', 6000'''' and 7000 and/or shown in FIGS. 1A to 54B, are not restricted to those cutting tools (1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''', 6000'''' and 7000) in connection with which they are described/shown, and may independently be applied, mutatis mutandis, to each other or to any other tools, in any combination considered to be appropriate by a person skilled in the art.

Turning now to FIGS. 55A to 57, another cutting tool is shown being generally designated as 8000 and comprising a cutting tool holder 8100, a cutting insert 8200 adapted for mounting on the cutting tool holder 8100 and a securing mechanism 8300 adapted for securing the cutting insert 8200 when mounted on the holder 8100. The cutting tool 8000 is designed for performing a turning operation. The cutting tool 8000 is generally similar to the cutting tool 500 previously described, with the difference being in the manner of securing the cutting insert 8200 onto the cutting tool holder 8100.

With particular reference being drawn to FIGS. 56A to 56D, the cutting insert 8200 is of generally rectangular shape and comprises a body 8210 formed with a cutting portion 8220. In particular, the body 8210 has a top face 8212T and a bottom face 8212B, and the cutting portion 8220 extends between the top face and the bottom face, 8212T, 8212B respectively.

The cutting insert 8200 is further formed with a central securing cavity 8213 defined about a central axis X of the cutting insert 8200, and having a generally concave bell shape. The securing cavity 8213 has a chamfered rim 8217 extending about the opening of the bell shaped cavity 8213. The cutting insert 8200 is further formed with a first securing extension 8214 extending from the bottom face 8212B, and a second securing extension 8216 extending from the first securing extension 8214, both extensions having a generally rectangular shape.

The cutting portion 8220 forms the side walls (four walls) of the cutting insert 8200, each such side wall being formed with a plurality of cutting teeth 8230, each cutting tooth being formed with a cutting edge 8224 defined as the intersection between a rake surface 8225 and a relief surface 8226. Each cutting edge 8224 extends in a direction extending between the top face 8212T and the bottom face 8212B, in accordance with cutting edges of previously described turning tools (e.g. 500).

In addition, the cutting portion 8220 is formed with a bridging cutting edge 8250 which extends from one side wall of the cutting insert 8200 to an adjacent side wall across the corner formed therebetween. This bridging cutting edge 8250 allows the turning tool 8000 to form near-straight corners in the workpiece WP (not shown) during operation of the turning tool 8000. Specific attention is drawn to FIG. 56B in which a top view of the cutting insert 8200 is shown, and from which it may be observed that the contour of the cutting edges 8224, 8250 of the cutting insert 8200 forms a square with slightly rounded edges at the bridging cutting edge 8250.

Figure 55A:
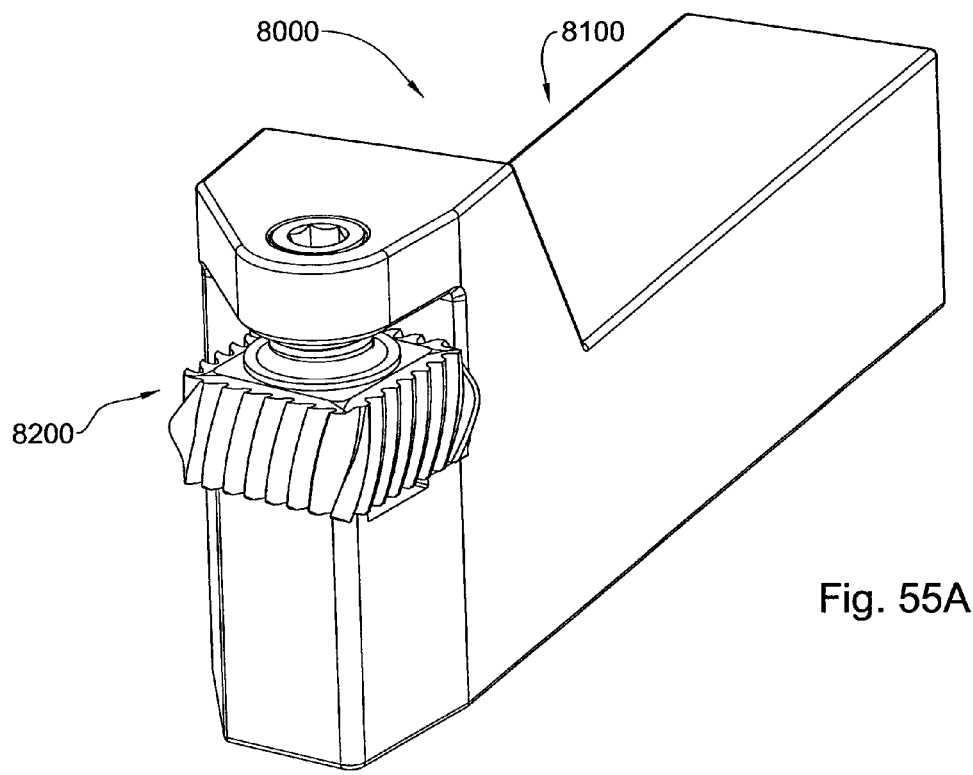
FIG. 55A is a schematic isometric view of a turning tool according to still a further example of the disclosed subject matter, the cutting insert of the turning tool having a small cutting radius.
Figure 55B:
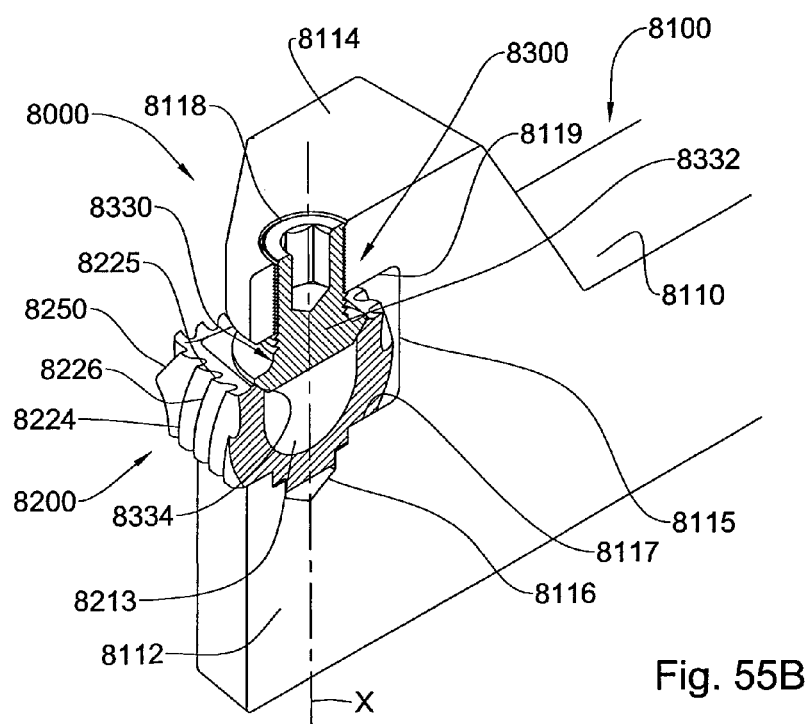
FIG. 55B is a schematic isometric section-view of the turning tool shown in FIG. 55A taken along plane P2 shown in FIG. 55A.
Figure 56B:
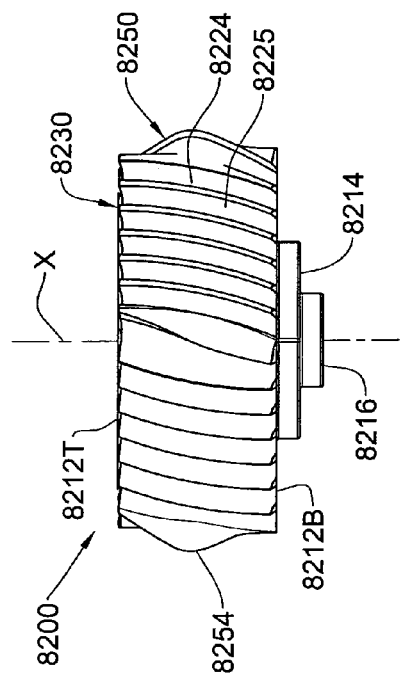
FIGS. 56A to 56C are, respectively, schematic front, top and isometric views of a cutting insert used in the turning tool shown in FIG. 55A.
Figure 56A:
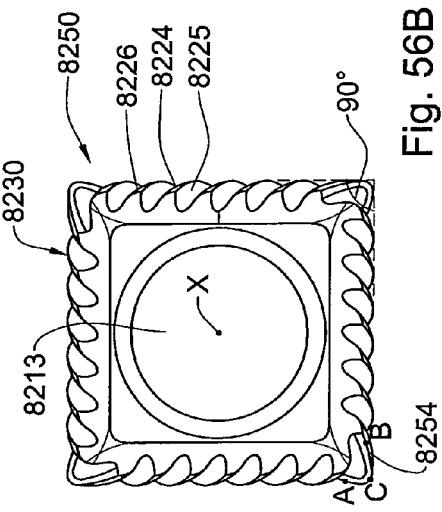
Figure 56D:
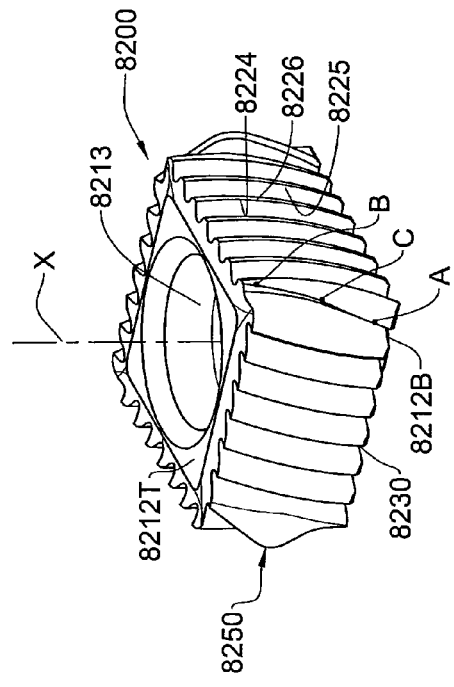
FIG. 56D is a schematic 45° view of the cutting insert shown in FIG. 56A.
Figure 56C:
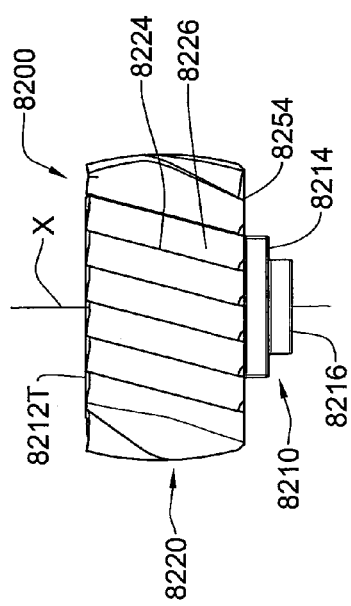
Figure 57:
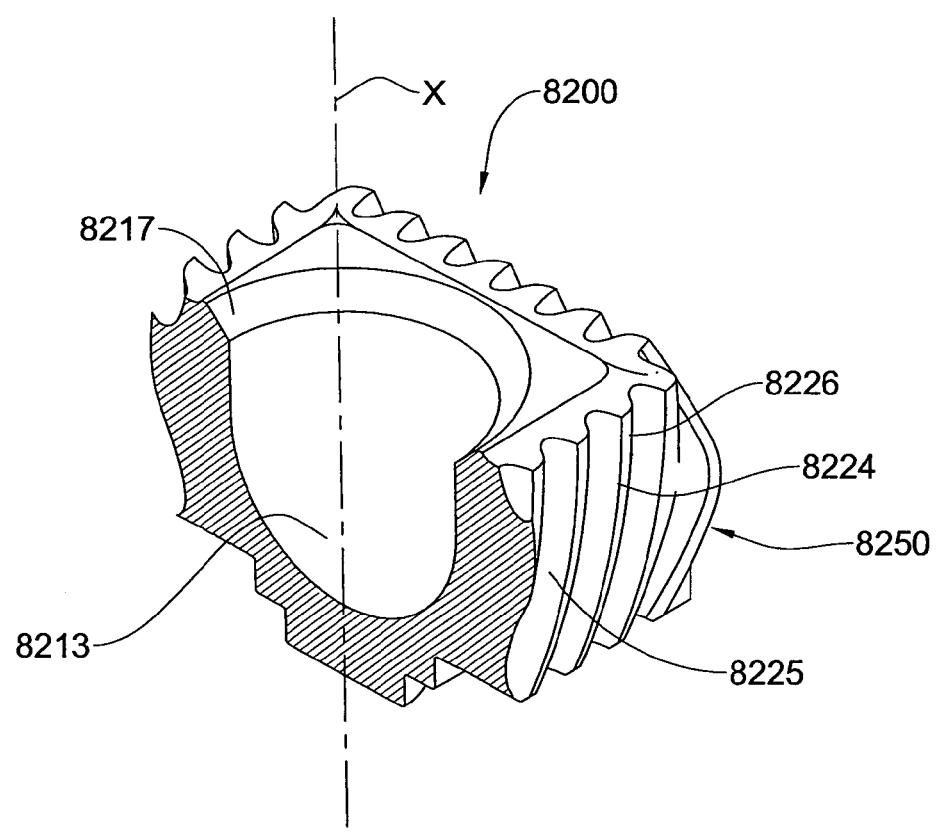
FIG. 57 is a schematic isometric section-view of the cutting insert shown in FIG. 56A, taken along plane P3 shown in FIG. 56A.

Attention is now drawn back to FIGS. 55A and 55B as well as FIG. 57, in which the securing mechanism 8300 of the turning tool 8000 is shown. The body 8110 of the cutting tool holder 8100 is formed at one end thereof with a bottom base 8112 and an overhanging extension 8114, such that there is formed an insert space 8115 defined between a top surface 8117 of the bottom base 8112 and a bottom surface 8119 of the overhanging extension 8114.

The bottom base 8112 is formed with a cavity 8116 of rectangular shape, adapted for receiving therein the extension of the cutting insert 8200. The cavity 8116 defines a central axis X which is adapted, when the cutting insert 8200 is mounted onto the cutting tool holder 8100, to be aligned with the central axis X of the cutting insert 8200. The overhanging extension 8114 is formed with a threaded bore 8118 adapted to receive therein the securing mechanism 8300. The threaded bore 8118 is designed so as to be aligned with the central axis X of the cavity 8116 of the bottom base 8112.

The arrangement is such that, in assembly, the cutting insert 8200 is adapted for being inserted into the space 8115 to a position in which the extensions 8214, 8216 are received within the cavity 8116 of the bottom base 8112, and such that the securing mechanism 8300 clamps the cutting insert 8200 towards the bottom base 8112, thus securing it in place.

For this purpose, the securing mechanism is in form of a fastening bolt having a stem portion 8320 and a head portion 8330. The stem portion 8320 is threaded and adapted to be received within the threaded bore 8118 of the overhanging extension 8114. The head portion 8330 is in the form of a circular head 8332 adapted, when the cutting insert 8200 is mounted onto the holder 8100 when the cutting insert 8200 is mounted onto the holder 8100, to be partially received within the securing cavity 8213 of the cutting insert 8200. The head portion 8330 is formed with a securing rim 8334 adapted, in the above mentioned position, to come in contact with the rim 8217 of the securing cavity 8213.

Under the above arrangement, there is provided full surface contact between the securing arrangement 8300 and the cutting insert 8200. In addition, the arrangement provides for cost-reduction of the cutting insert 8200 since it is mostly hollow, while the head portion 8330 partially fills in the cavity 8213.

Turning now to FIGS. 58A to 58D, another cutting insert is shown, generally designated 8200' and being similar in design to the previously described cutting insert 8200, with the difference being that in this particular example the design of the bridging cutting edge 8250' is such that the contour of the cutting insert 8200' provides for sharp corners of the cutting insert (i.e. about 90°).

For purpose of convenience, elements in the cutting insert 8200' which are similar to elements of the cutting insert 8200 were designated with similar designation number, but with the addition of two primes (').

Figure 58B:
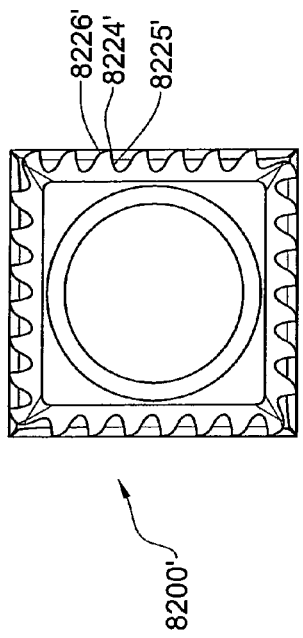
FIGS. 58A to 58C are, respectively, schematic front, top and isometric views of a cutting insert according to still another example of the disclosed subject matter, the cutting insert having a near 90° cutting radius.
Figure 58D:
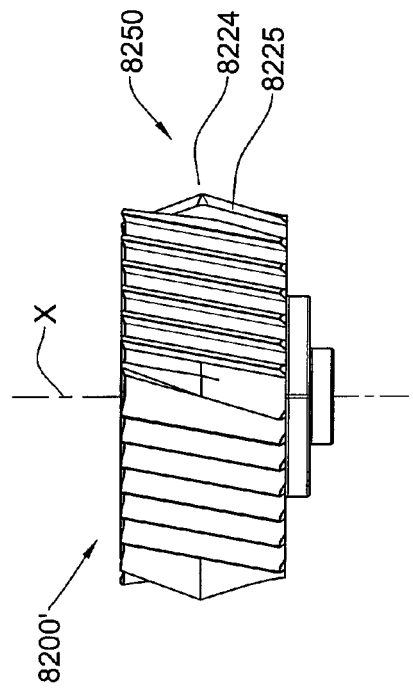
Figure 58A:
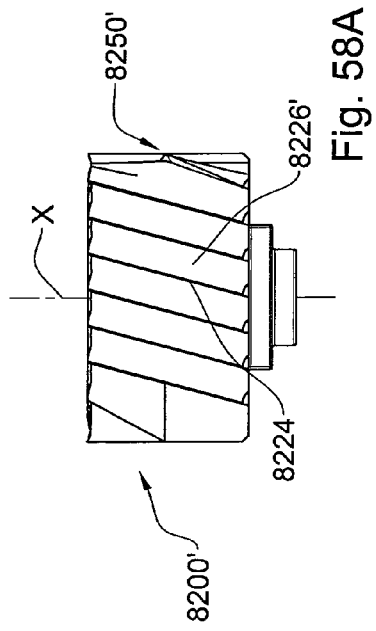
Figure 58C:
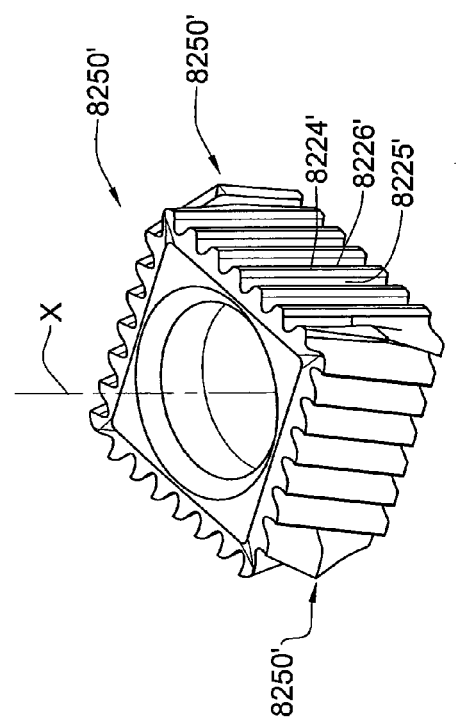

It should be clear that most principles and features described above with respect to cutting tools 1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''', 6000'''', 7000, 8000 and 8000' and/or shown in FIGS. 1A to 58D, are not restricted to those cutting tools (1, 1", 100, 100', 200, 300, 400, 500, 600, 700, 800, 900, 1000, 2000, 2000', 3000, 3000', 4000, 4000', 4000", 5000, 5000', 5000", 5000''', 6000, 6000', 6000", 6000''', 6000'''', 7000, 8000 and 8000') in connection with which they are described/shown, and may independently be applied, mutatis mutandis, to each other or to any other tools, in any combination considered to be appropriate by a person skilled in the art.

Turning now to FIGS. 59A to 61, a turning tool generally designated 9000, comprising a cutting tool holder 9100, a cutting insert 9200 and a clamping mechanism 9300 for securing the cutting insert 9200 onto the cutting tool holder 9100.

The cutting tool holder 9100 is formed with a body 9110 having an insert seat portion 9120 defined by a base surface 9127 and side walls 9122*a* and 9122*b*, forming a space having a general shape of a rectangular prism. The base surface 9127 is formed with a cavity 9126 adapted to engage with a corresponding portion of the cutting insert 9200.

The cutting tool holder 9100 is further formed with a threaded hole 9128 extending from a top face of the cutting tool holder 9100, and adapted for receiving therein a bolt of the securing mechanism 9300.

With particular reference being drawn to FIGS. 60A to 60D, the cutting insert 9200 comprises a body 9220 with a central axis X, and having a top face 9222T and a bottom face 9222B opposite one another, and side walls 9222S extending therebetween, such that each two bordering side walls 9222S form a corner. Along each two bordering side walls 9222S there extends a cutting portion 9230 having a cutting edge 9234 formed at the intersection of a rake and a relief surface 9236.

The cutting portion 9230 is designed such that the cutting edge 9234 surrounds the corner having one segment extending along one side wall 9222S and another segment extending along the bordering side wall 9222S. The arrangement is such that the one segment of the cutting edge 9234 is closer to the top face 9222T and the other segment is closer to the bottom face 9222B.

The rake surface of the cutting edge 9234 is constituted by several consecutive portions 9233, 9235, 9237 and 9239. The first portion 9233 extends generally parallel to the top face 9222T along one side wall 9222S, the second and third portions 9235 and 9237 are bridging portions forming the rake portions of the corner between the side walls 9222S, and the last portion 9239 serves as a chip breaker for chip removed from the workpiece WP.

Each of the top face 9222T and bottom face 9222B is formed with a mounting port 9240 adapted for engaging the cutting tool holder 9100 and the securing arrangement 9300 respectively. Each of the ports 9240 is in the form of a frustum pyramid having side walls 9242, and an inner cavity 9244, such that, when mounted onto the cutting tool holder 9100 as shown in FIG. 59A, the side walls 9242 are received within a cavity 9116 of the cutting tool holder 9100.

Figure 59A:
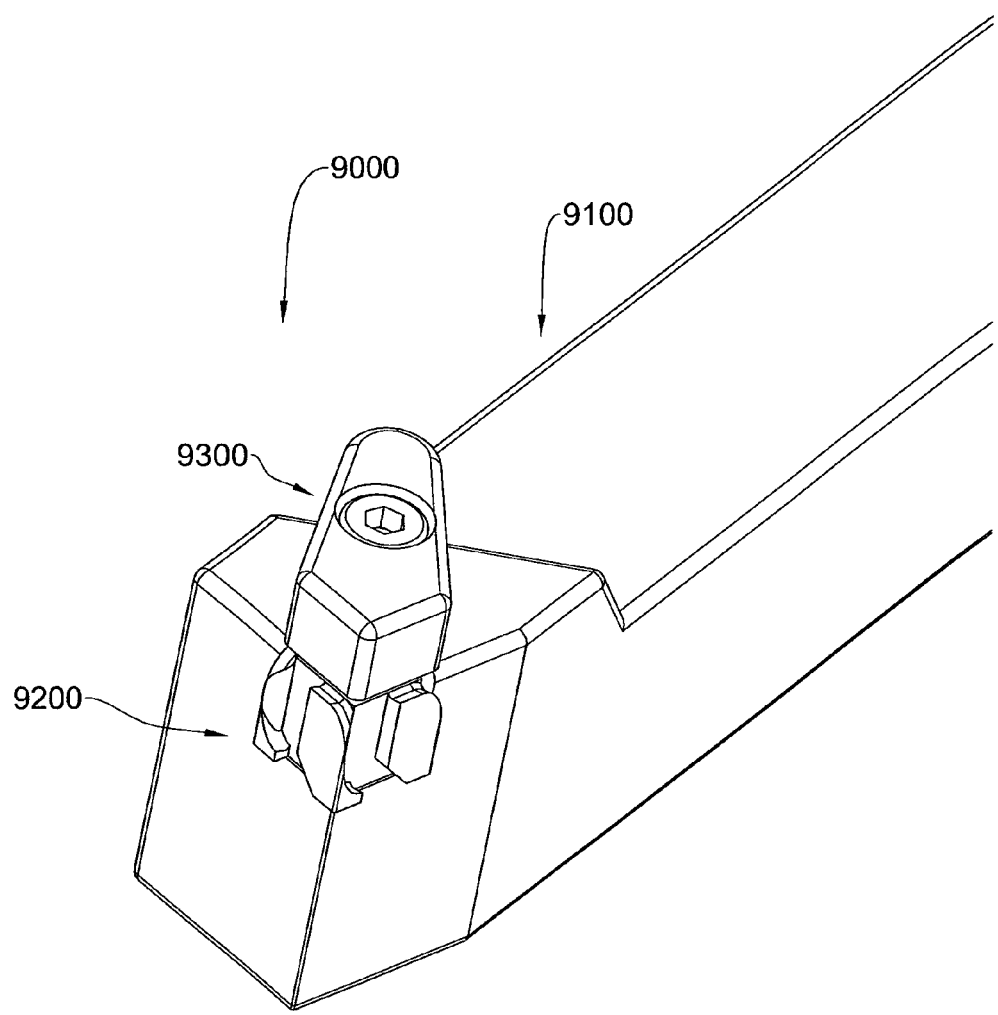
Figure 59B:
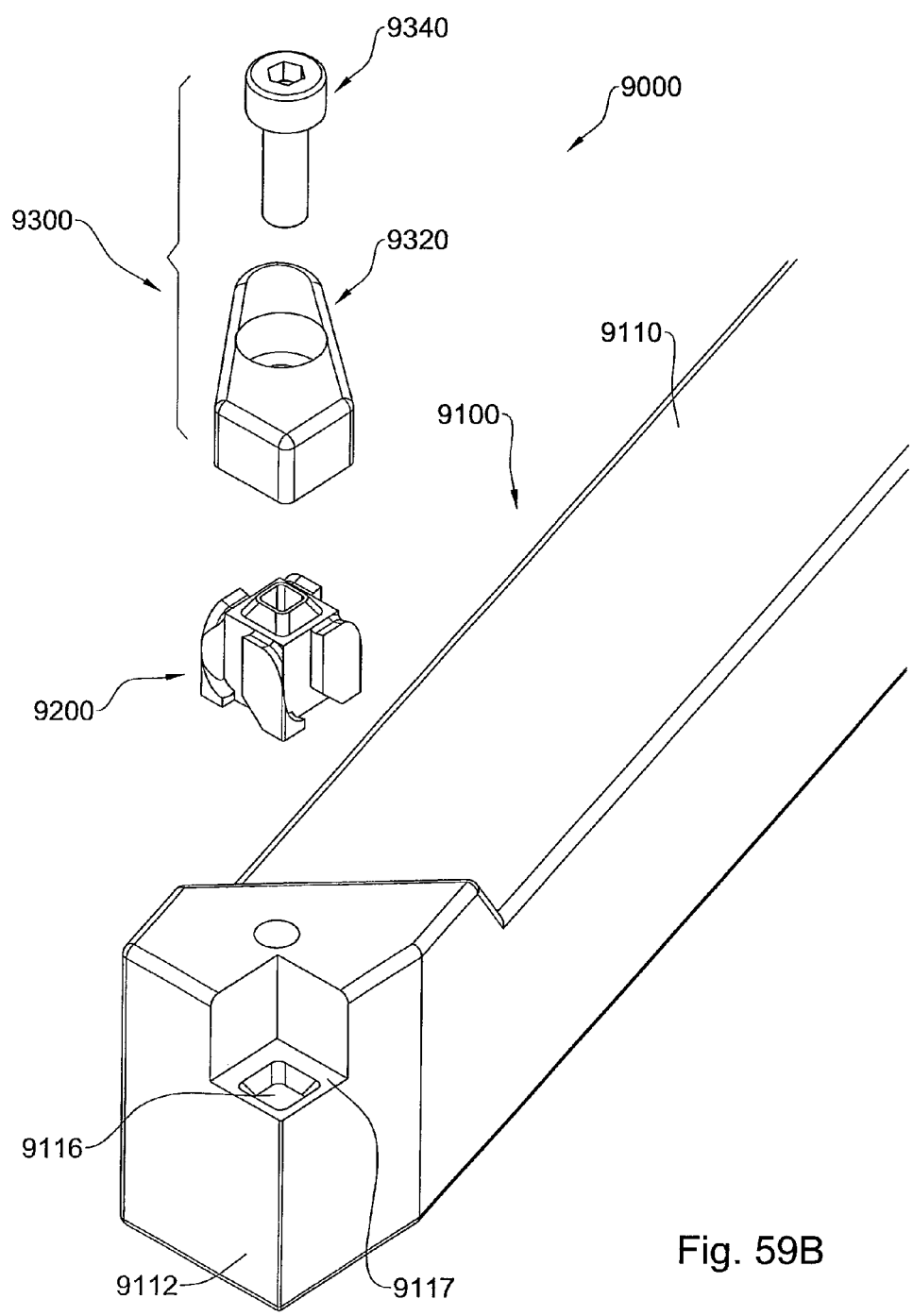
Figure 59C:
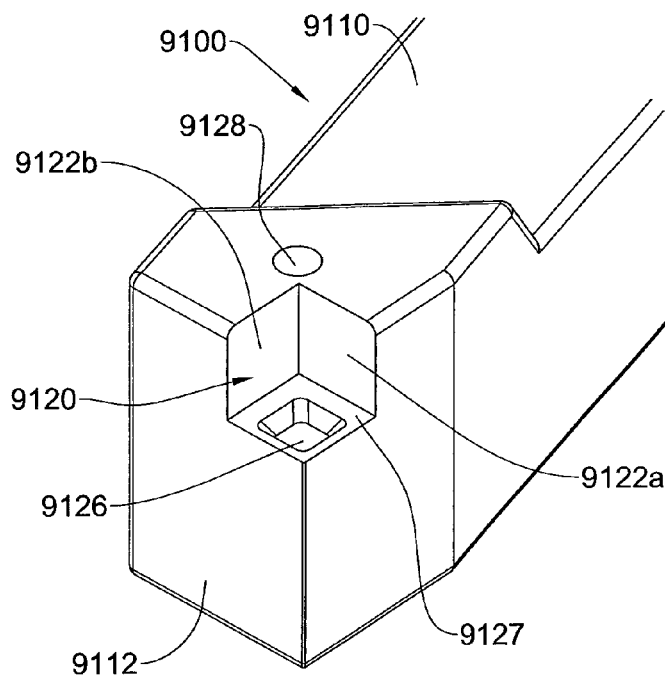
Figures 60A, 60B:
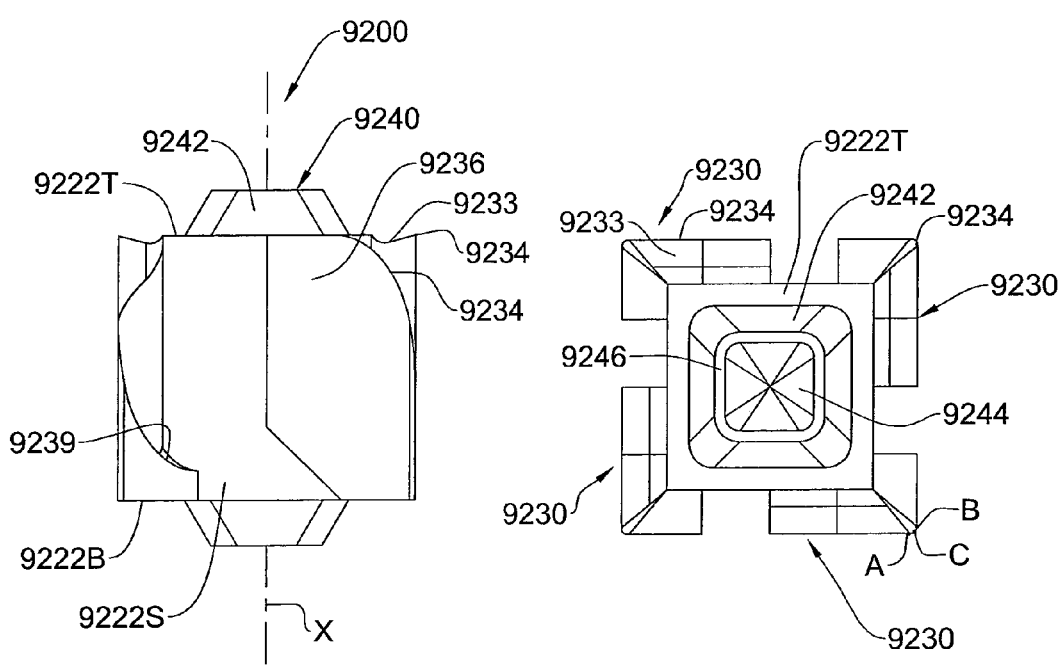
Figure 60C:
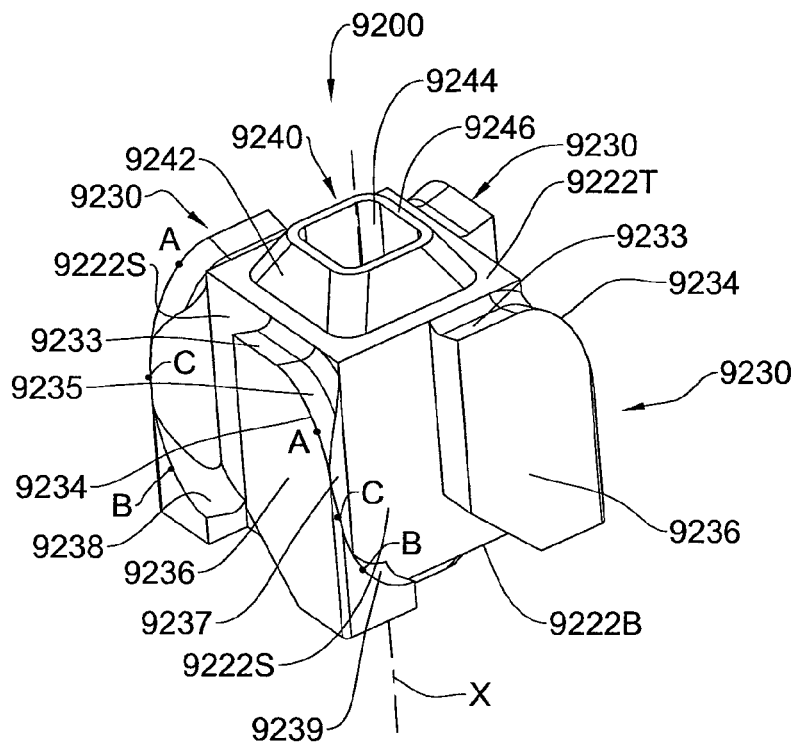
Figure 60D:
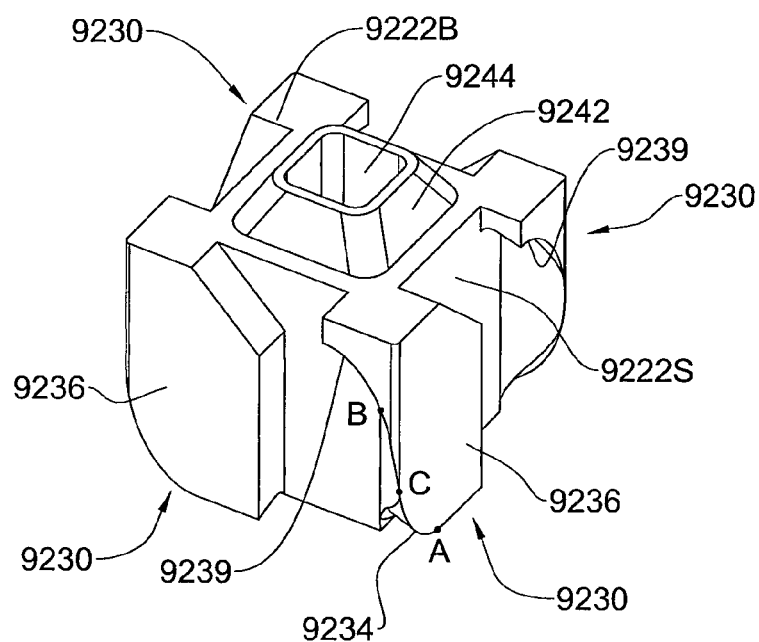

Reverting to FIGS. 59A and 59B, when the cutting insert 9200 is mounted onto the cutting tool holder 9100, the frustum pyramid of the port 9240 of the bottom face 9222B is received within the cavity 9126, such that the side walls 9222S are mated against the side walls 9122*a* and 9122*b* of the insert seat 9120. The frustum pyramid of the port 9240 of the top face 9222T is received within a corresponding cavity of a clamp 9320 of the securing mechanism 9300. The clamp 9320 is then fastened using a bolt 9340 received within the hole 9128 to secure the cutting insert 9200 in place.

Figure 61:
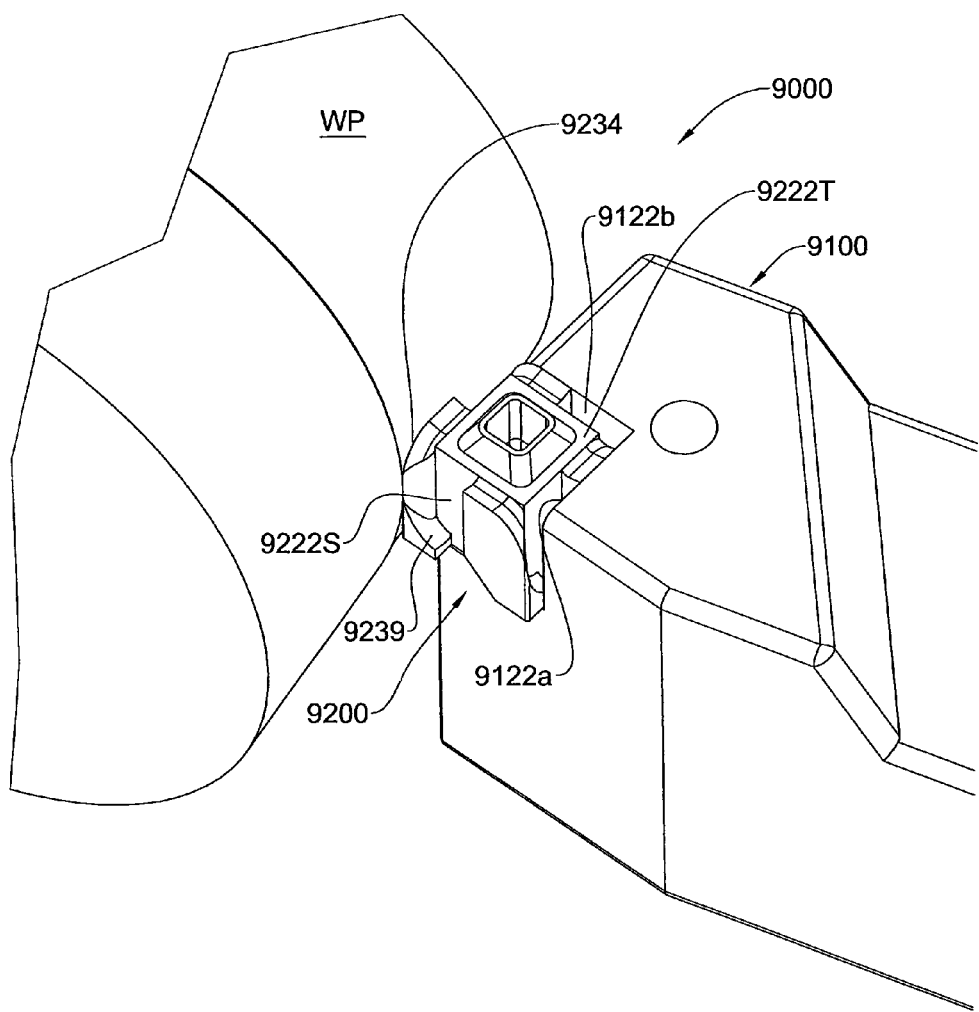
Figure 62A:
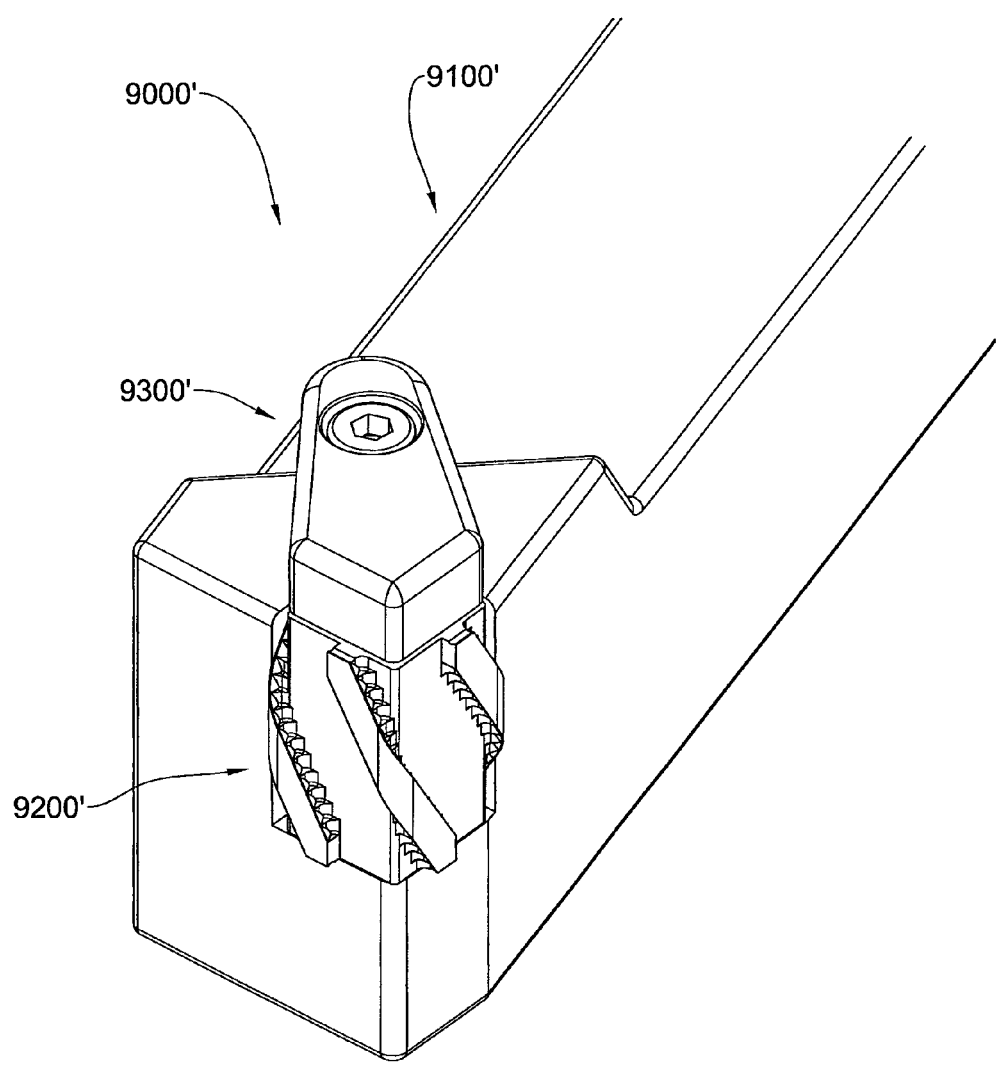
Figure 62B:
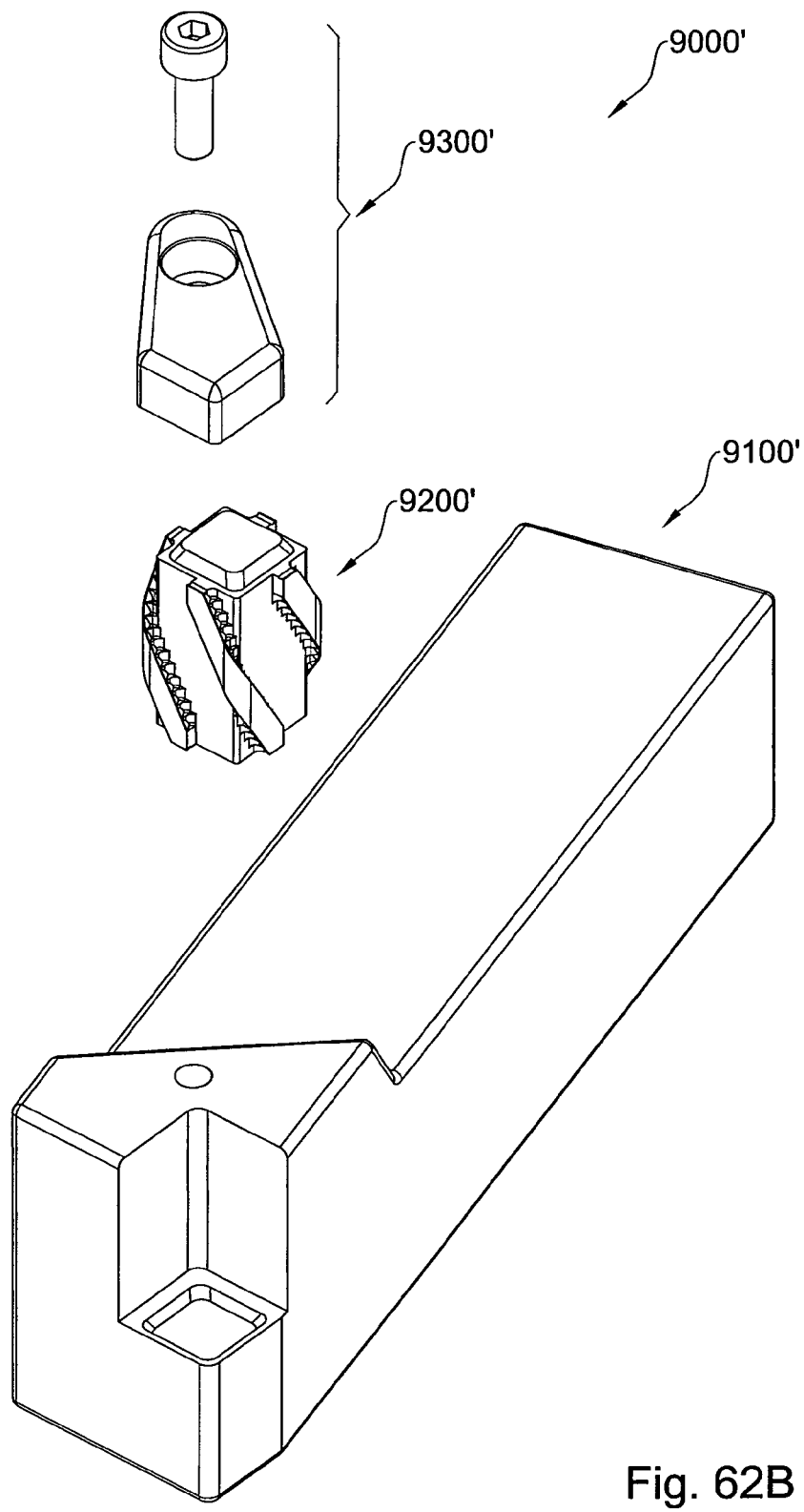
Figure 62C:
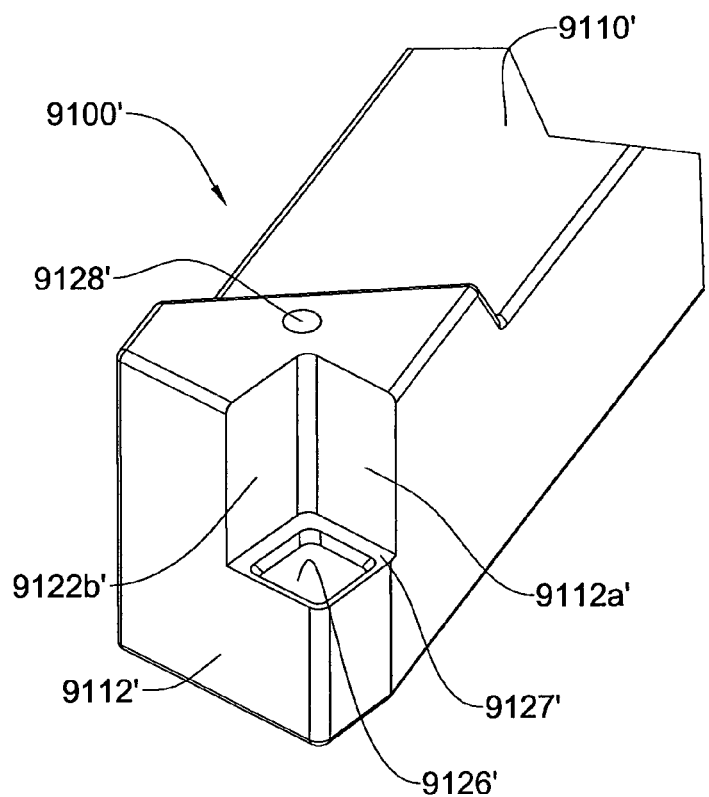

Turning now to FIG. 61, the turning tool 9000 is shown during removal of a chip from a workpiece WP. In operation, the workpiece WP is revolved and one of the corners of the cutting insert 9200 penetrates into the workpiece WP. Thus, the cutting edge 9234 gradually penetrates into the workpiece WP 'peeling off' a chip therefrom. The chip is eventually broken by the portion 9239 of the cutting insert 9200.

Turning now to FIGS. 62A to 63D, another turning tool generally designated 9000' is shown, also comprising a cutting tool holder 9100', a cutting insert 9200' and a securing mechanism 9300'. Therefore, elements of the cutting insert 9200' which are similar elements to elements of the cutting insert 9200 are denoted by similar numerals, with the addition of a ('), i.e. cutting edge 9224 of the cutting insert 9200 is similar to cutting edge 9224' of the cutting insert 9200'. One of the principle differences between the tools 9000 and 9000' lies in the design of the cutting insert 9200'.

In particular, the cutting insert 9200' is also formed with four cutting portions 9230', each cutting portion 9230' having a cutting edge 9234' defined at the intersection between a relief surface 9236' and a rake surface. The design of the rake surface of the cutting insert 9200' varies from the design of the rake surface of the cutting insert 9200 is that it is formed with a plurality of chip breaking elements 9250', dispose along the rake surface.

Figure 63A:
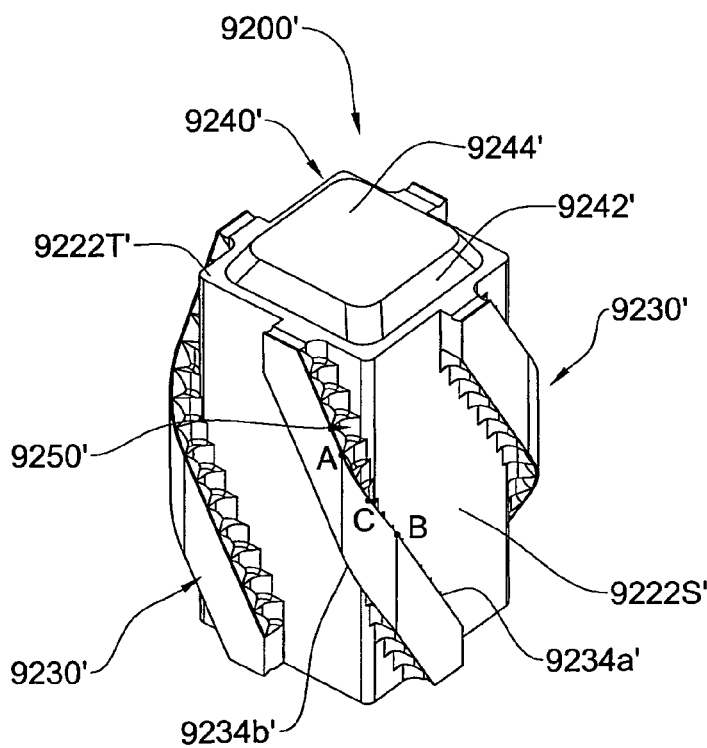
Figure 63B:
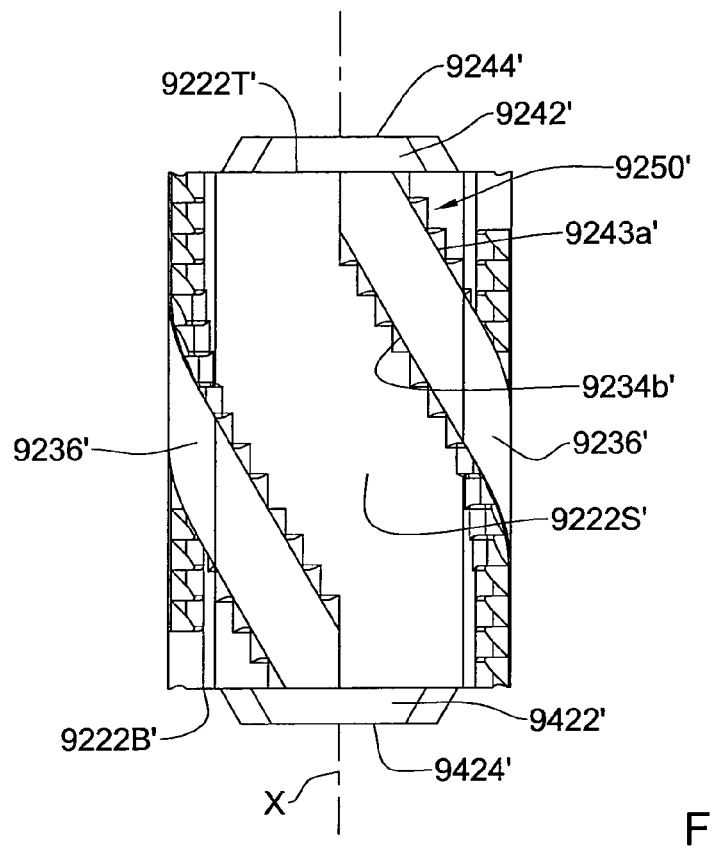
Figure 63C:
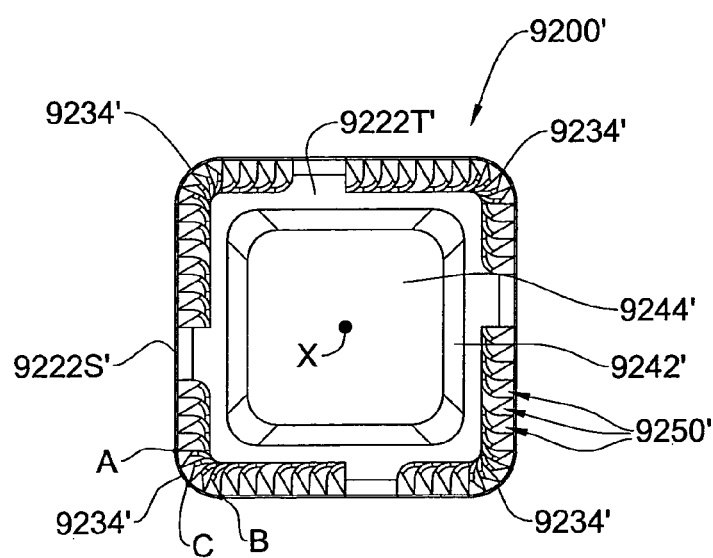
Figure 63D:
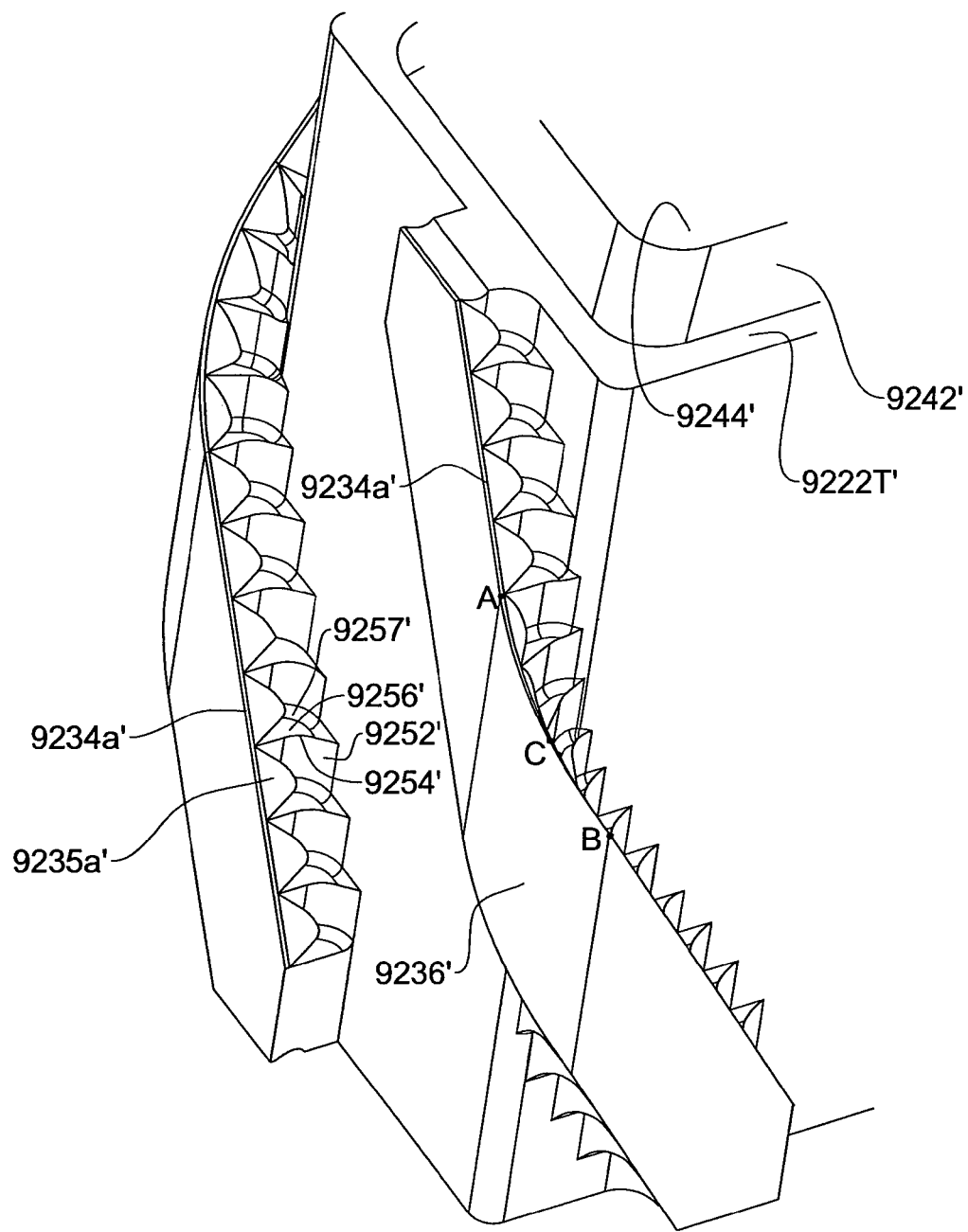

Attention is drawn to FIG. 63D in which an enlarged view of one of the cutting edges 9234' and chip breaking elements 9250' is shown. The chip breaking elements 9250' are formed as consecutive steps disposed along the length of the cutting edge 9234'. Each chip breaking element 9250' has a breaking edge 9254' defined at the intersection between a chip rake surface 9256' and a front surface chip relief surface 9252'. The arrangement is such that the breaking edge 9254' extends transverse to the cutting edge 9234' towards the body 9220' of the cutting insert 9200', the chip rake surface 9256' extending generally perpendicular to the central axis X of the cutting insert 9200' and the chip relief surface 9252' extending generally perpendicular to the chip rake surface 9256'.

During a cutting operation, when a chip is removed from the workpiece by a portion of the cutting edge 9234', it is almost immediately broken by the chip breaking element 9250' the breaking edge 9254' of which extends from that portion of the cutting edge. This design is such that each of the chip breaking elements 9250' is adapted to break a portion of a chip removed from a workpiece during a cutting operation, thus preventing the creation of an excessively long chip.

Turning now to FIGS. 64A to 64D, another turning tool is shown generally designated as 9000", having a similar design to that of cutting tool 9000'. Therefore, elements of the cutting insert 9200" which are similar elements to elements of the cutting insert 9200' are denoted by similar numerals, with the addition of a ('), i.e. cutting edge 9224' of the cutting insert 9200' is similar to cutting edge 9224" of the cutting insert 9200". One of the differences between the cutting tool 9000" and the previously described cutting tool 9000' lies in the design of the chip breaking elements 9250".

In particular, as shown particularly in FIG. 64D, the design of the chip breaking elements 9250" is such that the chip rake surface 9256" thereof is not planar (as opposed to the chip breaking surface 9256' of the chip breaking elements 9250') and the breaking edge 9254" is thus also curved. Specifically, the chip rake surface 9256" is concave, such that the breaking edge 9254" has a first end point $P_1$ located closer to the cutting edge 9234", a second end point $P_2$ located closer to the body 9220" of the cutting insert 9200", and an intermediate point $P_m$ which is lower (along a direction parallel to the central axis X of the cutting insert 9200") that the end points $P_1$, $P_2$. This design allows the chip breaking elements 9250" to better withstand the loads applied thereto by the chip removed from the workpiece.

Turning now to FIGS. 65A to 65E, still another turning tool is shown generally designated as 9000''', having a similar design to that of cutting tool 9000". Therefore, elements of the cutting insert 9200''' which are similar elements to elements of the cutting insert 9200" are denoted by similar numerals, with the addition of a ('), i.e. cutting edge 9224" of the cutting insert 9200" is similar to cutting edge 9224''' of the cutting insert 9200'''. One of the differences between the cutting tool 9000''' and the previously described cutting tool 9000" lies in the design of the chip breaking elements 9250'''.

In particular, the chip breaking elements, instead of being formed as steps as previously described, are, in this example, constituted by prolonged protrusions 9250''' extending along the rake surface 9235''' of the cutting insert 9200'''. As in previous examples, each such chip breaking element 9250''' has a chip rake surface 9256''' and a chip relief surface 9252''', defining at the intersection thereof a cutting edge 9254'''. However, in this present example, the chip breaking element 9250''' has the form of a concave crescent, such that both the chip rake surface 9256''' and the chip relief surface 9252''' extend generally transverse to the rake surface 9235''' of the cutting insert 9200'''.

It should be noted that the crescent shaped protrusion 9250''' is still oriented generally transverse to the cutting edge 9234''' of the cutting insert 9200''', i.e. a center line passing between end points $P_1$ and $P_2$ of the protrusion is generally perpendicular to the cutting edge 9234''' (extending from the cutting edge 9234' towards the body 9220''' of the cutting insert 9200''').

Turning now to FIGS. 66A to 66D, yet another turning tool is shown generally designated as 9000"", and having a similar design to that of cutting tool 9000'. Therefore, elements of the cutting insert 9200"" which are similar elements to elements of the cutting insert 9200''' are denoted by similar numerals, with the addition of a ('), i.e. cutting edge 9224''' of the cutting insert 9200''' is similar to cutting edge 9224"" of the cutting insert 9200"". One of the differences between the cutting tool 9000"" and the previously described cutting tool 9000''' lies in the design of the chip breaking elements 9250"".

In particular, the crescent shaped protrusions 9250"" of the cutting insert 9200"" are oriented such on the rake surface 9235" that a center line thereof (i.e. passing between end points $P_1$ and $P_2$ thereof), is angled to the cutting edge 9234"" and not perpendicular thereto. This orientation of the chip breaking elements 9250"" provides for reducing the loads exerted on the elements 9250"" by the chips removed from the workpiece WP during a cutting operation performed by the turning tool 9000"".

With reference to FIGS. 66E and 66F, 66G and 66H, and 66I and 66J, the cutting insert 9200''' is respectively shown when mounted on a cutting tool holder 9100''' during the performing of three cutting operations of a workpiece WWP. In FIGS. 66E and 66F the cutting insert 9200''' engages the workpiece WP such that the side of the cutting tool holder 9100''' is aligned with the workpiece WP, the feed being along the longitudinal direction of the cutting tool 9000'''. In FIGS. 66E and 66F the cutting insert 9200''' engages the workpiece WP such that the side of the cutting tool holder 9100''' is aligned with the workpiece WP, the feed being along the longitudinal direction of the cutting tool 9000'''. In FIGS. 66G and 66H the cutting insert 9200''' engages the workpiece WP such that the front of the cutting tool holder 9100''' is aligned with the workpiece WP, the feed being along a direction perpendicular to the longitudinal direction of the cutting tool 9000'''. In FIGS. 66I and 66J the cutting insert 9200''' engages the workpiece WP at an intermediary position between that shown in FIGS. 66E and 66F, and that shown in FIGS. 66G and 66H. In this position, the corner of the cutting insert 9200''' engages the workpiece and the feed is along a direction angled to the longitudinal direction of the cutting tool 9000'''.

It should be noted that the cutting inserts 9200, 9200', 9200'', 9200''' and 9200'''' are all configured for mounting in a similar manner onto their respective cutting tool holders 9100, 9100', 9100'', 9100''' and 9100''''.

It should also be noted that the feature of forming chip breaking elements (9250', 9250'', 9250''' and 9250'''') may also be referred to as 'chip breaking protrusions', 'chip breaking steps' etc., and may be used in any of the previously described tools.

It should further be clear that most principles and features described above with respect to cutting tools 1, 100, 100', 200, 300, 400, 500, 600, 700, 800, 900, 1000, 2000, 3000, 4000, 4000', 4000'', 5000, 5000', 5000'', 5000''', 6000, 6000', 6000'', 7000, 8000, 8000', 9000, 9000', 9000'', 9000''' and 9000'''' and/or shown in FIGS. 1A to 66D, are not restricted to those cutting tools (1, 100, 100', 200, 300, 400, 500, 600, 700, 800, 900, 1000, 2000, 3000, 4000, 4000', 4000'', 5000, 5000', 5000'', 5000''', 6000, 6000', 6000'', 7000, 8000, 8000', 9000, 9000', 9000'', 9000''' and 9000'''') in connection with which they are described/shown, and may independently be applied, mutatis mutandis, to each other or to any other tools, in any combination considered to be appropriate by a person skilled in the art.

Turning now to FIGS. 67A to 68B, a surface milling tool is shown generally being designated as 10,000. The milling tool 10,010 comprises a holder 10,100, a cutting insert 10,020

The cutting tool holder 10,010 comprises a body 10,011 with a central axis X about which the cutting tool 10000 is adapted to revolve, and has, at one end thereof a mounting portion 10,016 adapted for mounting thereon the cutting insert 10,020. The mounting portion 10,016 has a front surface 10,012 having formed thereon three securing connectors 10,030 adapted to be received within corresponding openings within the cutting insert 10,020. The mounting portions 10,016 is further formed with a central threaded bore 10,015 adapted for receiving therein a securing bold for securing the cutting insert 10,020.

The cutting insert 10,020 is essentially in the shape of a disc having a central axis X and a circular periphery, on which a plurality of cutting teeth 10,021 are formed. The cutting insert 10,020 is further formed with three 'windows' 10,040 adapted for receiving the corresponding connectors 10,030 of the cutting tool holder 10,010.

With particular reference being drawn to FIGS. 68A and 68B, each cutting tooth has a cutting edge 10,023 defined at the intersection between a corresponding rake surface and relief surface 10,025 and 10,027 respectively. The cutting edge 10,023 of each cutting tooth 10,021 extends from a top face 10,022T to a bottom face 10,022B of the disc-shaped cutting insert 10,020.

In assembly, the cutting insert 10,020 is mounted onto the mounting portion 10,016 of the cutting tool holder 10,010 such that the connectors 10,030 are received within the 'windows' 10,024 such that the bottom face 10,022B of the cutting insert 10,020 is flush against the front face 10,012 of the cutting tool holder 10,010. Once positioned, the cutting insert 10,020 is prevented from rotating due to the engagement with the connectors 10,030. In order to fully secure the cutting insert 10,020 in place, a securing bolt 10,050 is passed through a central bore 10,026 of the cutting insert 10,020 and is threaded into the hole 10,015 of the cutting portion 10,016.

With particular reference being drawn to FIG. 67C, the cutting insert has a diameter D and an axial extension l along the central axis X. The mounting portion 10,016 of the cutting tool holder 10,010 has a smaller diameter d, i.e. d<D, and an axial extension L greater than that of the cutting insert 10,020, i.e. L>l.

The above arrangement may be such that the cutting insert 10,020 comprises a plurality n of cutting edges, such that $$n \geq \frac{3D}{4} \cdot \frac{\theta}{360}$$

where θ is the angular extension of the cutting portion about the central axis (in this particular example 360°, and such that at any given point along the cutting portion, $$\frac{3D}{n} \geq L \geq \frac{3D}{2n},$$

where L' is the extension of the cutting edges of the cutting portion in a direction perpendicular to the cutting path.

It should further be clear that most principles and features described above with respect to cutting tools 1, 100, 100', 200, 300, 400, 500, 600, 700, 800, 900, 1000, 2000, 3000, 4000, 4000', 4000'', 5000, 5000', 5000'', 5000''', 6000, 6000', 6000'', 7000, 8000, 8000', 9000, 9000', 9000'', 9000''', 9000'''' and 10,000 and/or shown in FIGS. 1A to 68B, are not restricted to those cutting tools (1, 100, 100', 200, 300, 400, 500, 600, 700, 800, 900, 1000, 2000, 3000, 4000, 4000', 4000'', 5000, 5000', 5000'', 5000''', 6000, 6000', 6000'', 7000, 8000, 8000', 9000, 9000', 9000'', 9000''', 9000'''' and 10,000) in connection with which they are described/shown, and may independently be applied, mutatis mutandis, to each other or to any other tools, in any combination considered to be appropriate by a person skilled in the art.

Turning now to FIG. 69, an exemplary cutting insert generally designated CI is shown having a body formed with a front face F and a rear face R, and having four side faces extending therebetween—two short faces $S_1$ and two long faces $S_2$, such that each long face $S_1$ is neighbored by a short face $S_2$ and vise versa. The arrangement is such that each two neighboring side faces form a corner portion CP.

In addition, at the intersection of the corner portion CP with the front face F and the rear face R, there is formed a cutting edge CE of the corner portion CP, adapted to remove material from a workpiece during a cutting operation performed using the cutting insert CI, so as to create a corner recess within the workpiece WP (not shown).

Particular attention is now drawn to FIGS. 70A and 70B, in which a respective front view and an isometric view of the corner portion CP of the cutting insert CI are shown. It is observed that in the front view, the portion of the cutting edge CE is delimited by two tangent lines $L_1$ and $L_2$, which are respectively the projections of side faces $S_1$ and $S_2$ respectively. It is further observed that the lines $L_1$ and $L_2$ are tangent to the projection of the side faces $S_1$ and $S_2$ at respective points A and B, and intersect one another at a point O, forming an angle θ of almost 90°. It is noted that the angle θ corresponds to the angle of the corner recess that would be formed within the workpiece WP by the corner portion CP during a cutting operation as explained above, as shown in FIG. 70C.

In the exemplary cutting insert CI described herein, a bisector of the angle θ, originating at point O, intersects the cutting edge CE at an intermediary point C, located along the cutting edge CE between the tangency points A and B.

With particular reference to FIG. 70B, it is observed that point O is in fact an end projection of an axis O. The design of the corner portion CP is such that the projection A' and B' on the axis O of the respective tangency points A and B, fall at different locations along the axis O. The unique design of the cutting insert CI and in particular the corner portion CP is such that the projection C' of the intermediary point C on the axis O, falls between the locations of points A' and B'.

Furthermore, in this particular example, and several examples to be described in detail later, the intermediary point C may be any point on the cutting edge of the corner portion located between tangency points A and B, i.e. the projection each such intermediary point (not just that defined by the bisector) on the axis O will fall between the projections of points A and B on the axis O.

In common cutting inserts, the projections of tangency points A and B either fall on the same location along axis O, or fall at different locations with point C falling outside the segment of axis O defined between the projections of points A and B. In any of the cases, the projection of point C in standard cutting inserts does not fall between the projections of points A and B.

This design effectively prolongs the length of the cutting edge CE at the corner portion CP of the cutting insert CI, when compared to a standard cutting insert. Prolonging the length in the above manner, allows for a more efficient spread of the loads applied by the workpiece during a cutting operation, and thus allows for a longer life span of the cutting insert and of the tool in which it is used.

With particular reference being drawn also to FIGS. 70D and 70E, along the entire length of the cutting edge CE there extends an area referred herein as the cutting strip CS. The cutting strip is essentially that portion of the rake surface of the cutting insert immediately adjacent to the cutting edge, and may be viewed as a prolonged and curved strip.

It is observed that the strip CS extends, much like the cutting edge CE, from point A, surrounding the corner via point C, and progressing towards point B. It is further observed that at point A the cutting strip CS is facing essentially parallel a front surface of the cutting insert CI, while at point C, the cutting strip CS is already twisted about itself, such that its surface face in an almost upward direction. Progressing further towards point B along the cutting edge CE, the cutting strip CS completes the twist such that it faces upwards, and then curves towards point B where it is again facing essentially parallel to the front surface of the cutting insert CI.

It is noted that the cutting strip CS performs generally two twists (warps)—one about the corner of the cutting insert CI, and one about itself, i.e. changing the orientation of the surface of the cutting strip CS with respect to the central axis X of the cutting insert CI.

Furthermore, it is also noted that the cutting strip C.S., having surrounded the corner and facing in a generally upward direction, is slightly elevated over the point C, and, with reference to a workpiece WP is elevated thereabove. In other words, progression along the cutting strip CS from point C to point B, is under a slight inclination upward. Thereafter, before its final twist (change of orientation from facing upward to facing to the front), that point on the cutting strip CS is located higher than the point C.

The above principle of prolonging the cutting edge of the corner portion is referred herein as a 'warped corner' and will interchangeably be used with respect to the following examples with the terms 'magic corner', 'twisted corner', 'curved corner', 'prolonged corner' etc.

Several examples of cutting insert, cutting tools and cutting elements will now be described, all including the features of the 'warped corner'. In each such example, the cutting corners of the inserts/tools/elements have been given designators A, B and C which are equivalent to the above mentioned tangency points A and B and intermediary point C. It should be understood that in all these following examples, the design of the cutting corners yields the above described conditions (i.e. the projection of point C on the O axis, falls between the projections of point A and point B on the O axis). It should also be understood that while the projected points A', B' and C' are not always shown in the following examples, it should be clear, from the designated points A, B and C that the design of the cutting edge, the manner of operation thereof, and the advantages/benefits thereof are similar to those described in connection with the cutting insert CI shown in FIGS. 69 to 70B.

Turning now to FIGS. 71A to 71D, a example of a cutting insert is shown, generally designated as 10, 200. The cutting insert 10,200 has a body 10,220 formed with a generally rectangular front face and rear face 10,222F and 10,222R respectively (the faces 10,222F and 10,222R are similar in shape), and side walls 10,222$S_1$ and 10,222$S_2$ extending therebetween. The side faces 10,222$S_1$ and 10,222$S_2$ extend, respectively, between the short sides and the long sides of the rectangular faces 10,222F and 10,222R. The arrangement is such that each two adjacent side faces 10,222$S_1$ and 10,222$S_2$ form therebetween a corner.

The cutting insert 10,200 is further formed with a central bore 10,225 extending between the front face 10,222F and the rear face 10,222R, and configured for receiving therein a securing bolt for securing the cutting insert 10,200 onto a cutting tool holder (not shown) when mounted thereon. The central bore 10,225 has a central axis X, defining a central axis of the cutting insert 10,200.

Each side of the cutting insert (front and rear) is formed with two opposite cutting edges 10,232 defined at the intersection between the front/rear face 10,222F/10,222R and the corner formed by neighboring side faces 10,222$S_1$ and 10,222$S_2$. The arrangement is such that the cutting edges 10,232 are oppositely disposed i.e., the corner at which the cutting edge 10,232 is disposed is neighbored by two corners where no cutting edge is formed.

With particular attention being drawn to FIG. 71D, it is observed that the cutting edge 10,232 forms a prolonged corner, designated by points A, B and C corresponding to points A, B and C described with respect to FIGS. 70A to 70E.

The cutting insert 10,200 is adapted for mounting onto a cutting tool holder (not shown) in a standard manner, such that one of the front face and the rear face 10,222F/10,222R engages an insert seat of the tool holder, and the other face is configured to face the workpiece (not shown) during the cutting operation. In operation, the cutting insert 10,200 penetrates the workpiece WP such that point A is the first to come into contact with the workpiece WP, followed by the entire length of the cutting edge 10,232 along the corner, wherein point C penetrated the WP after point A and prior to point B.

As previously mentioned, prolonging the cutting edge 10,232 allows for a smoother penetration of the cutting insert 10,200 into the workpiece WP, thereby reducing the loads applied thereon by the workpiece WP, and furthermore, once a chip begins 'peeling off', the force which is to be applied in order to keep 'peeling' is considerably smaller than in cutting edges of common cutting inserts, which do not yield to the unique design of the cutting edge corner of the subject matter of the present application.

The cutting insert 10,200 is a reversible and indexible cutting insert, and is formed all-in-all with four cutting edges 10,232, such that when one cutting edge 10,232 of the front face 10,222F is worn out, the cutting insert 10,200 may be rotated about its central axis X so that the opposite cutting edge 10,232 is configured for removing material from the workpiece WP. When both cutting edges 10,232 are worn out, the cutting insert 10,200 may be flipped over so as to allow utilization of the two cutting edges 10,232 on the rear face 10,222R of the cutting insert 10,200.

Turning now to FIGS. 72A to 72D, another example of a cutting insert is shown, generally designated as 10,400, and having a body 10,420 of a generally square shape, formed with symmetric front and rear surfaces 10,422F and 10,422R respectively, and four identical side faces 10,422S extending therebetween. The arrangement is such that each two adjacent side faces 10,422S form a corner, corresponding to a corner which is to be formed within the workpiece WP (not shown) during a cutting operation.

The cutting insert 10,400 is formed with eight cutting portions 10,430, four on each side of the cutting insert 10,400, each such cutting portion 10,430 comprising a cutting edge 10,432. In each of the cutting portion 10,430, the cutting edge 10,432 has at least a portion defined at the intersection between the corner formed by the side faces 10,422S and the front/rear face 10,422F/10,422R.

The cutting edge 10,432 may also be defined as the intersection between a rake surface 10,434 extending along the front face 10,422F, and a relief surface extending along the corner formed between two neighboring side faces 10,422S.

In each such portion of the cutting edge 10,432, the corner is designed with a prolonged cutting edge 10,432 at the corner, designated by points A, B and C corresponding to points A, B and C described with respect to FIGS. 70A to 70E, and yielding to the same definition (i.e. the projection of point C on the O axis, falls between the projections of point A and point B on the O axis).

The cutting insert 10,400 is a reversible and indexible cutting insert, and is formed with eight cutting edges 10,432 disposed (at least partially) along its corners. Thus, the cutting insert 10,400 may be revolved about its central axis X in order to perform the desired indexing, and may also be flipped over (rear face 10,422R facing the workpiece instead of the front face 10,422F) for this purpose.

Turning now to FIGS. 73A to 73C, still another example of a milling tool C.T. is shown, comprising a cutting insert generally designated as 10,400', and having a body 10,420' of a generally square shape, formed with symmetric front and rear surfaces 10,422F' and 10,422R' respectively, and four identical side faces 10,422S' extending therebetween. The arrangement is such that each two adjacent side faces 10,422S' form a corner, corresponding to a corner which is to be formed within the workpiece WP (not shown) during a cutting operation.

The cutting insert 10,400' is formed with four cutting portions 10,430, on the face side 10,422F' of the cutting insert 10,400, each such cutting portion 10,430' comprising a cutting edge 10,432. In each of the cutting portion 10,430, the cutting edge 10,432 has at least a portion defined at the intersection between the corner formed by the side faces 10,422S and the front/rear face 10,422F/10,422R.

The cutting edge 10,432' may also be defined as the intersection between a rake surface 10,434' extending along the front face 10,422F', and a relief surface extending along the corner formed between two neighboring side faces 10,422S'.

In each such portion of the cutting edge 10,432', the corner is designed with a prolonged cutting edge 10,432' at the corner, designated by points A, B and C corresponding to points A, B and C described with respect to FIGS. 70A to 70E, and yielding to the same definition (i.e. the projection of point C on the O axis, falls between the projections of point A and point B on the O axis).

The cutting insert 10,400' is an indexible cutting insert, and is formed with four cutting edges 10,432' disposed (at least partially) along its corners. Thus, the cutting insert 10,400' may be revolved about its central axis X in order to perform the desired indexing.

Turning now to FIGS. 74A to 74D, still another example of a cutting insert is shown, generally designated as 10,500, having a body 10,520 of a generally rectangular shape, a front face 10,522F, a rear face 10,522R and side walls 10,522S$_1$ and 10,522S$_2$ extending therebetween. The side faces 10,522S$_1$ and 10,522S$_2$ extend, respectively, between the short sides and the long sides of the rectangular faces 10,522F and 10,222R. The arrangement is such that two adjacent side faces 10,222S$_1$ and 10,222S$_2$ form therebetween a corner, corresponding to a corner which is to be formed within the workpiece WP (not shown) during a cutting operation.

The cutting insert 10,500 is formed with two cutting portions 10,530, on opposite corners of the face side 10,522F of the cutting insert 10,500, each such cutting portion 10,530 comprising a cutting edge 10,532. In each of the cutting portion 10,530, the cutting edge 10,532 has at least a portion defined at the intersection between the corner formed by the side faces 10,522S$_1$, 10,522S$_2$ and the front face 10,522F.

The cutting edge 10,532 may also be defined as the intersection between a rake surface 10,534 extending along the front face 10,522F, and a relief surface extending along the corner formed between two neighboring side faces 10,522S$_1$, 10,522S$_2$.

In each cutting portion 10,530 of the cutting edge 10,532, the corner is designed with a prolonged cutting edge 10,532 at the corner, designated by points A, B and C corresponding to points A, B and C described with respect to FIGS. 70A to 70E, and yielding to the same definition (i.e. the projection of point C on the O axis, falls between the projections of point A and point B on the O axis).

It is observed that in this particular example, the cutting portion 10,530 bulges out, i.e. extending, along the central axis X, beyond the front surface 10,522F, such that point A is the closer to the front face 10,522F than point B (along the axial direction), and point C is located at an intermediary distance from the front face 10,522F (along the central axis X). In other words, the cutting edges 10,532 of the cutting portions 10,530 are remote from the rear face 10,522R of the cutting insert 10,500 (along the axial direction), to an extent greater than that of the front face 10,522F from rear face 10,522R.

In operation, the cutting insert 10,500 penetrates into the workpiece WP (not shown) such that first point B comes into contact with the material of the workpiece, followed by point C on the corner, and only thereafter, point A. Upon removing a chip from the workpiece WP, the chip is pushed towards the center of the cutting insert 10,500, and is then evacuated therefrom by displacing away from the cutting edge 10,500.

Turning not to FIGS. 75A to 75D, yet another example of a cutting insert is shown, generally designated as 10,500'. The cutting insert 10,500' is of similar shape and size to that of the cutting insert 10,500, with the difference being in the design of the cutting portion 10,530' thereof.

In particular, the cutting insert 10,500' has a body 10,520' of a generally rectangular shape, a front face 10,522F', a rear face 10,522R' and side walls 10,522S$_1$' and 10,522S$_2$' extending therebetween. The side faces 10,522S$_1$' and 10,522S$_2$' extend, respectively, between the short sides and the long sides of the rectangular faces 10,522F' and 10,222R'. The arrangement is such that two adjacent side faces 10,222S$_1$' and 10,222S$_2$' form therebetween a corner, corresponding to a corner which is to be formed within the workpiece WP (not shown) during a cutting operation.

The cutting insert 10,500' is formed with two cutting portions 10,530', on opposite corners of the face side 10,522F' of the cutting insert 10,500', each such cutting portion 10,530' comprising a cutting edge 10,532'. In each of the cutting portion 10,530', the cutting edge 10,532' has at least a portion defined at the intersection between the corner formed by the side faces 10,522S' and the front face 10,522F'.

The cutting edge 10,532' may also be defined as the intersection between a rake surface 10,534' extending along the front face 10,522F', and a relief surface extending along the corner formed between two neighboring side faces 10,522S$_1$', 10,522S$_2$'.

In each cutting portion 10,530' of the cutting edge 10,532', the corner is designed with a prolonged cutting edge 10,532' at the corner, designated by points A, B and C corresponding to points A, B and C described with respect to FIGS. 70A to 70E, and yielding to the same definition (i.e. the projection of point C on the O axis, falls between the projections of point A and point B on the O axis).

It is observed that in this particular example, the cutting portion 10,530', as opposed to the previously described cutting insert, is indented/concave (instead of bulging out), such that point A is the farther from the front face 10,522F' than point B (along the axial direction), and point C is located at an intermediary distance from the front face 10,522F' (along the central axis X).

In operation, the cutting insert 10,500 penetrates into the workpiece WP (not shown) such that point A is first to come into contact with the material of the workpiece, followed by point C on the corner, and only thereafter, point B.

Once a chip is removed from the workpiece WP (not shown), it is urged by the shape of the rake surface 10,534' of the cutting portion 10,530' upwards towards point B, and from there is further urged away from the cutting edge 10,532' until it is fully evacuated away from the cutting insert 10,500'.

It is observed that the two cutting inserts 10,500 and 10,500', though both comprising the feature of the 'warped corner', are in fact opposite designs to one another, i.e. in the cutting insert 10,500 the corner 'bulges out' (compared to a standard cutting insert in which the corner is not warped), whereas in the cutting insert 10,500' the corner is 'sunk in' (compared to a standard cutting insert in which the corner is not warped). Nonetheless, both cutting inserts 10,500 and 10,500' yield to the definition and conditions of the location of points A, B and C as described with respect to FIGS. 70A to 70D.

Turning now to FIGS. 76A to 76G, still a further cutting insert is shown generally designated as 10,500". The cutting insert 10,500" is generally a combination of the cutting inserts 10,500 and 10,500', as will now be described.

In particular, the cutting insert 10,500" has a body 10,520" of a generally rectangular shape, a front face 10,522F''', a rear face 10,522R" and side walls 10,522S$_1$" and 10,522S$_2$" extending therebetween. The side faces 10,522S$_1$" and 10,522S$_2$" extend, respectively, between the short sides and the long sides of the rectangular faces 10,522F''' and 10,222R". The arrangement is such that two adjacent side faces 10,222S$_1$' and 10,222S$_2$' form therebetween a corner, corresponding to a corner which is to be formed within the workpiece WP (not shown) during a cutting operation.

The cutting insert 10,500" is thus formed with two cutting portions 10,530", on opposite corners of the front face 10,522F''' of the cutting insert 10,500", each such cutting portion 10,530" comprising a cutting edge 10,532" similar to the cutting edges 10,532" of the cutting insert 10,500", and two cutting portions 10,530", on opposite corners of the rear face 10,522R" of the cutting insert 10,500", each such cutting portion 10,530" comprising a cutting edge 10,532" similar to the cutting edges 10,532' of the cutting insert 10,500'. In each of the cutting portion 10,530", the cutting edge 10,532" has at least a portion defined at the intersection between the corner formed by the side faces 10,522S$_1$", 10,522S$_2$" and the front/rear face 10,522F'''/10,522F'''.

The cutting edge 10,532" may also be defined as the intersection between a rake surface 10,534" extending along the front/rear face 10,522F'''/10,522F''', and a relief surface 10,536" extending along the corner formed between two neighboring side faces 10,522S$_1$', 10,522S$_2$'.

In each cutting portion 10,530" of the cutting edge 10,532", the corner is designed with a prolonged cutting edge 10,532" at the corner, designated by points A, B and C corresponding to points A, B and C described with respect to FIGS. 70A to 70E, and yielding to the same definition (i.e. the projection of point C on the O axis, falls between the projections of point A and point B on the O axis).

The cutting insert 10,500" is both reversible and indexible, wherein the cutting portions 10,530" of the front side thereof operates in a manner similar to the operation of the cutting insert 10,500', while the cutting portions 10,530" of the front side thereof operates in a manner similar to the operation of the cutting insert 10,500. Therefore, the manner of operation of the cutting insert 10,500" will not be discussed in detail, as it should be clear to a person skilled in the art from the previously described manner of operation with respect to cutting inserts 10,500, 10,500'.

Attention is now drawn to FIGS. 77A to 78C, in which an example of a turning tool C.T. is shown, comprising a cutting insert generally designated as 10,600. The cutting insert 10,600 has a body 10,620 of a generally square shape, formed with front and rear surfaces 10,622F and 10,622R respectively, and four identical side faces 10,622S extending therebetween. The arrangement is such that each two adjacent side faces 10,622S form a corner, corresponding to a corner which is to be formed within the workpiece WP (not shown) during a cutting operation.

The cutting insert 10,600 is formed with four cutting portions 10,630 on the face side 10,622F of the cutting insert 10,600, each such cutting portion 10,630 comprising a cutting edge 10,632. In each of the cutting portion 10,630, the cutting edge 10,632 has at least a portion defined at the intersection between the corner formed by the side faces 10,622S and the front face 10,622F.

The cutting edge 10,632 may also be defined as the intersection between a rake surface 10,634 extending along the front face 10,622F, and a relief surface 10,636 extending along the corner formed between two neighboring side faces 10,622S.

In each such portion of the cutting edge 10,632, the corner is designed with a prolonged cutting edge 10,632 at the corner, designated by points A, B and C corresponding to points A, B and C described with respect to FIGS. 70A to 70E, and yielding to the same definition (i.e. the projection of point C on the O axis, falls between the projections of point A and point B on the O axis). In particular, the cutting edge 10,632 of the cutting insert 10,600 'bulges out', generally similar to the design of the cutting insert 10,500 previously described.

The cutting insert 10,600 is indexible and is formed with four cutting edges 10,632 disposed (at least partially) along its corners. Thus, the cutting insert 10,600 may be revolved about its central axis X in order to perform the desired indexing.

With particular reference to FIG. 77B, when mounted onto the cutting tool holder to form the turning too C.T. the cutting insert 10,600 has both a forward tilt (i.e. with respect to a front surface F of the cutting tool holder) at an angle $\alpha_2$, and a side tilt (i.e. with respect to a side surface S of the cutting tool holder) at an angle $\alpha_1$.

Turning now to FIGS. 79 to 80C, another turning tool CT is shown comprising a cutting insert generally designated as 10,600', being generally similar to the cutting insert 10,600, with the difference being in the design of the cutting portions 10,630'.

The cutting insert 10,600' has a body 10,620' of a generally square shape, formed with front and rear surfaces 10,622F' and 10,622R' respectively, and four identical side faces 10,622S' extending therebetween. The arrangement is such that each two adjacent side faces 10,622S' form a corner, corresponding to a corner which is to be formed within the workpiece WP (not shown) during a cutting operation.

The cutting insert 10,600' is formed with four cutting portions 10,630' on the face side 10,622F' of the cutting insert 10,600', each such cutting portion 10,630' comprising a cutting edge 10,632'. In each of the cutting portion 10,630', the cutting edge 10,632' has at least a portion defined at the intersection between the corner formed by the side faces 10,622S' and the front face 10,622F'.

The cutting edge 10,632' may also be defined as the intersection between a rake surface 10,634' extending along the front face 10,622F', and a relief surface 10,636' extending along the corner formed between two neighboring side faces 10,622S'.

In each such portion of the cutting edge 10,632', the corner is designed with a prolonged cutting edge 10,632' at the corner, designated by points A, B and C corresponding to points A, B and C described with respect to FIGS. 70A to 70E, and yielding to the same definition (i.e. the projection of point C on the O axis, falls between the projections of point A and point B on the O axis). In particular, as opposed to the previousy described cutting insert 10,600', the cutting edge 10,632' of the cutting insert 10,600' is concave (i.e. 'sunk in') instead of 'bulging out', generally similar to the design of the cutting insert 10,500' previously described.

The cutting insert 10,600' is also indexible and is formed with four cutting edges 10,632' disposed (at least partially) along its corners. Thus, the cutting insert 10,600' may be revolved about its central axis X in order to perform the desired indexing.

With particular reference to FIG. 79, when mounted onto the cutting tool holder to form the turning too C.T. the cutting insert 10,600' has both a forward tilt (i.e. with respect to a front surface F of the cutting tool holder) at an angle $\alpha_2$, and a side tilt (i.e. with respect to a side surface S of the cutting tool holder) at an angle $\alpha_1$.

It should further be clear that most principles and features described above with respect to cutting tools 1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,400, 10,400', 10,500, 10,500', 10,500", 10,600 and 10,600' and/or shown in FIGS. 1A to 80C, are not restricted to those cutting tools (1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,400, 10,400', 10,500, 10,500', 10,500", 10,600 and 10,600') in connection with which they are described/shown, and may independently be applied, mutatis mutandis, to each other or to any other tools, in any combination considered to be appropriate by a person skilled in the art.

Turning to FIGS. 81A to 82F, the principle of the 'warped corner' may be implemented not only in milling/turning tools, but also in drilling tools as will now be explained in detail with respect to the exemplary drilling tool DRL shown in these drawings.

With particular attention being drawn to FIGS. 81A to 81D, in which a drill is shown, generally designated as DRL, formed with a body extending along a central axis X, having a front end with a front face F oriented generally perpendicular to the central axis X. The drill DRL is formed with a cutting portion at the front end, and has a cutting edge CE at the intersection of the front face and the body of the drill DRL, such that the cutting edge CE extends along the corner formed between the front face F and the body of the drill DRL.

As previously noted, the corner along which the cutting edge CE extends corresponds to the corner to be formed within the workpiece WP by the drill DRL. However, as opposed to the previously described cutting/turning/milling inserts, in this case the angle formed by the corner is about 120° (and not about 90°), as common in drilling tools.

In this exemplary drill DRL, the principle of the 'warped corner' is implemented to the cutting edge CE, the 'warped corner' of the exemplary drill DRL being of generally similar design to that of the exemplary cutting insert CI described with reference to FIGS. 70A to 70D. Thus, the cutting edge CE is denoted by points A, B and C disposed therealong, which correspond to points A, B and C described with respect to FIGS. 70A to 70D, and yielding to the same definition. Thus, the cutting edge CE is concave ('sunk in') so that the projection of point C on the O axis, falls between the projections of point A and point B on the O axis.

It is further noted that the warping of the cutting edge CE also yields that the profile of the drill DRL is configured to generate a filleted corner in a workpiece WP (shown FIGS. 82A to 82F), rather than a sharp corner as in common drills. The advantages of this features will be described in detail later with respect to FIGS. 82A to 82F.

With particular attention drawn to FIGS. 81E and 81F, four cross-sections $C_1$-$C_4$ of the drill DRL are shown during a drilling operation, when the drill DRL is positioned within a bore (partially shown) of a workpiece WP. It is observed that despite the warping of the cutting edge CE, in each cross-section, the angle between a rake surface RA and a bottom relief surface RE (designated $\alpha_1$ to $\alpha_4$ respectively), is always sufficient for providing a firm support for the cutting portion and the cutting edge CE so as to withstand the loads applied thereto by the workpiece WP. In particular, the angle $\alpha$ may range between 50° to 80°.

Reference is now made to FIGS. 82A to 82B in which the drill DRL is shown disposed within a bore BR of a workpiece WP, during five consecutive stages of a drilling operation.

It is first observed that, as previously mentioned, the bore BR formed in the workpiece WP has filleted (rounded) edges, rather than sharp corners as yielded by the drilling of common drills.

In operation, the cutting edge CE (as shown in FIG. 82A) begins peeling off a chip CH from the bottom of the bore BR, which rolls out upwards (i.e. about an axis perpendicular to the central axis X). At this point the segment of the cutting edge CE between points A and C is operable. As the drill DRL continues to revolve about the central axis X, the point C contacts the edge of the bore BR, and, owing to its warped design, leaves a filleted profile within the bore (shown FIG. 82D).

In addition, also owing to the unique continuous design of the cutting edge CE along the warped corner, there are no two neighboring segments of the cutting edge CE along the corner which are angled to one another. Rather, the cutting edge CE is completely continuous, such that at the stage shown in FIGS. 82D and 82E, the drill DRL continues peeling off chips, this time from the sides of the bore (in the area of the corner).

As a result of this continuous cutting edge CE, there is a considerable reduction in the loads applied to the cutting edge CE at the area of the corner (compared to regular drills), allowing for longer life span of the drill DRL under similar conditions to those of a common drill.

With additional attention drawn to FIG. 82F, when the drill DRL is within the bore BR, owing to the unique use of the 'warped corner', there is considerably more space for the chip CH between the rake surface RA of the drill DRL and the side walls of the bore BR.

Turning now to FIGS. 83A to 83G, an example of a drilling tool is shown, generally designated as 10,300, having a body 10,312 extending along a central axis X, and formed with a cutting portion 10,320 at one end thereof. The drill 10,300 is further formed with spiral portions 10,314 extending about the central axis X, and chip evacuation channels 10,316 formed therebetween, configured for evacuation of chips removed from the workpiece WP (not shown). In addition, there extends an auxiliary chip evacuation channel 10,318 between the cutting portion 10,320 and the spiral portions 10,314 of the drill 10,300, adapted for further evacuation of chips removed from the workpiece WP.

The cutting portion is formed with a cutting edge 10,324 extending from the central axis X in the outwardly radial direction and forming a corner between a front face of the cutting portion 10,320 and a peripheral surface of the cutting portion 10,320. The corner, as in previous examples, yields to the design of the 'warped corner' as designated by points A, B and C which correspond to points A, B and C described with respect to FIGS. 70A to 70D, and yielding to the same definition. In particular, it is observed that, much like the exemplary drill DRL, this drill 10,300 also has a 'sunk in' corner of the cutting edge 10,324.

The unique design of the drill 10,300 lies in the auxiliary chip evacuation channel 10,318. The design is such that chip removed by that segment of the cutting edge 10,324 extending between the center and point A, are configured to be urged via the chip evacuation channel 10,316, as denoted by arrow R, while chips removed by that segment of the cutting edge extending between points A and B (and passing through C), are configured to be urged and evacuated through the auxiliary channel 10,318 as denoted by arrow r. Such a design reduces the amount of chips flowing through each channel 10,316, 10,318, preventing unnecessary congestion of chips in the channel. The above described principle is similar to the principle previously disclosed with respect to drilling tool 800, shown in FIGS. 16A and 16B.

Turning now to FIGS. 84A to 84E, another example of a drilling tool is shown, generally designated 10,300', which is essentially similar to the exemplary drill DRL. The drill 10,300' has a body 10,312' extending along a central axis X, and formed with a cutting portion 10,320' at one end thereof. The drill 10,300' is further formed with spiral portions 10,314' extending about the central axis X, and chip evacuation channels 10,316' formed therebetween, configured for evacuation of chips removed from the workpiece WP (not shown).

The cutting portion is formed with a cutting edge 10,324' extending from the central axis X in the outwardly radial direction and forming a corner between a front face of the cutting portion 10,320' and a peripheral surface of the cutting portion 10,320'. The corner, as in previous examples, yields to the design of the 'warped corner' as designated by points A, B and C which correspond to points A, B and C described with respect to FIGS. 70A to 70E, and yielding to the same definition. In particular, it is observed that, much like the exemplary drill DRL, this drill 10,300' also has a 'sunk in' corner of the cutting edge 10,324', and operates much the same manner as drill DRL previously described.

Turning now to FIGS. 85A to 85G, another example of a drilling tool is shown, generally designated as 10,300". The drilling tool 10,300" is generally similar to the drilling tool 10,300', with the difference being in the design of the cutting edge 10,324" at the corner of the cutting portion 10,320. In particular, the drill 10,300" has a body 10,312" extending along a central axis X, and formed with a cutting portion 10,320" at one end thereof. The drill 10,300" is further formed with spiral portions 10,314" extending about the central axis X, and chip evacuation channels 10,316" formed therebetween, configured for evacuation of chips removed from the workpiece WP (not shown).

The cutting portion is formed with a cutting edge 10,324" extending from the central axis X in the outwardly radial direction and forming a corner between a front face of the cutting portion 10,320" and a peripheral surface of the cutting portion 10,320". The corner, as in previous examples, yields to the design of the 'warped corner' as designated by points A, B and C which correspond to points A, B and C described with respect to FIGS. 70A to 70E, and yielding to the same definition. In particular, it is observed that, contrary to the drilling tool 10,300', this drill 10,300" has a 'bulging out' corner of the cutting edge 10,324", and operates much the same manner as the previously described cutting edge of cutting insert 10,500'.

Attention is now drawn to FIGS. 86A to 86F, where still another drilling tool is shown generally being designated as 10,300'. This drilling tool 10,300''' is a combination of the drilling tool 10,300' and the previously disclosed drilling tool 6000, described with reference to FIGS. 47A to 49. In particular, the drilling tool 10,300''' is also spiral, much like drilling tool 6000, with the difference that it has a cutting edge 10,324''' formed with a 'warped corner' similar to that of the drilling tool 10,300'. The combination of these features demonstrates the interchangeable use and combination of previously described different features within one cutting tool. Therefore, this drilling tool will not be discussed in detail, as it should be apparent to any person skilled in the art in light of the description pertaining to tools 6000 and 10,300' with respect to FIGS. 47A to 49 and 84A to 84E respectively.

It should further be clear that most principles and features described above with respect to cutting tools (1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,300, 10,300', 10,300", 10,300''', 10,400, 10,400', 10,500, 10,500', 10,500", 10,600, 10,600' and/or shown in FIGS. 1A to 86F, are not restricted to those cutting tools (1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,300, 10,300', 10,300", 10,300''', 10,400, 10,400', 10,500, 10,500', 10,500", 10,600, 10,600') in connection with which they are described/shown, and may independently be applied, mutatis mutandis, to each other or to any other tools, in any combination considered to be appropriate by a person skilled in the art.

Turning now to FIGS. 87A to 87F, an integral milling tool is shown generally designated as 10,700, in which the concept of the 'warped corner' is implemented. The milling tool 10,700 is formed with a body 10,710 having spiraling portions 10,712 with chip evacuating channels 10,716 extending therebetween (also spiraling). Each of the spiraling portions 10,712 is formed with a cutting edge 10,734, spiraling about the central axis X.

The milling tool 10,700 is further formed with a front surface F extending perpendicular to the central axis at one end of the body 10,710. Between the front surface F and the spiraling portions 10,712 a corner is formed, such that there exists a corner cutting edge 10,724 extending along the corner (see FIG. 87F). This corner is designed according to the concept of the 'warped corner' and is designated by points A, B and C which correspond to points A, B and C described with respect to FIGS. 70A to 70E, and yielding to the same definition. In particular, it is observed that, much like the exemplary drill DRL previously described with respect to FIGS. 81A to 81D, this milling tool 10,700 also has a 'sunk in' corner, such that the cutting edge 10,724 is 'pulled back' ('sunk in') and operates much the same manner as the corner of the drill DRL previously described. However, as opposed to the drill DRL, here, the corner of the milling tool 10,700 is adapted to form a near-right angle (and not about 120°).

Turning now to FIGS. 88A to 88D, another milling tool is shown generally designated 10,700'. The milling tool 10,700' is generally similar to the milling tool 10,700 with the difference being in the design of the cutting edge 10,724' at the corner of the cutting portion 10,720. In particular, the milling tool 10,700' is also formed with a body 10,710' having spiraling portions 10,712' with chip evacuating channels 10,716' extending therebetween (also spiraling). Each of the spiraling portions 10,712' is formed with a cutting edge 10,734', spiraling about the central axis X.

The milling tool 10,700' is further formed with a front surface F extending perpendicular to the central axis at one end of the body 10,710'. Between the front surface F and the spiraling portions 10,712' a corner is formed, such that there exists a corner cutting edge 10,724' extending along the corner (see FIG. 88D). This corner is also designed, as in the previous example, according to the concept of the 'warped corner' and is designated by points A, B and C which correspond to points A, B and C described with respect to FIGS. 70A to 70E, and yielding to the same definition. In particular, it is observed that, contrary to the previously disclosed milling tool 10,700, this milling tool 10,700' has a 'bulging out' corner, such that the cutting edge 10,724' is 'extended forward' and operates much the same manner as the corner of the cutting insert 10,500' previously described.

Figure 88A:
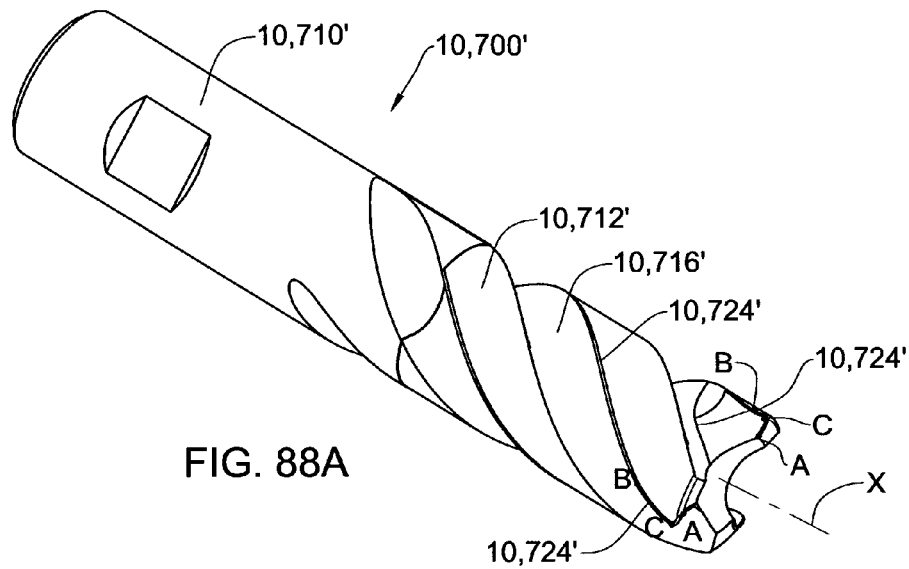
Figure 88B:
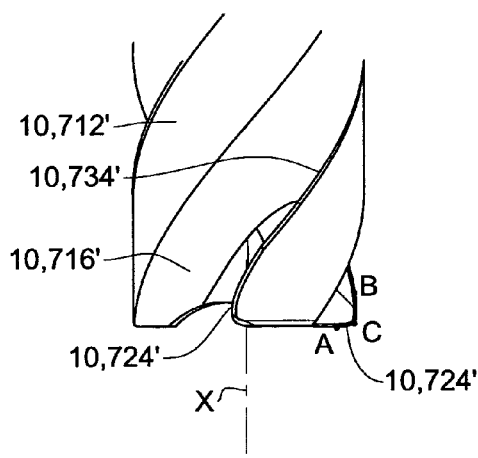
Figure 88C:
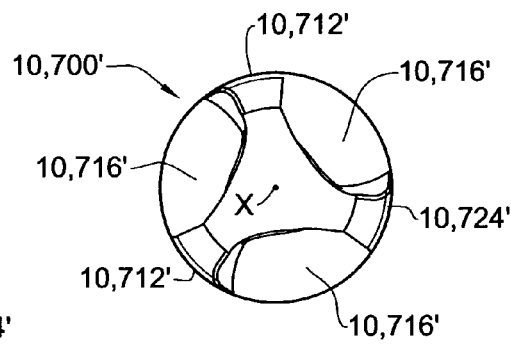
Figure 88D:
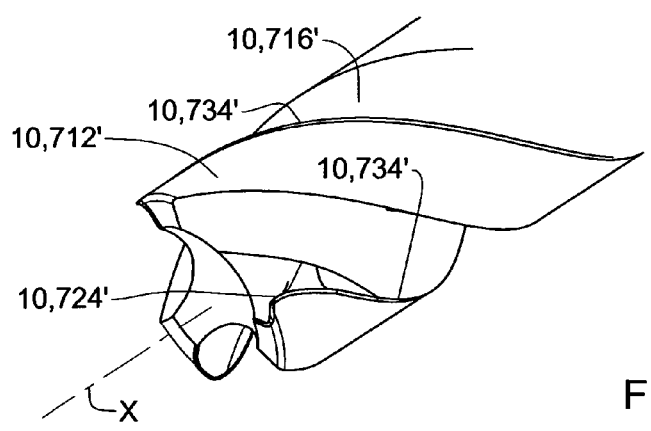

It should further be clear that most principles and features described above with respect to cutting tools (1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,300, 10,300', 10,300", 10,300''', 10,400, 10,400', 10,500, 10,500', 10,500", 10,600, 10,600', 10,700 and 10,700' and/or shown in FIGS. 1A to 88D, are not restricted to those cutting tools (1, 100, 100', 200, 300, 400, 500, 600, 700, 800, 900, 1000, 2000, 3000, 4000, 4000', 4000", 5000, 5000', 5000", 5000''', 6000, 6000', 6000", 7000, 8000, 8000', 9000, 9000', 9000", 9000''', 9000'''', 10,000, 10,200, 10,300, 10,300', 10,300", 10,300''', 10,400, 10,400', 10,500, 10,500', 10,500", 10,600, 10,600', 10,700 and 10,700') in connection with which they are described/shown, and may independently be applied, mutatis mutandis, to each other or to any other tools, in any combination considered to be appropriate by a person skilled in the art.

Attention is now drawn to FIGS. 89A to 89F, in which a circular saw tool ST is shown, comprising a plurality of cutting inserts, generally designated 10,800. Each such cutting insert 10,800 comprises a body 10,812 having a top face 10,822T, a bottom face 10,822B, two side faces 10,822S extending therebetween and a front face 10,822F also extending there between and bridging between the side faces 10,822S.

Each of the side faces 10,822S and the front face 10,822F form a corner, an a cutting edge 10,832 is formed at the intersection of each of these corners with the top face 10,822T. Each of these cutting edges 10,832 has a rake surface 10,834 formed on the top face 10,822T and a relief surface 10,836 formed on the corner between the side faces 10,822S and the front face 10,822F. Thus, the cutting insert 10,800 has two cutting edges 10,832 disposed side-by-side, and is symmetric with respect to a plane extending parallel to the side faces 10,822S and located therebetween.

Each of the cutting edges 10,832 has a design of a 'warped corner' which is similar to the corner design of the corner of the cutting insert 10,500". Each of the cutting edges 10,832 is thus appropriately designated by points A, B and C which correspond to points A, B and C described with respect to FIGS. 70A to 70E, and yielding to the same definition.

In particular, since the design of the cutting edge 10,832 at the corner is similar to that of cutting insert 10,500", the operation of the cutting insert 10,800 is also similar, with the difference being that in this cutting insert 10,800, both cutting edges 10,832 operate simultaneously during the same cutting operation.

Chips removed by the cutting edges 10,832 of the cutting insert 10,800 are split into two groups away from the center of the top face 10,822T (i.e. away from the symmetry plane), owing to the unique design of the top face 10,822T, such that chips removed by one cutting edge 10,832 are urged towards one side face 10,822S, while chips removed by the other cutting edge 10,832 are urged towards the other side face 10,822S.

Turning now to FIGS. 90A and 90B, a straight saw tool ST' incorporating the cutting inserts 10,800. Since the cutting inserts 10,800 have already been described in detail, the operation of the straight saw ST' making use of the same inserts 10,800 should be clear to a person skilled in the art.

Turning now to FIGS. 91A to 91F, the circular saw tool ST is shown when making use of another example of a cutting insert, generally designated as 10,800'. The cutting insert is similar in design to that of cutting insert 10,800, with the difference being in the design of the cutting corners thereof. In particular, the cutting insert 10,800' also comprises a body 10,812' having a top face 10,822T', a bottom face 10,822B', two side faces 10,822S' extending therebetween and a front face 10,822F' also extending there between and bridging between the side faces 10,822S'.

Each of the side faces 10,822S' and the front face 10,822F' form a corner, an a cutting edge 10,832' is formed at the intersection of each of these corners with the top face 10,822T'. Each of these cutting edges 10,832' has a rake surface 10,834' formed on the top face 10,822T' and a relief surface 10,836' formed on the corner between the side faces 10,822S' and the front face 10,822F'. Thus, the cutting insert 10,800' has two cutting edges 10,832' disposed side-by-side, and is also, as cutting insert 10,800, symmetric with respect to a plane extending parallel to the side faces 10,822S' and located therebetween.

Each of the cutting edges 10,832' has a design of a 'warped corner' which is similar to the corner design of the corner of the cutting insert 10,500'. Each of the cutting edges 10,832' is thus appropriately designated by points A, B and C which correspond to points A, B and C described with respect to FIGS. 70A to 70E, and yielding to the same definition.

In particular, since the design of the cutting edge 10,832' at the corner is similar to that of cutting insert 10,500', the operation of the cutting insert 10,800' is also similar, with the difference being that in this cutting insert 10,800', both cutting edges 10,832' operate simultaneously during the same cutting operation.

Chips removed by the cutting edges 10,832' of the cutting insert 10,800 are both urged towards the center of the top face 10,822T (i.e. towards the symmetry plane) owing to the unique design of the top face 10,822T, such that chips removed by both cutting edges 10,832 are urged to converge.

Turning now to FIGS. 92A and 92B, a straight saw tool ST' incorporating the cutting inserts 10,800'. Since the cutting inserts 10,800' have already been described in detail, the operation of the straight saw ST' making use of the same inserts 10,800' should be clear to a person skilled in the art.

Turning now to FIGS. 93A to 93E, a grooving tool GT is shown comprising a cutting tool holder and a cutting insert generally designated as 10,800". The cutting insert 10,800" is generally similar in design to cutting insert 10,800' with several differences in the overall design. In particular, cutting insert 10,800" is formed with a body 10,812" having a top face 10,822T", a bottom face 10,822B", two side faces 10,822S" extending therebetween and a front face 10,822F" also extending there between and bridging between the side faces 10,822S".

The cutting insert 10,800" is further formed with an extension 10,824 extending from the bottom face 10,822B", and configured for mounting the cutting insert 10,800" onto the cutting tool holder TH. When mounted, the bottom face 10,822B" of the cutting insert 10,800" is supported by the tool holder TH, as well as a rear face 10,822R" thereof.

Each of the side faces 10,822S" and the front face 10,822F" form a corner, an a cutting edge 10,832" is formed at the intersection of each of these corners with the top face 10,822T". Each of these cutting edges 10,832" has a rake surface 10,834" formed on the top face 10,822T" and a relief surface 10,836" formed on the corner between the side faces 10,822S" and the front face 10,822F". Thus, the cutting insert 10,800" has two cutting edges 10,832" disposed side-by-side, and is also, as cutting insert 10,800', symmetric with respect to a plane extending parallel to the side faces 10,822S" and located therebetween.

Each of the cutting edges 10,832" has a design of a 'warped corner' which is similar to the corner design of the corner of the cutting insert 10,500". Each of the cutting edges 10,832" is thus appropriately designated by points A, B and C which correspond to points A, B and C described with respect to FIGS. 70A to 70E, and yielding to the same definition.

Contrary to the cutting insert 10,800', the top face 10,822T" of this cutting insert 10,800" is formed with an additional chip breaking recess 10,838", configured for breaking the chips removed from the workpiece WP (shown FIG. 93A) by the cutting edges 10,832". In particular, during operation of the cutting insert 10,800", all chips removed from the workpiece WP converge towards the center of the top face 10,822T" (i.e. towards the symmetry plane). However, statistically, chips removed by the segment of the cutting edge 10,832" between points B and C are urged towards the top face 10,822T", while the chips removed by the segment of the cutting edge 10,832" between points A and C are urged towards the recess 10,838".

With particular reference being drawn to FIG. 93C, when the grooving tool GT is in position to engage the workpiece WP, one optional engagement point is a point located between point C and B, designated CP (Contact Point). In particular, this means that the central axis of the workpiece WP about which it is adapted to revolve is aligned with the contact point CP.

Turning now to FIGS. 94A to 94E, another example of a cutting insert is shown generally designated 10,900. The cutting insert 10,900 is generally similar to the cutting insert 10,500", with the difference being in the design of the cutting edge 10,932 at the corner of the cutting insert 10,900. In particular the cutting insert 10,900 has a body 10,920 of a generally rectangular shape, a front face 10,922F, a rear face 10,922R and side walls $10,922S_1$ and $10,922S_2$ extending therebetween. The side faces $10,922S_1$ and $10,922S_2$ extend, respectively, between the short sides and the long sides of the rectangular faces 10,922F and 10,222R. The arrangement is such that two adjacent side faces $10,222S_1$ and $10,222S_2$ form therebetween a corner, corresponding to a corner which is to be formed within the workpiece WP (not shown) during a cutting operation.

The cutting insert 10,900 is formed with two cutting portions 10,930, on opposite corners of the face side 10,922F of the cutting insert 10,900, each such cutting portion 10,930 comprising a cutting edge 10,932. In each of the cutting portion 10,930, the cutting edge 10,932 has at least a portion defined at the intersection between the corner formed by the side faces 10,922S and the front face 10,922F.

The cutting edge 10,932 may also be defined as the intersection between a rake surface 10,934 extending along the front face 10,922F, and a relief surface extending along the corner formed between two neighboring side faces 10,922S$_1$, 10,922S$_2$.

In each cutting portion 10,930 of the cutting edge 10,932, the corner is designed with a prolonged cutting edge 10,932 at the corner, designated by points A, B and C corresponding to points A, B and C described with respect to FIGS. 70A to 70E, and yielding to the same definition (i.e. the projection of point C on the O axis, falls between the projections of point A and point B on the O axis).

It is observed that in this particular example, the cutting portion 10,930, as in the previously described with respect to cutting insert 10,500", is indented/concave, such that point A is the farther from the front face 10,922F than point B (along the axial direction), and point C is located at an intermediary distance from the front face 10,922F (along the central axis X).

In operation, the cutting insert 10,900 operates similar to cutting insert 10,500", i.e. it penetrates into the workpiece WP (not shown) such that point A is first to come into contact with the material of the workpiece, followed by point C on the corner, and only thereafter, point B.

Once a chip is removed from the workpiece WP (not shown), it is urged by the shape of the rake surface 10,934 of the cutting portion 10,930 upwards towards point B, and from there is further urged away from the cutting edge 10,932 until it is fully evacuated away from the cutting insert 10,900.

However, contrary to cutting insert 10,500", the cutting edge 10,932 of the cutting insert 10,900 is formed with a chamfer portion (rather than being rounded), so as to generate, within the workpiece WP (not shown), a corner with a chamfer. The chamfer portion 10,937 of the cutting edge 10,932 may be better observed from FIGS. 94C and 94D.

Finally, turning to FIGS. 95A to 95D, still another cutting insert is shown, generally designated as 10,900'. The cutting insert 10,900' is generally similar to the cutting insert 10,500", with the difference being in the design of the cutting edge 10,932 at the corner of the cutting insert 10,900'. In particular the cutting insert 10,900' has a body 10,920' of a generally rectangular shape, a front face 10,922F', a rear face 10,922R' and side walls 10,922S$_1$' and 10,922S$_2$' extending therebetween. The side faces 10,922S$_1$' and 10,922S$_2$' extend, respectively, between the short sides and the long sides of the rectangular faces 10,922F' and 10,222W. The arrangement is such that two adjacent side faces 10,222S$_1$' and 10,222S$_2$' form therebetween a corner, corresponding to a corner which is to be formed within the workpiece WP (not shown) during a cutting operation.

The cutting insert 10,900' is formed with two cutting portions 10,930', on opposite corners of the face side 10,922F' of the cutting insert 10,900', each such cutting portion 10,930' comprising a cutting edge 10,932'. In each of the cutting portion 10,930', the cutting edge 10,932' has at least a portion defined at the intersection between the corner formed by the side faces 10,922S' and the front face 10,922F'.

The cutting edge 10,932' may also be defined as the intersection between a rake surface 10,934' extending along the front face 10,922F', and a relief surface extending along the corner formed between two neighboring side faces 10,922S$_1$', 10,922S$_2$'.

In each cutting portion 10,930' of the cutting edge 10,932', the corner is designed with a prolonged cutting edge 10,932' at the corner, designated by points A, B and C corresponding to points A, B and C described with respect to FIGS. 70A to 70E, and yielding to the same definition (i.e. the projection of point C on the O axis, falls between the projections of point A and point B on the O axis).

It is observed that in this particular example, the cutting portion 10,930', as in the previously described with respect to cutting insert 10,500", is indented/concave, such that point A is the farther from the front face 10,922F' than point B (along the axial direction), and point C is located at an intermediary distance from the front face 10,922F' (along the central axis X).

In operation, the cutting insert 10,900' operates similar to cutting insert 10,500", i.e. it penetrates into the workpiece WP (not shown) such that point A is first to come into contact with the material of the workpiece, followed by point C on the corner, and only thereafter, point B.

Once a chip is removed from the workpiece WP (not shown), it is urged by the shape of the rake surface 10,934' of the cutting portion 10,930' upwards towards point B, and from there is further urged away from the cutting edge 10,932' until it is fully evacuated away from the cutting insert 10,900'.

However, contrary to cutting insert 10,500", the cutting edge 10,932' of the cutting insert 10,900' is not fully rounded, as observed from FIGS. 95B and 95D. In particular, the cutting edge 10,932' has a breaking point at 10,938', such that the cutting edge 10,932' is not fully continuous.

With respect to all of the above described cutting tools—milling, turning and drilling, it is appreciated that the features of these cutting tools as mentioned above may provide the cutting tools with at least one of the following advantages:

Feed—under the same loads, the cutting tool may operate at greater feed and rotation speed F and $V_R$ respectively, than an equivalent cutting tool without the above mentioned features, and, as such, remove a greater amount of material from the workpiece per time unit t;

Loads—under the same feed and rotation speed F and $V_R$, the cutting tool may be subjected to lower loads than an equivalent cutting tool without the above mentioned features, thereby providing an increased overall lifespan;

Chip—under the same rotation speed $V_R$, the cutting tool may be allowed a greater feed F than an equivalent cutting tool without the above features, thus allowing to remove a thicker chip per time unit t for one turn of the cutting tool or workpiece; and Speed—under the same feed F, the cutting tool or the workpiece may be allowed a greater rotation speed $V_R$ than an equivalent cutting tool without the above features, removing a greater amount of chips per time unit t.

Lifespan—the cutting inserts/tools may be provided with a longer lifespan under the same conditions as a standard cutting insert/tool.

Those skilled in the art to which this disclosed subject matter pertains will readily appreciate that numerous changes, variations, and modification can be made without departing from the scope of the disclosed subject matter, mutatis mutandis.

The invention claimed is:
1. A cutting element for use in a cutting operation comprising:

a cutting edge capable of cutting out material from a workpiece during said operation, to form therein a workpiece corner angle (α);

at least one view of said cutting edge in which a portion of the cutting edge is delimitable by a first and a second tangency lines oriented tangentially to said portion of the cutting edge portion at respective first and second tangency points (A) and (B); the tangency lines forming, at the intersection thereof a vertex (O), and forming therebetween a cutting angle (AOB) corresponding to the workpiece corner angle (α);

a virtual bisector of said cutting angle intersecting the portion of said cutting edge at a third point (C);

a virtual line ($O_L$) passing through said vertex (O) perpendicularly to the plane of said one view; and an image projection (C') of the point (C) on line ($O_L$) is located between projections (A') and (B') of the respective tangency points (A) and (B) of said portion of the cutting edge on said line ($O_L$).

2. The cutting element according to claim 1, wherein the points (A), (C) and (B) lie on consecutive planes oriented substantially perpendicular to the line ($O_L$), such that point (C) lies on an intermediary plane, located between a plane on which lies tangency point (A), and a plane on which lies tangency point (B).

3. The cutting element according to claim 1, further comprising a first side face and a second side face, angled to one another to form an angle corresponding to the angle (α), the intersection between the side faces forming said corner, and a front face, such that the intersection between the front face and the corner formed by the side faces forms the portion of said cutting edge.

4. The cutting element according to claim 3, wherein tangency point (A) is located on a segment of the cutting edge at the intersection between the first side face and the front face while tangency point (B) is located on a segment of the cutting edge between the second side face and the front face.

5. The cutting element according to claim 4, wherein tangency point (A) is at a distance from a rear face of the cutting element that is greater than the distance of tangency point (B) from the rear face, whereby during the cutting operation, the cutting edge is configured so that tangency point (A) is the first to engage the workpiece, thereafter point (C) and only thereafter, tangency point (B).

6. The cutting element according to claim 4, wherein tangency point (B) is at a distance from a rear face of the cutting element which is greater than the distance of tangency point (A) from the rear face, whereby during the cutting operation, the cutting edge is configured so that tangency point (B) is the first to engage the workpiece, thereafter point (C) and only thereafter, tangency point (A).

7. The cutting element according to claim 1, wherein the cutting edge of the cutting element is defined as the intersection between a rake surface and a relief surface, the cutting element being formed with a cutting strip at an area portion of a rake surface extending along the cutting edge and having a width in a direction perpendicular to the cutting edge.

8. The cutting element according to claim 7, wherein the cutting strip extends along the corner of the cutting edge passing through points (A), (C) and (B), and has a varying orientation at each point along the cutting portion defined between tangency points (A) and (B), the orientation being defined by the direction normal to the cutting strip.

9. The cutting element according to claim 8, wherein the cutting strip extends around the corner of the cutting element, and also changes the orientation of the surface of the cutting strip with respect to the line ($O_L$).

10. The cutting element according to claim 1, wherein the cutting element is constituted by a cutting insert.

11. The cutting element according to claim 10, wherein the cutting insert is indexible and/or reversible, respectively having at least one of the following:
more than one cutting edge on one of the front and rear face thereof; or
at least one cutting edge at any one of said front and rear face thereof.

12. A cutting member according to claim 3, wherein there is formed an intersection line between said front face and said side faces, and said cutting element comprises cutting edges extending transverse to said intersection line.

13. A cutting tool holder adapted for mounting thereon a cutting member of claim 1, wherein the rake surface of the cutting member is formed with a plurality of chip breaking steps disposed along the rake surface in the direction of the cutting edge.

14. The cutting tool holder according to claim 13, wherein each of the chip breaker steps is adapted to be oriented transverse to the rake surface, at an angle (α), the angle being sufficient to cause a chip removed from the workpiece during operation of the cutting tool and progressing along the rake surface to break upon contact with the chip breaker step.

15. The cutting element according to claim 1, wherein:
said cutting element having a front face, a rear face opposite the front face, a first side face and a second side face angled to one another to form an angle corresponding to the angle (α);
the intersection between said front face and said first and second side faces forming said cutting edge;
said point (A) being located on the intersection between the first side face and the front face while said point (B) is located on the intersection between the second side face and the front face; and
said one view of the cutting edge corresponding to a front view of the cutting element, and in a side view of the cutting element including the cutting edge, one of said points (A) and (B) being closer to said rear face that to the other of the point (A) and (B).

* * * * *